(12) United States Patent
Ha et al.

(10) Patent No.: US 12,475,661 B2
(45) Date of Patent: Nov. 18, 2025

(54) OPTICAL LENS, DISPLAY, AND CONNECTING MEMBER PHYSICALLY COUPLING OPTICAL LENS AND DISPLAY TO EACH OTHER

(71) Applicant: LETINAR CO., LTD., Anyang-si (KR)

(72) Inventors: Jeong Hun Ha, Seodaemun-gu (KR); Jae Hyeok Kim, Anyang-si (KR)

(73) Assignee: LETINAR CO., LTD., Anyang-si (KR)

( * ) Notice: Subject to any disclaimer, the term of this patent is extended or adjusted under 35 U.S.C. 154(b) by 0 days.

(21) Appl. No.: 18/675,039

(22) Filed: May 27, 2024

(65) Prior Publication Data
US 2024/0394986 A1 Nov. 28, 2024

(30) Foreign Application Priority Data

May 25, 2023 (KR) .................. 10-2023-0067842
May 25, 2023 (KR) .................. 10-2023-0067843

(Continued)

(51) Int. Cl.
*G06T 19/00* (2011.01)
*G02B 27/01* (2006.01)
*G06F 3/01* (2006.01)

(52) U.S. Cl.
CPC ........ *G06T 19/006* (2013.01); *G02B 27/0172* (2013.01); *G06F 3/011* (2013.01)

(58) Field of Classification Search
CPC ............ G02B 27/0101; G02B 27/0149; G02B 27/0172; G02B 27/0176; G02B 27/0977;
(Continued)

(56) References Cited

U.S. PATENT DOCUMENTS

2019/0086674 A1* 3/2019 Sinay .................. G02B 27/0081
2024/0168433 A1* 5/2024 Jang .................. G02F 1/134363
2024/0329408 A1* 10/2024 Uhlendorf .............. G03B 35/18

FOREIGN PATENT DOCUMENTS

JP         2018-072597 A    5/2018
KR   10-2022-0017455 A    2/2022
KR        20230042230 A    3/2023

OTHER PUBLICATIONS

KR Office Action dated Aug. 13, 2025 in application No. 10-2024-0052809.
(Continued)

*Primary Examiner* — Nelson M Rosario
(74) *Attorney, Agent, or Firm* — Maschoff Brennan

(57) ABSTRACT

An optical lens module for providing augmented reality content includes an optical lens, in which reflection members provide image light as a pupil of a user's eye, a connection member coupled with the optical lens, and a display providing image light to the reflection members. The display is disposed on a seating structure of the connection member. A first coupling structure extending laterally is formed on one side of the optical lens. Second coupling structures are formed on one side of the connection member in the lateral direction. A gap is formed between the second coupling structures. In a state in which the connection member and the optical lens are coupled based on the concave structure and the protruding structures being coupled to each other, image light output from the display is provided in the direction of the optical lens through the gap between the protruding structures.

15 Claims, 119 Drawing Sheets

(30) Foreign Application Priority Data

| | | |
|---|---|---|
| May 25, 2023 | (KR) | 10-2023-0067844 |
| Jun. 13, 2023 | (KR) | 10-2023-0075729 |
| Jun. 13, 2023 | (KR) | 10-2023-0075730 |
| Jun. 13, 2023 | (KR) | 10-2023-0075731 |
| Jun. 23, 2023 | (KR) | 10-2023-0080795 |
| Jun. 23, 2023 | (KR) | 10-2023-0080796 |
| Jun. 23, 2023 | (KR) | 10-2023-0080797 |
| Jul. 12, 2023 | (KR) | 10-2023-0090623 |
| Jul. 12, 2023 | (KR) | 10-2023-0090624 |
| Apr. 19, 2024 | (KR) | 10-2024-0052778 |

(58) Field of Classification Search
CPC .............. G02B 27/28; G02B 2027/014; G02B 2027/0178; G06F 3/011; G06T 19/006
See application file for complete search history.

(56) References Cited

OTHER PUBLICATIONS

KR Office Action dated Sep. 30, 2025 in application No. 10-2024-0052778.

* cited by examiner

FIG. 10
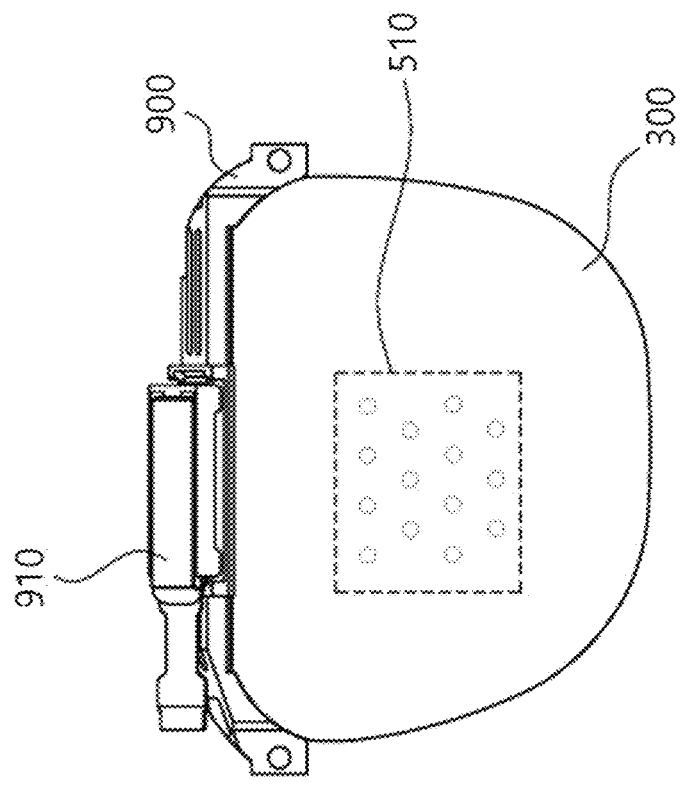
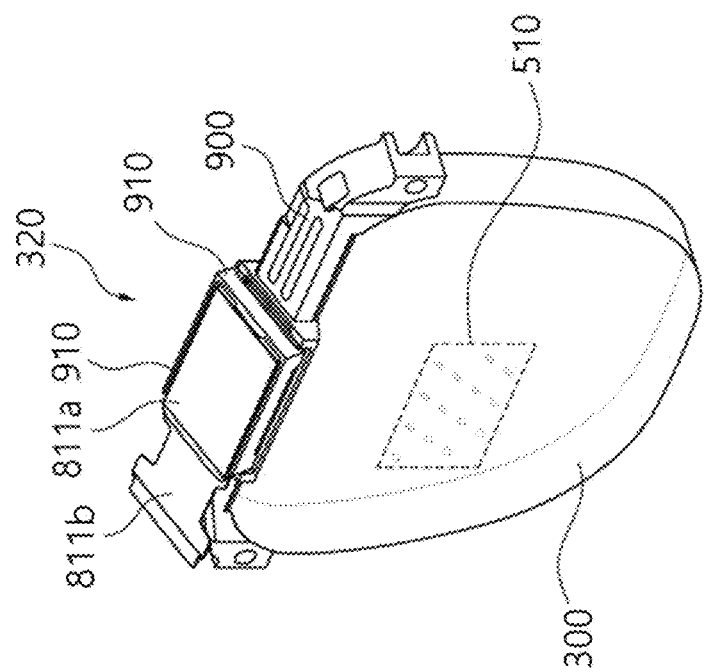

FIG. 29
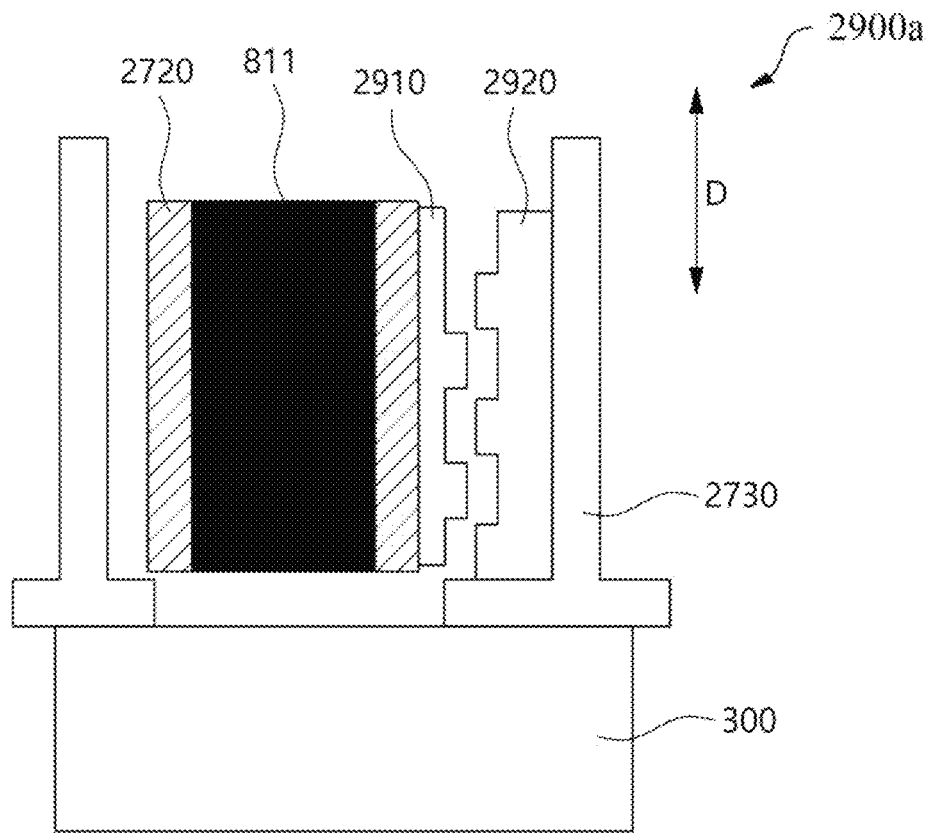
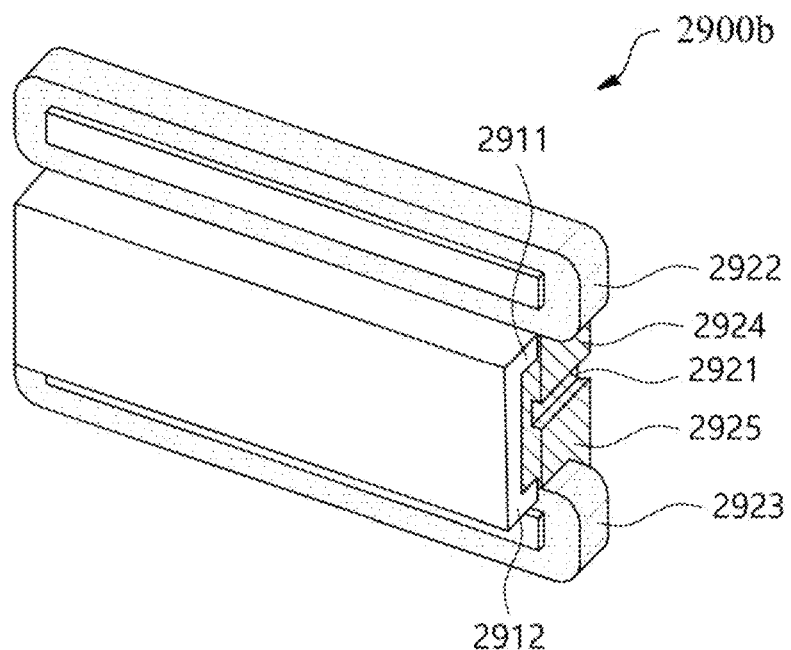

FIG. 40
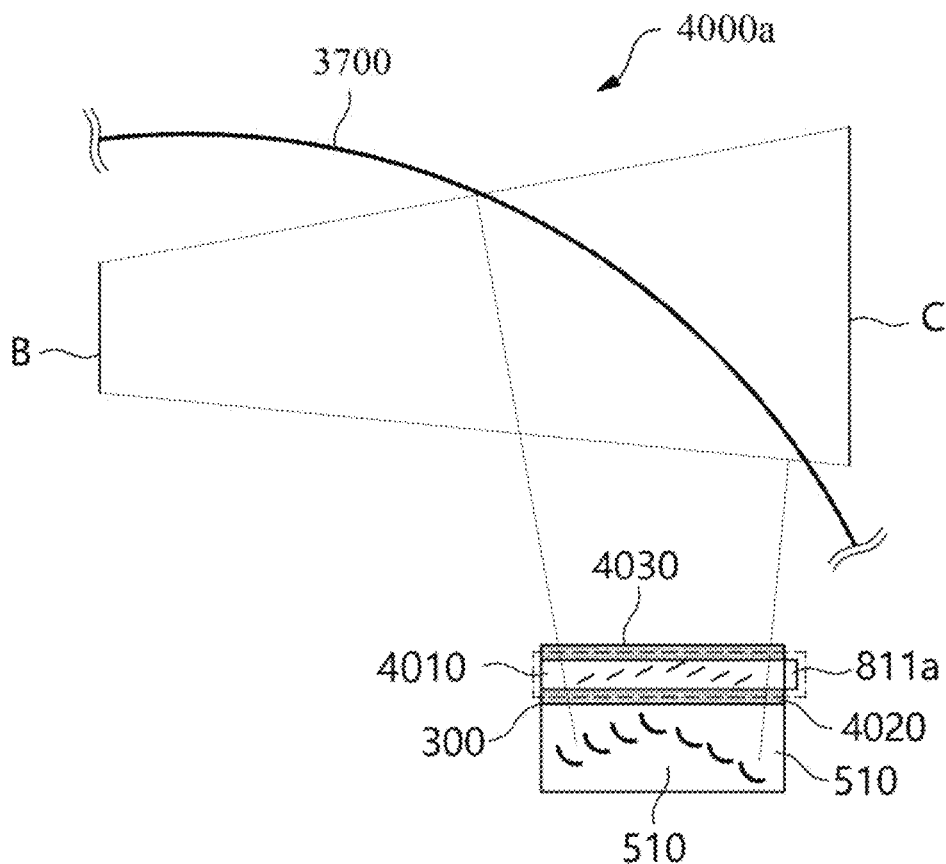
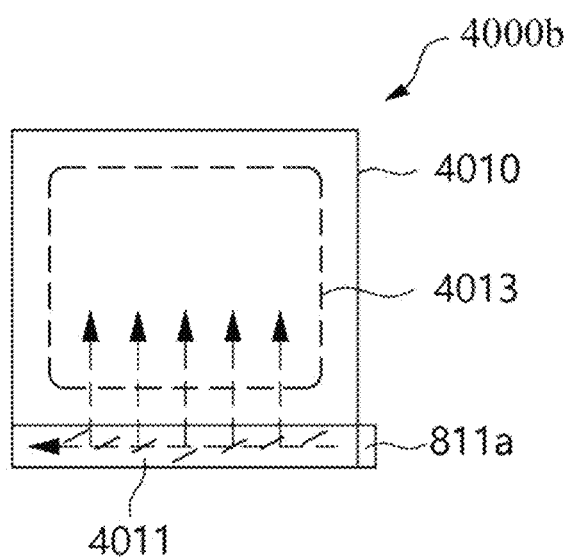

FIG. 49
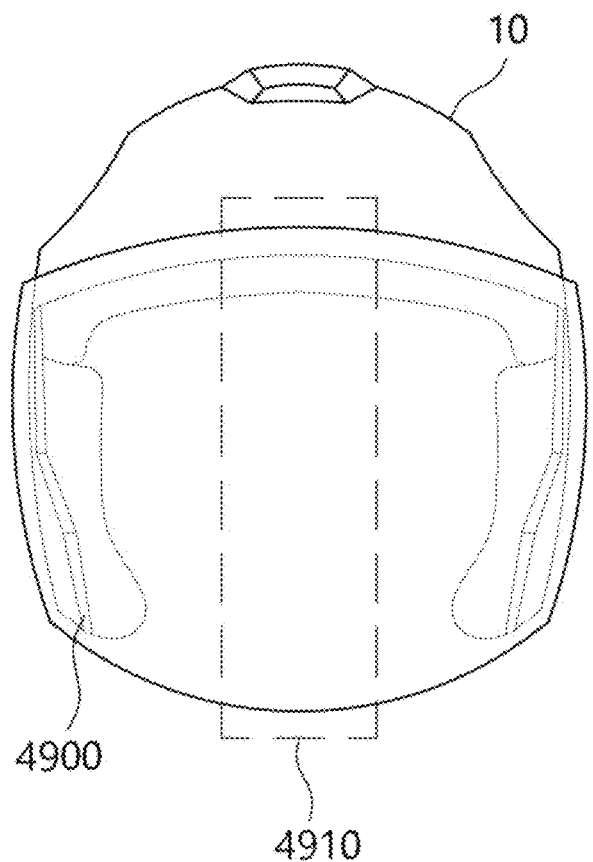
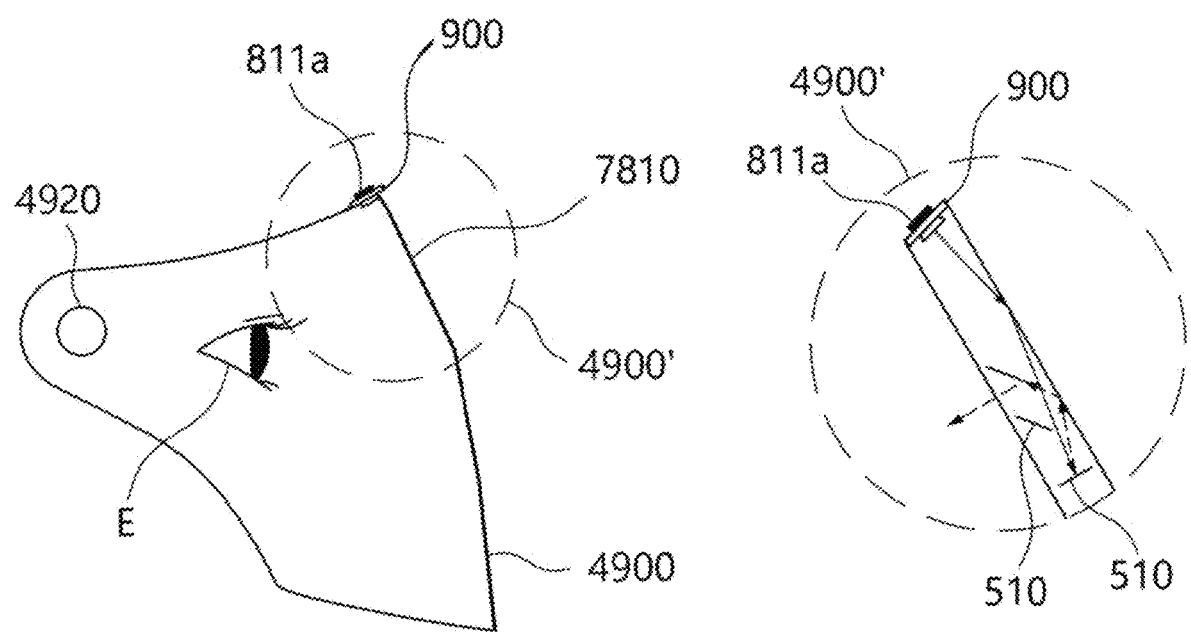

FIG. 75
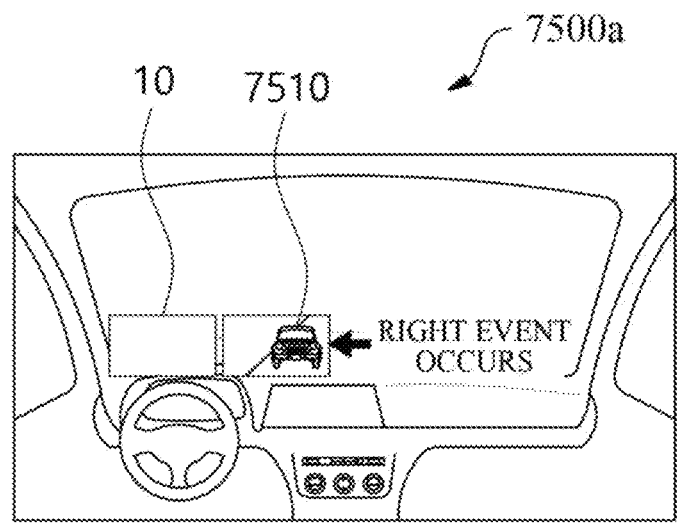
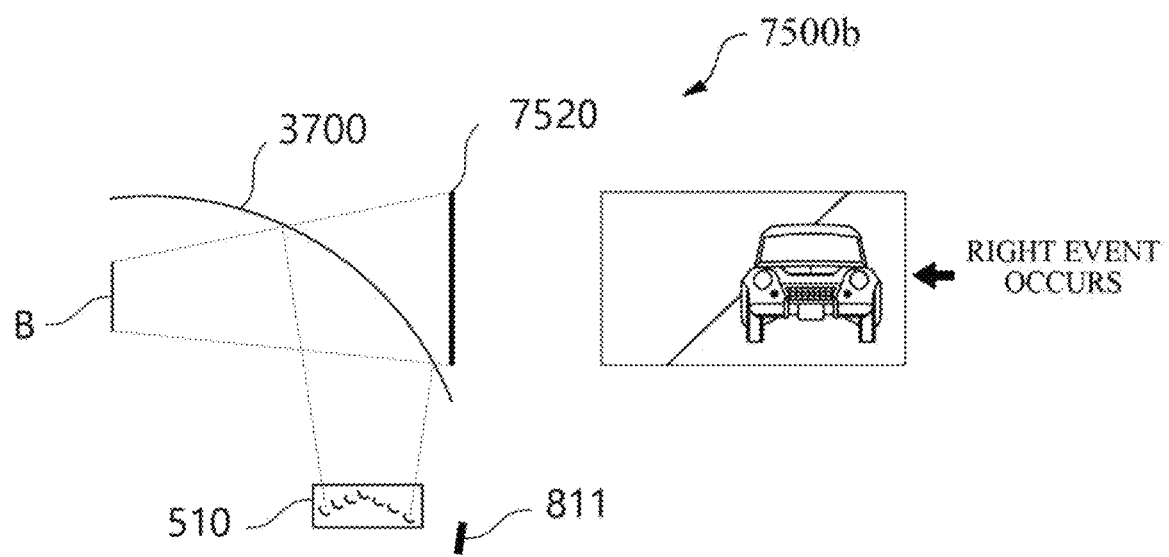

FIG. 117
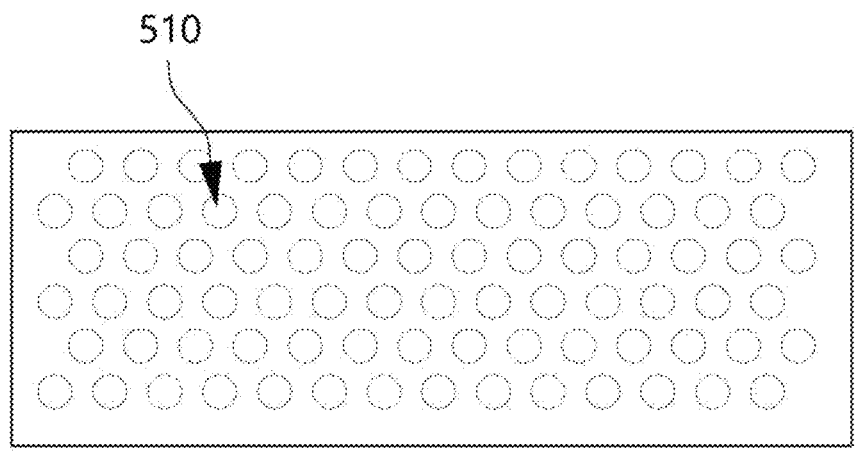
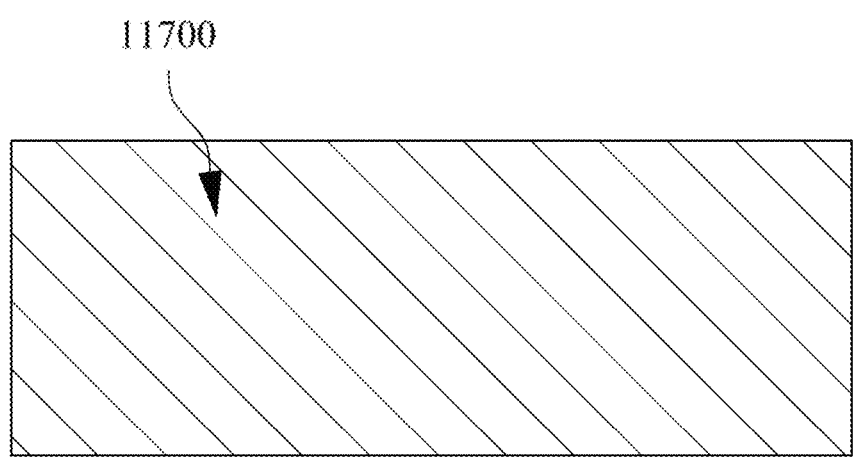

FIG. 119
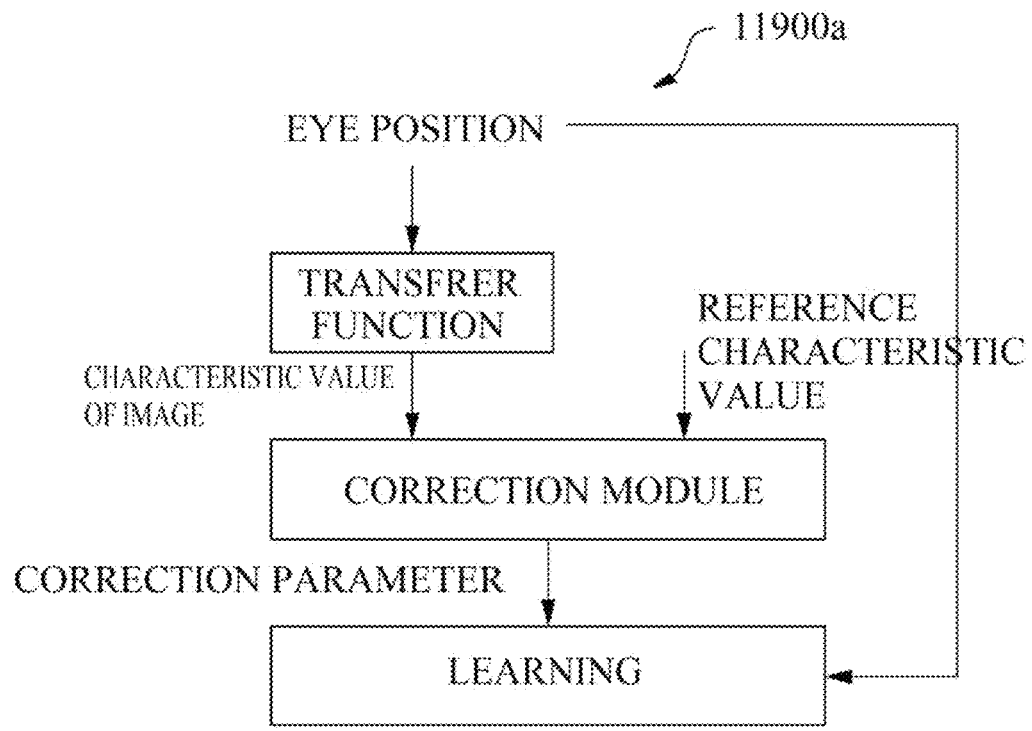
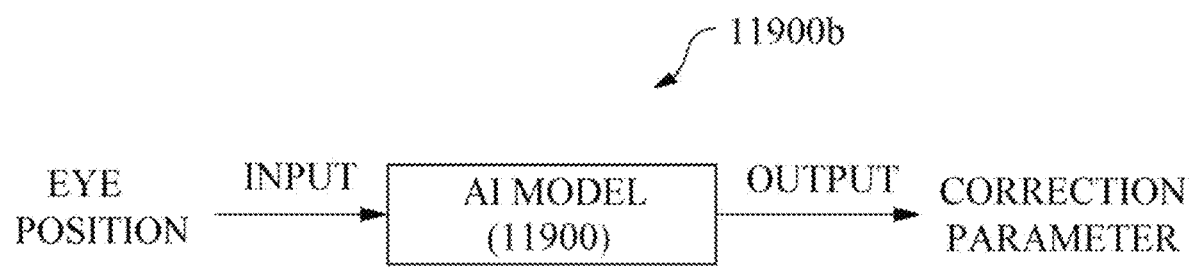

OPTICAL LENS, DISPLAY, AND CONNECTING MEMBER PHYSICALLY COUPLING OPTICAL LENS AND DISPLAY TO EACH OTHER

CROSS-REFERENCE TO RELATED APPLICATION

This application claims priority to and the benefit of Korean Patent Application No. 10-2023-0067842, filed on May 25, 2023, Korean Patent Application No. 10-2023-0067843, filed on May 25, 2023, Korean Patent Application No. 10-2023-0067844, filed on May 25, 2023, Korean Patent Application No. 10-2023-0075729, filed on Jun. 13, 2023, Korean Patent Application No. 10-2023-0075730, filed on Jun. 13, 2023, Korean Patent Application No. 10-2023-0075731, filed on Jun. 13, 2023, Korean Patent Application No. 10-2023-0080795, filed on Jun. 23, 2023, Korean Patent Application No. 10-2023-0080796, filed on Jun. 23, 2023, Korean Patent Application No. 10-2023-0080797, filed on Jun. 23, 2023, Korean Patent Application No. 10-2023-0090623, filed on Jul. 12, 2023, Korean Patent Application No. 10-2023-0090624, filed on Jul. 12, 2023, and Korean Patent Application No. 10-2024-0052778, filed on Apr. 19, 2024, the disclosure of which is incorporated herein by reference in its entirety.

BACKGROUND

Field of the Invention

Various embodiments of the present invention relate to an optical lens, a display, and a connection member for physically coupling the optical lens and the display.

Discussion of Related Art

Augmented reality (AR) is a technology that combines virtual objects or information in an environment that is actually existing and makes it appear like objects that exist in the original environment.

In order to implement the augmented reality, an optical system for transmitting virtual images reproduced by a device such as a computer to the eye of a user is required. For example, the augmented reality optical system generally includes a display unit emitting virtual image light, and an optical module including a lens for transmitting image light from an external actual object to the eye, wherein an optical element for transmitting virtual image light emitted from the display unit to the eye of the user is arranged.

In addition to the optical module for implementing the augmented reality, it is necessary to develop various technical elements for the practical use of the augmented reality.

SUMMARY OF THE INVENTION

An objective of the present invention is to provide an optical lens, a display, and a connection member for physically coupling the optical lens and the display to each other, which can improve the manufacturing convenience of an optical module used for augmented reality or virtual reality and minimize the tolerance at the time of assembly.

Another objective of the present invention is to provide an optical member for improving the optical quality of image light output from the display of the augmented reality device. Another objective of the present invention is to provide a driving device that changes the position of the display of the augmented reality device in order to enhance the visual quality of the user for the augmented reality content.

Another objective of the present invention is to provide an augmented reality device including a structure for acquiring reflected light of the user's eyes to provide various convenience services according to the user's gaze information. Another objective of the present invention is to provide various types of augmented reality devices using an optical lens including a plurality of reflective members and an installation type and wearing type.

Another objective of the present invention is to provide an augmented reality device that performs a gesture recognition function for recognizing the user's intention in various situations and an operation method thereof. Another objective of the present invention is to provide an augmented reality device that provides a convenience service within a vehicle with high convenience and an operation method thereof. Another objective of the present invention is to provide an augmented reality device that provides an augmented reality content service based on eye examination, surgical navigation, and disease judgment and an operation method thereof.

According to various embodiments, an optical lens module for providing augmented reality content may include an optical lens, in which a plurality of reflection members are embedded and disposed to provide image light as a pupil of a user's eye, a connection member implemented to be coupled with the optical lens, and a display implemented to provide image light to the plurality of reflection members, wherein the display is disposed on a seating structure of the connection member, a first coupling structure extending in a lateral direction is formed on one side of the optical lens, a plurality of second coupling structures are formed on one side of the connection member in the lateral direction, and a gap is formed between the plurality of second coupling structures, and in a state in which the connection member and the optical lens are coupled based on the concave structure and the plurality of protruding structures being coupled to each other, image light output from the display is provided in the direction of the optical lens through the gap between the plurality of protruding structures.

According to various embodiments, an augmented reality device for providing augmented reality content includes: an optical lens in which a plurality of reflection members are embedded and disposed to provide image light as a pupil of a user's eye; a connection member implemented to be coupled with the optical lens; and a display implemented to provide image light to the plurality of reflection members, wherein the display includes a frame disposed on a seating structure of the connection member and covering at least a portion of the connection member and the optical lens in which the display is seated, wherein a concave structure extending in a transverse direction is formed on an upper portion of the optical lens, a plurality of protrusion structures are formed in the transverse direction are formed on a lower portion of the connection member, and a gap is formed between the plurality of protrusion structures, and wherein the connection member and the optical lens are coupled based on the concave structure and the plurality of protrusion structures being coupled to each other, wherein the image light output from the display is formed to be provided in the direction of the optical lens through the gap between the plurality of protrusion structures.

According to various embodiments, an optical lens, a display, and a connection member for physically coupling the optical lens and the display to each other, which can increase manufacturing convenience of an optical module used for augmented reality or virtual reality and minimize tolerances during assembly, may be provided.

According to various embodiments, an optical member for improving the optical quality of image light output from the display of the augmented reality device may be provided. According to various embodiments, a driving device for changing the position of the display of the augmented reality device may be provided to enhance the visual quality of the user for the augmented reality content.

According to various embodiments, an augmented reality device including a structure for obtaining reflected light of the user's eyes for providing various convenience services according to the user's gaze information may be provided.

According to various embodiments, various types of augmented reality devices using an optical lens including a plurality of reflective members may be provided, such as installation type and wearing type. According to various embodiments, an augmented reality device for performing a gesture recognition function for recognizing the user's intention in various situations may be provided, and an operation method thereof may be provided.

According to various embodiments, an augmented reality device for providing convenience in vehicle services with high convenience may be provided, and an operation method thereof may be provided. According to various embodiments, an augmented reality device for providing augmented reality content services based on eye examination, surgical navigation, and disease determination may be provided, and an operation method thereof may be provided.

The effects of the present specification are not limited to the above-described effects, and the effects not mentioned may be clearly understood by those skilled in the art from the specification and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 10 is a diagram for describing an example of the connection member according to various embodiments.

FIG. 29 is a diagram for explaining an example of changing the position of the output device through the interaction of magnetic substance(s) and electromagnet(s) according to various embodiments.

FIG. 40 is a diagram for explaining a third implementation example of the augmented reality device implemented to provide augmented reality content to a single area of the optical member of the vehicle according to various embodiments.

FIG. 49 is a diagram for describing an example of a wearing-type augmented reality device according to various embodiments.

FIG. 75 is a diagram for describing an operation for providing an image around a transportation means according to various embodiments.

FIG. 117 is a diagram for describing an example of a pattern image provided as an optical lens by a quality evaluation device according to various embodiments.

FIG. 119 is a diagram for describing an example of an artificial intelligence model for content control according to various embodiments.

DETAILED DESCRIPTION OF EXEMPLARY EMBODIMENTS

Figure 1:
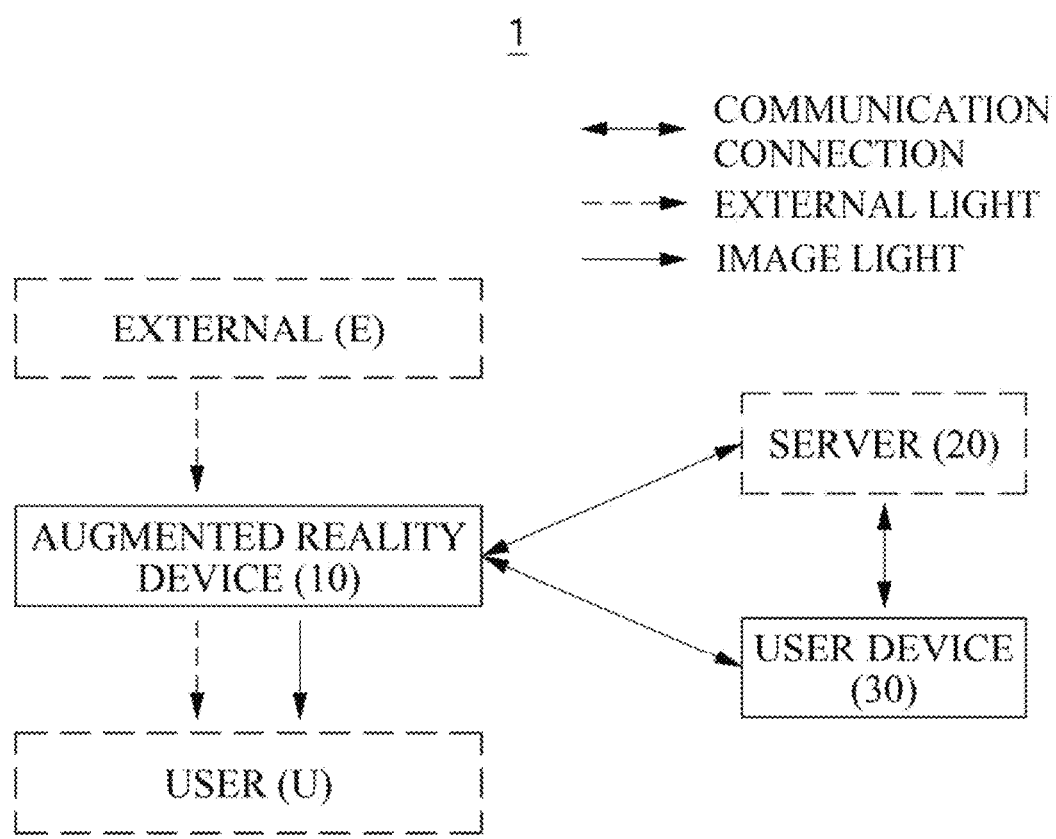
FIG. 1 is a block diagram for explaining an example of a configuration of the augmented reality system according to various embodiments.

The electronic device according to various embodiments disclosed in this document may be various types of devices. The electronic device may include, for example, a portable communication device (e.g., a smartphone), a computer device, a portable multimedia device, a portable medical device, a camera, a wearable device, or a home appliance. The electronic device according to an embodiment of the present document is not limited to the aforementioned devices.

It should be understood that various embodiments of the present disclosure and the terms used herein are not intended to limit the technical features disclosed in the present disclosure to specific embodiments, but to include various changes, equivalents, or alternatives to the corresponding embodiments. With regard to the description of the drawings, similar reference numerals may be used for similar or related components. The singular form of a noun corresponding to an item may include one or more of the items unless the relevant context clearly dictates otherwise. In this document, each of the phrases such as "a or b," "at least one of a and b," "at least one of a or b," "a, b, or c," "at least one of a, b, and c," and "at least one of a, b, or c" may include any one of the items listed together in the corresponding phrase among the phrases, or any and all possible combinations thereof. Terms such as "first", "second", or "first" may be used simply to distinguish a corresponding component from another corresponding component, and the corresponding components are not limited in other aspects (e.g., importance or order). If a (e.g., first) component is referred to as "coupled" or "connected" with or without the term "functionally" or "communicatively" to another (e.g., second) component, it means that the component may be connected to the other component directly (e.g., wired), wirelessly, or through a third component.

The term "module" used in various embodiments of the present disclosure may include a unit implemented in hardware, software, or firmware, and may be used interchangeably with terms such as logic, logical block, components, or circuits. A module may be an integrated component or a minimum unit or part of the component that performs one or more functions. For example, according to an embodiment, the module may be implemented in the form of an application-specific integrated circuit (ASIC).

Various embodiments of the present disclosure may be implemented as software (e.g., a program) including one or more instructions stored in a storage medium (e.g., an internal memory or an external memory) readable by a machine (e.g., an electronic device). For example, a processor (e.g., processor) of a device (e.g., an electronic device) may call at least one instruction among one or more instructions stored from a storage medium and execute it. This enables the device to be operated to perform at least one function in accordance with the at least one command called. The one or more instructions may include code generated by a compiler or code that can be executed by an interpreter. A storage medium that can be read by a device may be provided in the form of a non-transitory storage medium. Here, 'non-transitory' means that the storage medium is a tangible device and does not include a signal (e.g., electromagnetic wave), and this term does not distinguish between a case where data is semi-permanently stored in the storage medium and a case where data is temporarily stored.

According to an embodiment, the method according to various embodiments disclosed in this document may be included and provided in a computer program product. Computer program products can be traded between sellers and buyers as goods. The computer program product may be distributed in the form of a machine-readable storage medium (e.g., compact disc read only memory (CD-ROM)), or may be distributed (e.g., downloaded or uploaded) online through an application store (e.g., Play Store™), or directly between two user devices (e.g., smart phones). In the case of online distribution, at least a part of the computer program product may be temporarily created or at least temporarily stored in a storage medium readable by a device such as a server of a manufacturer, a server of an application store, or a memory of a relay server.

According to various embodiments, each component (e.g., module or program) of the above-described components may include a single or a plurality of entities, and some of the plurality of entities may be separately arranged in other components. According to various embodiments, one or more components or operations among the corresponding components described above may be omitted, or one or more other components or operations may be added. Alternatively or additionally, a plurality of components (e.g., modules or programs) may be integrated into one component. In this case, the integrated component may perform one or more functions of each component of the plurality of components, the same as or similar to that performed by the corresponding component among the plurality of components before the integration. According to various embodiments, operations performed by modules, programs, or other components may be executed sequentially, in parallel, repeatedly, or heuristically, one or more of the operations may be executed in a different order, omitted, or one or more other operations may be added.

According to various embodiments, an optical lens module for providing augmented reality content may include an optical lens, in which a plurality of reflection members are embedded and disposed to provide image light as a pupil of a user's eye, a connection member implemented to be coupled with the optical lens, and a display implemented to provide image light to the plurality of reflection members, wherein the display is disposed on a seating structure of the connection member, a first coupling structure extending in a lateral direction is formed on one side of the optical lens, a plurality of second coupling structures are formed on one side of the connection member in the lateral direction, and a gap is formed between the plurality of second coupling structures, and in a state in which the connection member and the optical lens are coupled based on the concave structure and the plurality of protruding structures being coupled to each other, image light output from the display is provided in the direction of the optical lens through the gap between the plurality of protruding structures.

According to various embodiments, an optical lens module may be provided in a state in which the connection member and the optical lens are coupled based on the coupling between the concave structure and the plurality of protruding structures, wherein the position of the gap formed between the plurality of protruding structures corresponds to the position of the plurality of reflection members.

According to various embodiments, the optical lens module may be provided in which the image light output from the display is provided toward the plurality of reflection members through the gap, and the augmented reality content is visually recognized by the user as the image light is reflected from the plurality of reflection members and provided to the pupil of the user.

According to various embodiments, the optical lens module may further include a display holder in which the display is disposed, and the display holder may be disposed in the seating structure of the connection member.

According to various embodiments, the optical lens module may further include an electrical connection member extending from the display, and the electrical connection member may extend laterally on the connection member.

According to various embodiments, the optical lens module may further include at least one optical member disposed between the gaps.

According to various embodiments, the at least one member may include an optical member, and the first optical characteristic of the optical member may correspond to the second optical characteristic of the optical lens.

According to various embodiments, the at least one member may include a driving device for moving a position of the display.

According to various embodiments, the plurality of protruding structures may include a first protruding structure and a second protruding structure, and the concave structure may include a first concave structure implemented to be coupled to the first protruding structure and a second concave structure implemented to be coupled to the second protruding structure, and an electrical connection member extending from the display may be disposed in an empty space formed in a state in which the first protruding structure and the first concave structure are coupled.

According to various embodiments, the optical lens module may be provided in which the height of the first protruding structure is smaller than the height of the second protruding structure, and the empty space is formed between the bottom surface of the first protruding structure and the bottom surface of the first concave structure.

According to various embodiments, the optical lens module may be provided in which the thickness of the first protruding structure is larger than the thickness of the second protruding structure, and the empty space is formed inside the first protruding structure.

According to various embodiments, the optical lens module may be provided in which a first coupling structure is formed at the side of the optical lens, a second coupling structure formed to be coupled to the first coupling structure, and the connection member is firmly supported by an additional member in a state in which the first coupling structure and the second coupling structure are coupled.

According to various embodiments, the first coupling structure may be a protruding structure, and the second coupling structure may be formed as a structure for surrounding the protruding structure.

According to various embodiments, an augmented reality device for providing augmented reality content includes an optical lens in which a plurality of reflective members configured to provide image light as a pupil of an eye of a user are embedded and disposed; a connection member configured to be coupled with the optical lens; and a display configured to provide image light to the plurality of reflective members, wherein the display includes a frame disposed on a seating structure of the connection member and covering at least a portion of the connection member and the optical lens on which the display is seated, wherein a concave structure extending in a transverse direction is formed at an upper portion of the optical lens, a plurality of protruding structures are formed at a lower portion of the connection member in the transverse direction, and a gap is formed between the plurality of protruding structures, and image light output from the display is provided in the direction of the optical lens through the gap between the plurality of protruding structures in a state in which the connection member and the optical lens are coupled based on the concave structure and each of the plurality of protruding structures being coupled to each other.

According to various embodiments, an augmented reality device may be provided in which the position of the gap formed between the plurality of protruding structures corresponds to the position of the plurality of reflective members in a state in which the connection member and the optical lens are coupled based on the concave structure and each of the plurality of protruding structures being coupled to each other.

1. A Summary of an Augmented Reality System 1

The augmented reality system 1 according to various embodiments may be a system configured to provide image light together with external light to a user. The user may visually recognize digital content by image light together with objects by external light. Digital content visually recognized together with objects visually recognized by the external light may be defined as augmented reality content.

1.1. A Configuration of the Augmented Reality System 1

Figure 2:
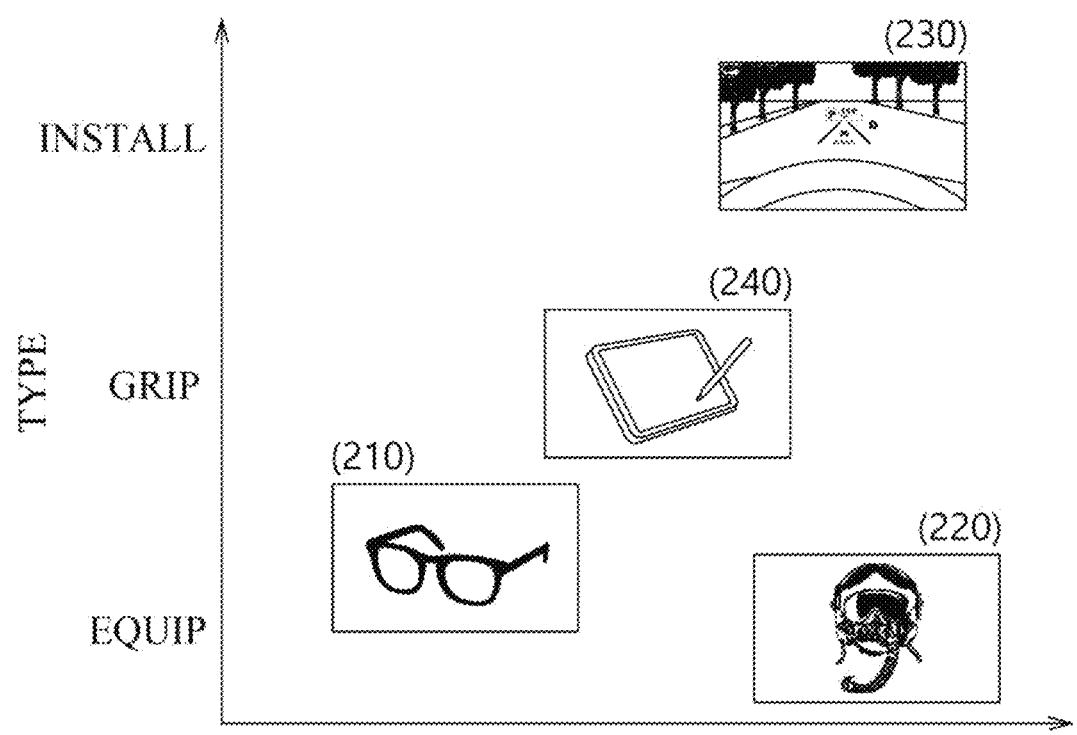
FIG. 2 is a block diagram for explaining examples of an augmented reality device according to various embodiments.

FIG. 1 is a block diagram for explaining an example of a configuration of the augmented reality system 1 according to various embodiments. FIG. 2 is a block diagram for explaining examples of an augmented reality device 10 according to various embodiments.

According to various embodiments, referring to FIG. 1, the augmented reality system 1 may include an augmented reality device 10, a server 20, and a user terminal 30. However, the illustrated and/or described example is not limited, and the augmented reality system 1 may be configured to include more components and/or include fewer components.

According to various embodiments, the augmented reality device 10 may be configured to provide augmented reality content to the user. The augmented reality device 10 may provide image light to the user u while the user u visually recognizes objects of the external E based on external light provided from the external E (for example, various things or natural objects) of the user U. At this time, the object of the external E may be visually recognized as external light is provided to the user through the augmented reality device 10 and/or as the images acquired by the augmented reality device 10 are provided to the user based on the external light. The augmented reality device 10 may provide various types of services to users based on augmented reality content.

Referring to FIG. 2, the augmented reality device 10 may be implemented in a wearable type, an installable type, and/or a grip type, and may be implemented in various sizes. For example, the wearable augmented reality device 10 includes glasses-type wearable augmented reality device 210, helmet-type wearable augmented reality device 220, and the like, and is not limited to the described and/or illustrated examples. Also for example, the installation-type augmented reality device includes a head-up display (HUD) 230 and the like, and is not limited to the illustrated and/or described examples. In addition, for example, the grip-type augmented reality device 10 may include a smartphone, a tablet pc, etc.

According to various embodiments, the server 20 may be implemented to provide a predetermined service through the augmented reality device 10. For example, the server 20 may receive information from the augmented reality device 10 with the augmented reality device 20 and/or transmit information to the augmented reality device 20.

According to various embodiments, the user terminal 30 is a user device using the augmented reality system 1, and may include wearable devices such as smartphones, tablet pcs, and smart watches.

1.2. Implementation Example of the Augmented Reality System 1

According to various embodiments, the augmented reality system 1 may be implemented to provide a service to the user u in various ways using the augmented reality device 10.

In an embodiment, the augmented reality device 10 may be implemented as a system type. The system type may be defined as a type that provides a service in cooperation with other external devices. For example, the augmented reality device 10 may be implemented to provide a service based on exchanging (e.g., transmitting and/or receiving) data (or information) with the server 20 via the user terminal 30. The augmented reality device 10 may set a communication connection with the user terminal 30, and the user terminal 30 may set a communication connection with the server 20. Accordingly, the augmented reality device 10 and the server 20 may transmit and/or receive data (or information) through the user terminal 30. As another example, the augmented reality device 10 may be implemented to provide a service based on exchanging (e.g., transmitting and/or receiving) data (or information) with the server 20. The augmented reality device 10 may set a communication connection directly with the server 20, transmit data (or information) to the server 20, or receive data (or information) from the server 20.

In another embodiment, the augmented reality device 10 may be implemented as an on-device type. For example, the augmented reality device 10 may be implemented to provide a service by itself without exchanging data (or information) with the server 10 and/or the user terminal 20.

The operation of the augmented reality device 10 described below may be performed based on all of the implementations of the augmented reality system 1 described above, unless otherwise noted.

2. The Configuration of the Augmented Reality Device 10

Figure 3:
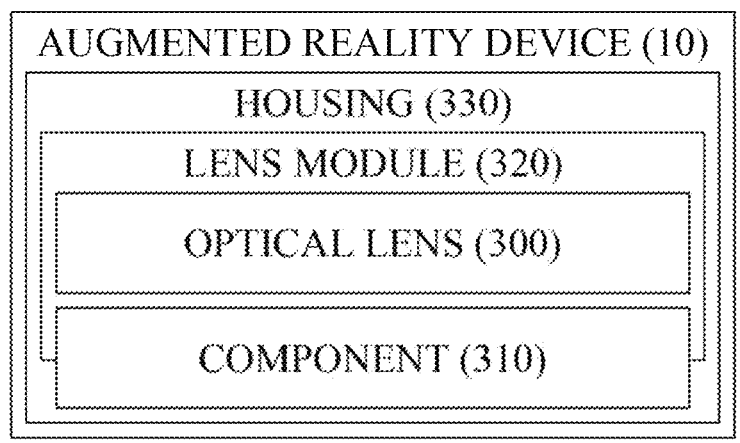
FIG. 3 is a block diagram for explaining an example of a configuration of an augmented reality device according to various embodiments.

FIG. 3 is a block diagram for explaining an example of a configuration of an augmented reality device 10 according to various embodiments.

Referring to FIG. 3, according to various embodiments, the augmented reality device 10 may include an optical lens 300, a component 310, a lens module 320, and a housing 330, and is not limited to the example shown and/or described, and the augmented reality device 10 may include more components and/or fewer components.

According to various embodiments, the optical lens 300 may be implemented to receive image light output from the display among the components 310 and provide the same as the pupil of the user of the augmented reality device 10 while providing light provided from the external. The optical lens 300 may be implemented based on an injection molding process of a plastic material, and thus may be designed to be resistant to an external impact.

According to various embodiments, the components 310 may include electronic components and/or physical components. The electronic components may include an output device, an input device, and a driving device, and the physical components may include a connection member for physically connecting the respective components, and an optical member optically connected to the optical lens. The detailed description of each component will be given below.

According to various embodiments, the lens module 320 may be implemented to include a part (e.g., a display and a connection member) of the optical lens 300 and the components 310. For example, the display may be disposed on the optical lens 300, and the lens module 320 may be provided by physically coupling the optical lens 300 and the display to the connection member.

According to various embodiments, the housing 330 may constitute the appearance of the augmented reality device 10, and the lens module 320 and the components 310 may be disposed. In one embodiment, when the augmented reality device 10 is implemented as a wearable type, the housing 330 may be implemented as a glasses frame and/or a helmet. When the augmented reality device 10 is implemented as an installation type, the housing 330 may be implemented as a housing that may be disposed at a specific position.

2.1. The Configuration of the Optical Lens 300

Figure 4:
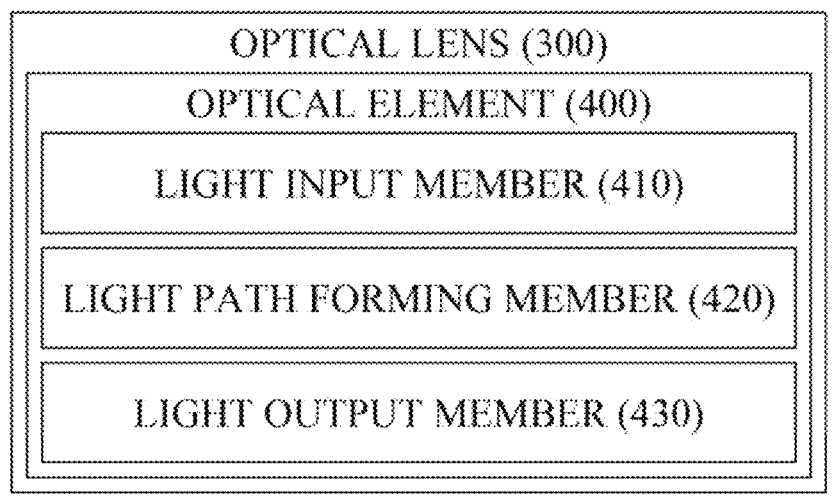
FIG. 4 is a block diagram of the optical lens according to various embodiments.

FIG. 4 is a block diagram of the optical lens 300 according to various embodiments. Hereinafter, FIG. 4 will be further described with reference to FIGS. 5 to 7.

Figure 5:
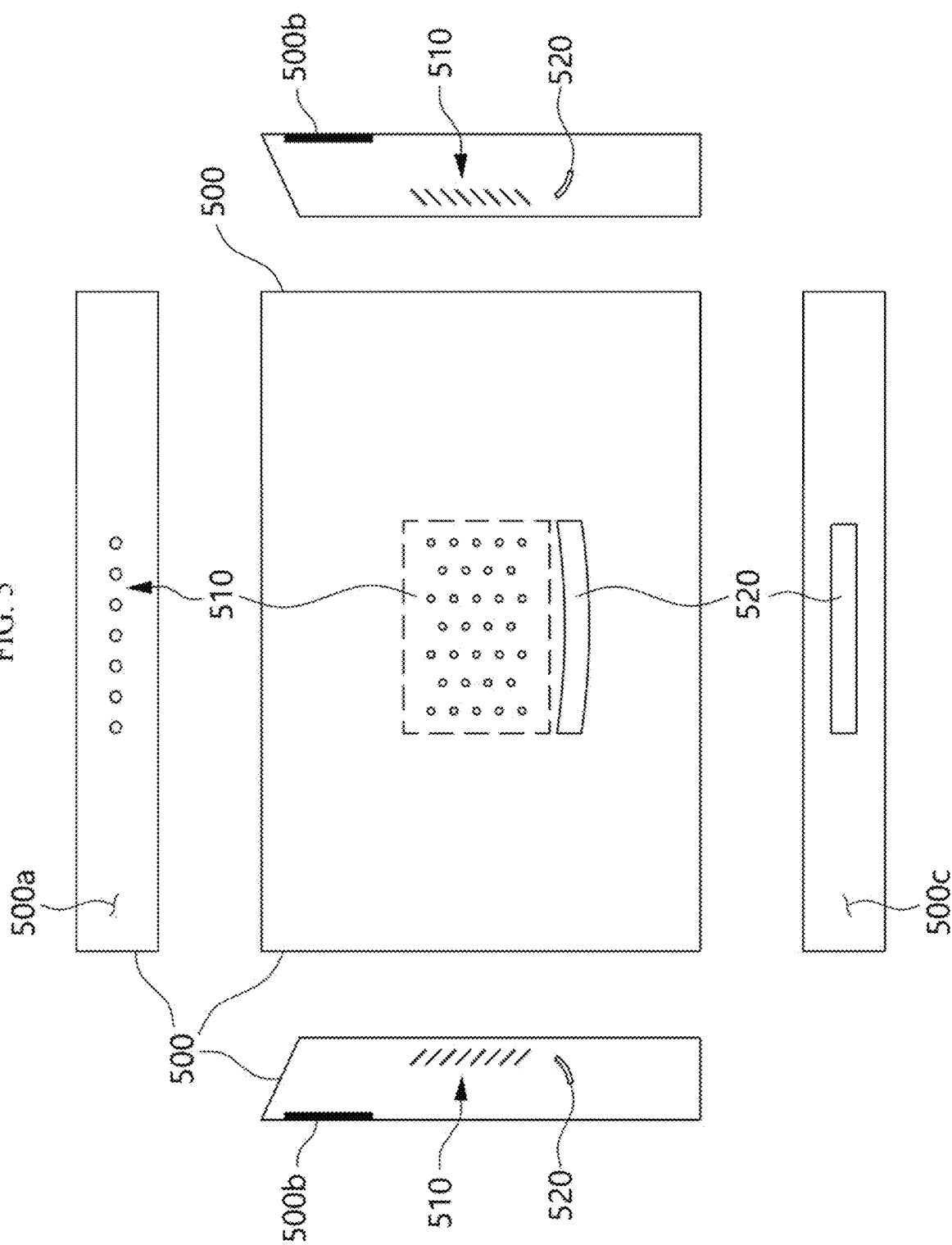
FIG. 5 is a diagram for explaining an example of a configuration of the optical lens according to various embodiments.
Figure 6:
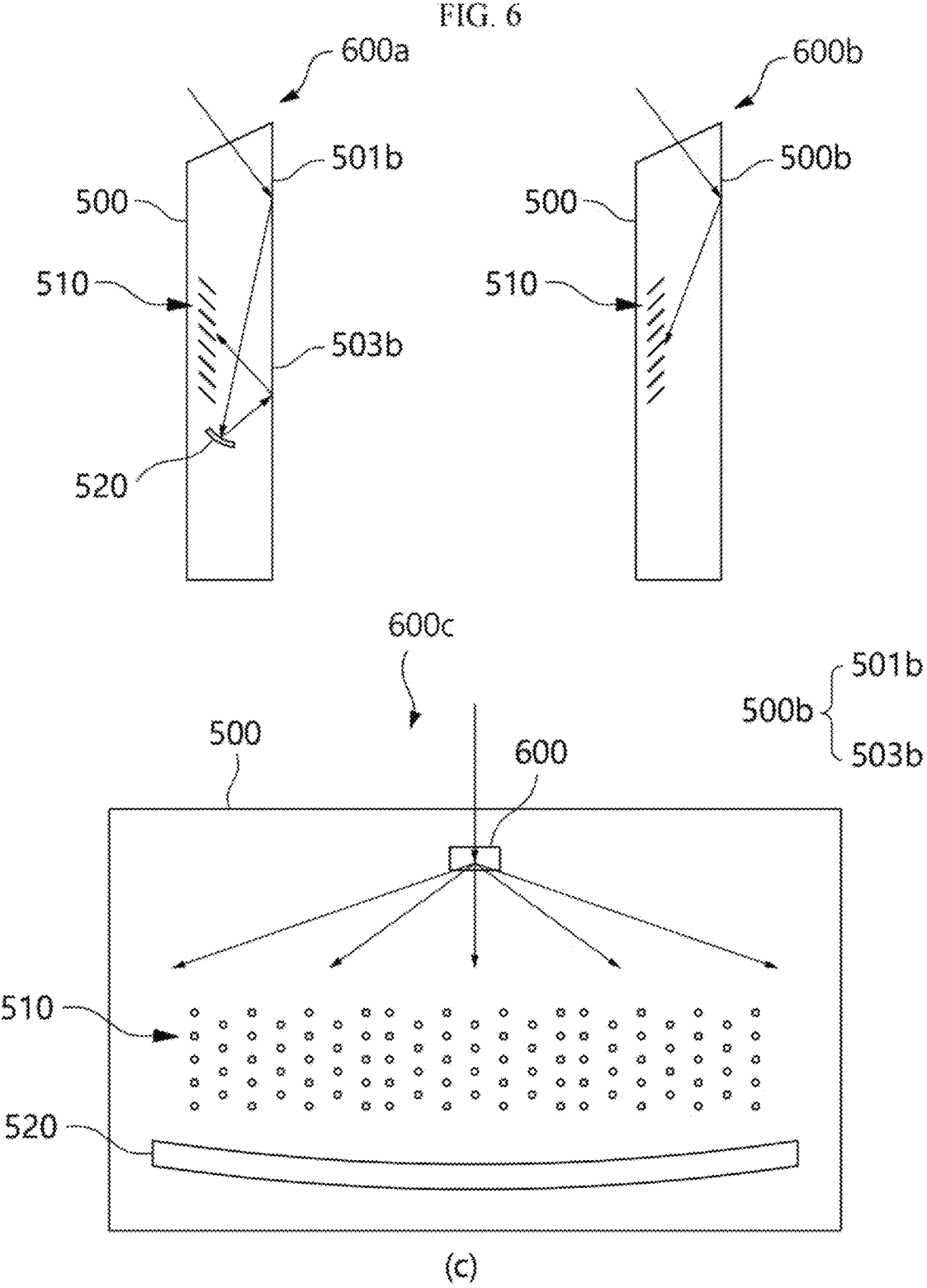
FIG. 6 is a diagram for explaining various examples of the optical lens 300 according to various embodiments.
Figure 7:
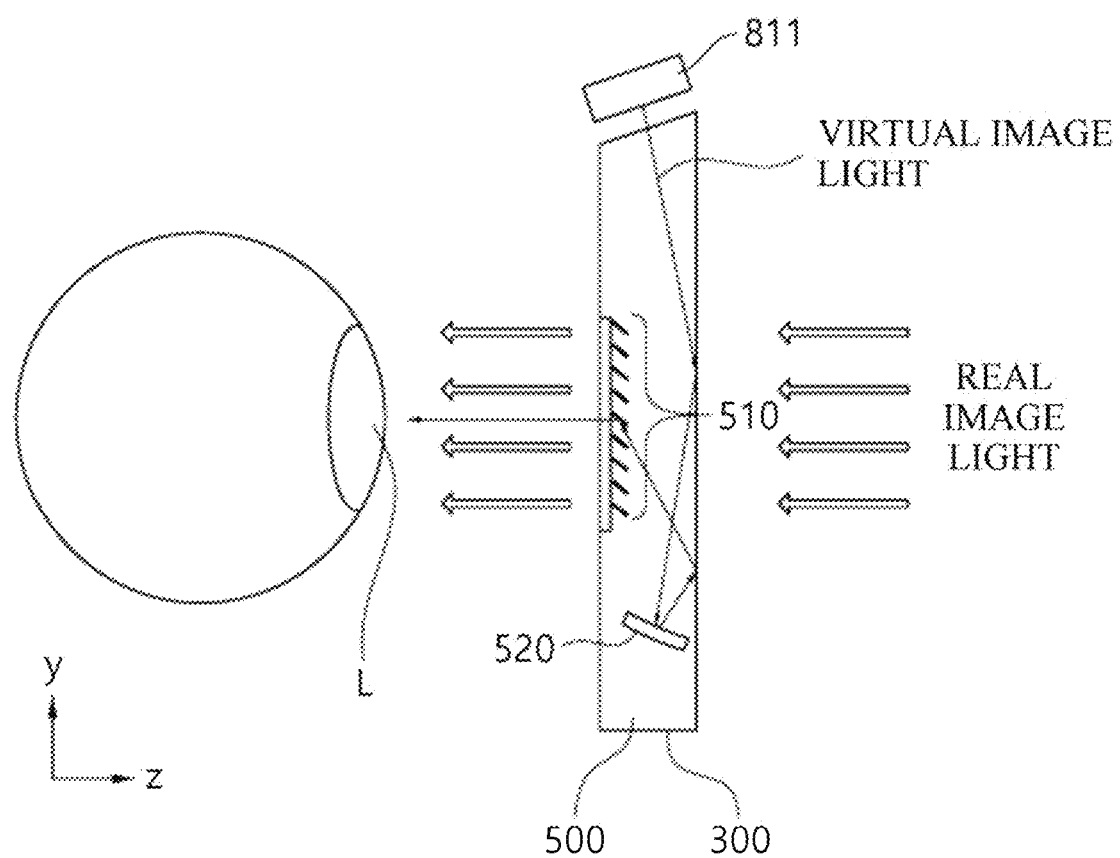
FIG. 7 is a diagram for explaining an example of providing augmented reality content based on a configuration of the optical lens according to various embodiments.

FIG. 5 is a diagram for explaining an example of a configuration of the optical lens 300 according to various embodiments. FIG. 6 is a diagram for explaining various examples of the optical lens 300 according to various embodiments. FIG. 7 is a diagram for explaining an example of providing augmented reality content based on a configuration of the optical lens 300 according to various embodiments.

According to various embodiments, referring to FIGS. 4 to 5, optical lens 300 may include at least one optical element 400 (or an optical member). The body 500 of the optical lens 300 may include a light input member 410, a light path forming member 420, and a light output member 430. Meanwhile, the body 500 of the optical lens 300 may be implemented in a form in which a plurality (e.g., two) of the body members are coupled, so that the above-described components (e.g., the light input member 410, the light path forming member 420, and the light output member 430) may be implemented in the body 500 of the optical lens 300, but is not limited to the examples described, and the body 500 may be implemented in a single form.

Meanwhile, in some embodiments, at least one of the above-described components of the optical lens 300 (e.g., the light input member 410, the light path forming member 420, and the light output member 430) may be omitted, or one or more other components may be added. For example, referring to 600*a* of FIG. 6, the optical lens 300 may be implemented to include the light path forming member 420 (e.g., the collimator 520), but referring to 600*b* of FIG. 6, the optical lens 300 may be implemented not to include the light path forming member 420. In some embodiments, at least some of the above components may be integrated into any integral component.

2.1.1. Example of the Light Input Member 410

According to various embodiments, the light input member 410 may be implemented to acquire (or receive) image light provided from the output device 811 (e.g., the display) and provide the image light to the inside of the optical lens 300 (or to other components (e.g., the light path forming member 420, and the light output member 430). The light path forming member 420 may be implemented as a reflective surface 500*b*, a collimator 520, and/or a vision correction structure (not shown), but is not limited to the described example. The light input member 410 may be implemented as at least one of the upper surface 500*a* to which the image light is input, or the light diffusion member 600, but is not limited to the described example.

For example, the light input member 410 may be a specific surface of the optical lens 300. For example, referring to FIG. 5, the upper surface 500*a* of the body 500 of the optical lens 300 may be the light input member. Referring to FIG. 5, the upper surface 500*a* may be formed as an inclined surface having a specific slope. In this case, the upper surface 500*a* may be formed to have an inclination angle with respect to a normal in a front direction from the pupil when the optical lens 300 is placed in the front surface of the pupil. The inclination angle may have a value in the range of 0 degree to 90 degree, but may preferably have a value in the range of approximately 30 degrees to 60 degrees. Meanwhile, the upper surface 500*a* may be formed as a curved surface and have a refractive power with respect to the image light incident through the upper surface 500*a*, but is not limited to the illustrated example. The upper surface 500*a* formed as the curved surface may provide a part of a function of the collimator. The upper surface 500*a* may face each other with a surface of the output device 811 (e.g., the display), and may be disposed to be spaced apart from the output device 811 (e.g., the display).

For example, referring to 600*c* of FIG. 6, the light input member 410 may include an optical member 600 (hereinafter, a light diffusion member) for expanding the image light. The light diffusion member 600 may be implemented to include a polarizing element and a holographic optical element, but is not limited to the described example. The image light input to the optical lens 300 by the light diffusion member 600 may be diffused in a two-dimensional direction (e.g., the x-direction and the y-direction), and thus the FOV for the image light provided through the optical lens 300 may be improved.

2.1.2. Example of the Light Path Forming Member 420

According to various embodiments, the light path forming member 420 may be implemented to control the path of the light (e.g., the image light) incident into the optical lens 300.

The light path forming member 420 may be implemented as at least one of the reflective surface 500*b*, the collimator 520, or the vision correction structure (not shown), but is not limited to the example described.

For example, referring to 600*a* of FIG. 6, the light path forming member 420 may be a reflective surface 500*b* formed on an inner wall of the optical lens 300. The reflective surface 500*b* may be implemented to change (e.g., fold) a path of image light and provide (or guide) the image light to the light output member 430 (e.g., the plurality of reflective members 510). The reflective surface 500*b* may be implemented as a total reflective surface that reflects all of the incident light, or a reflective surface that reflects at least a portion of the incident light and transmits the remainder.

For example, the reflective surface 500*b* may include one or more surfaces disposed in a direction parallel to the optical axis of the body 500 of the optical lens 300. According to an embodiment, referring to 600*a* of FIG. 6, the reflective surface 500*b* may include a first surface 501*b* and a second surface 503*b*. The first surface 501*b* may be a reflective surface 500*b* formed to reflect the light incident through the light input member 410, and the second surface 503*b* may be a reflective surface 500*b* formed to reflect the light provided by another member (e.g., the light path forming member 420). Meanwhile, referring to 600*b* of FIG. 6, the reflective surface 500*b* may be implemented as one surface to reflect the input light and guide the light directly to the light output member 430.

For example, referring to FIGS. 5 to 6, the light path forming member 420 may include a collimator 520 (or mirror) embedded in a lower portion of the body 500 of the optical lens 300. As the image light input to the body 500 of the optical lens 300 is folded by the collimator 520, the volume of the body 500 of the optical lens 300 may be reduced. The thickness of the collimator 520 may be formed (e.g., very thin) so that the collimator 520 is almost impossible to be viewed when the user observes the optical lens 300 from the front surface. The collimator 520 provides the effect of significantly reducing the ghost image and the outflow light together with the light output member 430. The light output member 430 and the collimator 520 serve as a collimator and a combiner and simultaneously serve as an aperture. Therefore, it is possible to block the incident light at different angles and thereby remove the noise light and scatter the external light.

According to an embodiment, the collimator 520 may be spaced apart from the lower surface 500*c* of the body 500 of the optical lens 300 so as to receive the input from the reflective surface 500*b* and guide it to the light output member 430.

According to an embodiment, referring to 600*a* of FIG. 6, the collimator 520 may be disposed close to the second surface 503*b* of the optical lens 300. This arrangement may block the ghost image.

According to an embodiment, when the optical lens 300 is observed from the pupil toward a surface perpendicular to the front direction, the collimator 520 may be formed to extend from the center portion of the body 500 of the optical lens 300 to be closer to the light output member 430 toward both sides of the left and right, and thus may be formed in a generally smooth "U" bar form. This is to enable the collimator 520 to better perform functions as a collimator. According to an embodiment, the overall length of the collimator 520 may be extended to correspond to the length of the overall of the plurality of the light output members 430 in the z-axis direction.

According to an embodiment, the collimator 520 may be any one of a notch filter, a full mirror, a half mirror, a diffractive element, a holographic optical element, and a refractive element, or a combination thereof. According to an embodiment, the collimator 520 may be coated with a material that absorbs light without reflecting light on the opposite surface of the collimator 520.

In addition, for example, the optical path forming member 420 may be formed in a structure for correcting vision. According to an embodiment, at least a portion of both sides of the body 500 of the optical lens 300 may be formed to have a predetermined curvature for correcting vision. For example, both sides of the body 500 of the optical lens 300 may be implemented as one of a concave surface or a convex surface. For example, one side of the body 500 of the optical lens 300 may be formed as a concave surface, and another side of the body 500 opposite thereto may be formed as a convex surface, and the curvature may be formed to be smaller than one side. As light provided to the outside of the optical lens 300 is refracted by both sides of the body 500 of the optical lens 300, it may be implemented to form a focal point on the retina of the user.

At least a portion of both sides of the body 500 of the optical lens 300 may be disposed with a predetermined optical element for a refractive or abnormal user having farsighted or nearsighted. The optical element may include a negative refractive optical element, a diffractive element, a holographic optical element, a concave lens, and/or a convex lens. At this time, the optical elements disposed at least a portion of both sides may be formed integrally with the body 500 of the optical lens 300 or may be configured as a separate module to be detachably coupled with the body 500 of the optical lens 300.

For example, the negative refractive optical element may mean an optical element that refracts incident light in a direction symmetrical with respect to the normal refractive direction of light having a positive refractive index and the normal of the exit surface. The negative refractive optical element may be formed of a metamaterial having a negative refractive index in a specific wavelength band. In addition, the negative refractive optical element may also be formed as an array of micro mirrors. For example, a lens having a refractive power for correcting vision may be disposed on at least one of the outside or inside of the reflective surface 500*b*.

For example, the diffractive element may mean an optical element that refracts or reflects incident virtual image light through a diffraction phenomenon. That is, the diffractive element may be an optical element that provides various optical functions using a diffraction phenomenon of light. The diffractive element has the advantage that it can have a point-to-point image and a flat plate structure without aberration and adjust aberration s such as an aspheric surface. In addition, the diffractive element has a very thin thickness of several μm, but has a similar role as a general lens, a prism, and a mirror having a several thickness of mm, so it is advantageous in reducing the volume and weight of the optical system. In particular, the diffractive element acts as a refractive or reflective element only for light that matches the design wavelength band of nanostructures due to the wavelength-dependent characteristics of the diffraction p Therefore, the use of such a diffractive element increases the transparency to ensure the brightness of the viewing image, and since the optical synthesizer structure is not observed from the outside, it is advantageous to provide an augmented reality optical device with better aesthetics similar to general glasses. Such a diffractive element may be classified into a reflective diffractive element and a transmissive diffractive element.

2.1.3 Example of the Light Output Member 430

According to various embodiments, the light output member 430 may reflect image light provided from the output device 811 (e.g., a display) to the optical lens 300 toward the pupil of the user, thereby providing the augmented reality content to the user. Referring to FIG. 7, the light output member 430 may be implemented to provide image light received from other components (e.g., the light path forming member 420) of the optical lens 300 to the pupil of the user. For example, as shown in FIGS. 5 to 7, the light output member 430 may include a plurality of reflective members 510 implemented to reflect at least a portion of the input image light, but the light output member 430 may include a single reflective member, without being limited to the described and/or illustrated examples.

According to various embodiments, the plurality of reflective members 510 may be formed at a specific angle. Each of the plurality of reflective members 510 preferably has an angle of at least 45 degrees or less with respect to the front direction at the center of the pupil of the user.

According to various embodiments, the plurality of reflective members 510 may be formed at a specific size. For example, the plurality of reflective members 510 may be formed to be smaller than the pupil size of a person, that is, 8 mm or less, and preferably 4 mm or less considering the visual state of the plurality of reflective members 510 from the outside by the external user (e.g., a properly visible degree). In addition, it may be formed to be 0.8 mm or larger to prevent diffraction, but is not limited to the described example. The size of the plurality of reflective members 510 means a maximum length (e.g., a diameter) between points forming the plurality of reflective members 510 when the shape of the plurality of reflective members 510 is a circle or an ellipse, and may mean a minimum length (e.g., a width) between points forming the plurality of reflective members 510 when the shape of the plurality of reflective members 510 is a bar or a square, but is not limited to the described example. Accordingly, since the size of the plurality of reflective members 510 is smaller than the pupil size, the depth of the light incident on the pupil through the plurality of reflective members 510 may be near to infinity, that is, the depth of the light may be very deep. For example, the size of the plurality of reflective members 510 may be a maximum length between any two points on the boundary line of the plurality of reflective members 510. Here, the depth refers to a range where focus is recognized as being correct, and thus if the user gazes the actual world and changes the focus distance to the actual world, if the focus of the augmented reality image is always recognized as being correct. This can be seen as a pin a hole effect. Therefore, regardless of changing the focal length while a user gazes an actual object existing in the real world, it is possible to always provide a clear virtual image for an augmented reality image. In addition, the area of the plurality of reflective members 510 may be 16π(mm2) or less. The area of the plurality of reflective members 510 may be an area of a projection of the plurality of reflective members 510 projected from the pupil to a plane perpendicular to the front direction when the user gazes the front. The area of the plurality of reflective members 510 may be an area of a projection of the plurality of reflective members 510 projected from the pupil to a plane perpendicular to the direction of the plurality of reflective members 510 when the user gazes the direction of the plurality of reflective members 510. At least one thickness of the plurality of reflective members 510 is preferably 500 μm or less.

According to various embodiments, the plurality of reflective members 510 may be formed in a specific shape. For example, the plurality of reflective members 510 may be formed as a curved surface or a plane. The curved surface is preferably a concave surface or a convex surface. The surface other than the surface formed as the curved surface may be formed as any one of a plane, a concave surface, or a convex surface. For example, the reflective surface of the plurality of reflective members 510 may be a concave mirror formed concavely toward the first surface of the optical lens, which is the direction in which the augmented reality image light is incident, and in this case, the plurality of reflective members 510 may serve as a collimator that collimates the augmented reality image light emitted from the light output device, and therefore, it is not necessary to use an optical module such as a collimator in the light traveling direction of the light output device. The actual object image light (noise light) that can be emitted from the actual object and generate a ghost image is incident to the plurality of reflective members 510, as described above, since the plurality of reflective members 510 are arranged toward the first surface, which is the direction in which the augmented reality image light is incident, the actual object image light (noise light) reflected from the reflective surface of the plurality of reflective members 510 is emitted toward the second surface of the optical lens, and is transmitted to the light output device direction by being totally reflected again from the second surface of the optical lens. Therefore, it can be seen that the actual object image light, which can be emitted from the actual object and generate a ghost image, is dissipated inside the optical lens and is not leaked to the pupil. However, this principle is to explain the basic principle for the actual object image light (noise light) reflected from the plurality of reflective members 510 not to be leaked to the outside of the optical lens, and in practice, the position and direction of the plurality of reflective members 510 should be appropriately adjusted so as to minimize the external light (noise light) reflected from the plurality of the plurality of the reflective members 510 and entering the pupil of the user.

According to an embodiment, the plurality of reflective members 510 may be formed in asymmetric, asymmetric, Y, or a through-hole shape. The point-symmetric shape is a shape that allows the plurality of reflective member According to an embodiment, the plurality of reflective members 510 may be formed to appear in a circular shape when viewed from a plane. In addition, the plurality of reflective members 510 may be formed to be elliptical in a plane so that they appear in a circular shape when viewed from the pupil.

According to an embodiment, the plurality of reflective members 510 may include a first reflective surface and a second reflective surface that are a pair of reflective surfaces that are inclined to each other. For example, the augmented reality image light incident on the second reflective surface may be reflected from the second reflective surface and transmitted to the first reflective surface, and may be reflected again from the first reflective surface and then transmitted to the pupil. Therefore, the direction of the augmented reality image light incident on one of the plurality of reflective members 510 may be inverted around the boundary line between the first reflective surface and the second reflective surface of the plurality of reflective members 510 to emit. For example, since the plurality of reflective members 510 are disposed inside the optical lens with an appropriate inclination angle in consideration of the relative positions of the light output device and the pupil, the inclination angle between the first reflective surface and the second reflective surface may be considered in this regard. In addition, the inclination angles of the plurality of reflective members 510 need not be all the same, but may be partially different. In addition, the first reflective surface and the second reflective surface need not be connected, and may be disposed at a distance from each other. That is, the first reflective surface and the second reflective surface need not be connected to adjacent boundary surfaces, and the boundary surfaces may be spaced apart from each other. However, it is necessary to have an appropriate distance according to other requirements in design. For example, the sizes of the first reflective surface and the second reflective surface need not be the same, but may be different from each other. For example, the first reflective surface may be larger than the second reflective surface or the second reflective surface may be larger than the first reflective surface according to design requirements. The first reflective surface and the second reflective surface may be designed to have at least one of a shape having a curvature, a triangle, a quadrangle, or a polygon. For example, the areas of the first reflective surface and the second reflective surface may be the same or different. For example, among the plurality of reflective members 510 constituting the array of the plurality of reflective members 510, the plurality of reflective members 510 disposed at the center portion may be disposed so that the areas of the first reflective surface and the second reflective surface appear the same, and the plurality of reflective members 510 disposed at the outer periphery may be tilted so that the areas of one side appear small. For example, the plurality of reflective members 510 disposed at the outer periphery may be tilted toward the center portion. According to one embodiment, the plurality of reflective members 510 in the center may appear to have the same area of the first and second reflective surfaces when viewed from the front through the first surface of the optical lens, and may be arranged on the left and right sides. The areas of the first and second reflective surfaces of the plurality of reflective members 510 may not appear to be the same. That is, the plurality of reflective members 510 may be disposed so that the areas of the second reflective surface appear larger than the first reflective surface, and the plurality of reflective members 510 may be disposed so that the areas For example, when the array of the plurality of reflective members 510 is viewed from the front through the first surface, the plurality of reflective members 510 disposed at the center of the array of the plurality of reflective members 510 may be disposed so that the areas of the first reflective surface and the second reflective surface appear the same, and at least some of the plurality of reflective members 510 other than the plurality of reflective members 510 disposed at the center of the array of the plurality of reflective members 510 may be disposed so that the plurality of reflective members 510 disposed at the center of the array of the plurality of reflective members 510 may be rotated about the boundary line between the first reflective surface and the second reflective surface. According to an embodiment, the plurality of reflective members 510 may be disposed so that the augmented reality image light transmitted from the light output device is not blocked by another light output device. For example, the plurality of reflective members 510 may be arranged so that the optical lens is positioned along a diagonal or a gentle curve when viewed from the side.

According to various embodiments, the plurality of reflective members 510 may be configured by any one of an optical filter, a notch filter, a full mirror, a half mirror, a diffractive element, a holographic optical element, a state conversion optical element and a refractive element capable of converting reflectance and transmittance, or a combination thereof, that reflects only image light belonging to a wavelength band of a specific color and transmits image light having a wavelength other than the wavelength band of the specific color. According to an embodiment, the plurality of reflective members 510 may apply other materials (e.g., polarizing elements, holographic optical elements) having optical properties on the surfaces of the plurality of reflective members 510. According to an embodiment, the plurality of reflective members 510 are materials having a certain hardness, and glass, aluminum, silver, various kinds of metals, alloys, or synthetic resins may be used.

According to various embodiments, the plurality of reflective members 510 may be arranged in various ways. For example, a plurality of reflective members 510 may have the same size as each other, or a plurality of reflective members 510 may be disposed so that at least one of the plurality of reflective members 510 has a different size. For example, the plurality of reflective members 510 may be configured with a plurality of optical elements and may be arranged to form a group. In this case, the plurality of reflection members 510 formed in plurality may be disposed to be close to the second surface of the optical lens as it is farther from the light output device. According to an embodiment, the intervals of the plurality of optical elements may be the same, but the intervals between some optical elements may be different. According to an embodiment, the plurality of reflective members 510 may not completely overlap when viewed from the optical axis direction, and may be disposed so that each of the plurality of reflective members 510 is not parallel to each other. According to an embodiment, a plurality of reflective members 510 may be disposed to be close to the surface of the optical lens closer to the pupil farther from the optical path forming member 420 (e.g., a lower collimator or a lower mirror) formed at the optical lens. According to an embodiment, at least some of the plurality of reflective members 510 may be disposed closer to the second surface of the optical means as the distance from the light output device is farther away. The plurality of reflective members 510 may be arranged in a gentle c-shape as a whole when viewed from the vertical direction of the optical lens. The plurality of reflective members 510 may be disposed closer to the first surface as it is farther from the light path forming element (e.g., the lower collimator).

According to an embodiment, when the optical lens is placed on the front surface of the pupil of the user, the front direction of the pupil is referred to as an x axis, and the line segment passing between the vertical line between the light output device and the x axis and the inner surface of the optical lens while being parallel along the x axis is referred to as a y axis, the z axis becomes a line segment passing between the inner surface of the optical lens while being perpendicular to the x axis and the y axis, and here, the plurality of reflective members 510 may be disposed parallel to each other along the z-axis direction. In this case, the plurality of reflective members 510 may be disposed so that they have a long length in the z-axis direction. For example, the plurality of reflective members 510 may be formed in an ellipse shape having a long axis in the x-axis direction when viewed from the y axis direction. According to an embodiment, the plurality of reflective members 510 may be formed in a bar shape extending along the z-axis direction. According to an embodiment, the surfaces of the plurality of reflective members 510 formed to have a long length in the z-axis direction than the x-axis direction or the reflective portions formed to have a long length in the y-axis direction than the z-axis direction may be formed as a concave surface concave toward the first surface of the optical means or a convex surface convex toward the first surface of the optical means. According to an embodiment, at least a portion of the plurality of reflective members 510 may be disposed inside the reflective surface 500b of the optical lens so that a virtual line connecting the center thereof forms a curve when viewed from the z-axis direction of the optical lens. According to an embodiment, each of the plurality of reflective members 510 is disposed not to be positioned along all of the plurality of reflective members 510 constituting the adjacent plurality of reflective members 510 and a virtual straight line parallel to the z-axis. The plurality of reflective members 510 may be disposed to be staggered without being aligned parallel to the z-axis when viewed from the z-axis direction.

According to various embodiments, the plurality of reflective members 510 may constitute a first plurality of reflective members 510 groups and a second plurality of reflective members 510 groups as the plurality of non-adjacent reflective members 510. The arrangement between the plurality of reflective members 510 groups may be implemented in the same manner as the arrangement of the plurality of reflective members 510 described above.

According to an embodiment, the plurality of reflective surfaces 500b of the optical lens may be formed to be inclined to each other. In addition, the inclination angle θ may be set based on the focal distance D of the augmented reality image corresponding to the image light emitted from the light output device and the width S incident from the light output device to the plurality of reflective members 510 of the optical lens. In addition, the inclination angle θ may be set based on the formula of $\tan^{-1}(S/D)$. In addition, the inclination angle θ may have a value in the range of 0.015° to 4.6°. In addition, at least one of the first surface and the second surface of the optical lens may be formed as a curved surface. In addition, the first surface and the second surface of the optical means optical means may have partial inclination angle θ.

2.1.4 Other Additional Member

According to various embodiments, the optical lens 300 may further include a light absorbing element (not shown). The light absorbing element may be a coating layer formed on the outer surface of the optical lens 300 to block the residual light incident on the light absorbing element from being leaked to the outside of the optical lens 300.

For example, the light absorbing element may be formed of a light absorbing material. The light absorbing material means a material having a property that does not reflect light, and the light absorbing material means that the surface is coated with a material having a property that does not reflect light or the composition itself is formed of a light absorbing material.

For example, the light absorbing element may arrange the image light of the plurality of reflective members 510 on the opposite side of the first surface to block the residual light from being leaked to the outside. In the case of coating the light absorbing element, it is not necessary to be completely opaque, and the transparency is enough to be 5% or less. The transparency means the ratio of the intensity of the incident light of the plurality of reflective members 510 to the intensity of the light emitted through the light absorbing element when incident. According to an embodiment, the light absorbing element may be arranged between the light output device and the light path forming element (e.g., the lower collimator) to absorb the ghost image generated from the image light. In this case, the light absorbing element is preferably arranged between the light output device and the light path forming member 420 in the optical lens to absorb at least a part of the augmented reality image light emitted from the light output device and directly transferred to the light path forming member 420 to generate the ghost image. In addition, one point of the light output device from which the augmented reality image light generating the ghost image is emitted and one point of the reflective surface of the light path forming element may be arranged on a virtual straight line directly connecting the point of the light output device.

2.2. Configuration of Component 310

Figure 8:
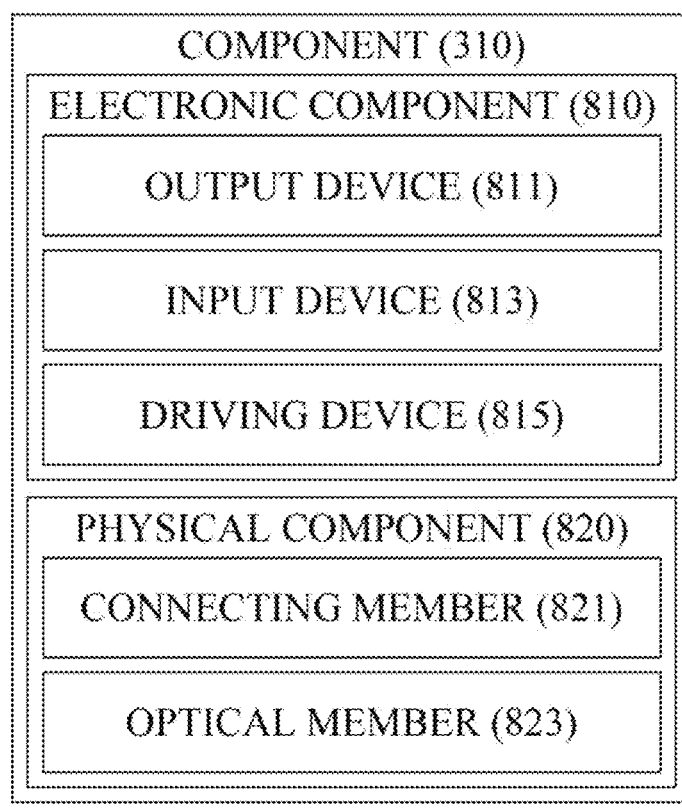
FIG. 8 is a block diagram of a component according to various embodiments.

FIG. 8 is a block diagram of a component 310 according to various embodiments.

Referring to FIG. 8, the component 310 may include an electronic component 810 (or an electrical component) including an output device 811, an input device 813, and a driving device 815, and a physical component 820 including a connection member 821 and an optical member 823, but is not limited to the described and/or illustrated examples, and may include more kinds of components. For example, although not illustrated, a wiring for electrically connecting the electronic component 810, a power supply device for supplying power to the electronic component 810, a battery for storing power, a communication circuit, and a processor may be further included. As the electronic components 810 are controlled by the processor, the augmented reality device 10 may perform a predetermined function.

According to various embodiments, the output device 811 may be implemented to output the image light. The processor of the augmented reality device 10 may control the output device 811 to output the image light based on the information received through the communication circuit to reflect the image light by the optical lens 300 (e.g., the reflective members 510). For example, the output device 811 may be implemented with at least one of an organic light emitting diode (OLED), a liquid crystal display (LCD), and/or a liquid crystal on silicon (LCoS) type display, or laser.

According to various embodiments, the input device 813 may be implemented to acquire predetermined information from the outside of the augmented reality device 10. For example, the input device 813 may include a physical key and a touch sensor for receiving a physical input (e.g., a touch) of the user with respect to the augmented reality device 10. For example, the input device 813 may include a microphone for acquiring external sounds (e.g., utterances of the user, sounds of surrounding environments). For example, the input device 813 may include a camera (or image sensor) for capturing an environment of the outside (e.g., front, side, and rear).

According to various embodiments, the driving device 815 may be implemented to move at least a portion of other components of the augmented reality device 10. For example, the driving device 815 may be implemented to move at least one of the output device 811 (e.g., a display) or the optical member 823 (e.g., a collimator) disposed around the output device 811. Examples of the driving device 815 will be described in detail below.

According to various embodiments, the connection member 821 may be implemented to physically couple (or connect) the components of the augmented reality device 10. For example, the connection member 821 may be implemented to physically couple the output device 811 and the optical lens 300, so that the image light output from the output device 811 may be stably provided to the optical lens 300.

According to various embodiments, the optical member 823 may be implemented to control the characteristics of the image light output from the output device 811. For example, the optical member 823 may include a collimator, a lens array, a prism, a polarizing member, a beam splitter, and the like, but is not limited to the described example, and various types of optical members for changing the characteristics of the light may be provided to the augmented reality device 10. The optical member 823 is disposed between the output member 811 and the optical lens 300, and accordingly, the characteristics of the image light provided from the output device 811 to the optical lens 300 may be controlled.

2.2.1 Example of a Connection Member

Hereinafter, a detailed example 900 of the above connection member 821 will be described.

Figure 9:
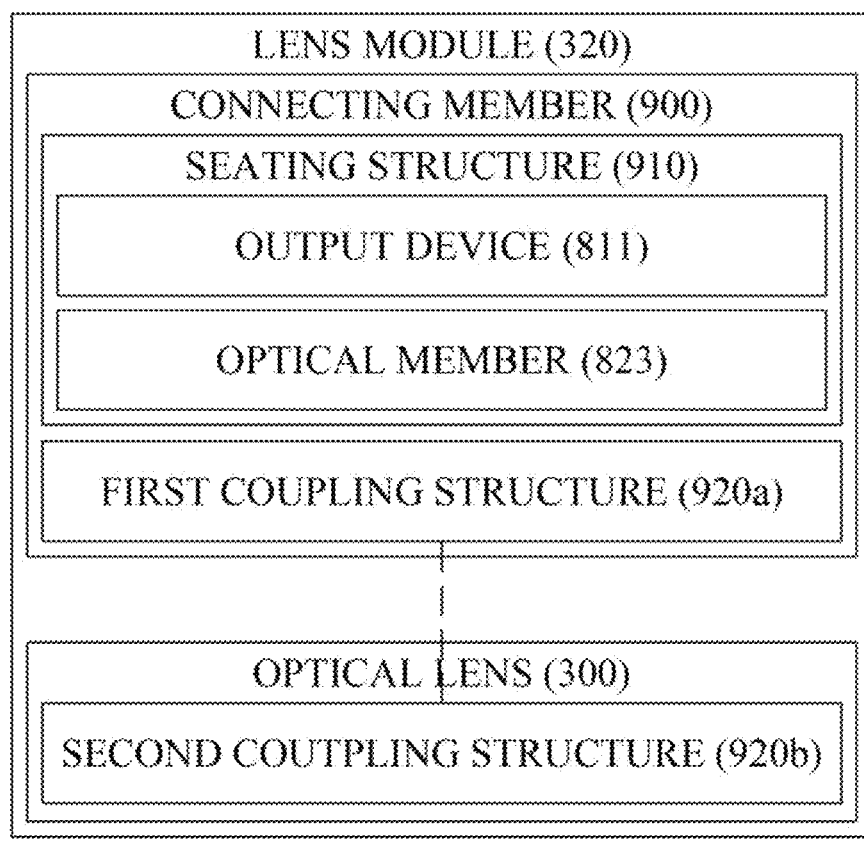
FIG. 9 is a block diagram illustrating an example of the connection member according to various embodiments.

FIG. 9 is a block diagram illustrating an example of the connection member 900 according to various embodiments. Hereinafter, FIG. 9 will be further described with reference to FIGS. 10 to 11.

Figure 11:
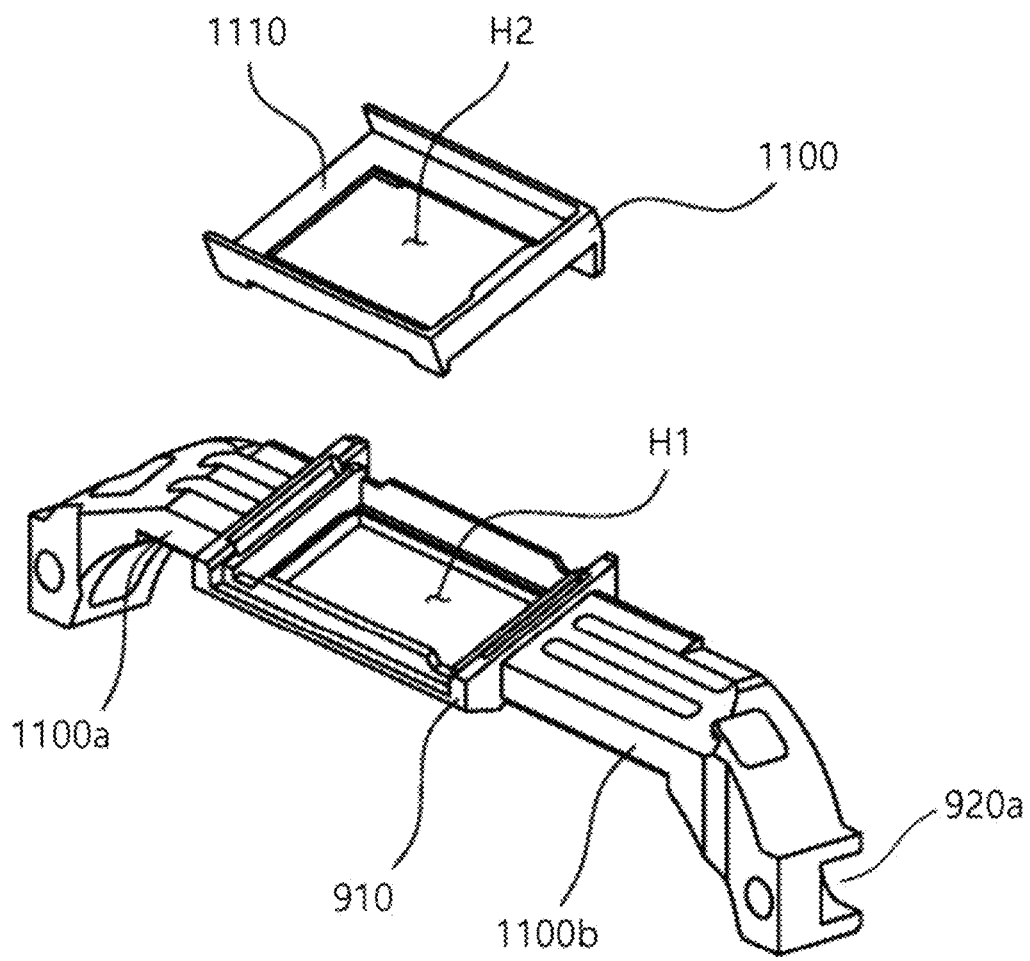
FIG. 11 is a diagram for describing an example of an additional structure (e.g., a holder) provided to the connection member according to various embodiments.

FIG. 10 is a diagram for describing an example of the connection member 900 according to various embodiments. FIG. 11 is a diagram for describing an example of an additional structure (e.g., a holder) provided to the connection member 900 according to various embodiments.

According to various embodiments, the connection member 900 may include a seating structure 910 and a first coupling structure 920a in which the output device 811 and the optical member 823 are seated. As the first coupling structure 920a of the connection member 900 is coupled to the second coupling structure 920b formed in the optical lens 300, the connection member 900 and the optical lens 300 may be physically coupled to each other. The connection member 900 and the optical lens 300 may be defined as a lens module 320. On the other hand, the lens module 320 may be implemented to include more or fewer configurations. For example, in a particular implementation of the lens module 320, the optical member 823 may be excluded from the lens module 320. In addition, for example, although not shown, a cover member may be provided on the output member 811.

According to various embodiments, the output device 811, the optical member 823, and the optical lens 300 may be optically (or operatively) coupled to each other based on the physical coupling between the connection member 900 and the optical lens 300. The optical coupling means that light is transferred between each component, and referring to FIGS. 10 to 11, image light output from the output device 811 (e.g., a display) may be transferred to the optical lens 300 through the optical member 823 in a state in which the connection member 900 and the optical lens 300 are physically coupled. The connection member 900 may be defined as a lens holder in the sense of optically coupling the optical lens 300 and other components.

According to various embodiments, the seating structure 910 may be implemented to include an internal space for accommodating the output device 811 (e.g., a display) and the optical member 823 (e.g., a collimator), a structure (e.g., a protruding structure) for supporting (or fixing) a component (e.g., the output device 811 and the optical member 823) seating in the internal space, and a predetermined hole hi. In this case, the display 811*a* may be disposed on the optical member 823, and a predetermined extraction structure (e.g., hole) may be formed on the side surface of the seating structure 910 adjacent to the one frame so that the wire member 811b (e.g., PCB) connected to the display 811a may extend along one frame of the connection member 900. The image light output from the output device 811 may be provided to the optical lens 300 through the optical member 823 and the hole h2. Referring to FIG. 11, a separate additional structure 1100 including the output device 811, the structure 1110 for accommodating the optical member 823, and a predetermined hole h2 may be provided. As the separate additional structure 1100 is disposed in the above-described seating structure 910, the output device 811 and the optical member 823 may be provided in the connection member 900. The image light output from the output device 811 may be provided to the optical lens 300 through the optical member 823 and the holes hi and h2. The additional structure 110 is defined as a holder, and the assembly convenience of the lens module 320 may be improved based on the holder.

According to various embodiments, the coupling structure (e.g., the first coupling structure 920a and 920b) may be formed as a structure that can be coupled to each other. For example, referring to FIG. 11, a predetermined frame 1100a and 1100b may extend from the seating structure 910 of the connection member 900 to both side directions, and a first coupling structure 920a (e.g., a groove) may be formed at an end portion of each of the frames 1100a and 1100b. A second coupling structure 920b (e.g., a protruding portion) that can be coupled to the first coupling structure 920a may be formed at a side portion of the optical lens 300.

Hereinafter, various examples of the connection member 900 having a direct coupling structure according to various embodiments will be described. Hereinafter, for convenience of explanation, descriptions duplicated with the implementation examples of the connection member 900 described above are omitted.

2.2.1.1 Direct Coupling Structure

Figure 12:
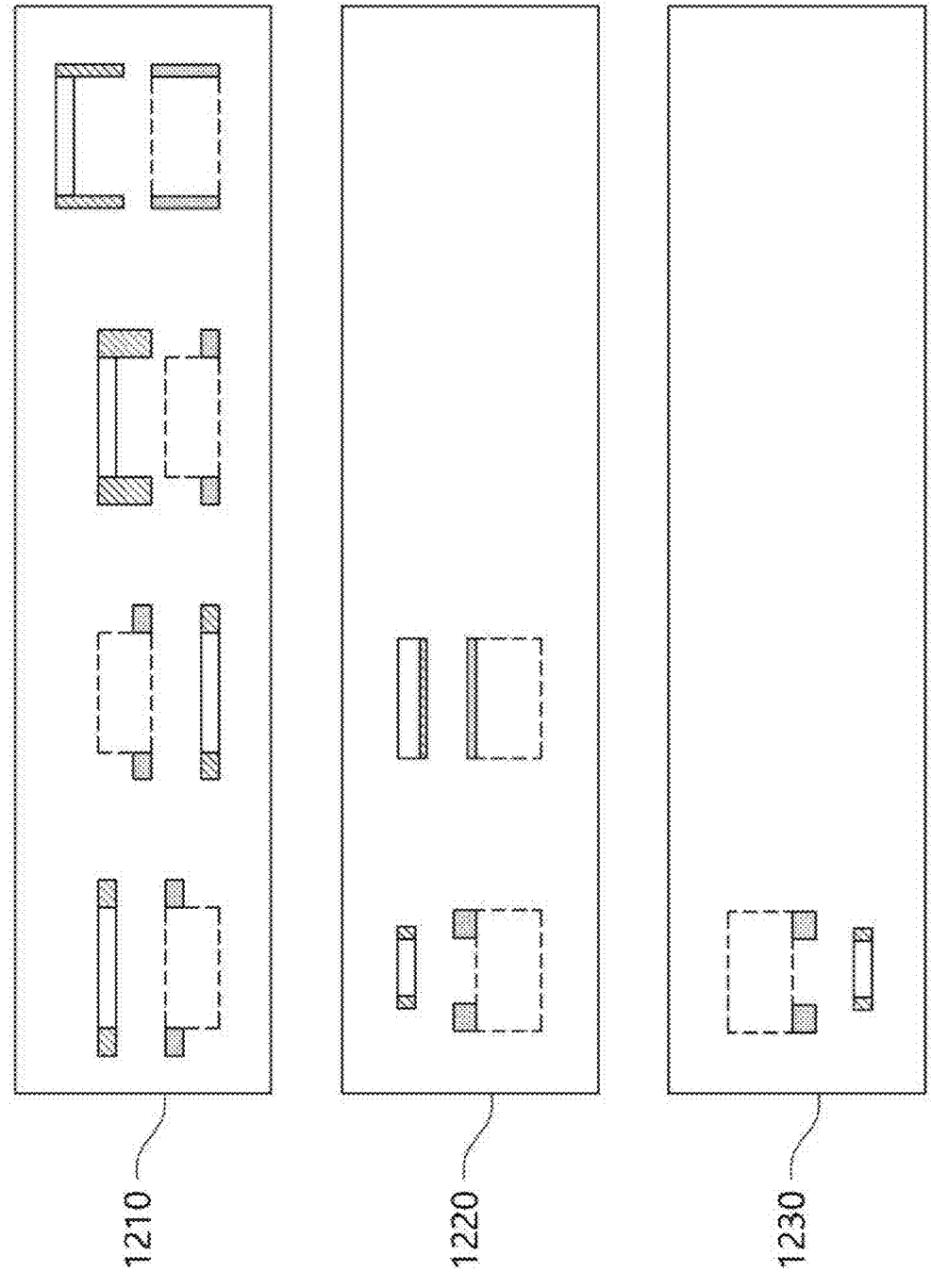
FIG. 12 is a diagram for explaining an example of a connection member (e.g., a holder) having a direct coupling structure according to various embodiments.

FIG. 12 is a diagram for explaining an example of a connection member 900 (e.g., a holder) having a direct coupling structure according to various embodiments.

According to various embodiments, referring to FIG. 12, the connection member 900 (e.g., holder) may be formed to have a structure (direct coupling structure) for being directly connected to the optical lens 300. For example, the connection member 900 (e.g., the holder) may be implemented to have a first coupling structure 920a for physically coupling to the second coupling structure 920b formed in the optical lens 300.

In an embodiment, as shown in 1210 of FIG. 12, the connection member 900 may have a first coupling structure 920a for coupling to the second coupling structure 920b formed in the side portion of the optical lens 300. For example, as shown in 1210 of FIG. 12, the second coupling structure 920b may be formed in a part of the side portion of the optical lens 300 (e.g., the upper portion of the side portion, the lower portion of the side portion, and the center portion of the side portion), and the connection member 900 may be implemented to have a first coupling structure 920a for coupling to the second coupling structure 920b. In this case, the first coupling structure 920a of the connection member 900 may have a shape extending downward to be coupled to the second coupling structure 920b formed in the side portion of the optical lens 300. In addition, the second coupling structure 920b may be formed in all of the side portion of the optical lens 300, and the first coupling structure 920a of the connection member 900 may have a shape extending downward to be coupled to the second coupling structure 920b formed in the side portion of the optical lens 300.

In another embodiment, as shown in 1220 of FIG. 12, the connection member 900 may have a first coupling structure 920a for coupling to the second coupling structure 920b formed in the upper portion of the optical lens 300. For example, the second coupling structure 920b may be formed in a part of the upper portion of the optical lens 300 (e.g., the upper portion of the side portion, and the center portion of the upper portion), and the connection member 900 may be implemented to have a first coupling structure 920a for coupling to the second coupling structure 920b. In addition, the second coupling structure 920b may be formed in all of the upper portion of the optical lens 300, and the connection member 900 may be implemented to have a first coupling structure 920a for coupling to the second coupling structure 920b.

In another embodiment, as shown in 1230 of FIG. 12, the connection member 900 may have a first coupling structure 920a for coupling to the second coupling structure 920b formed in the lower portion of the optical lens 300. For example, the second coupling structure 920b may be formed in at least a part of the upper portion of the optical lens 300 (e.g., the upper portion of the side portion, and the center portion of the upper portion), and the connection member 900 may be implemented to have a first coupling structure 920a for coupling to the second coupling structure 920b.

Hereinafter, specific examples of the connection member 900 (e.g., the holder) having a direct coupling structure will be described.

First Embodiment

Figure 13:
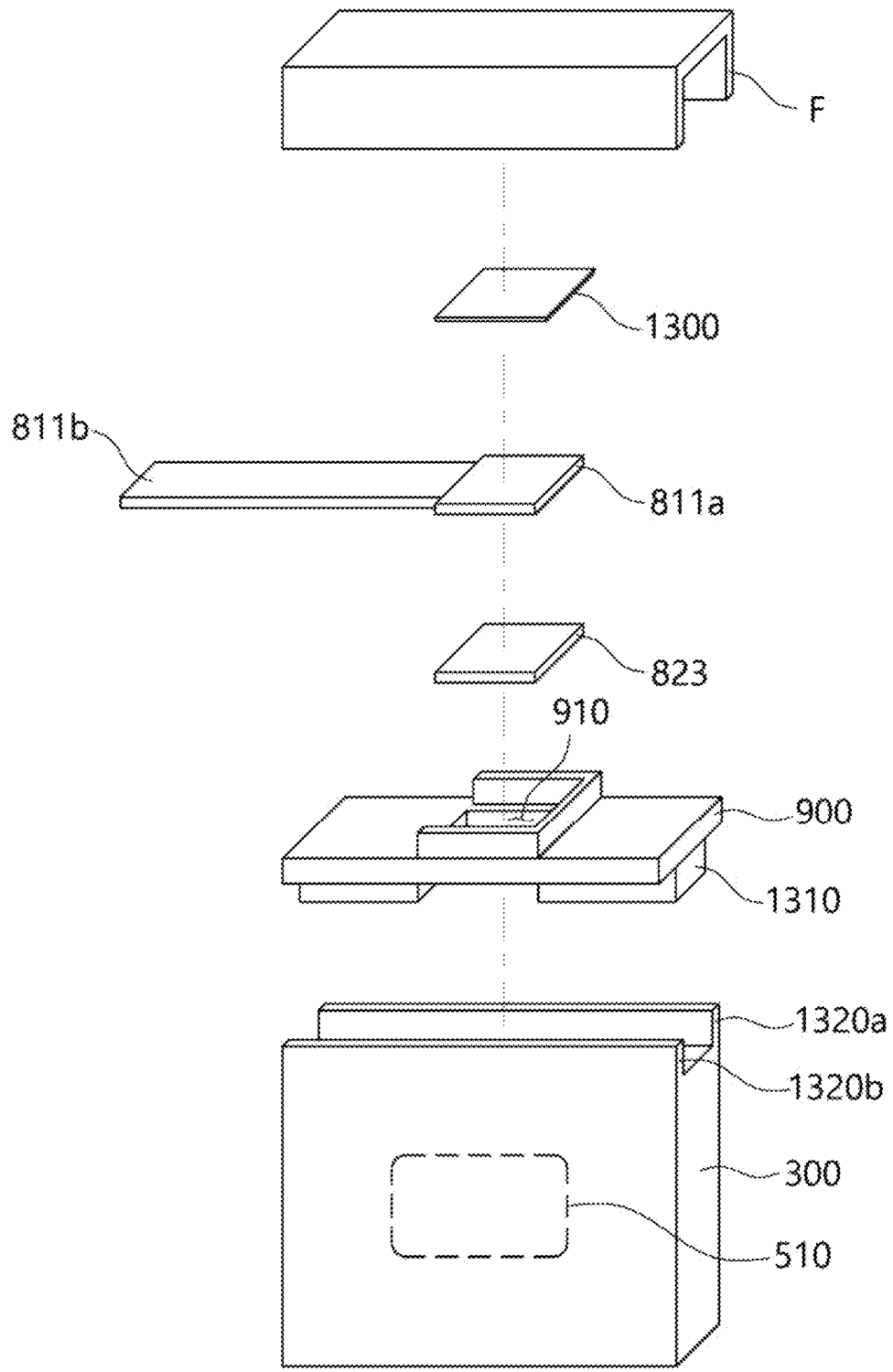
FIG. 13 is a view for describing an example of the connection member having a first coupling structure for coupling to the second coupling structure formed in the upper portion of the optical lens, according to various embodiments.

FIG. 13 is a view for describing an example of the connection member 900 having a first coupling structure 920a for coupling to the second coupling structure 920b formed in the upper portion of the optical lens 300, according to various embodiments.

Hereinafter, FIG. 13 will be further described with reference to FIG. 14.

Figure 14:
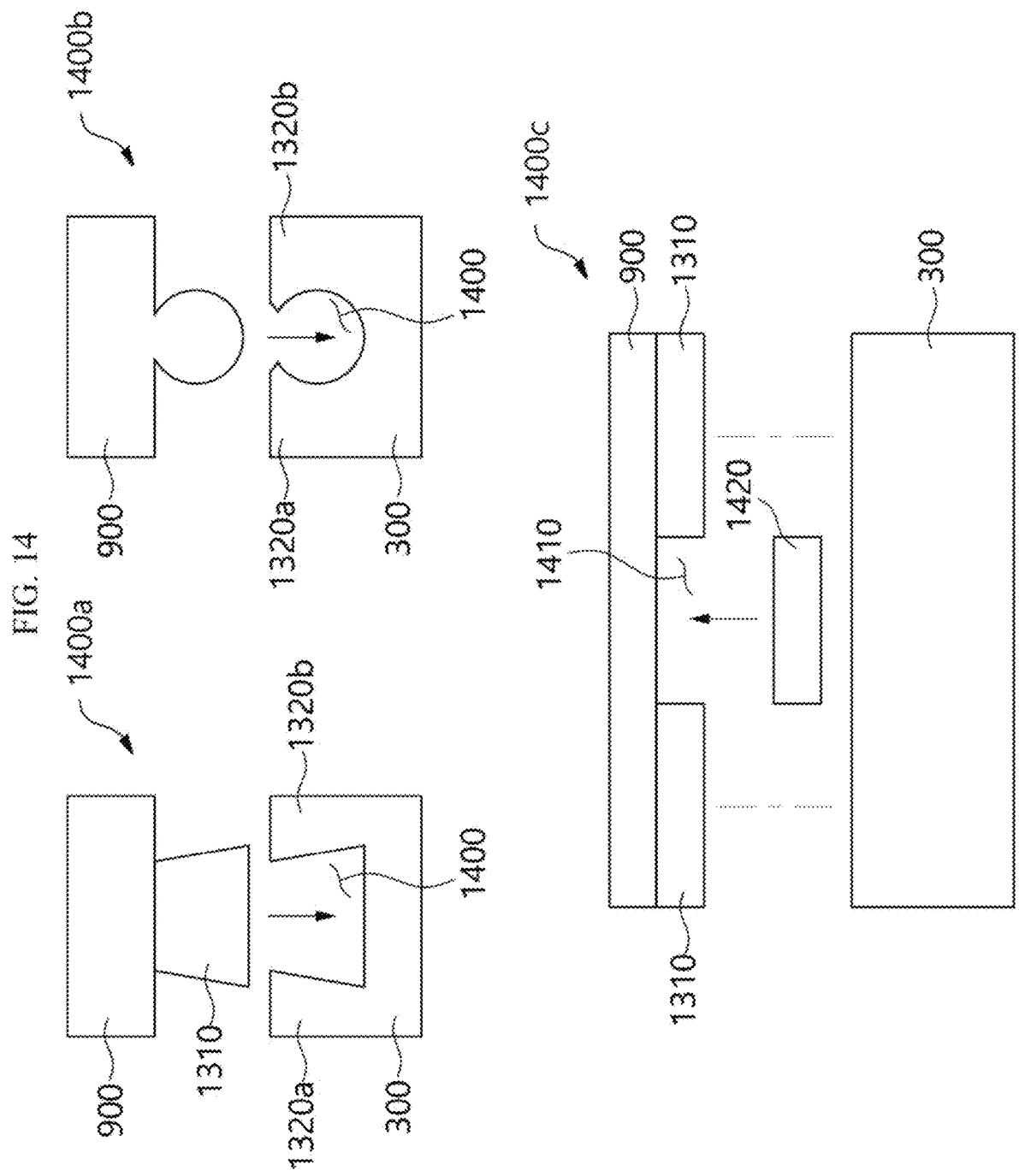
FIG. 14 is a diagram for explaining examples of coupling structures according to various embodiments.

FIG. 14 is a diagram for explaining examples of coupling structures according to various embodiments.

According to various embodiments, the lens module 320 may include the connection member 900, the display 811a disposed in the seating structure 910 of the connection member 900, the optical member 823, and the cover 1300. As described above, a separate holder 1100 may be seated in the seating structure 910 of the connection member 900. According to various embodiments, the optical lens 300 and the connection member 900 may be covered by the frame f in a state of being fastened to each other.

According to various embodiments, a first coupling structure 1310 implemented to be coupled to the second coupling structure 1320a and 1320b of the optical lens 300 may be formed under the connection member 900. The first coupling structure 1310 may be at least one protruding structure formed in the longitudinal direction of the connection member 900, and the second coupling structure 1320a and 1320b may be a structure 1320a and 1320b that forms a concave structure 1400 (or a groove) corresponding to the at least one protruding structure. Referring to 1400a and 1400b of FIG. 14, the protruding structure 1310 and the concave structure 1400 may be implemented in a shape that can be firmly coupled to each other. For example, when observation from the side surface, the outer surfaces of the protruding structure 1310 and/or the inner surfaces of the concave structure 1400 may be formed in a shape that is not parallel to each other. As an example, when observation from the side surface, the protruding structure 1310 and the concave structure 1400 may be formed in a trapezoid shape, but may be implemented in a various type of shape such as a spherical shape. Accordingly, the connection member 900 and the optical lens 300 may be firmly coupled to each other by sliding the protruding structure 1310 in the longitudinal direction to the concave structure 1400. In this case, a predetermined adhesive member may be additionally provided on the outer surface of the protruding structure 1310 and/or the inner surface of the concave structure 1400.

According to various embodiments, referring to 1400c of FIG. 14, the protruding structure 1310 may not be formed in the region 1410 (or the region corresponding to the hole H1) corresponding to the display 811a of the connection member 900. That is, an empty space may be formed between the plurality of protruding structures 1310. An additional electronic component and/or physical components may be provided in the region 1410. In an embodiment, the optical member 1420 may be provided in the region 1410. The optical member 1420 may have optical characteristics corresponding to the optical characteristics of the optical lens 300 or may be implemented to have different optical characteristics. For example, the optical member 1420 may be a collimator having a different refractive index from the optical lens 300, and accordingly, the aforementioned optical member 823 may be excluded, but is not limited to the above-described example. Accordingly, in a state in which the protruding structure 1310 and the optical member 1420 are coupled, the image light output from the display 811a may be stably provided to the plurality of reflective members 510 of the optical lens 300 through the optical member 1420 between the plurality of protruding structures 1310. In another embodiment, a driving device for moving the display 811a described below may be provided in the region 1410.

On the other hand, as opposed to the description and/or the illustrated example, it is apparent to those skilled in the art that the protruding structure 1310 may be formed under the connection member 900 and may be formed in the upper part of the optical lens 300.

Second Embodiment

Figure 15:
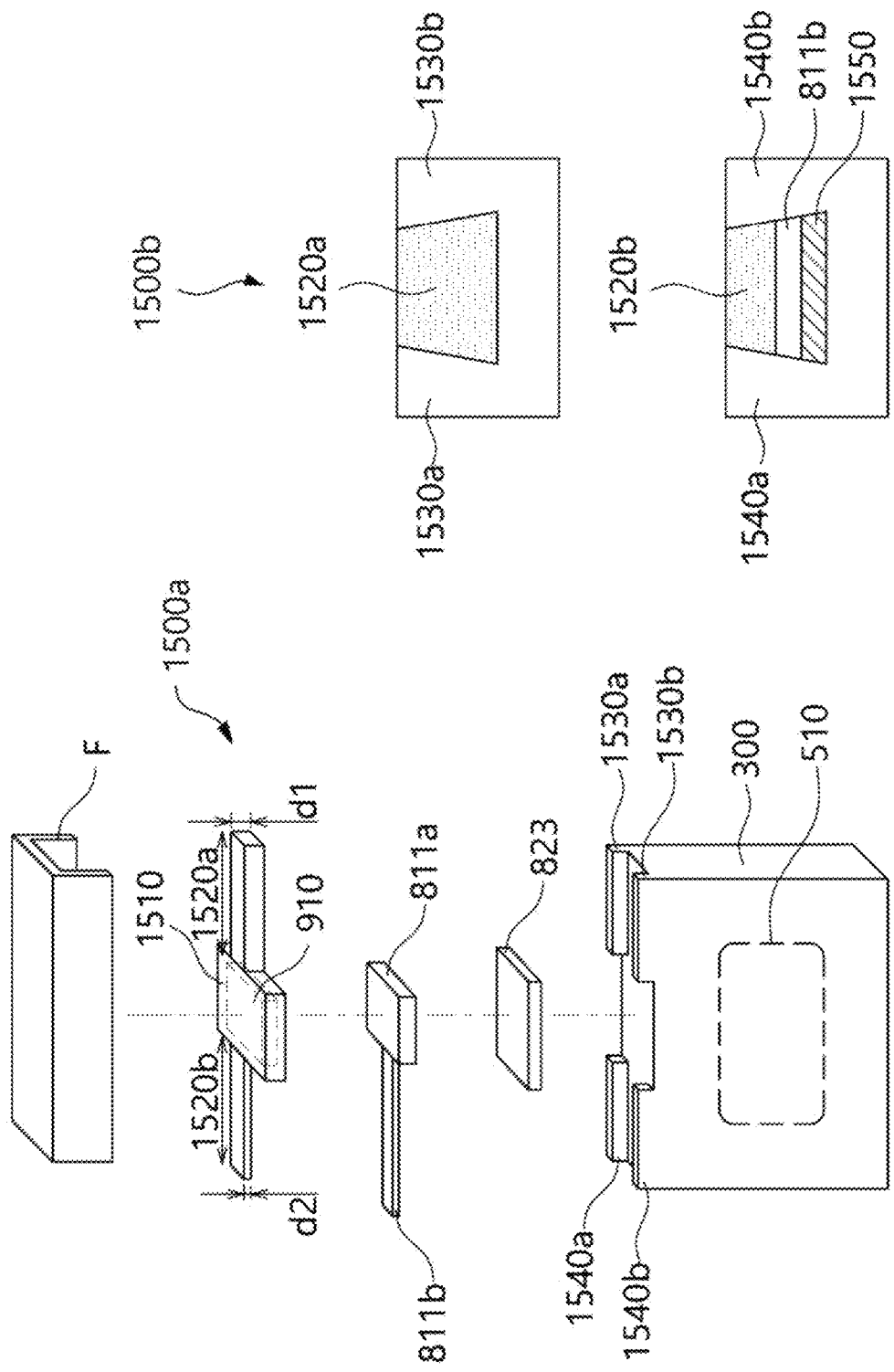
FIG. 15 is a diagram for explaining another example of the connection member having the first coupling structure formed in the upper part of the optical lens according to various embodiments.

FIG. 15 is a diagram for explaining another example of the connection member 900 having the first coupling structure 920a formed in the upper part of the optical lens 300 according to various embodiments. Hereinafter, a description duplicated with the aforementioned "first embodiment" will be omitted.

According to various embodiments, the plurality of wing structures 1520a and 1520b may be implemented to be coupled to a concave structure (or groove) formed by the plurality of structures 1530a, 1530b, 1540a, and 1540b formed in the upper portion of the optical lens 300. The seating structure 910 for seating the output device (e.g., the display 811a) and the optical member 823 may be formed in the internal space of the body structure 1510, but is not limited to the described and/or illustrated example, and the seating structure 910 may be formed in the upper portion of the body structure 1510 rather than the internal space of the body structure 1510 such as the "first embodiment" described above.

According to various embodiments, the plurality of wing structures 1520a and 1520b are formed like the protruding structure 1310 as described above in the "first embodiment", and each height may be different. For example, referring to 1500a of FIG. 15, the height (e.g., d2) of the protruding structure of one wing structure (e.g., the second wing structure 1520b) associated with the electrical connection member 811b among the plurality of wing structures 1520a and 1520b may be formed to be smaller than the height (e.g., d1) of the other wing structure (e.g., the first wing structure 1520a). Accordingly, referring to 1500b of FIG. 15, the electrical connection member 811b (e.g., the FPCB) extending from the display 811a may be disposed through the space between the lower surface of the protruding structure of the second wing structure 1520b and the upper portion of the optical lens 300, and may be connected to another electronic component (e.g., the processor and the battery). In this case, the lower surface of the first wing structure 1510b may be disposed to be in contact with the upper portion of the optical lens 300, and foreign substances from the outside may be prevented from flowing into the gap between the optical lens 300 and the connection member 900. Meanwhile, an additional member 1550 for preventing the foreign substances from flowing may be disposed between the lower surface of the protruding structure of the second wing structure 1520b and the optical lens 300 (e.g., disposed below the electrical connection member 811b), but is not limited to the described and/or illustrated example.

Third Embodiment

Figure 16:
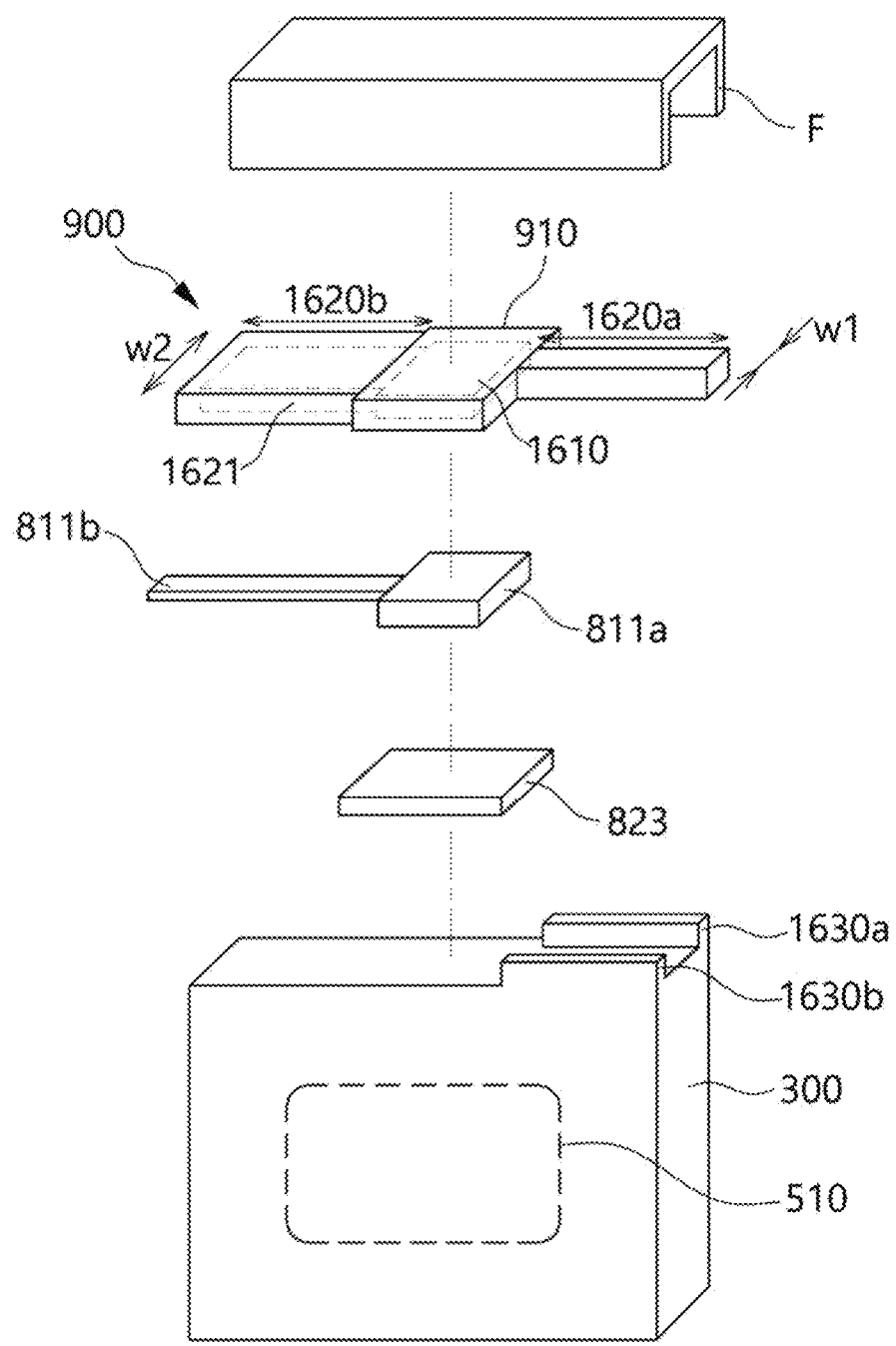
FIG. 16 is a diagram for explaining another example of the connection member having the first coupling structure for coupling to the second coupling structure formed in the upper portion of the optical lens, according to various embodiments.

FIG. 16 is a diagram for explaining another example of the connection member 900 having the first coupling structure 920a for coupling to the second coupling structure 920b formed in the upper portion of the optical lens 300, according to various embodiments. Hereinafter, a description duplicated with the "first embodiment to the second embodiment" will be omitted.

According to various embodiments, referring to FIG. 16, the connection member 900 may include a body structure 1610 and a plurality of wing structures 1620a and 1620b each extending in both side directions from the body portion 1610 similar to the "second embodiment" described above, and a description duplicated will be omitted. In this case, the optical lens 300 may be implemented to have the structures 1630a and 1630b for forming a concave structure only at one side portion of the upper portion. The one side portion may be a side portion opposite to the side portion provided with the electrical connection member 811b.

According to various embodiments, each width (w1 and w2) of the plurality of wing structures 1620a and 1620b may be different. For example, referring to referring FIG. 16, the width (e.g., w2) of one wing structures associated with the electrical connection member 811b may be formed to be greater than the width (e.g., w1) of the other wing structures (e.g., the first wing structure 1620a). Accordingly, the second wing structure 1620b may have the internal space 1621 in which the electrical connection member 811b is positioned. The electrical connection member 811b withdrawn from the internal space 1621 may be connected to other electronic components (e.g., a processor or a battery).

According to various embodiments, only one among the plurality of wing structures 1620a and 1620b (e.g., the first wing structure 1620a) may have a protruding structure such as the "first embodiment". For example, among the plurality of wing structures 1620a and 1620b, the first wing structure 1620a having a relatively smaller width may have a protruding structure, and the first wing structure 1620a of the connection member 900 may be coupled to a concave structure formed at one side portion of the upper portion of the optical lens 300 described above accordingly.

Fourth Embodiment

Figure 17:
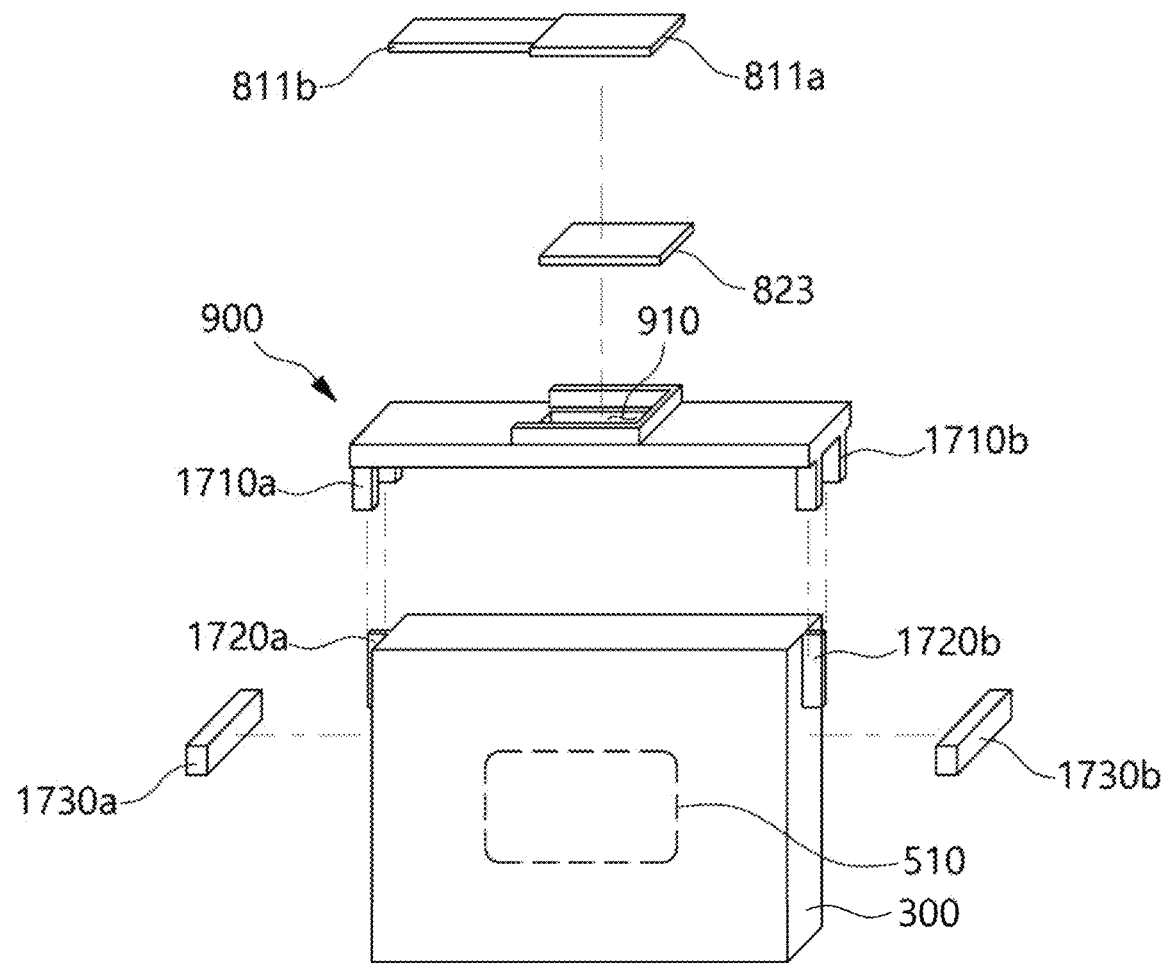
FIG. 17 is a diagram for describing another example of the connection member having the first coupling structure for coupling to the second coupling structure formed at the side portion of the optical lens, according to various embodiments.

FIG. 17 is a diagram for describing another example of the connection member 900 having the first coupling structure 920a for coupling to the second coupling structure 920b formed at the side portion of the optical lens 300, according to various embodiments.

According to various embodiments, referring to FIG. 17, the connection member 900 may be formed to have the first coupling structures 1710a and 1710b for physically coupling to the second coupling structures 1720a and 1720b formed at the side portion of the optical lens 300. As shown in FIG. 17, when the second coupling structures 1720a and 1720b are formed in a protruding structure, the first coupling structures 1710a and 1710b may be formed to have a plurality of protruding structures for forming a concave structure for coupling to the protruding structure. In this case, in the state in which the first coupling structure 1710a and the second coupling structure 1720b are coupled, the fixing structures 1730a and 1730b for firmly fixing them may be implemented.

Fifth Embodiment

Figure 18:
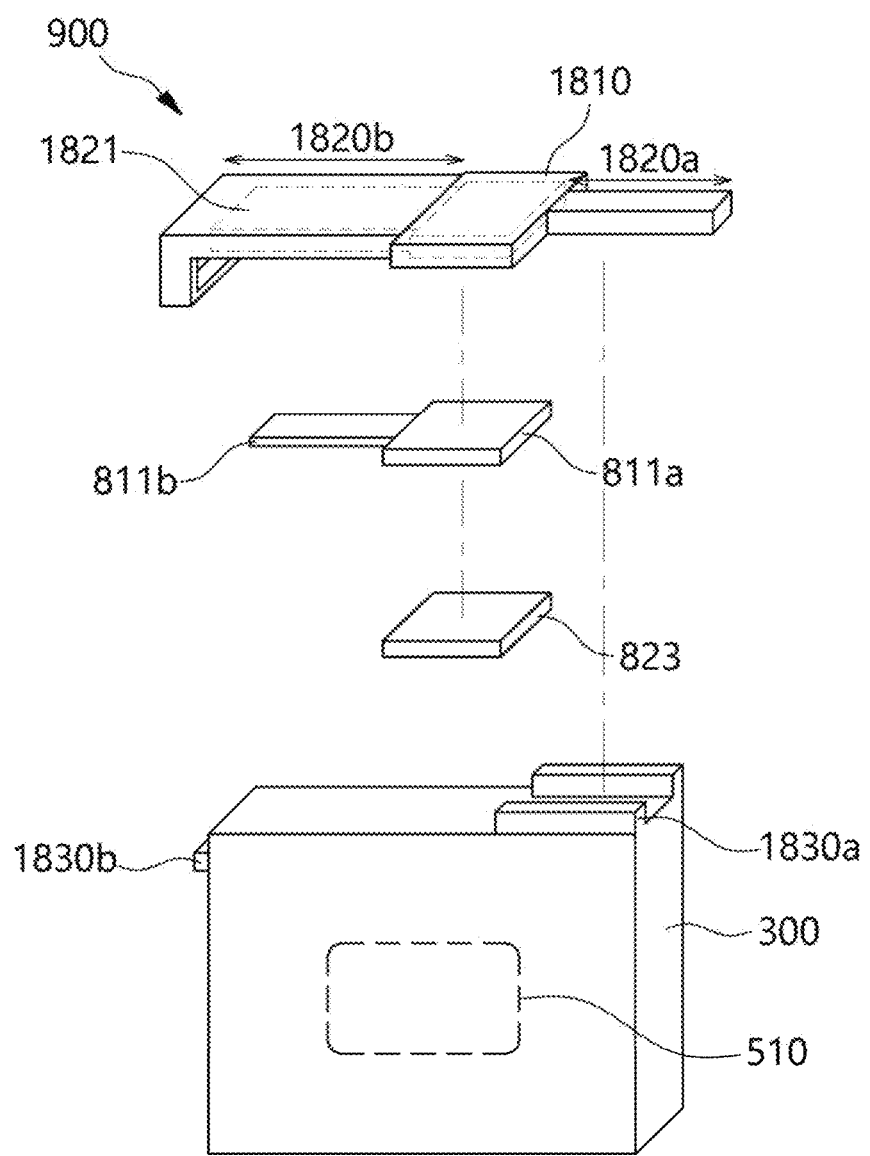
FIG. 18 is a diagram for describing an example of the connection member having a structure in which at least some of the above-described direct coupling structures are combined, according to various embodiments.

FIG. 18 is a diagram for describing an example of the connection member 900 having a structure in which at least some of the above-described direct coupling structures are combined, according to various embodiments.

According to various embodiments, the connection member 900 may be implemented to have at least one first coupling structure 920a for physically coupling to the second coupling structure 920b formed at least one of the upper portion, the side portion, or the lower portion of the optical lens 300. For example, referring to FIG. 18, the connection member 900 may include a body structure 1810 and a plurality of wing structures 1820a and 1820b extending to both sides from the body structure 1810. The first wing structure 1820a may be implemented to be physically coupled to the second coupling structure 1830a formed at a portion (e.g., the side portion) of the upper portion of the optical lens 300, and the second wing structure 1820b may be implemented to be physically coupled to the second coupling structure 1830b formed at the side portion of the optical lens 300. Each of the wing structures 1820a and 1820b of the connection member 900 may be implemented as described in the above-described embodiments, and thus detailed descriptions are omitted.

2.2.1.2 Mediated Coupling Structure

Figure 19:
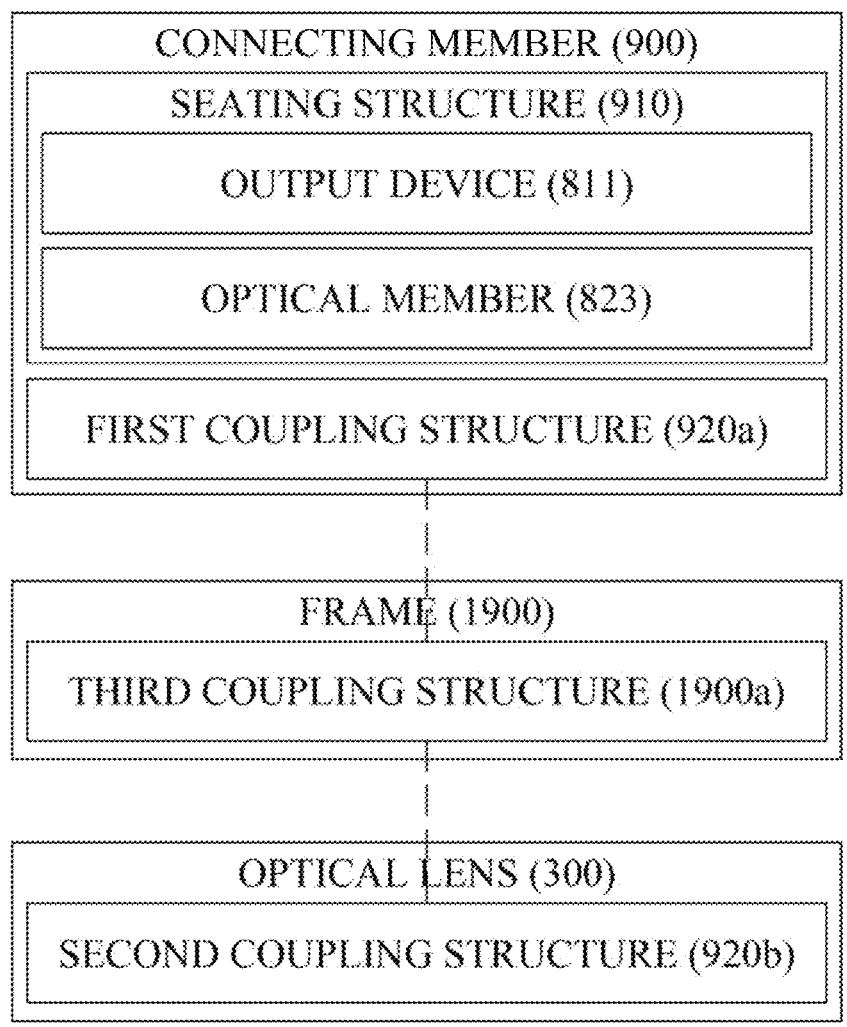
FIG. 19 is a block diagram illustrating an example of the connection member, according to various embodiments.

FIG. 19 is a block diagram illustrating an example of the connection member 900, according to various embodiments.

For convenience of explanation, redundant descriptions with the above-described "direct coupling structure" will be omitted. According to various embodiments, referring to FIG. 19, the connection member 900 and the optical lens 300 may be physically coupled to each other because the frame 1900 to become connected. In other words, differently from the aforementioned "direct coupling structure", as shown in FIG. 20, the first coupling structure 920a of the connection member 900 may be physically coupled with the third coupling structure 1900a of the frame 1900, and the second coupling structure 920b of the optical lens 300 may be coupled with the third coupling structure 1900a of the frame 1900.

Hereinafter, various examples of the connection member 900 having the intermediate coupling structure according to various embodiments will be described. Hereinafter, for convenience of explanation, descriptions duplicated with the implementation examples of the connection member 900 described above are omitted.

Figure 20:
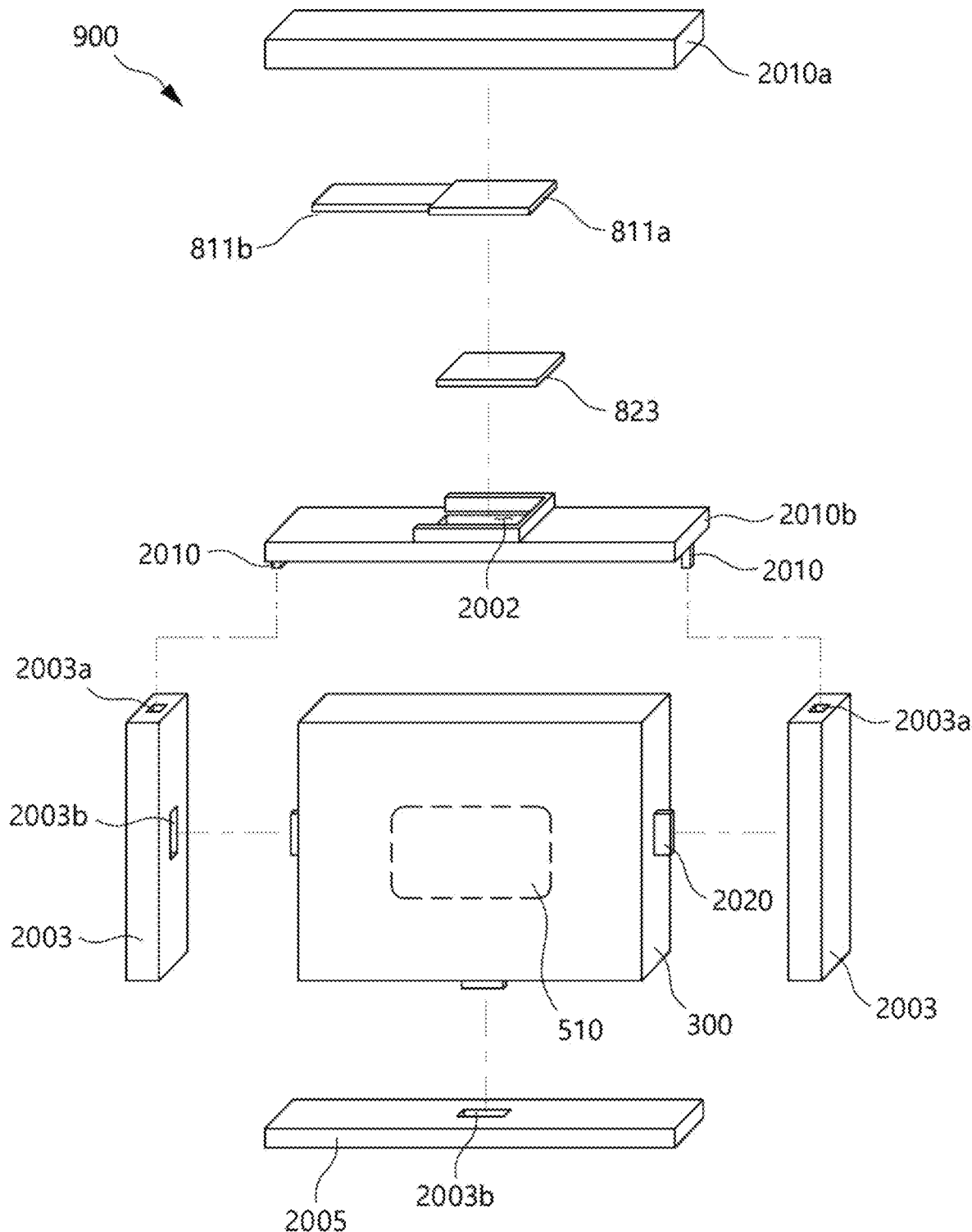
FIG. 20 is a diagram for explaining another example of the optical lens and the connection member coupled to the frame according to various embodiments.

FIG. 20 is a diagram for explaining another example of the optical lens 300 and the connection member 900 coupled to the frame 1900 according to various embodiments.

According to various embodiments, referring to FIG. 20, the eyeglass frame may include frames 2003 and 2005, which have a coupling structure (e.g., a concave structure 2003a) for being coupled to the first coupling structure 920a (e.g., a protruding structure 2010) of the connection member 900 and a coupling structure (e.g., a concave structure 2003b) for being coupled to the second coupling structure 920b (e.g., a protruding structure 2020) of the optical lens 300. Meanwhile, it is obvious to those skilled in the art that the protruding structure may be formed in the frames 2003, 2005, and a concave structure may be formed in the connection member 900 and the optical lens 300, without being limited to the illustrated and/or described examples.

According to various embodiments, the connection member 900 may include a lower structure 2010b including a seating structure 2002 for seating the output device 811a and/or the optical member 823, and an upper structure 2010a coupled to the lower structure 2010b and covering the output device 811a and/or the optical member 823. The lower structure 2010b may be implemented to include a first coupling structure 920a (e.g., a protruding structure 2010) for coupling to a coupling structure (e.g., a concave structure 2003a) formed in some of the eyeglass frame (e.g., side frame 2003). The seating structure 2002 of the connection member 900 may be formed at a position corresponding to the plurality of reflective members 510 of the optical lens 300, similar to the above.

According to various embodiments, the optical lens 300 may be implemented to include a second coupling structure 920b (e.g., the protruding structure 2020) for coupling to a coupling structure (e.g., the concave structure 2003b) formed in some of the eyeglass frame (e.g., the lower frame 2005).

Figure 21:
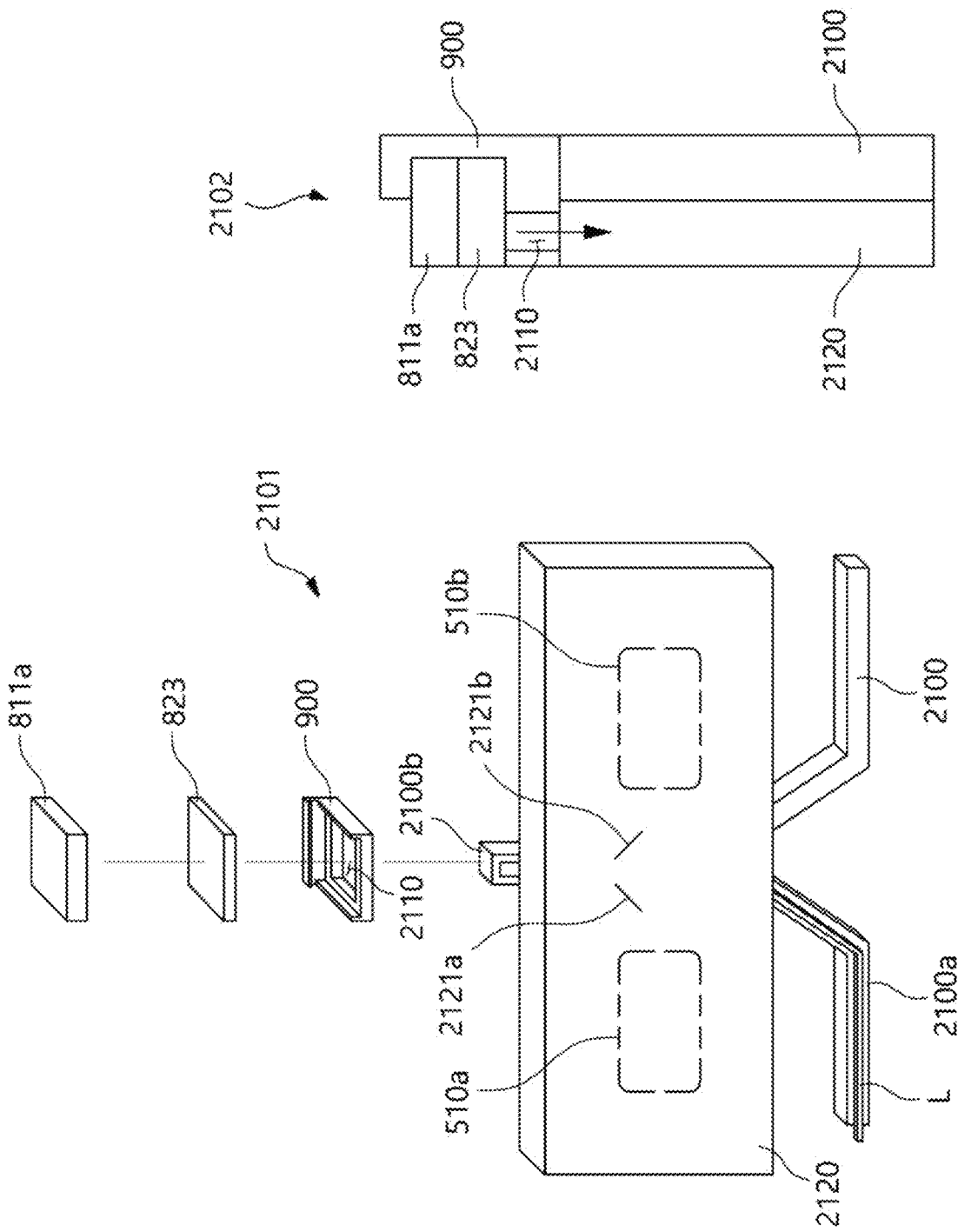
FIG. 21 is a diagram for explaining another example of the optical lens and the connection member coupled to the frame according to various embodiments.

FIG. 21 is a diagram for explaining another example of the optical lens 300 and the connection member 900 coupled to the frame 1900 according to various embodiments. Hereinafter, for convenience of explanation, a description duplicated with the above descriptions will be omitted.

According to various embodiments, referring to 2101 of FIG. 21, the frame 2100 may be implemented to have a structure capable of being combined with the optical lens 2120 (e.g., cylindrical lens) and the connection member 900 including the plurality of reflective member groups 510a and 510b in each of the first area corresponding to the left eye and the second area corresponding to the right eye. Although not illustrated, the optical lens 2120 may be implemented to include a first optical lens corresponding to the left eye and a second optical lens corresponding to the right eye, respectively, rather than a cylindrical lens structure. For example, the frame 2100 may include a lower frame 2100a and a column frame 2100b extending from the lower frame 2100a. The lower frame 2100a may be implemented to include a structure (e.g., a groove structure) for coupling a part (e.g., a lower portion) of the optical lens 2120. The column frame 2100b may be implemented to include a structure for the connection member 900 to be mounted. An electrical connection member L may be disposed through the inner space of each of the lower frame 2100a and the column frame 2100b, and one end of the electrical connection member L may be electrically connected to electronic components (e.g., a display 811a) disposed in the connection member 900 disposed on the column frame 2100b, and the other end may be electrically connected to other electronic components (e.g., a processor, a battery).

According to various embodiments, the connection member 900 may further include a locking part (not shown) to fix the seated display 811*a*.

According to various embodiments, a hole may be formed in a partial region 2110 of the connection member 900. For example, the partial region 2110 of the connection member 900 may be a region corresponding to the optical lens 2120 in a state in which the connection member 900 is mounted on the column frame 2100*b*. Referring to 2102 of FIG. 21, in a state in which the connection member 900 is mounted on the column frame 2100*b*, image light output from the display 811*a* may be provided to the optical lens 2120 through the hole in the region 2110.

According to various embodiments, although not shown, a driving device for moving at least one of the display 811*a* or the optical member 823 in a longitudinal direction and/or a transverse direction may be provided inside the connection member 900. Accordingly, the position of the display 811*a* or the optical member 823 may be determined according to the display mode of the augmented reality device 10. For example, when the display mode of the augmented reality device 10 is a binocular mode in which augmented reality content is provided through the user's binocular, the position of the display 811*a* and the optical member 823 may be located at the center, and accordingly, image light output from the display 811*a* may be provided to all of the plurality of reflection member groups 510*a* and 510*b*, and thus may be provided to the user's binocular. For example, when the display mode of the augmented reality device 10 is a monocular mode in which augmented reality content is provided through one eyeball (e.g., a left eyeball or a right eyeball) of the user's binocular, the position of the display 811*a* and the optical member 823 may be moved by the driving device to be biased to a specific direction, and accordingly, image light output from the display 811*a* may be provided to a reflection member group corresponding to a specific position among the plurality of reflection member groups 510*a* and 510*b*, and thus may be provided to the user's specific position. An example of the driving device will be described in detail later.

According to various embodiments, the optical lens 2120 may include additional optical elements 2121*a* and 2121*b* to separately provide image light into the plurality of reflection member groups 510*a* and 510*b*. The additional optical elements 2121*a* and 2121*b* may be reflective members, a beam splitter, etc. Meanwhile, instead of the illustrated example, the additional optical elements 2121*a* and 2121*b* are implemented in the optical lens 2120, the optical member 823 may be implemented to control the image light in the plurality of the reflection member groups 510 (510*a* and 510*b*). For example, the optical member 823 may be implemented to have a refractive index for the image light incident on the optical member 823 to be refracted in the direction of the plurality of groups of reflective members 510*a* and 510*b*, and/or to include the additional optical elements 2121*a* and 2121*b* described above.

2.2.2 Examples of Output Devices and Optical Members
2.2.2.1 LED Display

Figure 22:
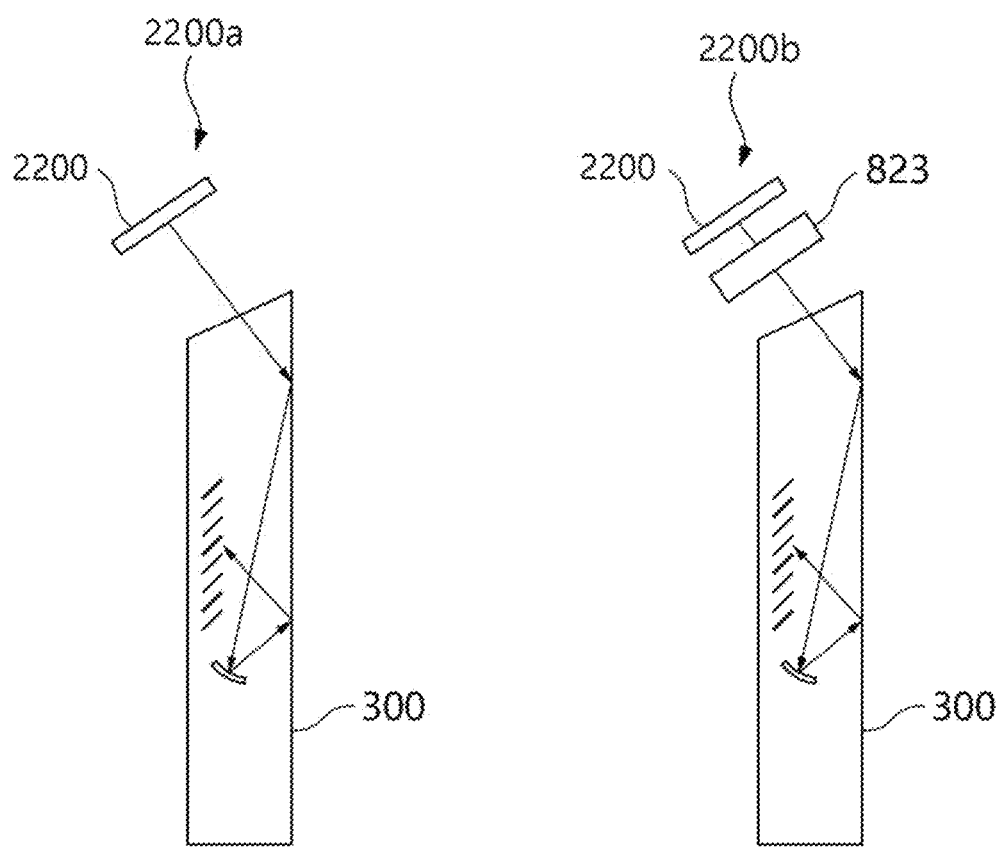
FIG. 22 is a diagram illustrating an example of implementing a led display and an optical member according to various embodiments.

FIG. 22 is a diagram illustrating an example of implementing a led display and an optical member according to various embodiments.

According to various embodiments, the augmented reality device 10 may include a light emitting diode (LED) display 2200 as illustrated in FIG. 22. In this case, as illustrated in 2200*a* of FIG. 22, the optical member 823 may not be disposed between the display 2200 and the optical lens 300, or as illustrated in 2200*b* of FIG. 22, the optical member 823 may be disposed below the display 2200.

According to various embodiments, the optical member 823 may be implemented to control the optical characteristics of the image light output from the LED display 2200. For example, the optical member 823 may include a collimator, a lens array, a prism, a polarizing member, a beam splitter, and the like, but is not limited to the examples described, and various types of optical members for changing the characteristics of the light may be provided in the augmented reality device 10.

2.2.2.2 Laser Display

Figure 23:
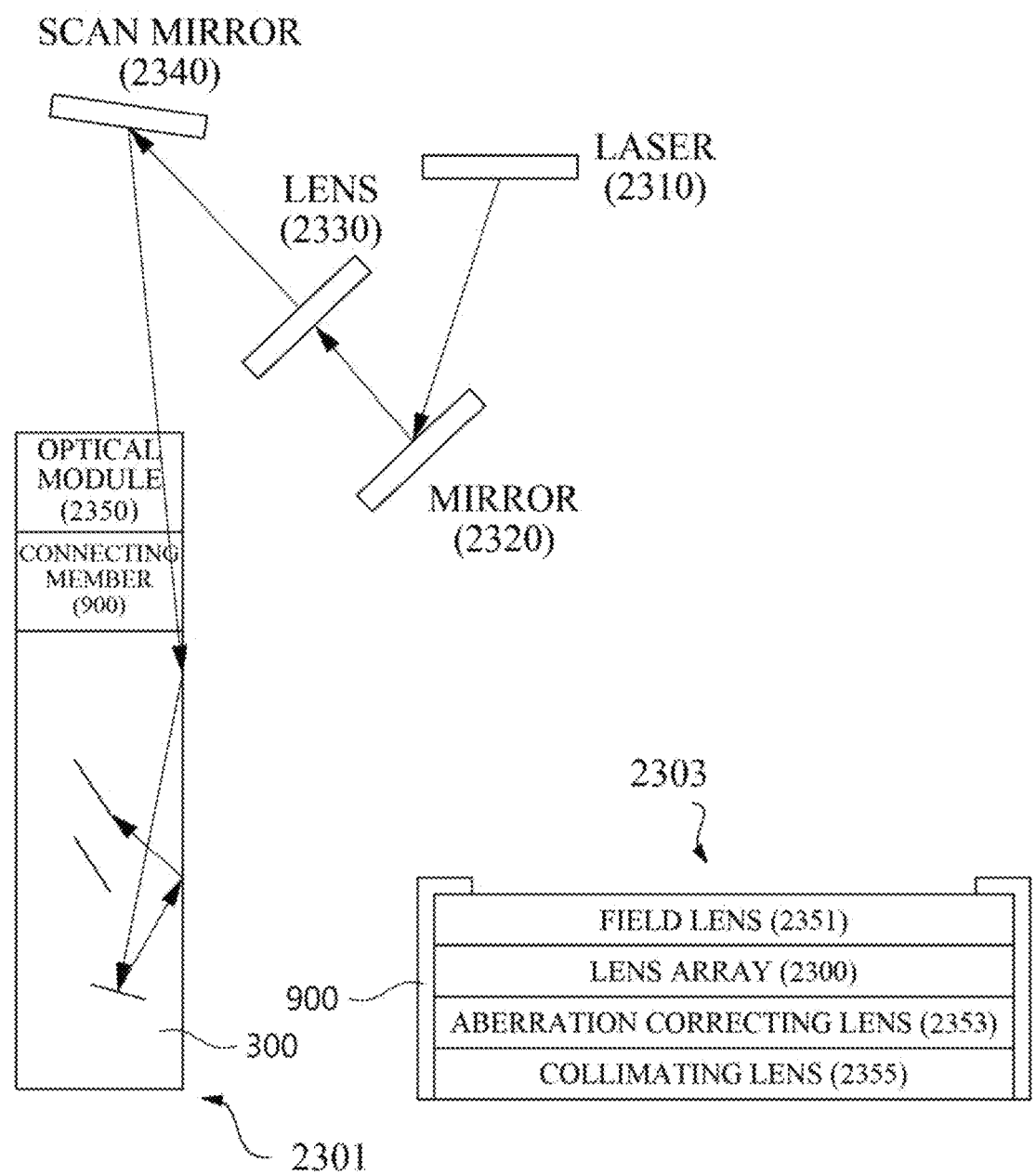
FIG. 23 is a diagram illustrating an example of implementing a laser display and an optical member according to various embodiments.

FIG. 23 is a diagram illustrating an example of implementing a laser display and an optical member according to various embodiments.

According to various embodiments, referring to 2301 of FIG. 23, the augmented reality device 10 may include a laser light source 2310, a mirror 2320 for reflecting light output from the laser light source, a lens 2330 for controlling the focal length of the reflected light, a scan mirror 2340 for adjusting the direction of the light provided through the lens 2330, an optical lens 300, and an optical module 2350 coupled to the optical lens 300 through a connection member 900.

2303 of FIG. 23 shows an example of an optical module 2350. According to various embodiments, referring to 2303 of FIG. 24, the optical module 2350 may be seated on the connection member 900 and may include a field lens 2351, the aforementioned lens array 2300, a color aberration correcting lens 2353, and a collimating lens 2355 (or a collimator). However, the optical module 2350 may include more components, and may selectively exclude some components. For example, the optical module 2350 may not include the lens array 2300 and/or the color aberration correcting lens 2353.

2.2.2.3 LCoS Display

Figure 24:
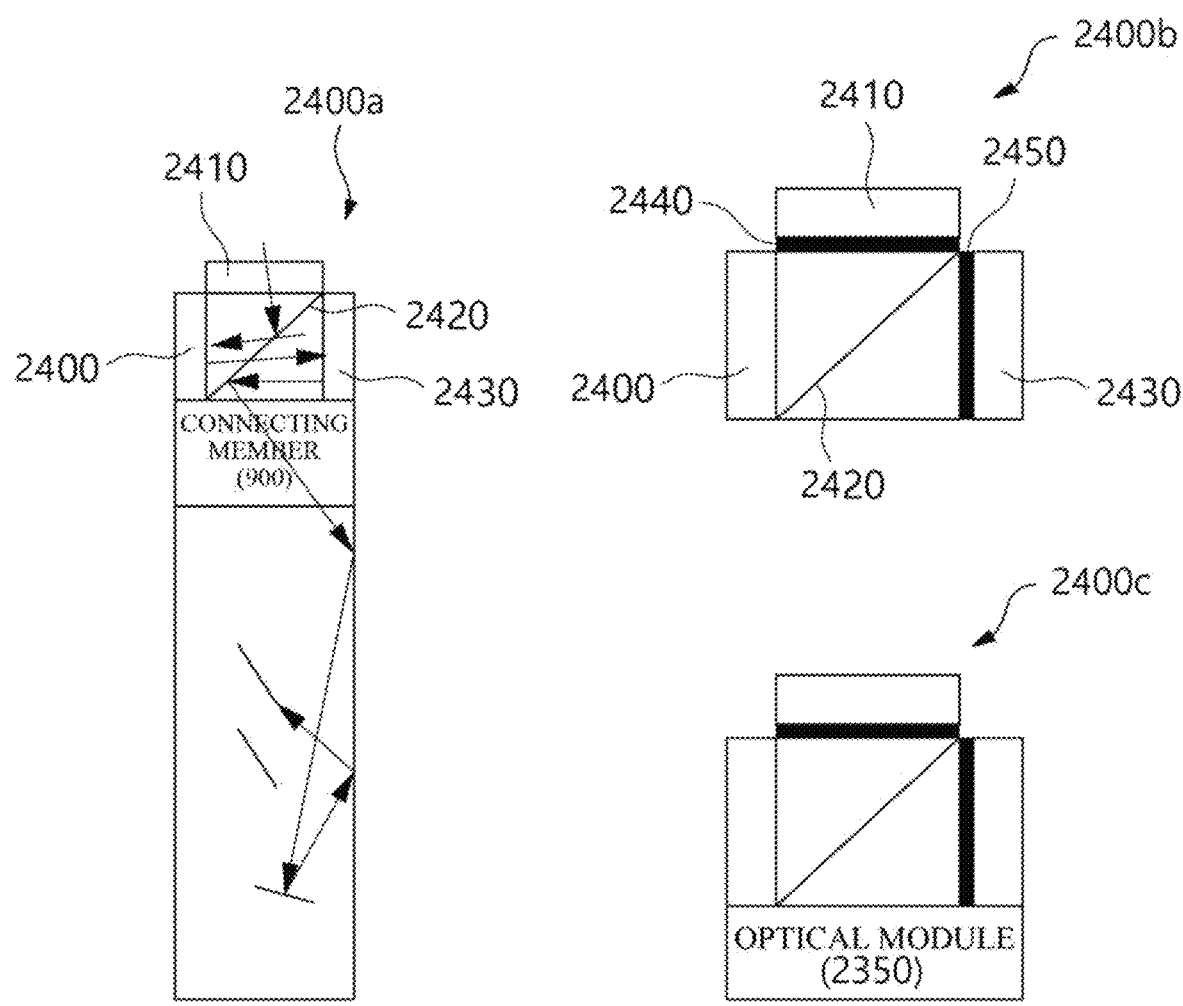
FIG. 24 is a diagram illustrating an example of implementing a LCoS display and an optical member according to various embodiments.

FIG. 24 is a diagram illustrating an example of implementing a LCoS display and an optical member according to various embodiments.

According to various embodiments, referring to 2400*a* of FIG. 24, the augmented reality apparatus 10 may include a light source 2410, a beam splitter 2420 for separating and reflecting light output from the light source 2410, an LCoS display 2400, a mirror 2430, an optical lens 300, and a connection member 900 for physically coupling the optical lens 300 and the above-described components.

According to various embodiments, referring to 2400*b* of FIG. 24, it may further include a diffusion layer 2440 for diffusing light output from the light source 2410, and a delay plate 2450 (e.g., ¼ delay plate and ½ delay plate) for delaying light output from the mirror 2430. Further, referring to 2400*c* of FIG. 24, the optical module 2350 described above in the description of the laser display may be additionally provided.

2.2.3. Example of Driver

Figure 25:
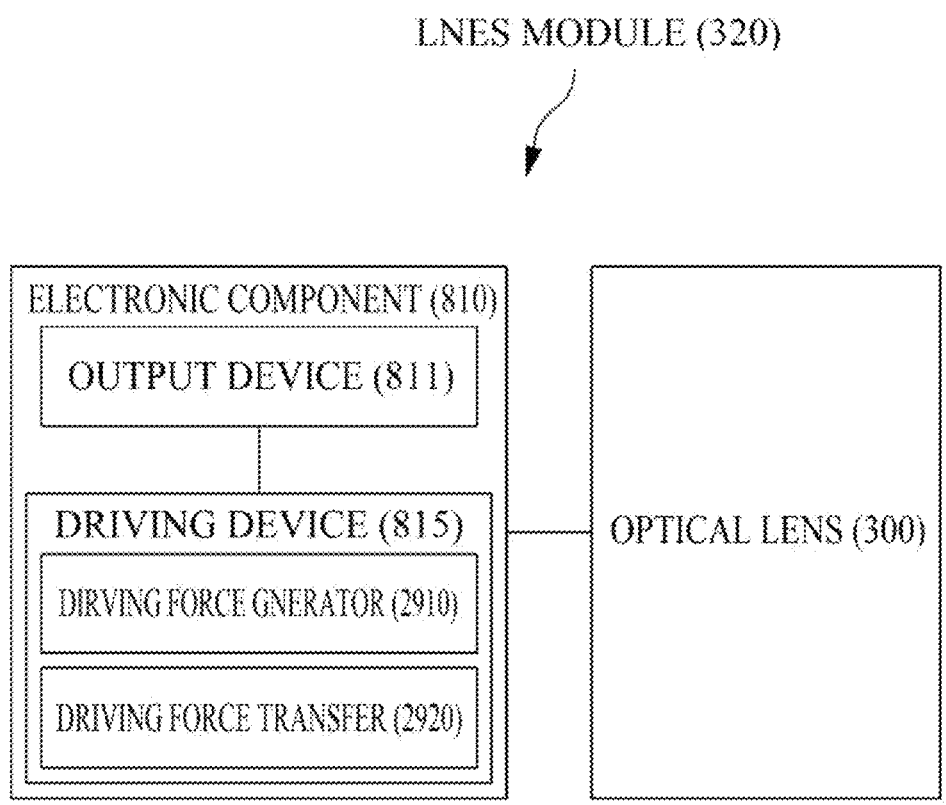
FIG. 25 is a diagram for explaining an implementation example of a driving device of an augmented reality device according to various embodiments.

FIG. 25 is a diagram for explaining an implementation example of a driving device of an augmented reality device according to various embodiments.

According to various embodiments, the augmented reality device 10 may be implemented to include a driving device 815 for adjusting the position of some components (e.g., the output device 811 and the optical lens 300) included in the augmented reality device 10 as the electronic component 810.

Referring to FIG. 25, a lens module 320 including the driving device 815 is illustrated. For example, the lens module 320 may include the electronic component 810 and the optical lens 300. In an embodiment, the electronic component 810 may include the output device 811 and the driving device 815.

According to various embodiments, the driving device 815 may include a driving force generator 2510 for generating a driving force to change the position of at least one of the components included in the augmented reality device 10 and a driving force transfer 2520 implemented to change the position of at least one of the output device 811 and the optical lens 300 by using the driving force generated through the driving force generator 2510.

According to various embodiments, as the driving device 815 is controlled by the processor described with reference to FIG. 8, the position of the components (e.g., the output device 811) connected to the driving device 815 may be changed.

According to an embodiment, the driving force transfer 2520 may transmit the driving force obtained through the driving force generator 2510 to the output device 811 to adjust the position (or the angle) of the output device 811. For example, the driving device 815 may adjust the position of the output device 811 based on the user's gaze information to be described with reference to FIG. 31.

According to various embodiments, as the augmented reality device 10 adjusts the position of the components included in the augmented reality device 10 through the driving device 815, the user may more conveniently watch the content stably (e.g., without shaking).

According to various embodiments, the driving force generator 2510 and the driving force transfer 2520 may be implemented in various shapes. Hereinafter, various examples of the driving device 815 according to various embodiments will be described.

Although the driving device 815 described below is explained to adjust the position of the output device 811 for convenience of explanation, the position of the optical member 823, the optical lens 300, and the seating structure 910 may be adjusted as necessary. That is not limited to the embodiments and drawings disclosed in this document, and various modifications may be made by those skilled in the art. For example, the driving device 815 may adjust the position of various components of the augmented reality device 10 including the optical member 823, the optical lens 300, and/or the seating structure 910 may be adjusted in a way similar to the position of the output device 811.

In addition, the driving device 815 described below corresponds to one example, and is not intended to limit the form of a device to which the technical idea disclosed in the present disclosure is applied.

2.2.3.3. A Driving Device Including Magnetic Substance(s) and Electromagnet(s)

Figure 26:
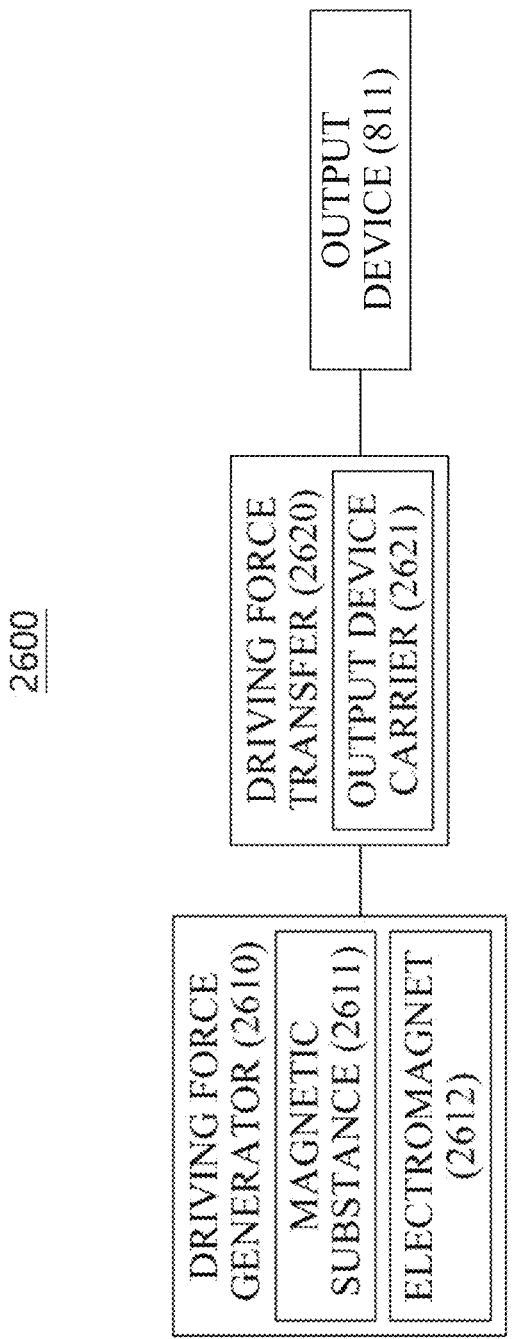
FIG. 26 is a diagram for describing an example of implementing a driving device including magnetic substance(s) and electromagnet(s) according to various embodiments.
Figure 27:
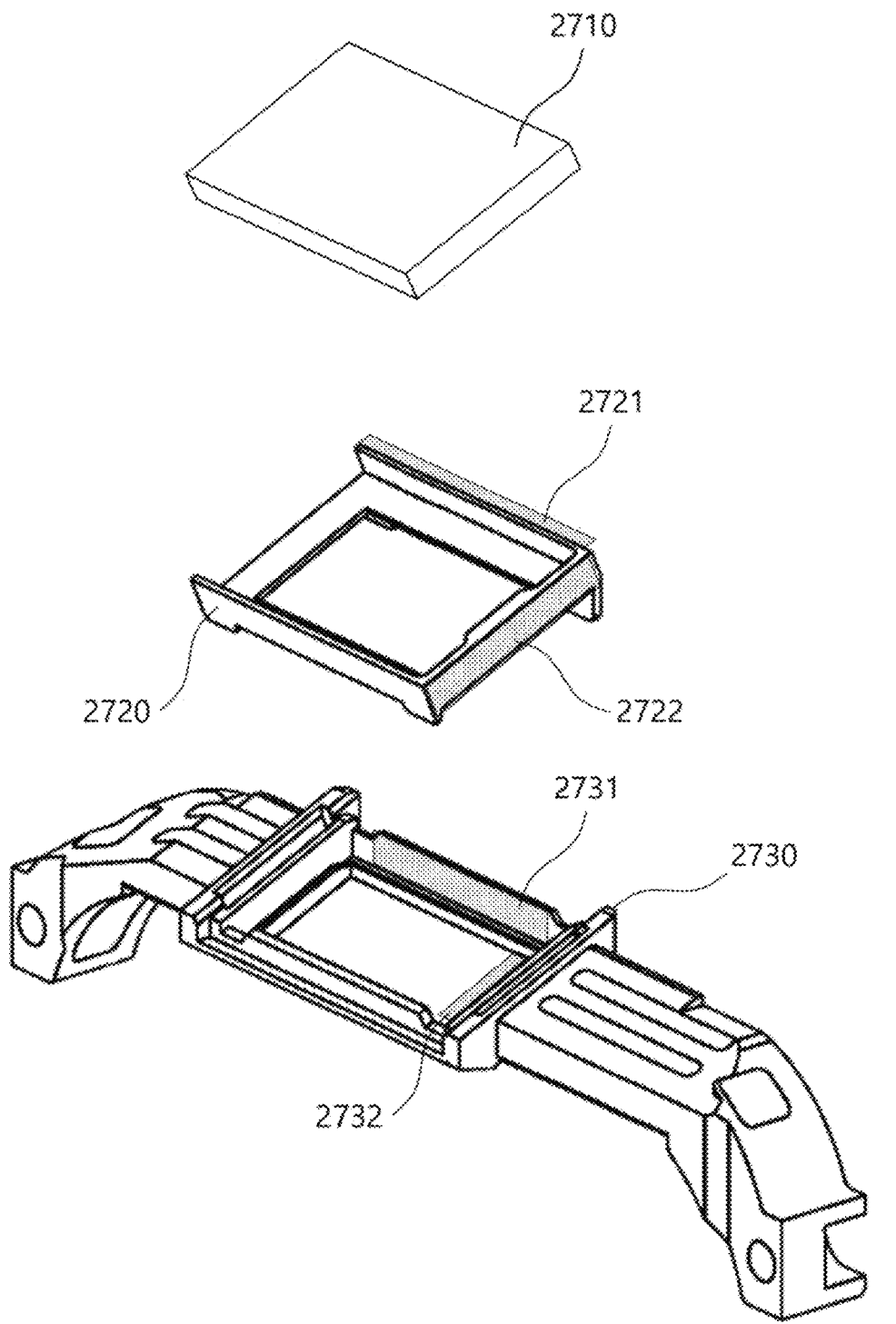
FIG. 27 is an exploded perspective view of a driving device including magnetic substance(s) and electromagnet(s) according to various embodiments.
Figure 28:
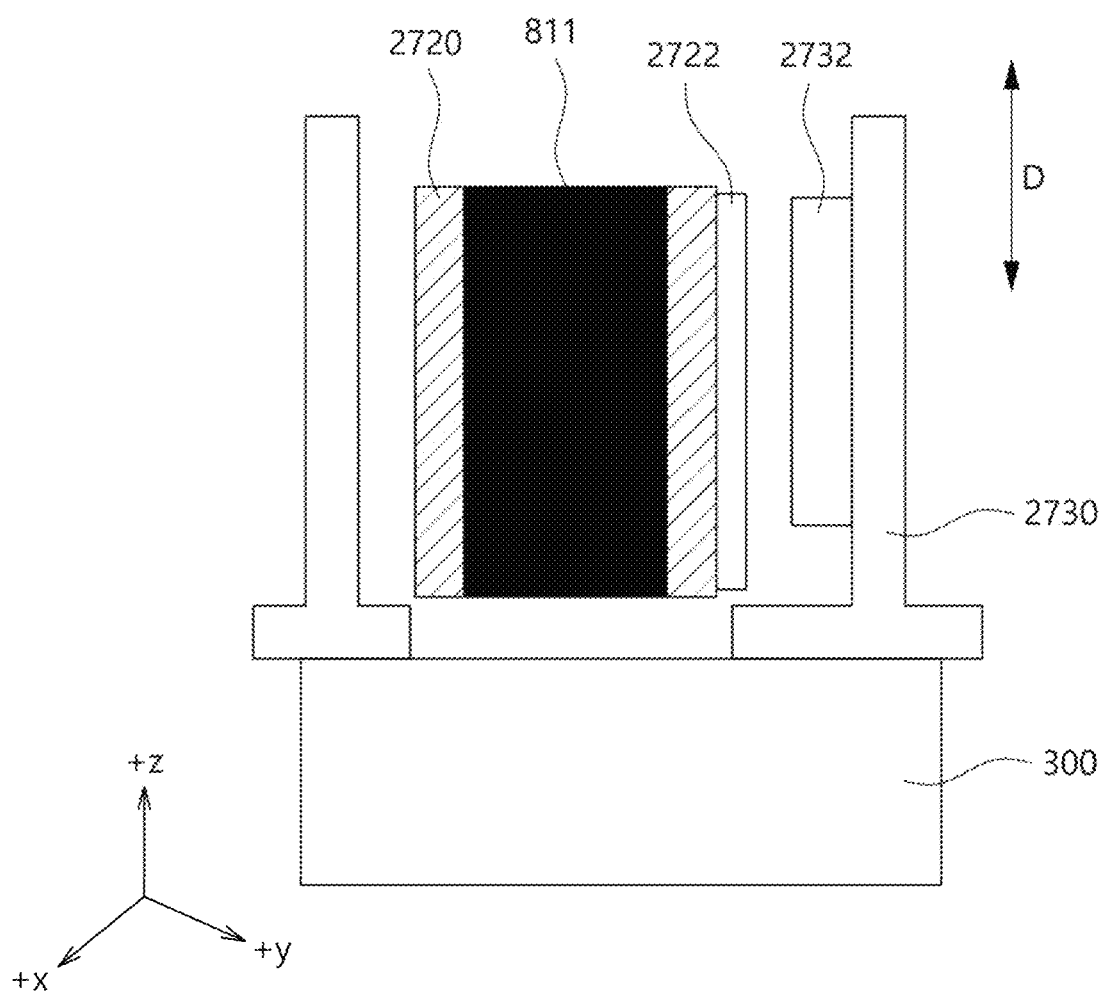
FIG. 28 is a diagram for describing an example of changing a position of an output device through an interaction between magnetic substance(s) and electromagnet(s) according to various embodiments.

FIG. 26 is a diagram for describing an example of implementing a driving device including magnetic substance(s) and electromagnet(s) according to various embodiments. FIG. 27 is an exploded perspective view of a driving device including magnetic substance(s) and electromagnet(s) according to various embodiments. FIG. 28 is a diagram for describing an example of changing a position of an output device through an interaction between magnetic substance(s) and electromagnet(s) according to various embodiments.

In the description of FIG. 27 and FIG. 28, the configuration described in FIG. 26 may be briefly described or omitted.

Hereinafter, for convenience of description, the driving device using electromagnet(s) and magnetic substance(s) is described with reference to FIGS. 26 to 30, however, the configuration described through each drawing may be mixed.

According to various embodiments, the driving device 815 may include at least one magnetic substance 2611 and at least one electromagnet 2612 implemented to generate a driving force. In addition, the driving device 815 may include an output device carrier 2621 implemented to transfer the driving force obtained from the at least one magnetic substance 2611 and the at least one electromagnet 2612 to the output device 811.

According to various embodiments, the driving force generator 2610 (e.g., the driving force generator 2510 of FIG. 25) may include at least one magnetic substance 2611 and at least one electromagnet 2612. For example, the at least one magnetic substance 2611 and the at least one electromagnet 2612 may be disposed in the seating structure 910 (e.g., the seating structure 2730 of FIG. 27) and/or the output device carrier 2621 (e.g., the output device carrier 2720 of FIG. 27). According to various embodiments, the driving device 815 may perform a focal length adjustment and/or an image stabilization function using the at least one magnetic substance 2611 and the at least one electromagnet 2612 disposed in the seating structure 910 and the output device carrier 2621. In one embodiment, the at least one magnetic substance 2611 and the at least one electromagnet 2612 may interact electromagnetically with each other by a processor or a control circuit of the augmented reality device 10. Through the interaction, the augmented reality device 10 may perform a focal length adjustment and/or an image stabilization function. For example, the driving device 815 may control the direction and/or intensity of the current passing through the at least one electromagnet 2612 configured with at least one coil under the control of the processor to control the electromagnetic force. In addition, the driving device 815 may move (or rotate) the output device carrier 2621 in a direction in which the reality light is incident on the optical lens 300 using a Lorentz force or a Solenoid force by the electromagnetic force.

According to various embodiments, the driving force transfer 2620 (e.g., the driving force transfer 2520 of FIG. 25) may include the output device carrier 2621 in which the output device 811 and/or the optical member 823 is disposed. According to an embodiment, the output device carrier 2621 may move in at least one direction through the at least one magnetic substance 2611 and the at least one electromagnet 2612. For example, as the output device carrier 2621 is moved through the at least one magnetic substance 2611 and the at least one electromagnet 2612, the output device 811 (e.g., a display) and/or the optical member 823 may be moved. In an embodiment, as the output device 811 (e.g., a display) and/or the optical member 823 is moved in the second direction (e.g., a longitudinal direction, a direction parallel to the direction of the actual object image light incident on the optical lens 300 coupled through the connection member 900), the path of light from the output device 811 to the optical lens 300 may be adjusted to perform the focus adjustment function.

Referring to FIG. 26, a perspective exploded view of an augmented reality device including the at least one magnetic substance 2611 and the at least one electromagnet 2612 is illustrated.

Referring to FIGS. 27 and 28, according to various embodiments, the augmented reality device 10 may include the output device carrier 2720 and the seating structure 2730 (e.g., the seating structure 910 of FIG. 9). In this case, the cover 2710 (e.g., the frame F of FIG. 13) and the output device 811 (and/or the optical member 823) may be disposed on the output device carrier 2720. In addition, the augmented reality device 10 may include at least one magnetic substance 2611 (e.g., the first magnetic substance 2721 and the second magnetic substance 2722) disposed on the outer surface of the output device carrier 2720. In addition, the augmented reality device 10 may include at least one electromagnet 2621 (e.g., the first electromagnet 2731 and the second electromagnet 2732) disposed on the inner surface of the seating structure 2730. According to various embodiments, the illustrated example is not limited, and the augmented reality device 10 may include various types of electromagnets and magnetic substances at various positions to perform the same functions as the at least one magnetic substance 2611 and the at least one electromagnet 2621.

According to various embodiments, the components of the driving device 815 (e.g., the driving force generator 2610 and the driving force transfer 2620) may be accommodated in a space formed between the cover 2710 and the seating structure 2730. According to an embodiment, the cover 2710 may be coupled to the seating structure 2730 and may be formed in a box shape having an internal space.

According to various embodiments, the output device 811 (and/or the optical member 823) may be accommodated in the output device carrier 2720 (e.g., the output device carrier 2621). For example, the output device 811 may be disposed on the inner surface of the output device carrier 2720. Therefore, the output device 811 may move integrally with the output device carrier 2720.

According to various embodiments, the output device carrier 2720 may be installed to be movable in the internal space formed through the cover 2710 and the seating structure 2730. For example, the output device carrier 2720 may be disposed to be movable in at least one direction D in the internal space formed through the cover 2710 and the seating structure 2730. In this case, the driving device 815 may include an additional structure (e.g., a ball member, a sliding member, or the like) implemented to guide the movement of the output device carrier 2720.

According to various embodiments, the output device carrier 2720 may move in one dimension (e.g., one axis direction). To adjust the focus so that the image light output from the output device 811 can be viewed by the user. For example, the augmented reality device 10 may move the output device carrier 2720 to prevent the user from being unable to visually recognize the content output from the output device 811 due to the defocus. For example, the driving device 815 may adjust the focal length by moving the output device carrier 2720 in a direction perpendicular to the optical axis (e.g., +z/−z direction) of the actual object image light incident on the optical lens 300.

According to various embodiments, at least one magnetic substance 2611 (e.g., the first magnetic substance 2721, the second magnetic substance 2722) may be attached to at least a part of the output device carrier 2720 to move the output device carrier 2720 through interaction with at least one electromagnet 2621 (e.g., the first electromagnet 2731, the second electromagnet 2732). According to an embodiment, the first magnetic substance 2721 may be disposed to face the first electromagnet 2731. In addition, the second magnetic substance 2722 may be disposed to face the second electromagnet 2732. In an embodiment, as current is applied to the first electromagnet 2731 and the second electromagnet 2732, the output device carrier 2720 may move in at least one direction d by the magnetic force generated between the first magnetic substance 2721 and the first electromagnet 2731. In an embodiment, as current is applied to the first electromagnet 2731 and the second electromagnet 2732, the output device carrier 2720 may move in at least one direction d by the magnetic force generated between the second magnetic substance 2722 and the second electromagnet 2732.

For example, the first magnetic substance 2721 may move in at least one direction d by a magnetic force generated through interaction with the first electromagnet 2731. In addition, the second magnetic substance 2722 may move in at least one direction d by a magnetic force generated through interaction with the second electromagnet 2732. Therefore, the output device carrier 2720 may be driven by attractive or repulsive force between the first magnetic substance 2721 and the first electromagnet 2731, and by attractive or repulsive force between the second magnetic substance 2722 and the second electromagnet 2732.

According to various embodiments, the output device carrier 2720 may be moved in at least one direction D by at least one magnetic substance 2611 and at least one electromagnet 2612. The path of light from the output device 811 to the optical lens 300 may be adjusted by the movement of the output device carrier 2720 to perform a focus adjustment function.

FIG. 29 is a diagram for explaining an example of changing the position of the output device through the interaction of magnetic substance(s) and electromagnet(s) according to various embodiments.

According to various embodiments, among the elements of the augmented reality device 10 illustrated in FIG. 29, a configuration having the same reference numerals as the elements described with reference to FIG. 26 to FIG. 28 and FIG. 30 may perform similar functions. Therefore, duplicate descriptions are omitted below.

Referring to FIG. 29(a), an example of moving an output device carrier 2720 through interaction between at least one magnetic substance 2910 (e.g., at least one magnetic substance 2611 of FIG. 26) and at least one electromagnet 2920 (e.g., at least one electromagnet 2612 of FIG. 26) is illustrated. Referring to FIG. 29 (b), an arrangement for interaction between at least one magnetic substance 2910 (e.g., at least one magnetic substance 2611 of FIG. 26) and at least one electromagnet 2920 (e.g., at least one electromagnet 2612 of FIG. 26) is shown.

According to various embodiments, the at least one magnetic substance 2910 may include at least one protruding portion 2911, 2912.

According to various embodiments, the at least one electromagnet 2920 may include a first magnetic substance 2924, a first magnet 2921, and a second magnetic substance 2925. The first magnetic substance 2924, the first magnet 2921, and the second magnetic substance 2925 may be fixed to an inner surface of the seating structure 2730. In this case, the first magnet 2921 may have a first pole on the surface in contact with the first magnetic substance 2924, and a second pole on the surface in contact with the second magnetic substance 2925. Therefore, the at least one protruding portion 2911, 2912 of the at least one magnetic substance 2910 may be spaced apart from the at least one electromagnet 2920 by a predetermined distance by the magnetic force generated in the first magnet 2921, the first magnetic substance 2924, and the second magnetic substance 2925.

According to various embodiments, the at least one electromagnet 2920 may include a first coil 2922 spaced apart from the first magnet 2921 by a predetermined distance, and a second coil 2923 spaced apart from the first coil 2922. According to an embodiment, as current is applied to the first coil 2922 and the second coil 2923, the at least one electromagnet 2920 may be a passage through which magnetic flux flows. Accordingly, the electromagnetic force may be induced in the at least one magnetic substance 2910, and the at least one magnetic substance 2910 may move to a point where the force becomes zero. Therefore, the output device carrier 2720 on which the at least one magnetic substance 2910 is disposed may move in at least one direction D.

According to various embodiments, the driving device 815 may control the electromagnetic force by controlling the direction and/or intensity of the current applied to the first coil 2922 and the second coil 2923 under the control of the processor. Therefore, the driving device 815 may move (or rotate) the output device carrier 2621 in the direction of the optical axis (not illustrated) in which the reality light is incident on the optical lens 300 and/or in a direction perpendicular to the optical axis.

Figure 30:
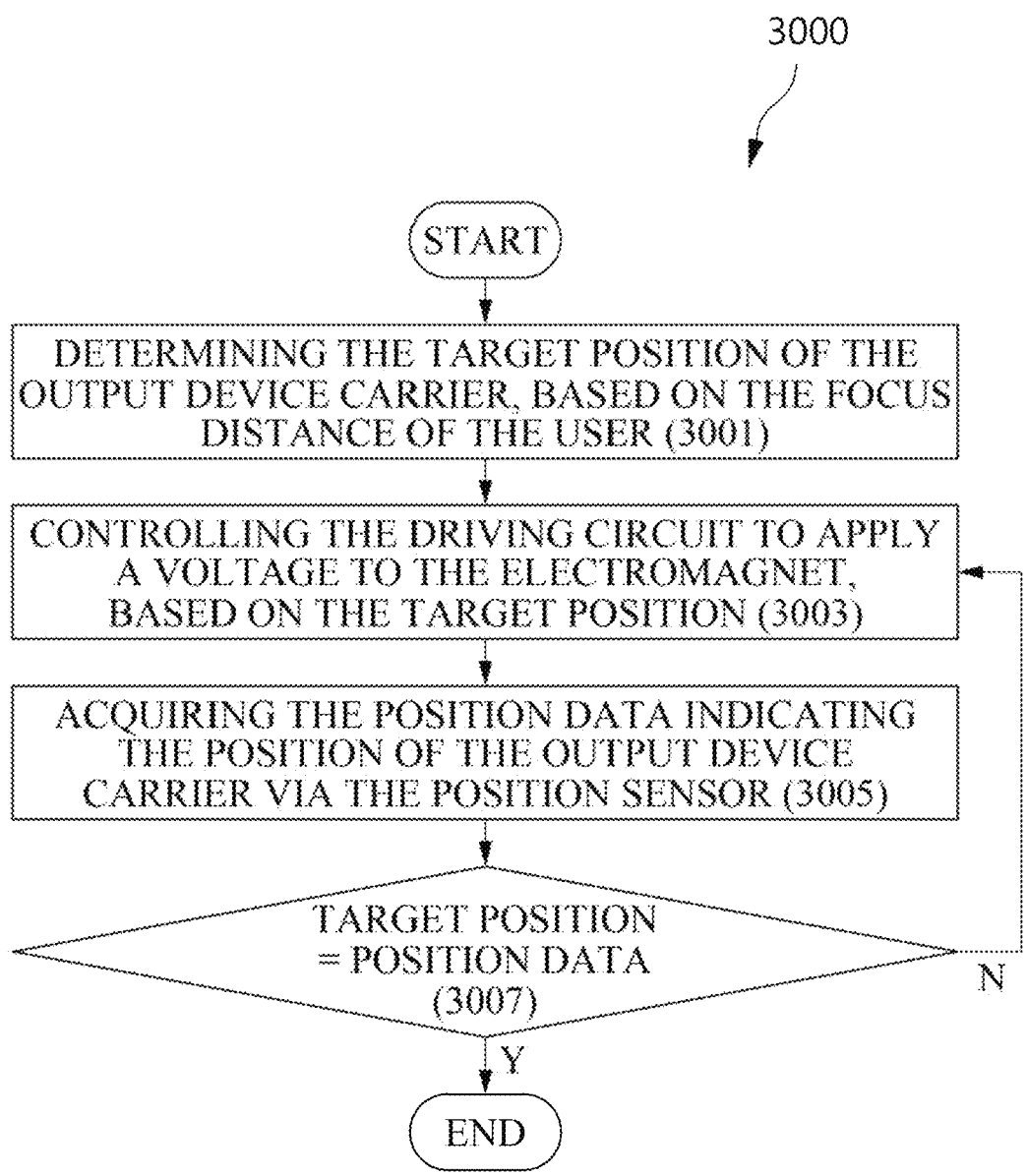
FIG. 30 is a flowchart illustrating a method of controlling voltage to be applied to electromagnet(s) by an augmented reality device, according to various embodiments.

FIG. 30 is a flowchart 3000 illustrating a method of controlling a voltage to be applied to electromagnet(s) by an augmented reality device, according to various embodiments.

Each of the operations described below may be performed in combination with each other. In addition, the operation by the augmented reality device 10 among the operations described below may mean the operation of the augmented reality device 10 controlled by the processor (not illustrated) of the augmented reality device 10 described with reference to FIG. 1 or the processor of the server 20 described with reference to FIG. 35.

In addition, "information" described below may be interpreted as meaning "data" or "signal", and "data" may be understood as concepts including both analog data and digital data.

According to various embodiments, operations illustrated in FIG. 30 may be performed in various orders and may be performed in various orders without limitation. In addition, according to various embodiments, operations illustrated in FIG. 30 may be performed more or at least one operation may be performed less than the operations illustrated in FIG. 30.

Referring to FIG. 30, in operation 3001, the augmented reality device 10 may determine the target position of the output device carrier 2720 based on the focus distance of the user. For example, the augmented reality device 10 may acquire the gaze information of the user and determine the target position of the output device carrier 2720 based on the gaze information of the user through the operations described below with reference to FIGS. 31 to 34.

According to various embodiments, in operation 3003, the augmented reality device 10 may control the driving circuit to apply a voltage to the electromagnet 2612 based on the target position. For example, the augmented reality device 10 may control the driving circuit (e.g., driver integrated circuit (IC)) disposed at the center of the at least one electromagnet 2612, respectively, through the processor, based on the target position of the output device carrier 2720. According to various embodiments, the augmented reality device 10 may control the current applied to the at least one electromagnet 2612 through the driving circuit. According to an embodiment, as the current is applied to the at least one electromagnet 2612, the direction and/or magnitude of the magnetic force generated between the at least one electromagnet 2612 and the at least one magnetic substance 2611 may be controlled by the magnitude and/or direction of the current applied. Therefore, the processor may control the current applied to the at least one electromagnet 2612 through the driving circuit to allow the output device carrier 2720 to be located at the target position.

According to various embodiments, in operation 3005, the augmented reality device 10 may acquire the position data indicating the position of the output device carrier 2720 through the position sensor. According to an embodiment, the augmented reality device 10 may acquire the position data through the position sensor (e.g., a gyro sensor, a Hall sensor, a tunnel magneto-resistance sensor, or the like) disposed in at least a part of the output device carrier 2720 or the seating structure 2730.

For example, the at least one electromagnet 2612 disposed in at least a part of the seating structure 2730 may include the driving circuit (e.g., driver IC). According to an embodiment, the driving circuit may include a Hall sensor.

According to various embodiments, the Hall sensor may be disposed on the outer surface of the output device carrier 2720 to detect the position of the at least one output device 2720 through the change in the position of the at least one magnetic substance 2611 moving together with the output device carrier 2720. For example, the Hall sensor may measure the position of the opposing magnetic substance 2611 with respect to the Hall sensor through interaction with the opposing magnetic substance 2611. The at least one Hall sensor may measure the change in the magnetic field formed by the opposing magnetic substance 2611 to sense the position of the opposing magnetic substance 2611.

According to various embodiments, in operation 3007, the augmented reality device 10 may determine whether the target position and the position data match. For example, the augmented reality device 10 may compare the target position of the output device carrier 2720 determined based on the user gaze information with the position data indicating the actual position of the output device carrier 2720. The augmented reality device 10 may control the driving circuit to apply a voltage to the at least one electromagnet 2612 until the target position and the position data match.

According to various embodiments, the augmented reality device 10 may adjust the position of the output device carrier 2720 based on the user gaze information based on the user gaze information based on the user gaze information. Therefore, the augmented reality device 10 may adjust the optical path of the image light for the content incident from the output device 811 to the optical lens 300 so that the content is stably provided.

According to various embodiments, the augmented reality device 10 may control the driving circuit based on various data without being limited to the above-described target position.

For example, the augmented reality device 10 may acquire image data corresponding to the content that the user visually recognizes through the image sensor. The augmented reality device 10 may determine the target position of the output device carrier 2720 that allows the user to visually recognize the content based on the acquired image data. According to various embodiments, the augmented reality device 10 may control the driving circuit based on the determined target position. For example, the augmented reality device 10 may control the magnitude of the attractive force and/or repulsion force generated between the at least one electromagnet 2612 and the at least one magnetic substance 2611 by adjusting the magnitude of the voltage input to the at least one electromagnet 2612 through the driving circuit. Therefore, the augmented reality device 10 may allow the output device carrier 2720 to be located at the target position.

2.2.4. Example of Gaze Information Acquisition Structure

According to various embodiments, the augmented reality device 10 may be implemented as a component 310 to include a gaze information acquisition structure for acquiring the gaze information of the user wearing the augmented reality device 10. For example, the gaze information may include information about the gaze coordinates and/or directions of the user, information about the change in the gaze of the user, and information about the state (e.g., retention and movement) of the user's gaze. The gaze information acquisition structure may be implemented to acquire the light reflected from the pupil of the user wearing the augmented reality device 10, and as the information about the acquired reflected light is analyzed by the augmented reality device 10 and/or the external device (e.g., the server 20 and the user terminal 30), the gaze information of the gender user may be acquired. The gaze information may be reflected in the service of the augmented reality system 1.

Hereinafter, various examples of the gaze information acquisition structure according to various embodiments will be described.

2.2.4.1 Separate Acquisition Structure

Figure 31:
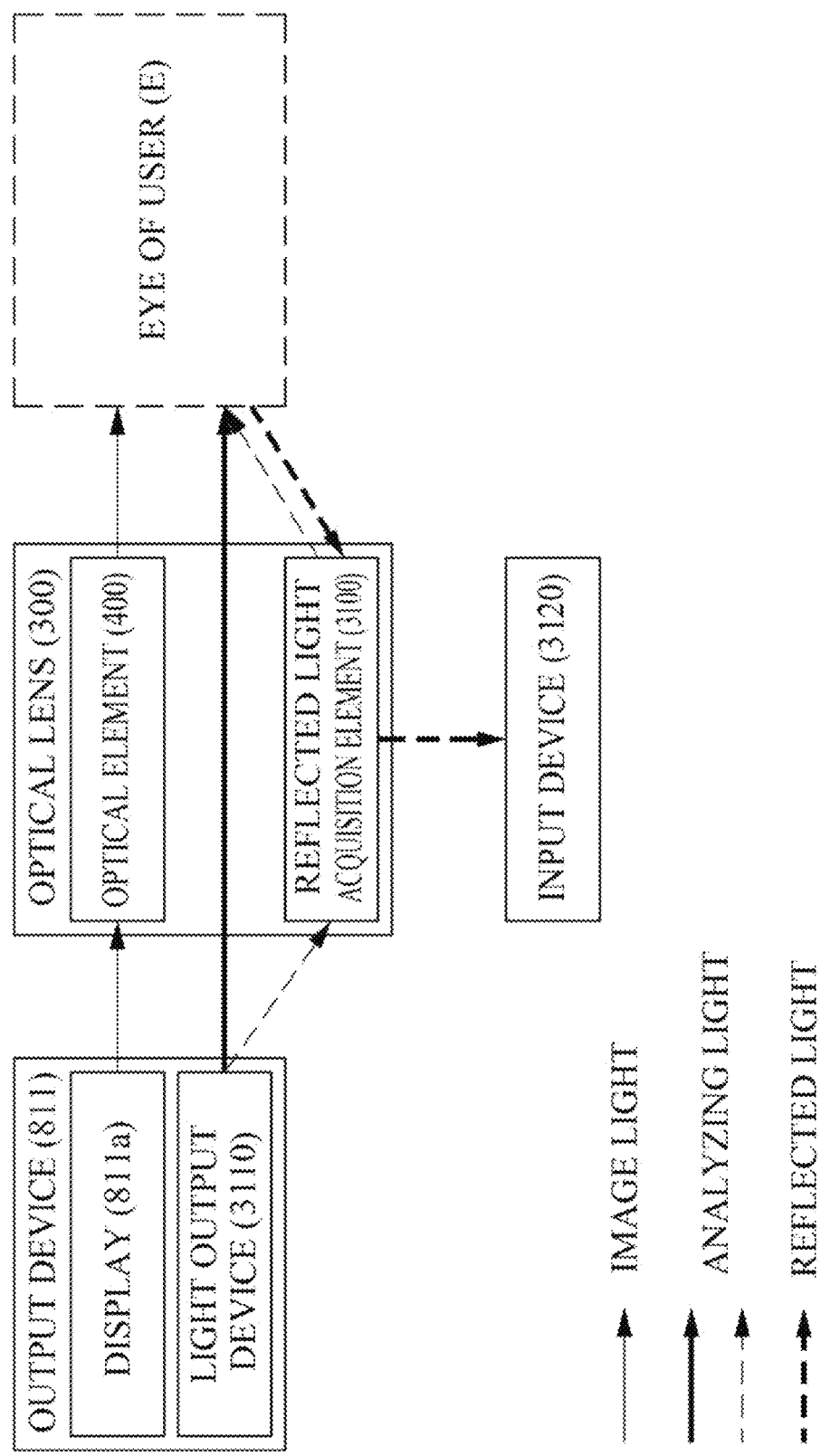
FIG. 31 is a block diagram illustrating an example of the augmented reality device further including a separate optical element to acquire gaze information according to various embodiments.
Figure 32:
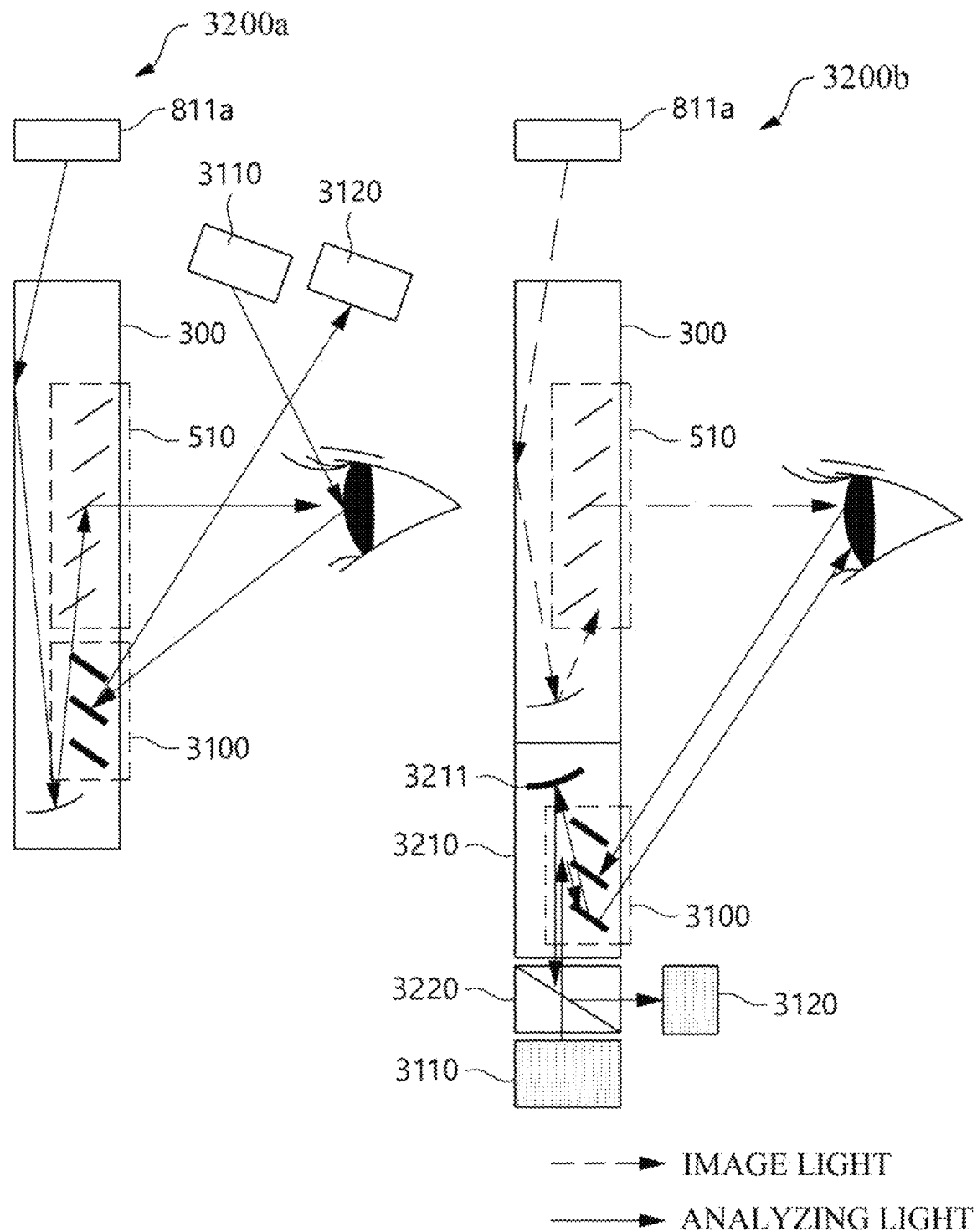
FIG. 32 is a diagram for describing examples of separate optical elements provided to acquire gaze information according to various embodiments.

FIG. 31 is a block diagram illustrating an example of the augmented reality device 10 further including a separate optical element to acquire gaze information according to various embodiments. FIG. 32 is a diagram for describing examples of separate optical elements provided to acquire gaze information according to various embodiments.

Hereinafter, FIG. 31 will be further described with reference to FIG. 32. According to various embodiments, the augmented reality device 10 may include an output device further including an optical output device 3110 for providing analyzing light to acquire gaze information together with the display 811a, an optical lens 300 further including a for acquiring reflected light from the eye E of the user wearing the augmented reality device 10, and an input device 3120 for acquiring the reflected light. The light output device 3110 may be implemented to output light of at least one of an infrared band, an ultraviolet band, or a visible ray band. In response to the light of the band output from the light output device 3110, the input device 3120 may be a camera and/or an image sensor for obtaining information about light of at least one of an infrared band, an ultraviolet band, or a visible ray band. The augmented reality device 10 (e.g., processor) may obtain information about the eye based on the information about the reflected light obtained using the input device 3120. As autonomous analysis is performed by the augmented reality device 10 and/or analyzed by an external device (e.g., the server 20 or the user terminal 30), the eye information of the gender user may be obtained.

In an embodiment, referring to 3200a of FIG. 32, the light output device 3110 may be implemented to directly provide the analyzing light to the eye E of the user. The optical lens 300 may further include a reflected light acquisition element 3100 for providing the reflected light output from the eye E to the input device 3120 as the analyzing light is provided to the eye E in a region different from the region in which the plurality of reflecting members 310 are disposed. For example, the reflected light acquisition element 3100 may include a plurality of reflecting members as illustrated, but is not limited to the illustrated example, and may be implemented as a general mirror, a diffraction grating, a concavo-convex pattern (or a sawtooth pattern) implemented to allow light reflection.

In another embodiment, referring to 3200b of FIG. 32, the light output device 3110 may be implemented to provide the analyzing light to the eye E of the user through the reflected light acquisition element 700. The reflected light acquisition element 3100 may be implemented to be included in an additional lens 3210 implemented separately from the optical lens 300, but is not limited to the illustrated example, and may be implemented to be included in another portion of the optical lens 300. When the additional lens 3210 is provided, the additional lens 3210 may be attached to one end of the optical lens 300. In this case, the mirror may be provided at the attached portion to reduce the influence of light output from different lenses, but is not limited to the illustrated example. The light output from the light output device 3110 may be light polarized with S or P, and accordingly, the polarized light may pass through the beam splitter 3220 that reflects the opposite polarization. The passed light may be provided to the eye E of the user by the reflected light acquisition element 3100, and thus the reflected light may be output from the eye E of the user. The reflected light may be folded by the reflected light acquisition element 3100 and provided to the input device 3120 through the beam splitter 3220. In this case, a ¼ delay polarizing plate may be provided in a part of the reflected light acquisition element 3100 provided to the additional lens 3210, and reflected by the beam splitter 3220 as the polarization state of the reflected light is ½ delay from the polarization state of the analyzing light.

2.2.4.2 Integrated Acquisition Structure

Figure 33:
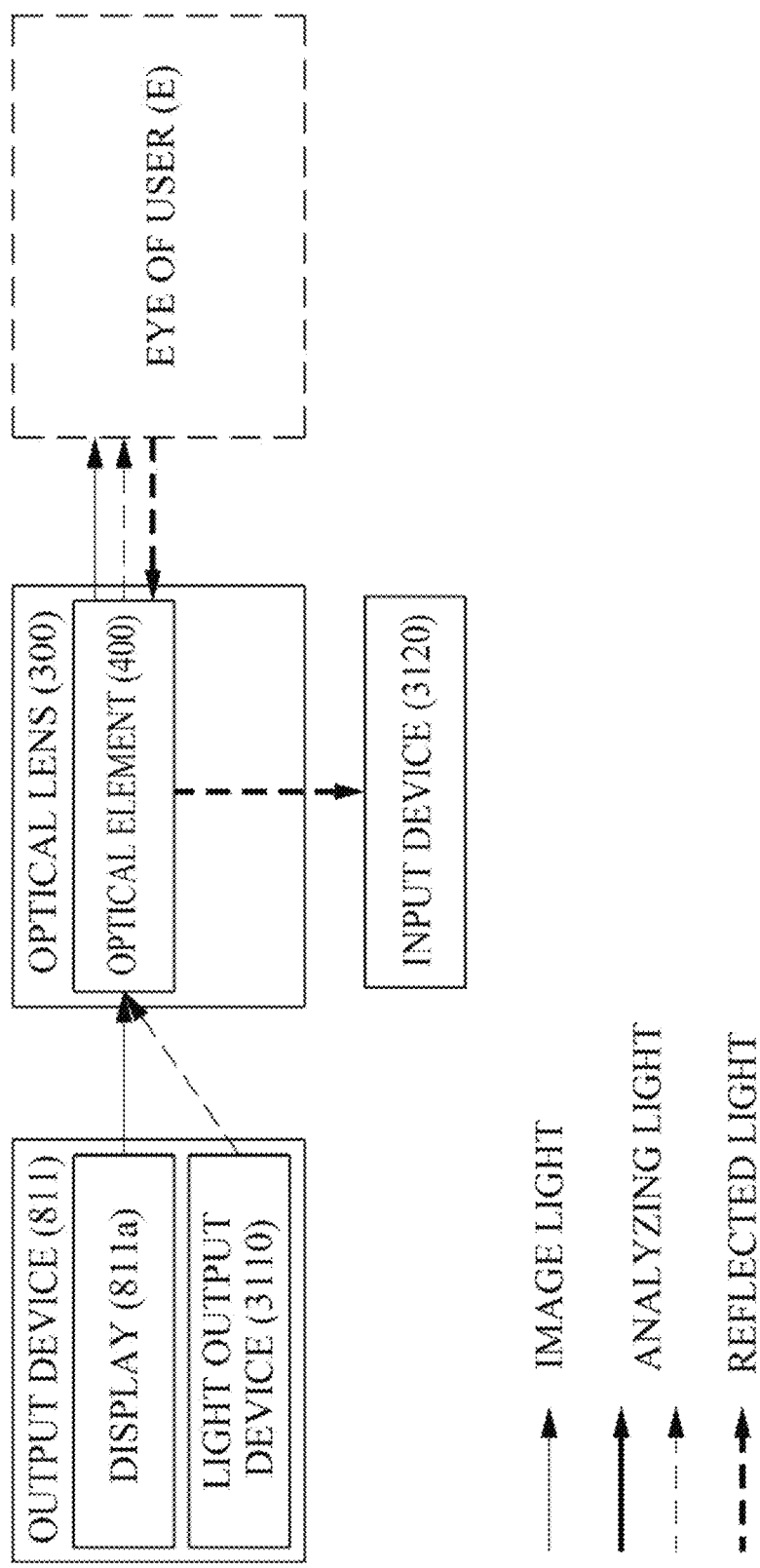
FIG. 33 is a block diagram illustrating an example of an augmented reality device that uses an optical element to obtain eye information according to various embodiments.
Figure 34:
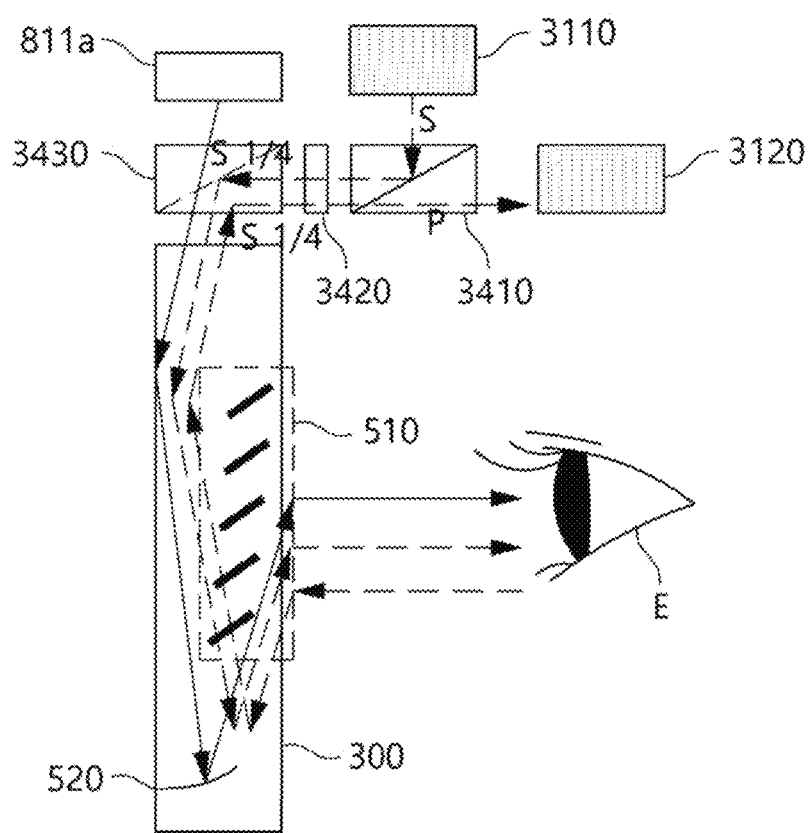
FIG. 34 is a diagram illustrating an example of an optical element to obtain eye information according to various embodiments.

FIG. 33 is a block diagram illustrating an example of an augmented reality device 10 that uses an optical element to obtain eye information according to various embodiments. FIG. 34 is a diagram illustrating an example of an optical element to obtain eye information according to various embodiments.

Hereinafter, FIG. 33 will be further described with reference to FIG. 33. Hereinafter, for convenience of description, duplicate contents with the contents described in the "separate acquisition structure" will be omitted.

According to various embodiments, the augmented reality apparatus 10 may provide the analyzing light output from the light output device 3110 to the eye E of the user using the optical element 400 in the optical lens 300, obtain the reflected light output from the eye E of the user using the optical element 400, and provide the obtained reflected light to the input device 3120.

For example, referring to FIG. 33, the augmented reality apparatus 10 may further include a first beam splitter 3410, a ¼ delay flat plate 3420, and a second beam splitter 3430. The first beam splitter 3410 may be a polarizing plate implemented to reflect a specific polarization (e.g., s, or p), and the second beam splitter 3430 may be a polarizing plate implemented to reflect light having a polarization state delayed by ¼ from the specific polarization. Accordingly, when the analyzing light having a specific polarization state is output from the light output device 3110, the analyzing light may pass through the first beam splitter 3410 and be quarter polarized by the polarizing plate 3420 and be reflected by the second beam splitter 3430, and as a result, the analyzing light may be provided to the optical lens 300, and as a result, the analyzing light may be provided to the eye E of the user. Alternatively, the second beam splitter 3430 may be implemented to simply reflect light (e.g., infrared) in a specific band, and as light in a specific band while having a specific polarization state is output from the light output device 3110, pass through the first beam splitter 3410 and be quarter polarized by the polarizing plate 3420 and be reflected by the second beam splitter 3430, the analyzing light may be provided to the optical lens 300, and the analyzing light may be provided to the eye E of the user by the optical element 400 (e.g., the plurality of reflective members 310 and the collimator 520) of the optical lens 300. The reflected light output from the eye E may be folded again by the optical element 400 (e.g., the plurality of reflective members 310 and the collimator 520) of the optical lens 300, and then provided to the second beam splitter 3430 and reflected and quarter polarized by the polarizing plate 3420 and pass through the first beam splitter 3410, and then provided to the input device 710. Meanwhile, the position of the light output device 3110 and the input device 3120 may be exchanged with each other, without being limited to the illustrated and/or described examples, and accordingly, the first beam splitter 3410 may be implemented to transmit the light of the specific polarization and reflect the light of the opposite polarization, and may be implemented to transmit the analyzing light and reflect the reflected light to the input device 3120.

3. Configuration of a Server

Figure 35:
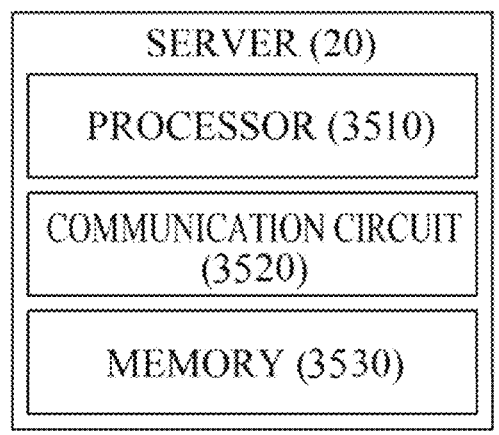
FIG. 35 is a block diagram illustrating an example of a configuration of the server according to various embodiments.

FIG. 35 is a block diagram illustrating an example of a configuration of the server 20 according to various embodiments.

According to various embodiments, the server 20 may include a processor 3510, a communication circuit 3520, and a memory 3530. However, the described and/or illustrated examples, and the server 20 may include more configurations and/or fewer configurations.

According to various embodiments, the processor 3510 may control at least one other component (e.g., hardware or software component) of the server 20 connected to the processor 3510 by executing software, and perform various data processing or calculation. According to an embodiment, as at least part of the data processing or calculation, the processor 3510 may store According to an embodiment, the processor 3510 may include a main processor (not shown) (e.g., a central processing unit or an application processor) or an auxiliary processor (not shown) (e.g., a graphic processing unit, a neural network processing unit (NPU), an image signal processor, a sensor hub processor, or a communication processor) that can operate independently or together with the main processor (not shown). For example, when the server 20 includes the main processor (not shown) and the auxiliary processor (not shown), the auxiliary processor (not shown) may be configured to use lower power than the main processor (not shown) or to be specific to a specified function. The auxiliary processor (not shown) may be implemented separately from the main processor (not shown) or as part of the main processor (not shown).

The auxiliary processor (not shown) may control at least a part of a function or state related to at least one of the components (e.g., the communication circuit 3520) of the server 20 instead of the main processor (not shown) while the main processor (not shown) is in an inactive (e.g., sleep) state, or may control at least a part of a function or state related to at least one of the components (e.g., the communication circuit 3520) of the server 20 together with the main processor (not shown) while the main processor (not shown) is in an active (e.g., executing an application) state. According to an embodiment, the auxiliary processor (not shown) (e.g., an image signal processor or a communication processor) may be implemented as part of another component (e.g., the communication circuit 3520) that is functionally related. According to an embodiment, the auxiliary processor (not shown) (e.g., a neural network processing unit) may include a hardware structure specialized for processing an artificial intelligence model. The artificial intelligence model may be generated through machine learning. Such learning may be performed, for example, in the server 20 itself in which the artificial intelligence is performed, or may be performed through a separate server (e.g., a learning server). The learning algorithm may include, for example, supervised learning, unsupervised learning, semi-supervised learning, or reinforcement learning, but is not limited to the above example. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-networks, or a combination of two or more of the above, but is not limited to the above example. The artificial intelligence model may additionally or alternatively include a software structure in addition to the hardware structure.

According to various embodiments, the communication circuit 3520 may support the establishment of a direct (e.g., wired) communication channel or a wireless communication channel between the server 20 and an external electronic device (e.g., the augmented reality device 10 or the user terminal 30). The communication circuit 3520 may include one or more communication processors that operate independently from the processor 3510 (e.g., the application processor) and support direct (e.g., wired) communication or wireless communication. According to an embodiment, the communication circuit 3520 may include a wireless communication module (not shown) (e.g., a cellular communication module, a short-range wireless communication module, or a GNSS communication module), or a wired communication module (e.g., local area network (LAN) communication module, or power line communication module). Among these communication modules, a corresponding communication module may communicate with an external electronic device (e.g., the augmented reality device 10 or the user terminal 30) through a first network (e.g., a short-range communication network such as Bluetooth, wireless fidelity (Wi-Fi) direct, or infrared data association (IrDA)) or a second network (e.g., a long-range communication network such as a legacy cellular network, a 5G network, a next-generation communication network, the Internet, or a computer network (e.g., LAN or WAN)). These various types of communication modules may be integrated into one component (e.g., a single chip), or may be implemented as a plurality of separate components (e.g., multiple chips). The wireless communication module may identify or authenticate the server 20 within a communication network such as the first network or the second network by using subscriber information (e.g., international mobile subscriber identifier (IMSE)) stored in the subscriber identification module.

According to various embodiments, the memory 3530 may store various data used by at least one component of the server 20. The data may include, for example, software (e.g., input data or output data for a program and a command related thereto). The memory 3530 may include a volatile memory or a non-volatile memory.

Meanwhile, the user terminal 30 may also be implemented to include the components of the server 20, and the description of the components of the server 20 may be applied to the description of the components of the augmented reality device 10 and the user terminal 30.

4. Type of Augmented Reality Device

Figure 36:
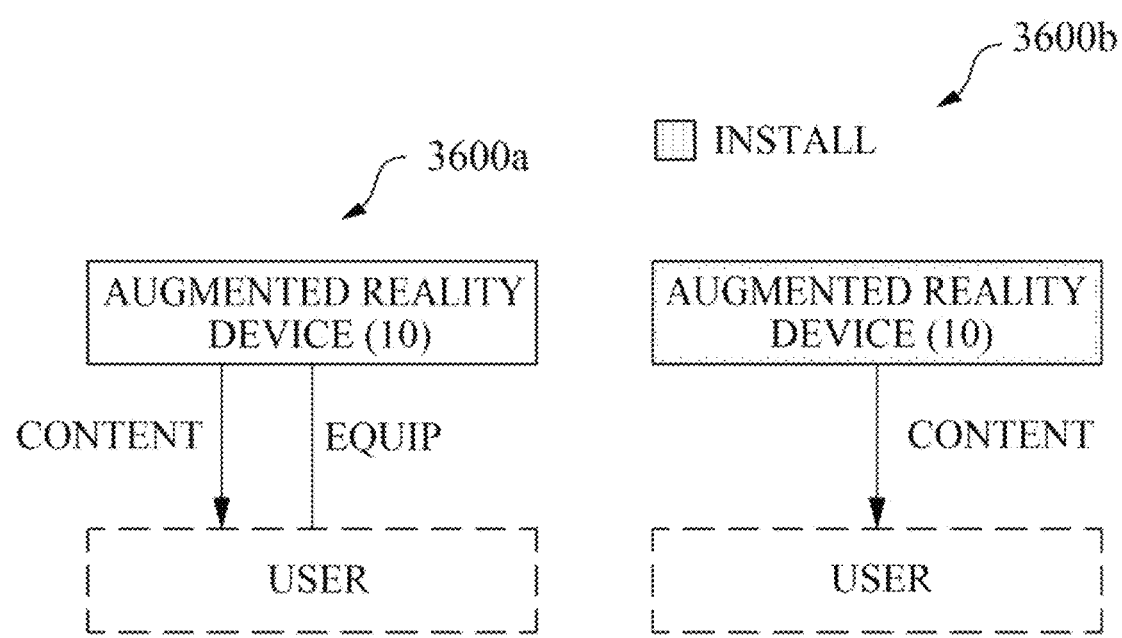
FIG. 36 is a block diagram illustrating the type of augmented reality device according to various embodiments.

FIG. 36 is a block diagram illustrating the type of augmented reality device 10 according to various embodiments.

According to various embodiments, the augmented reality device 10 may be implemented in a form (wearable type)

that is wearable to the user as illustrated in 3600a of FIG. 36, and/or may be implemented in an installable form (installable type) as illustrated in 3600b of FIG. 35. Regardless of the type of augmented reality device 10, the augmented reality device 10 may provide the user with augmented reality content with more improved quality based on the plurality of reflective members 510 described above.

4.1. Installation Type

Hereinafter, an example of the augmented reality device 10 of the installation type will be described.

Figure 37:
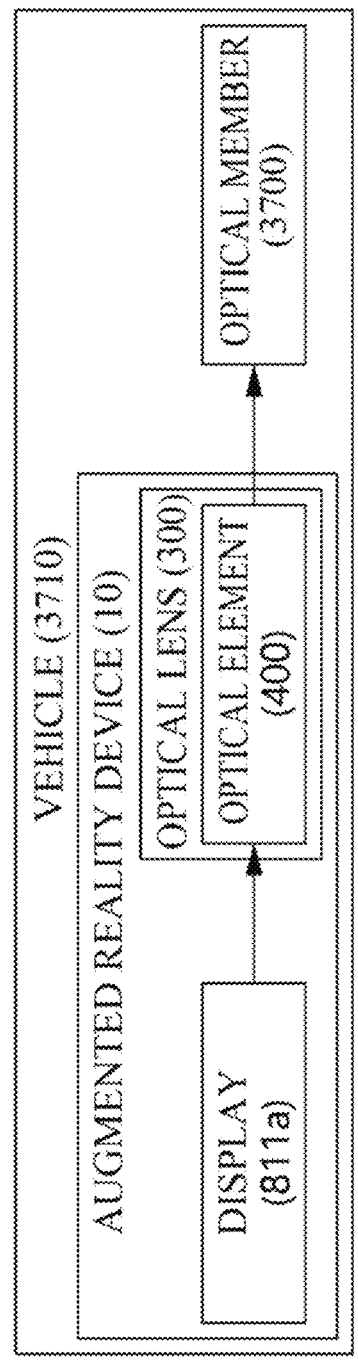
FIG. 37 is a block diagram illustrating an example of the augmented reality device of the installation type according to various embodiments.

FIG. 37 is a block diagram illustrating an example of the augmented reality device 10 of the installation type according to various embodiments.

According to various embodiments, the augmented reality device 10 of the installation type may be implemented as a head-up display (HUD), which is disposed in the vehicle 3710. For example, the augmented reality device 10 may provide the augmented reality content to the user of the vehicle 3710 by providing the image light output from the display 811a to the optical element 400 of the vehicle 3710 (e.g., the windshield 3700, the window, and the like) of the vehicle 300. The augmented reality content may include navigation information, information related to driving, and/or various types of information (e.g., weather information).

4.1.1. Single Area HUD 4.1.1.1. First Implementation Example

Figure 38:
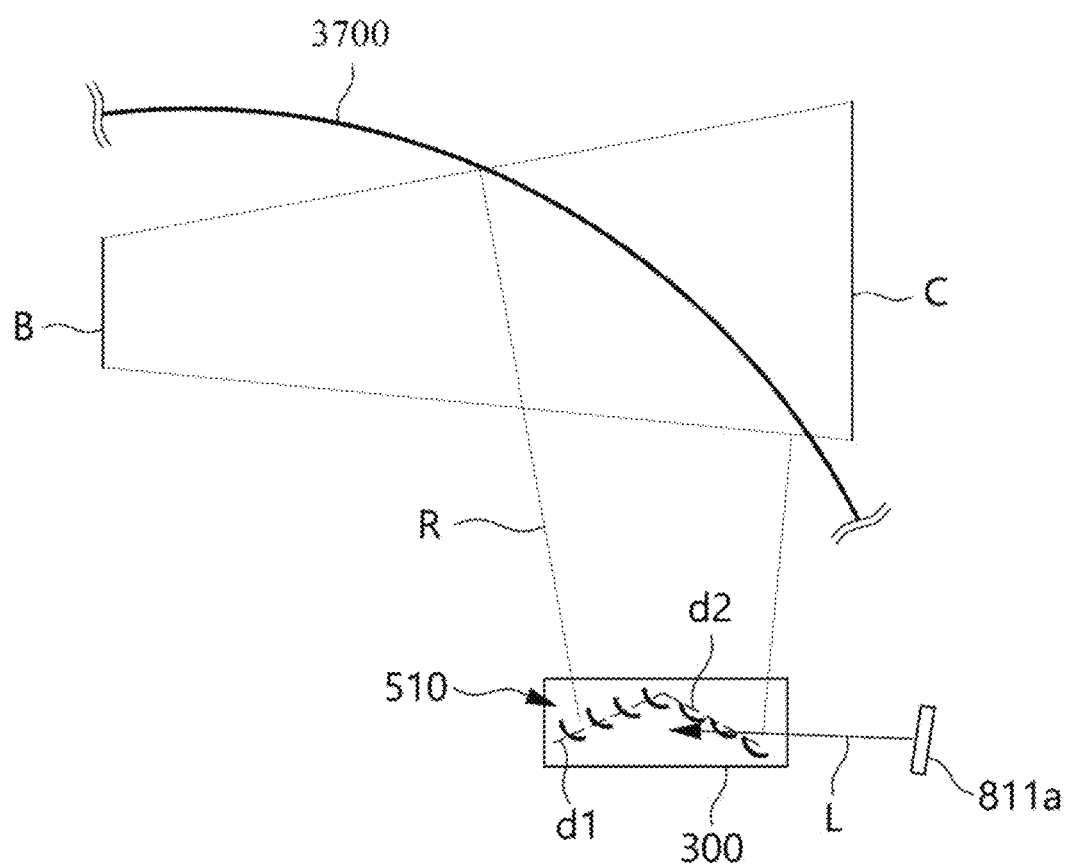
FIG. 38 is a diagram for explaining a first implementation example of the augmented reality device 10 that is implemented to provide the augmented reality content in a single area of the optical member of the transportation means according to various embodiments.

FIG. 38 is a diagram for explaining a first implementation example of the augmented reality device 10 that is implemented to provide the augmented reality content in a single area of the optical member of the transportation means according to various embodiments.

According to various embodiments, referring to FIG. 38, the augmented reality device 10 may include a display 811a and an optical lens 300 (or structure) including a plurality of reflective members 510. The image light L output from the display 811a is reflected R by the plurality of reflective members 510 and provided to the optical member 3700 (e.g., windshield) of the vehicle (e.g., the vehicle), such that the augmented reality content C is provided as the eye box B (e.g., the eye of the user) and visible by the user. However, the illustrated and/or described example is not limited, and the augmented reality device 10 may include more and/or fewer configurations.

According to various embodiments, the plurality of reflective members 510 may include a plurality of reflective member groups disposed along different directions d1 and d2. Referring to FIG. 38, a center point of the plurality of reflective members 510 included in the first reflective member group may be disposed along the first direction d1, and a center point of the plurality of reflective members 510 included in the second reflective member group may be disposed along the second direction d2. An angle between the first direction d1 and the second direction d2 may be determined according to the inclination of the optical member 3700 (e.g., windshield) of the vehicle (e.g., the vehicle).

According to various embodiments, the curvature of the plurality of reflective members 510 may be determined according to the curvature of the optical member 3700 (e.g., windshield) of the vehicle (e.g., the vehicle). Accordingly, the influence of the color aberration on the augmented reality content C may be reduced.

4.1.1.2. Second Implementation Example

Figure 39:
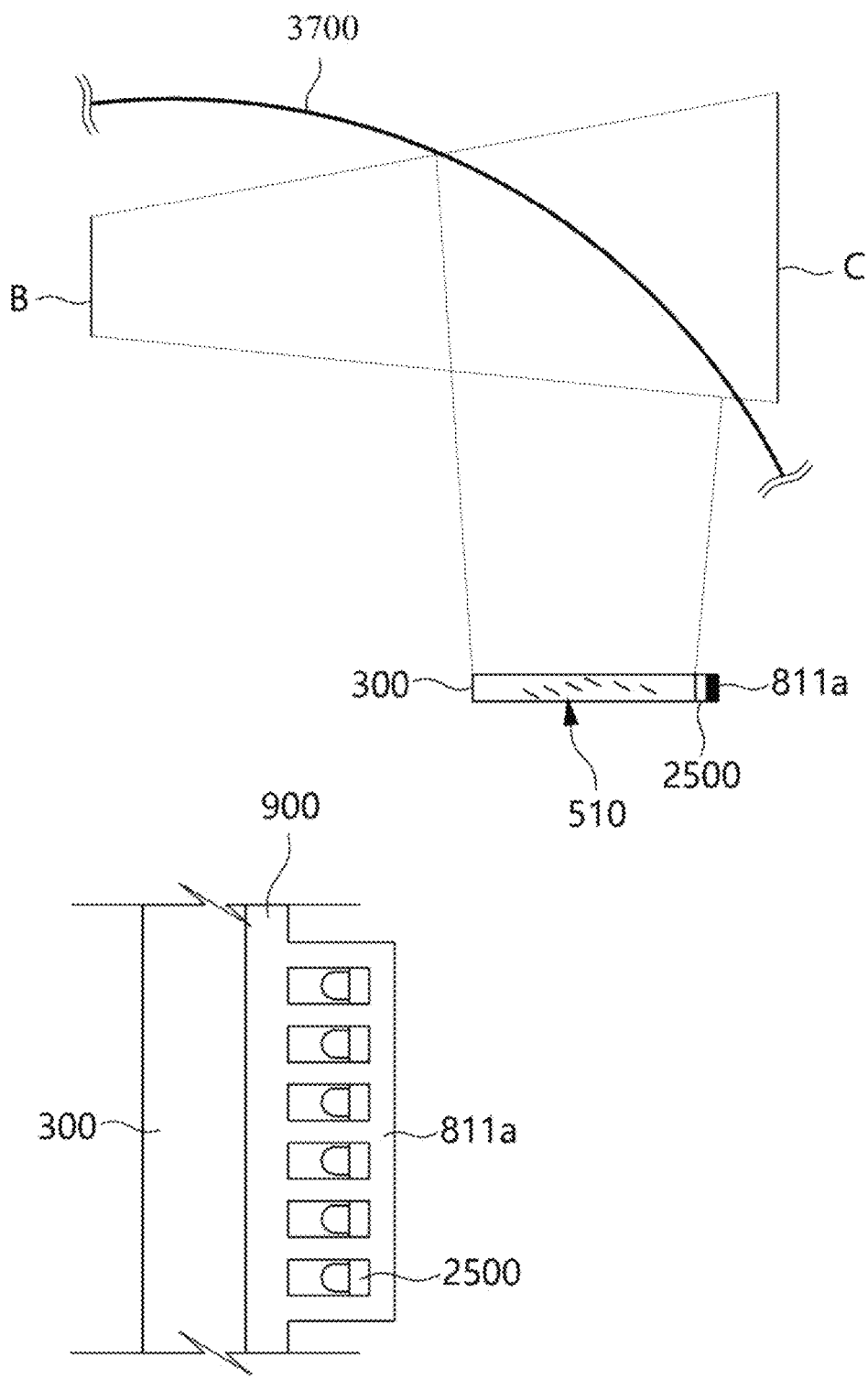
FIG. 39 is a diagram for explaining a second implementation example of the augmented reality device implemented to provide augmented reality content to a single area of the optical member of the vehicle according to various embodiments.

FIG. 39 is a diagram for explaining a second implementation example of the augmented reality device 10 implemented to provide augmented reality content to a single area of the optical member of the vehicle according to various embodiments. Hereinafter, for convenience of description, a description duplicated with the aforementioned "first implementation example" will be omitted.

According to various embodiments, referring to FIG. 39, compared to the "first implementation example", the augmented reality device 10 may further include a lens array 2500 and a connection member 900 on which the display 811a is mounted, which are physically coupled to the optical lens 300. The lens array 2500 and the connection member 900 may be implemented.

4.1.1.3. Third Implementation Example

FIG. 40 is a diagram for explaining a third implementation example of the augmented reality device 10 implemented to provide augmented reality content to a single area of the optical member of the vehicle according to various embodiments. Hereinafter, for convenience of description, a description duplicated with the aforementioned "first implementation example to the second implementation example" will be omitted.

According to various embodiments, referring to 4000a of FIG. 40, compared to "first implementation example to the second implementation example", the augmented reality device 10 may further include a light diffusing member 4010 and at least one polarizing plate 4020 and 4030. However, the illustrated and/or described example is not limited, and the at least one polarizing plate 4020 and 4030 may be omitted.

According to various embodiments, the light diffusing member 4010 may be implemented to diffuse (or duplicate) light input from the display 811a to provide the optical lens 300 to the optical lens 300. The FOV of the augmented reality content provided to the driver may be improved based on the diffusion of the light. In an embodiment, referring to 4000a of FIG. 40, the light diffusing member 4010 may be implemented to include a plurality of reflective members to receive image light output from the display 811a and reflect the image light in the direction of the optical lens 300. In another embodiment, referring to 4000b of FIG. 40, the light diffusing member 4010 may be implemented to include a plurality of reflective members 4011 disposed along the direction of the image light output from the display 811a and arranged to reflect (or diffuse) light in a direction orthogonal to the direction of the image light, and a plurality of reflective members 4013 to reflect the light received from the plurality of reflective members 4011 in the direction of the optical lens 300.

According to various embodiments, the plurality of reflective members 510 of the optical lens 300 may receive the image light reflected from the light diffusing member 4010, reflect and provide the image light to the optical member 6600 of the transportation means, and provide the augmented reality content C to the driver.

According to various embodiments, the polarizing plates 4020 and 4030 may be arranged to provide image light having a specific polarization state (e.g., p or s) to the optical member 6600 of the transportation means. For example, a quarter-delayed polarizing plate 4020 may be disposed between the light diffusing member 4010 and the optical lens 300, and a half-delayed polarizing plate 4030 that transmits image light in a specific polarization state may be provided on the upper surface adjacent to the optical member 6600 of the transportation means of the light diffusing member 4010. Accordingly, the image light output from the display 811a may pass through the quarter-delayed polarizing plate 4020 twice and delayed half, and the half-delayed light may pass through the half-delayed polarizing plate 4030, and as a result, the image light in the specific polarization state may be provided to the optical member 6600. Accordingly, the visual quality (e.g., definition and resolution) of the augmented reality content c may be improved. However, the polarizing plates 4020 and 4030 may not be arranged, without limitation to the described and/or illustrated examples.

4.1.2. Multiple Area HUD

Hereinafter, for convenience of description, description overlapping with the aforementioned "single Area Hud" will be omitted.

4.1.2.1. Multiple Display Embodiment

Figure 41:
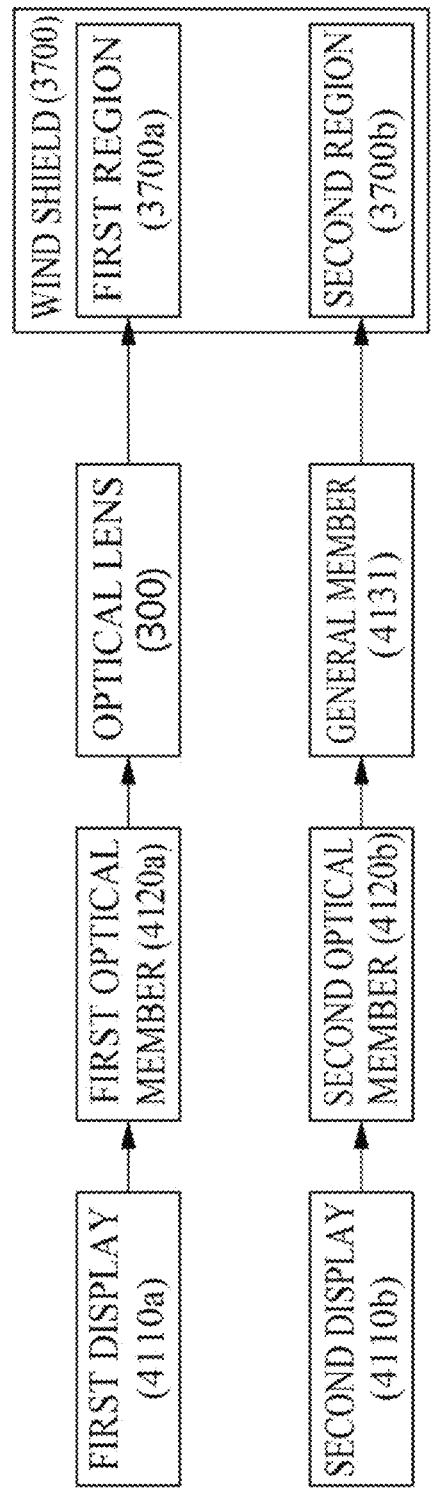
FIG. 41 is a view for describing an example of an augmented reality device implemented to provide augmented reality content to multiple regions of the optical member of the transportation means based on the plurality of displays, according to various embodiments.

FIG. 41 is a view for describing an example of an augmented reality device 10 implemented to provide augmented reality content to multiple regions of the optical member of the transportation means based on the plurality of displays, according to various embodiments. Hereinafter, FIG. 41 will be further described with reference to FIG. 42, FIG. 43, and FIG. 44.

Figure 42:
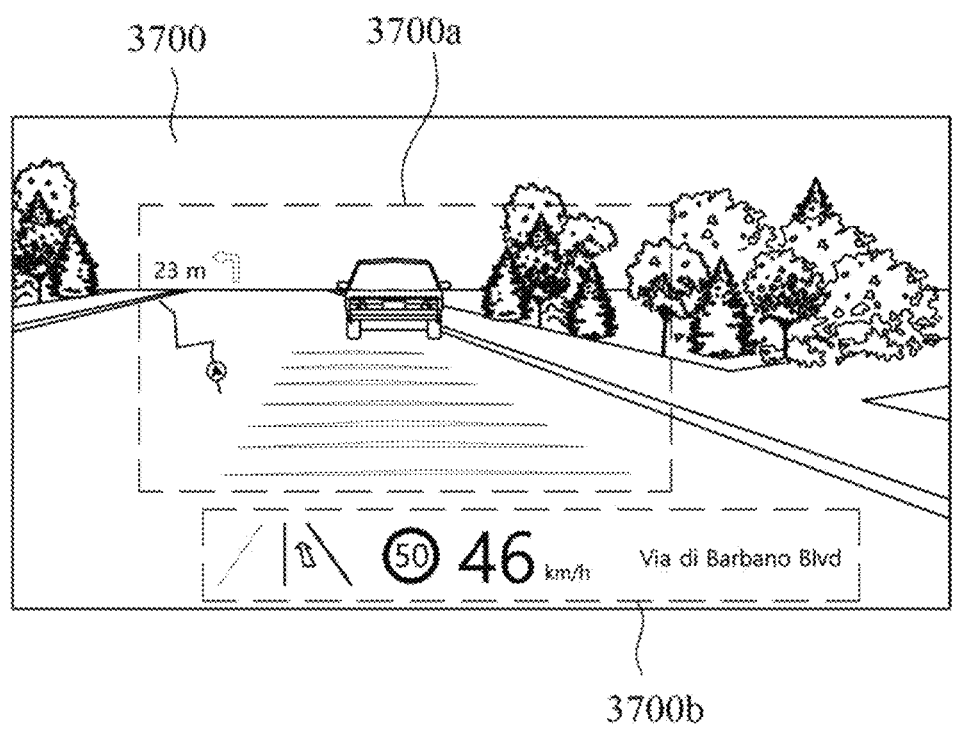
FIG. 42 is a view illustrating an example of augmented reality content provided to the optical member of the transportation means, according to various embodiments.
Figure 43:
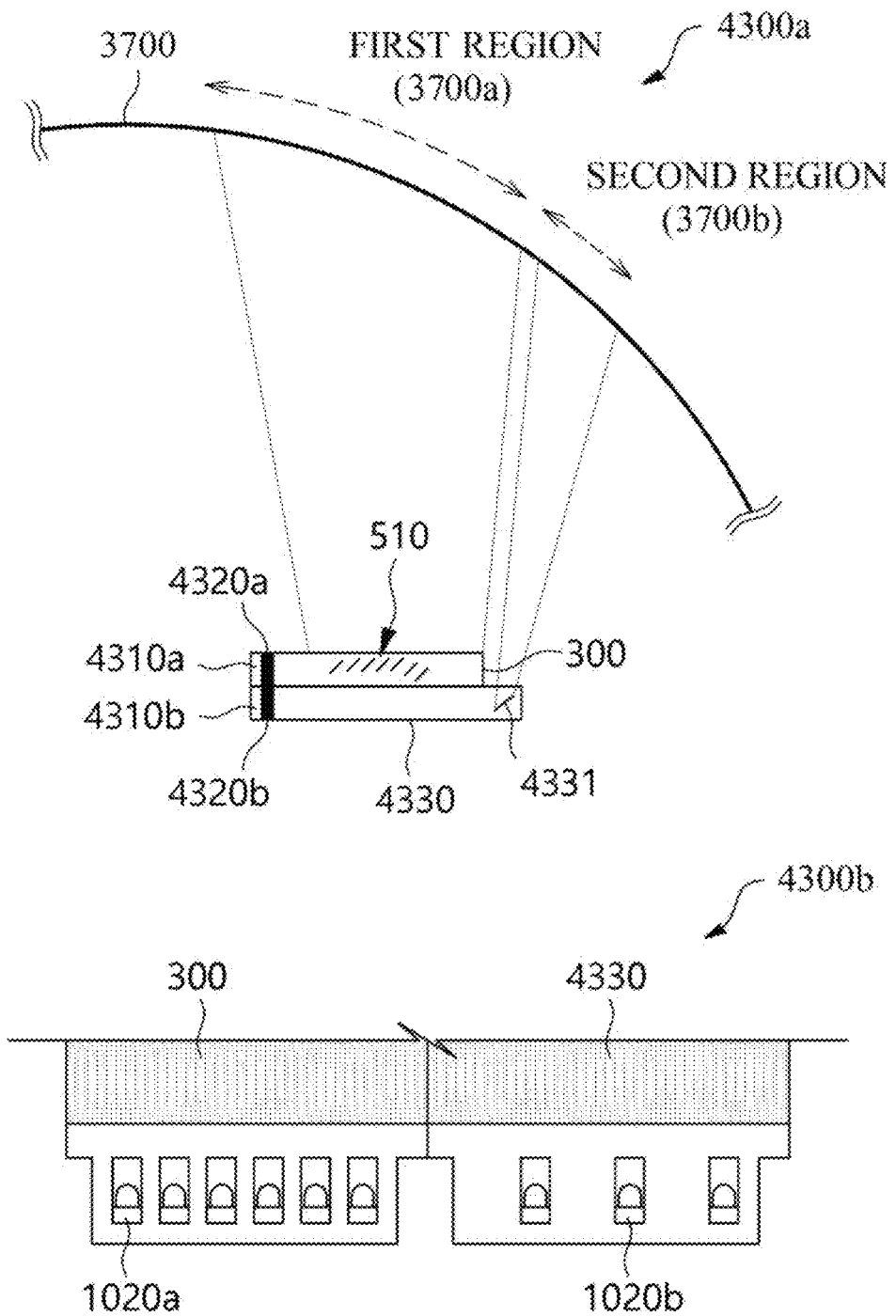
FIG. 43 is a view for describing an example of an augmented reality device implemented to provide augmented reality content to multiple regions, according to various embodiments.
Figure 44:
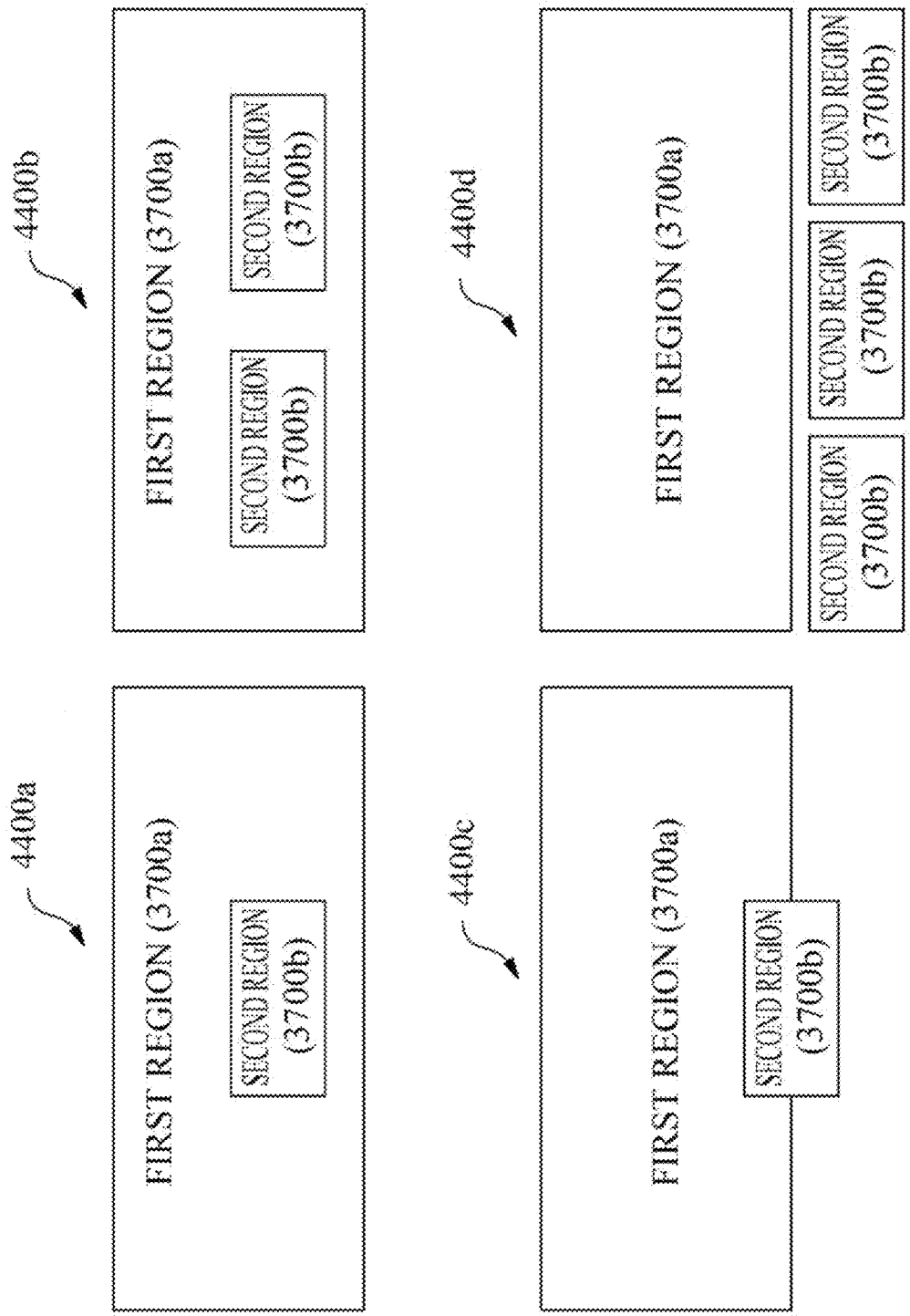
FIG. 44 is a view for describing an example of a region provided with augmented reality content, according to various embodiments.

FIG. 42 is a view illustrating an example of augmented reality content provided to the optical member of the transportation means, according to various embodiments. FIG. 43 is a view for describing an example of an augmented reality device 10 implemented to provide augmented reality content to multiple regions, according to various embodiments. FIG. 44 is a view for describing an example of a region provided with augmented reality content, according to various embodiments.

According to various embodiments, the augmented reality device 10 may be implemented to provide augmented reality content to multiple regions (e.g., first regions 3700*a* and second regions 3700*b*), respectively. Referring to FIG. 42, the augmented reality apparatus 10 may be implemented to provide different augmented reality contents to each of the plurality of regions (e.g., the first region 3700*a* and the second region 3700*b*). For example, the augmented reality apparatus 10 may provide first augmented reality contents that have a relatively larger area, have a higher visual quality (e.g., resolution), and/or dynamically moved in the first region 3700*a*, and may provide second augmented reality contents that have a relatively smaller area, have a lower visual quality (e.g., resolution), and/or statically moved in the second region 3700*b*. For example, the first augmented reality contents may include at least one graphic object provided to be dynamically moved for driving navigation, and the second augmented reality contents may include information (e.g., driving speed) provided at a statically fixed location.

According to various embodiments, referring to FIG. 41, the augmented reality apparatus 10 may include a plurality of displays (e.g., the first display 4110*a*, the second display 4110*b*) for providing image light to the plurality of regions (e.g., the first region 3700*a* and the second region 3700*b*), a plurality of optical members (e.g., the first optical member 4120*a*, the second optical member 4120*b*), and components (e.g., the optical lens 300 and the general member 4131) for providing image light provided from the plurality of optical members (e.g., the first optical member 4120*a*, the second optical member 4120*b*) to the optical member 3700. Meanwhile, the augmented reality apparatus 10 may include more components and/or fewer components, without being limited to the illustrated and/or described examples. For example, the plurality of optical members (e.g., the first optical member 4120*a*, the second optical member 4120*b*) may be excluded.

According to various embodiments, each of the plurality of displays (e.g., the first display 4110*a*, the second display 4110*b*) may output image light including different contents. For example, the augmented reality apparatus 10 (e.g., a processor (not shown)) may control the first display 4110*a* to output image light including at least one graphic object for driving navigation, and control the second display 4110*b* to output image light including predetermined information (e.g., driving speed).

According to various embodiments, each of the plurality of displays (e.g., the first display 4110*a*, the second display 4110*b*) may output image light so that the visual characteristics of the first augmented reality contents provided in the first region 3700*a* and the visual quality (e.g., brightness) of a specific type of the second augmented reality contents provided in the second region 3700*b* correspond to each other. For example, the brightness of the light output from the first display 4110*a* may be set to be higher than the brightness of the light output from the second display 4110*b* so that the brightness of the first augmented reality contents having a relatively larger size corresponds to each other.

According to various embodiments, the plurality of optical members (e.g., the first optical member 4120*a*, the second optical member 4120*b*) may be implemented to have different light modulation characteristics. The light modulation characteristics may refer to properties that control the optical characteristics of the light transmitted through the optical members (e.g., the first optical member 4120*a*, the second optical member 4120*b*). For example, the first optical member 4120 *a* may have a first optical modulation characteristic that modulates image light to have a first focal length and have a first field of view (FOV), the second optical member 4120*b* may have a second optical modulation characteristic that modulates image light to have a second focal length and have a second field of view (FOV), the first focal length may be greater than the second focal length, and the first field of view may be greater than the second field of view. Accordingly, the first augmented reality content provided in the first region 3700*a* may have a larger area and have a higher visual quality (e.g., resolution) compared to the second augmented reality content provided in the second region 3700*b*. For example, referring to 4300*b* of FIG. 43, a plurality of optical members (e.g., the first optical member 4120*a* and the second optical member 4120*b*) may be differently implemented lens arrays. The first optical member 4120*a* may include a lens having a greater curvature and/or may be implemented as a lens array having a greater number of lenses 1020*a* and 1020*b* compared to the second optical member 4120*b*. However, the FOV of image light may be improved based on the plurality of reflective members 510, and thus the plurality of optical members (e.g., the first optical member 4120*a* and the second optical member 4120*b*) may be implemented in the same way. That is, the optical patterns of the plurality of optical members (e.g., the first optical member 4120*a* and the second optical member 4120*b*) may correspond to each other. However, the FOV of image light may be improved based on the plurality of reflective members 510, and thus the plurality of optical members (e.g., the first optical member 4120*a* and the second optical member 4120*b*) may be implemented in the same way. That is, the optical patterns of the plurality of optical members (e.g., the first optical member 4120*a* and the second optical member 4120*b*) may correspond to each other.

According to various embodiments, referring to 4300*a* of FIG. 43, an optical lens 300 including a plurality of reflective members 510 may be provided to provide image light provided from the first optical member 4120*a* to the first region 3700*a*, and a general mirror 4131 may be provided to provide image light provided from the second optical member 4120*b* to the second region 3700*b*. As the image light is reflected by the plurality of reflective members 510 to improve the FOV, the first augmented reality content provided in the first region 3700a may have a larger area and have a higher visual quality (e.g., resolution) compared to the second augmented reality content provided in the second region 3700b. In this case, the size of each of the plurality of reflective members 510 may be implemented to be smaller than the size of the general mirror 4131. Meanwhile, the optical lens 300 including a relatively smaller number of reflective members may be provided instead of the general mirror 4131 or a transparent display (not shown) may be disposed to correspond to the second region 3700b to provide predetermined information. According to various embodiments, a plurality of regions (e.g., the first region 3700a and the second region 3700b) provided in the optical member 3700 (e.g., the windshield) may be provided in a overlapping form and/or may be implemented in a plurality as illustrated in 4400a to 4400d of FIG. 44. When the second region 700b is implemented in a plurality of regions, the above-described components may be additionally disposed 4.1.2.2. Single Display Embodiment According to various embodiments, the augmented reality device 10 may be implemented to provide augmented reality content through a plurality of regions based on a single display so as to be smaller. Hereinafter, for convenience of description, overlapping descriptions with the above-described "a plurality of display implementation examples" will be omitted.

Figure 45:
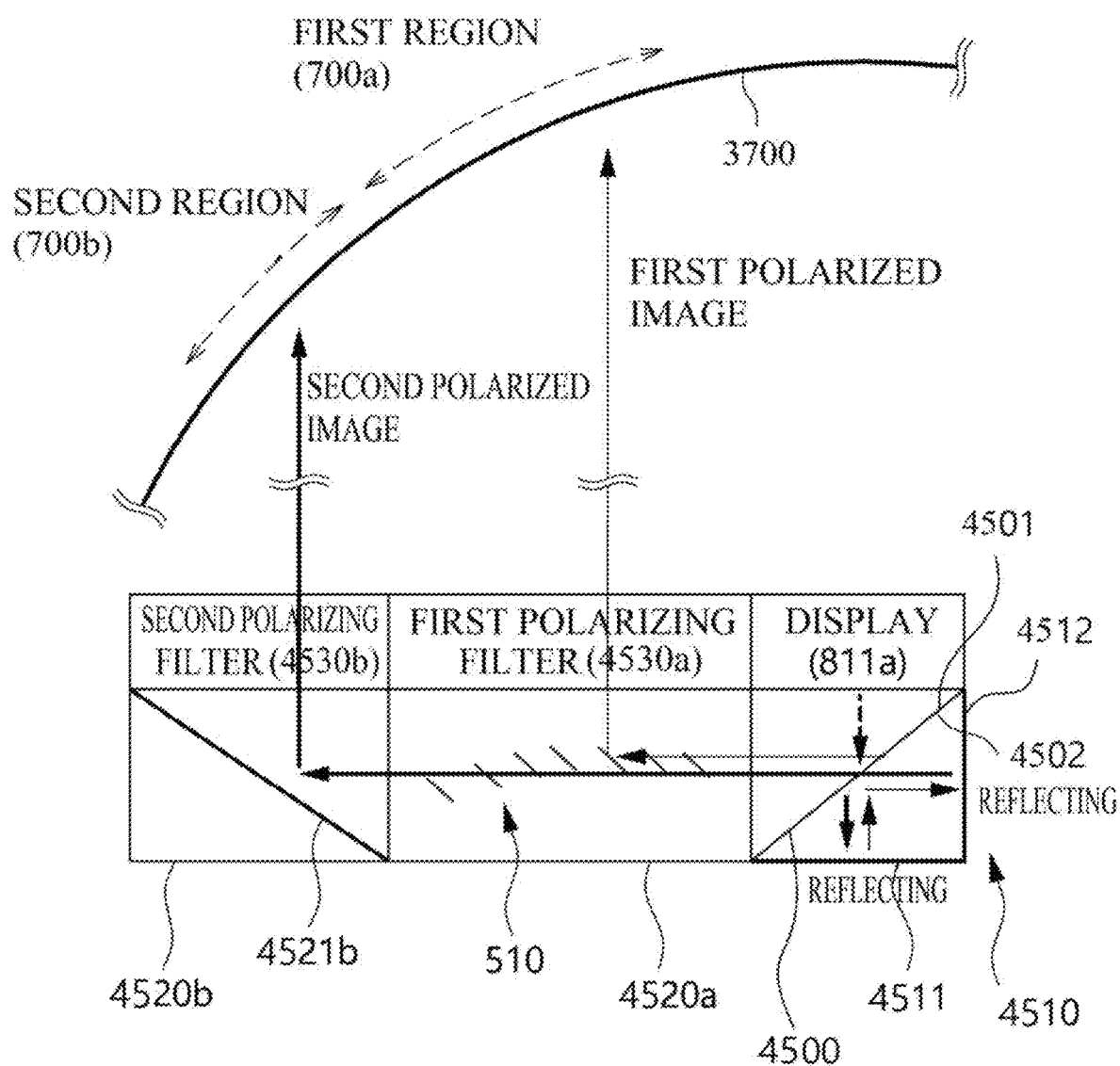
FIG. 45 is a diagram for explaining an example of an augmented reality device implemented to provide augmented reality content to a plurality of regions of an optical member of a transportation means based on a single display according to various embodiments.

FIG. 45 is a diagram for explaining an example of an augmented reality device 10 implemented to provide augmented reality content to a plurality of regions of an optical member of a transportation means based on a single display according to various embodiments.

According to various embodiments, referring to FIG. 45, the augmented reality device 10 may include a display 811a, a beam splitter 4510, a plurality of mirrors 4511 and 4512, a first optical structure 4520a, a second optical structure 4520b, and a plurality of polarizing filters 4530a and 4530b. However, it is not limited to the described and/or illustrated examples, and the augmented reality device 10 may include fewer components and/or more components. For example, the plurality of polarizing filters 4530a and 4530b may be excluded.

According to various embodiments, the display 811a may be implemented to output image light having different polarization states. For example, as image light having different polarization states is provided to each of the plurality of regions (e.g., the first region 700a and the second region 700b), different augmented reality contents may be provided to the user through the plurality of regions. Accordingly, the display 811a may be controlled to output image light having different polarization states during different times or may be controlled to output image light having different polarization states simultaneously. The image light having different polarization states may be implemented to include different contents, and for example, as described above, the image light having the first polarization state provided to the first region 700a may be implemented to include dynamic driving navigation contents, and the image light having the second polarization state provided to the second region 700b may be implemented to include static information.

According to various embodiments, the beam splitter 4510 may include a reflective surface 4501 and 4502 that reflects a specific polarization and transmits different polarizations, and polarizing mirrors 4511 and 4512 that form polarizations with half wave length differences. For example, referring to FIG. 45, light having the first polarization state may be reflected from the first surface 4501 of the reflective surface and light having the second polarization state may be transmitted. The light having the first polarization state may be transmitted to the first optical structures 4520a and 4520b. Referring to FIG. 45, the light having the second polarization state provided from the display 811a may be transmitted through the reflective surface 4500 and be provided to the second surface 4502 by the first polarizing mirror 4511, and be provided to the second surface 4502 by the second polarizing mirror 4512, and be provided to the second surface 4502 by the second polarizing mirror 4512, and be provided to the optical structures 4520 by the second polarizing mirror 4520b. In other words, as the path of the light having the second polarization state is controlled by the second surface 4502 and the plurality of reflective mirrors 4511 and 4512, the light having the second polarization state may be provided to the optical structures 4520a and 4520b.

According to various embodiments, the first optical structure 4520a may include a plurality of reflective members 510 for reflecting light in a specific polarization state. In this case, the light in a polarization state reflected by the plurality of reflective members 510 may be light in a polarization state reflected from the first surface 4501. Accordingly, based on image light having a short optical path and less influence by the outside, the visual quality improved augmented reality content may be provided through the first region 700a. However, the light in a polarization state reflected by the plurality of reflective members 510 may be light in a polarization state reflected from the second surface 4501. The light in a specific polarization state reflected from the plurality of reflective members 510 may be provided to the first region 700a by being transmitted through the first polarization filter 4530a implemented to transmit light in a specific polarization state disposed on the first optical structure 4520a. As the light in a different polarization state is prevented from being provided to the first region 700a by the first polarization filter 4530a, the visual quality of the augmented reality content provided through the first region 700a may be improved.

According to various embodiments, the second optical structure 4520b may include a reflective member 4521b for reflecting light in a polarization state different from the light in a specific polarization state reflected from the first optical structure 4520a. The second optical structure 4520b may receive the light that passed through the first optical structure 4520a. The reflective member 4521b may be a general mirror as illustrated, but is not limited to the illustrated example, and may be implemented to include fewer reflective members than the plurality of reflective members 510 included in the first optical structure 4520a. The light in a specific polarization state reflected from the reflective member 4521b may be provided to the second region 700a by being transmitted through the second polarization filter 4530b implemented to transmit light in a specific polarization state disposed on the second optical structure 4520b. As the light in a different polarization state is prevented from being provided to the second region 700b by the second polarization filter 4530b, the visual quality of the augmented reality content provided through the second region 700b may be improved.

According to various embodiments, the first optical structure 4520a and the second optical structure 4520b may be implemented as a single optical substrate.

Meanwhile, the positions of the first optical structure 4520a and the second optical structure 4520b may be implemented oppositely, without being limited to the illustrated and/or described examples.

4.1.3. HUD Expansion

According to various embodiments, the above-described optical element of the optical lens 300 may be provided separately in the transportation means in order to expand the image light provided from the HUD device and provide the image light to the driver.

4.1.3.1. Image Light Expansion

Figure 46:
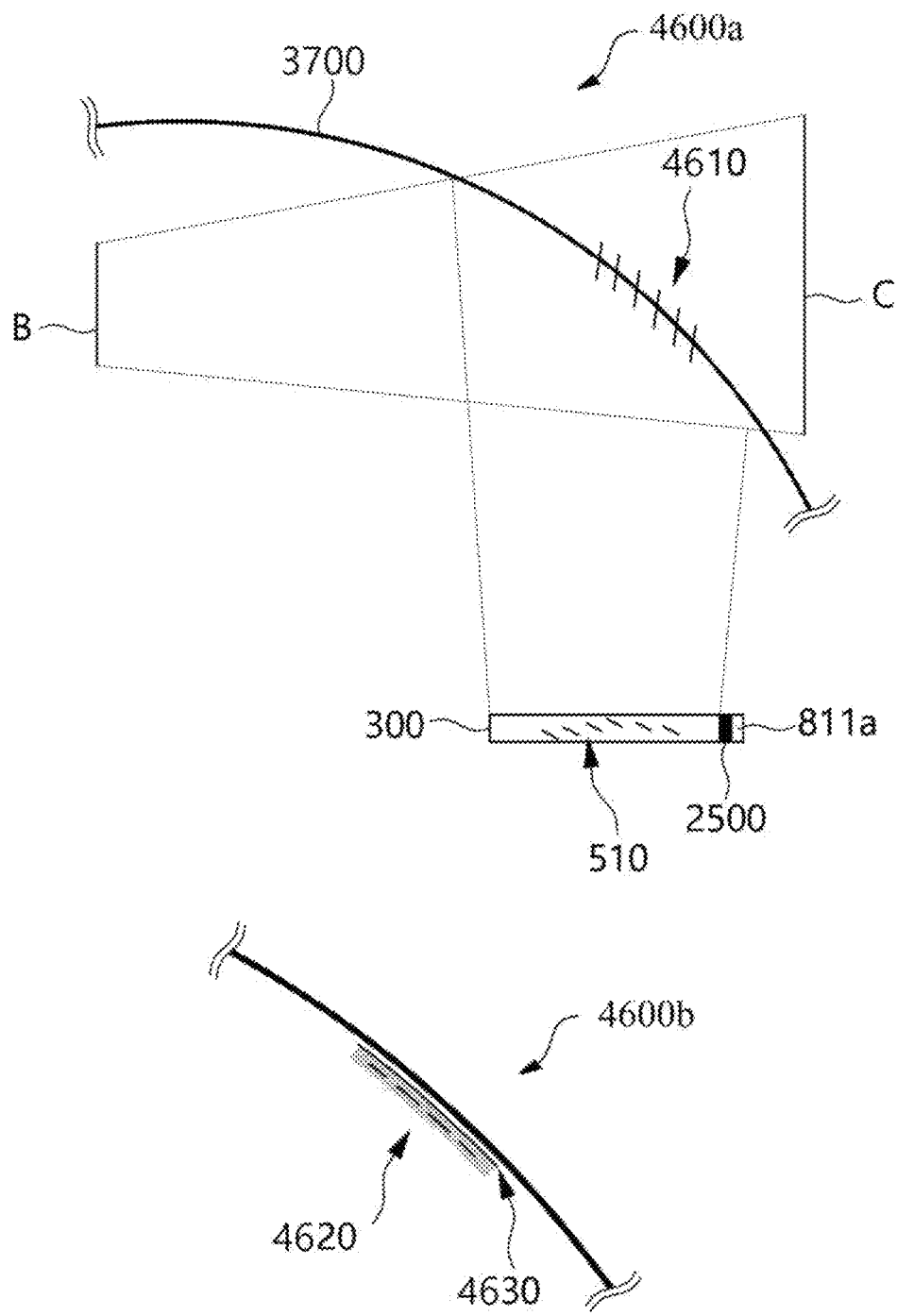
FIG. 46 is a diagram for describing an example of an optical element additionally provided to an optical member (e.g., a windshield) of the transportation means in order to expand the image light.

FIG. 46 is a diagram for describing an example of an optical element additionally provided to an optical member 6600 (e.g., a windshield) of the transportation means in order to expand the image light.

According to various embodiments, as described above, in the state that the augmented reality device 10 (or a general HUD device) is provided to the transportation a, referring to 4600*a* of FIG. 46, at least a portion of the optical member 6600 of the transportation may be provided with a plurality of reflective members 4610. Accordingly, as the image light provided from the augmented reality device 10 to the optical member 6600 is reflected by the plurality of reflective members 4610 and provided by the user's eyes, the FOV of the augmented reality content C may be further enhanced.

According to various embodiments, the plurality of reflective members 510 may be provided in a form that is embedded in at least a portion of the optical member 6600, but as illustrated in 4600*b* of FIG. 46, the plurality of reflective members 510 may be provided in a form that is included in a separate base 4620 and may be provided by being coupled to at least a portion of the optical member 3700 using an adhesive member 4630.

4.1.3.2 Expansion of a Seat Providing Augmented Reality Content

Figure 47:
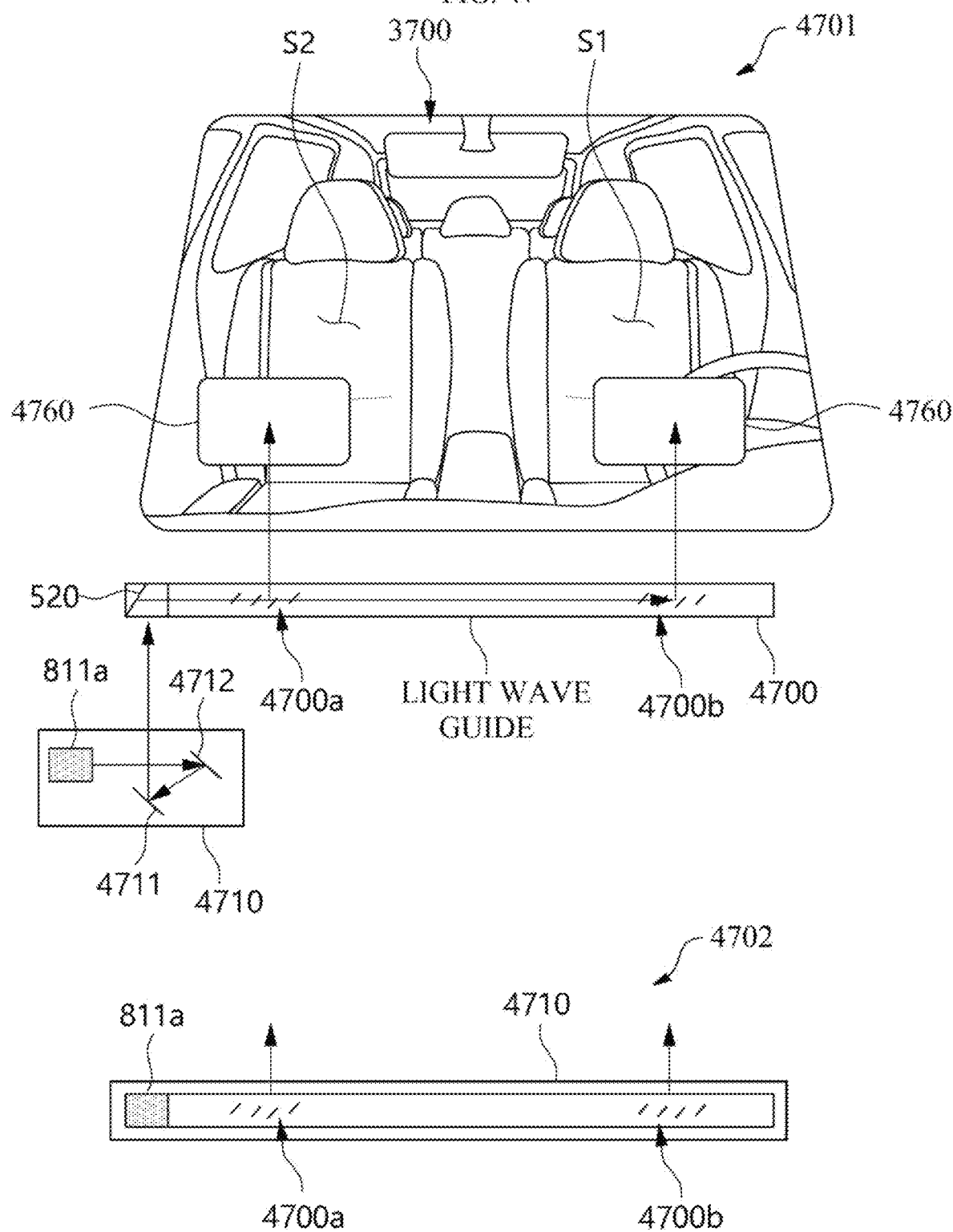
FIG. 47 is a diagram for explaining another example of an optical element additionally provided to an optical member (e.g., a windshield) of a transportation means to expand the image light, according to various embodiments.
Figure 48:
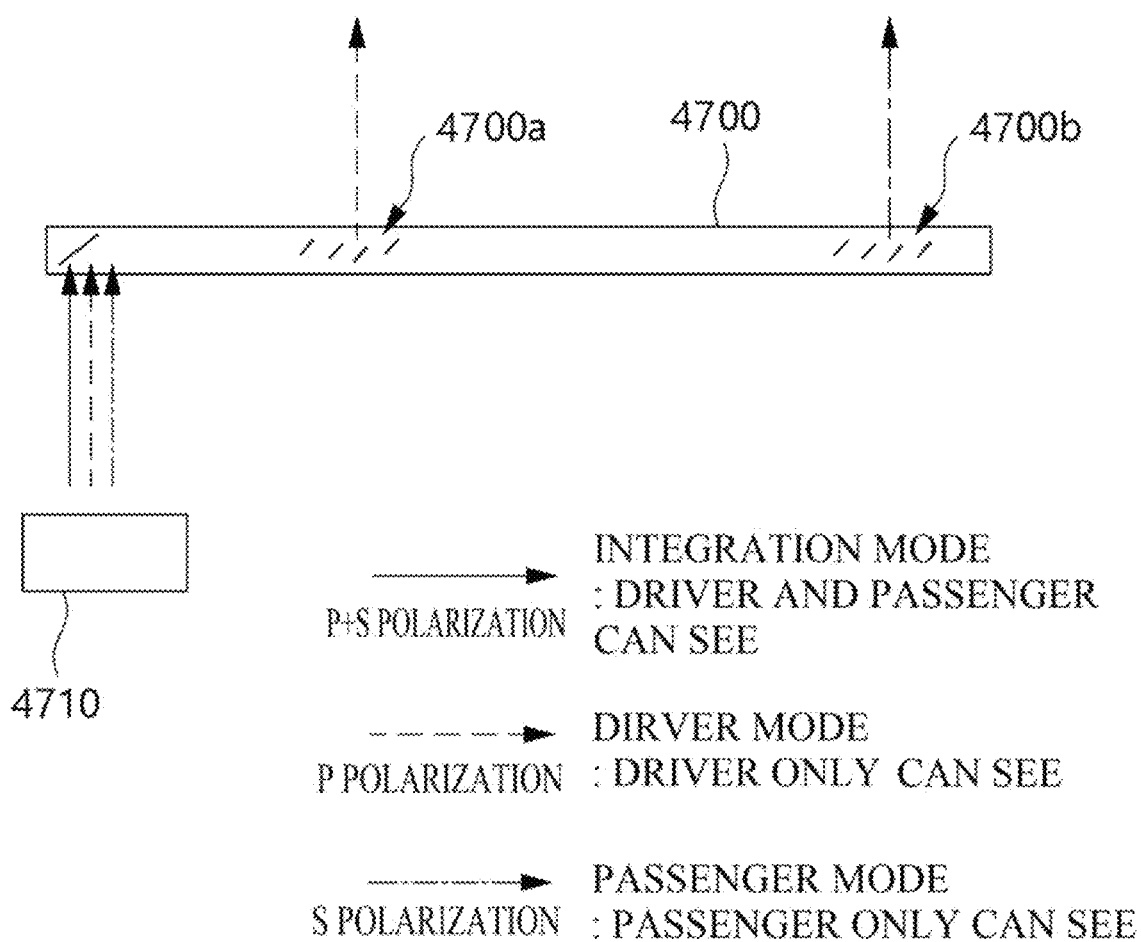
FIG. 48 is a diagram for explaining an example of providing augmented reality content to a driver seat and a passenger seat according to a content providing mode, according to various embodiments.

FIG. 47 is a diagram for explaining another example of an optical element additionally provided to an optical member 6600 (e.g., a windshield) of a transportation means to expand the image light, according to various embodiments. FIG. 48 is a diagram for explaining an example of providing augmented reality content to a driver seat and a passenger seat according to a content providing mode, according to various embodiments.

Hereinafter, FIG. 47 will be further explained with reference to FIG. 48.

According to various embodiments, referring to 4701 of FIG. 47, an optical member 6600 (e.g., a windshield) of a transportation means provided with a HUD device 4710 may be provided with a first light expansion structure 4700 including a plurality of reflective member groups (e.g., a first reflective member group 4700*a* and a second reflective member group 4700*b*) and a collimator 520 (or a reflective mirror), and second optical structures 4720*a*, 4720*b* disposed corresponding to each seat (e.g., a driver seat S1 and a passenger seat S2). However, the present invention is not limited to the illustrated and/or described examples.

According to various embodiments, the first light expansion structure 4700 may have a shape that extends in one direction. For example, as illustrated in 4701 of FIG. 47, the first light expansion structure 4700 may have a shape that extends from the driver seat S1 to the passenger seat S2. Accordingly, when the image light output from the display 811*a* included in the HUD device 4710 is reflected and output by the plurality of optical members 4711 and 4712 in the HUD device 4710, the first light expansion structure 4700 may acquire the light and expand the light in the direction (or the opposite direction) of the passenger seat S2 from the driver seat S1.

According to various embodiments, the first light expansion structure 4700 may be disposed at a lower portion of the optical member 6600 of the transportation means and may be implemented to have a transmittance corresponding to the transmittance of the optical member 6600 of the transportation means, and may be provided not to interfere with the driver's vision.

On the other hand, as illustrated in 4702 of FIG. 47, the first light expansion structure 4700 may not be implemented separately from the HUD device 4710, but may be included in the HUD device 4710. Accordingly, the light output from the display 811*a* may be reflected by the plurality of the reflective member groups (e.g., the first reflective member group 4700*a* and the second reflective member group 4700*b*).

According to various embodiments, the collimator 520 may be disposed at a position adjacent to provide the image light in the direction of the passenger seat S2. On the other hand, it is not limited to the example described, and an optical element that reflects image light in a specific direction such as a reflective member may be used instead of the collimator 520.

According to various embodiments, each of the plurality of reflective member groups (e.g., the first reflective member group 4700*a* and the second reflective member group 4700*b*) may be disposed at a position corresponding to a specific seat (e.g., the driver seat S1 and the passenger seat S2). Each of the plurality of reflective member groups may provide image light provided from the collimator 520 as a specific seat (e.g., driver seat S1 and passenger seat S2). In this case, as illustrated in 4701 of FIG. 47, each of the plurality of reflective member groups (e.g., the first reflective member group 4700*a* and the second reflective member group 4700*b*) may provide image light to the second optical structures 4760 so that the image light is expanded by the second optical structures 4760 to be provided to the driver, but they are not limited to the illustrated example and may be implemented to immediately provide the image light to the driver.

According to various embodiments, each of the plurality of reflective member groups (e.g., the first reflective member group 4700*a* and the second reflective member group 4700*b*) may be implemented to reflect light in a specific polarization state. For example, each of the plurality of reflective member groups may be provided with a polarizing plate for reflecting light in a specific polarization state.

Referring to FIG. 48, whether to provide image light from the plurality of reflective member groups (e.g., the first reflective member group 4700*a* and the second reflective member group 4700*b*) may be determined according to the content providing mode. The content providing mode means a mode for providing image light to a seat, and may include an integrated mode for providing image light to both the driver seat s1 and the passenger seat s2, a driver mode for providing image light to the driver seat s1, and a passenger mode for providing image light to the passenger seat s2. For example, when the first reflection member group 4700*a* polarizes light in a first polarization state (e.g., P polarization), and the second reflection member group 4700*b* polarizes light in a second polarization state (e.g., S polarization), the HUD device 4710 may be implemented to provide all polarization states of light in the state set to the integrated mode, to provide light in a first polarization state (e.g., P polarization) in the state set to the driver mode, and to provide light in a second polarization state (e.g., S polarization) in the state set to the passenger mode.

4.2. Equip Type

Hereinafter, an example of a equip type augmented reality device 10 will be described.

4.2.1. Eyeglass Type

According to various embodiments, the wearable augmented reality device 10 may be implemented in the form of glasses. As the optical lens 300 and the components 400 are disposed in the above-mentioned glass-type frame, the augmented reality device 10 may be implemented, and repetitive descriptions are omitted.

4.2.2. Helmet Type

According to various embodiments, the wearable augmented reality device 10 may be implemented in the form of a helmet. Accordingly, a user riding on a vehicle (e.g., a vehicle, a motorcycle, an aircraft, or the like) may wear the augmented reality device 10. Hereinafter, the description will be further given with reference to FIGS. 49 to 52.

Figure 50:
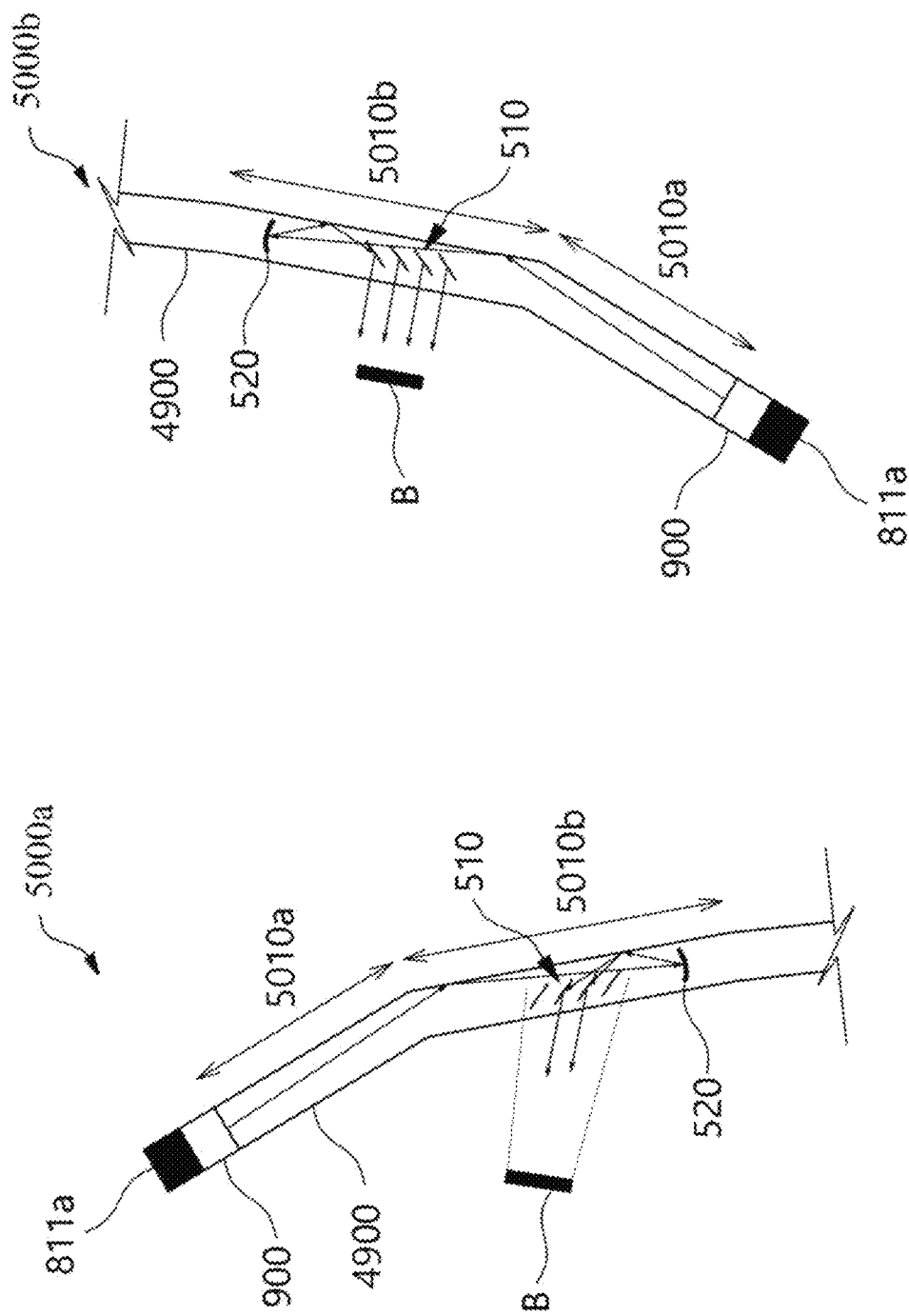
FIG. 50 is a diagram for explaining another example of a wearing-type augmented reality device according to various embodiments.
Figure 51:
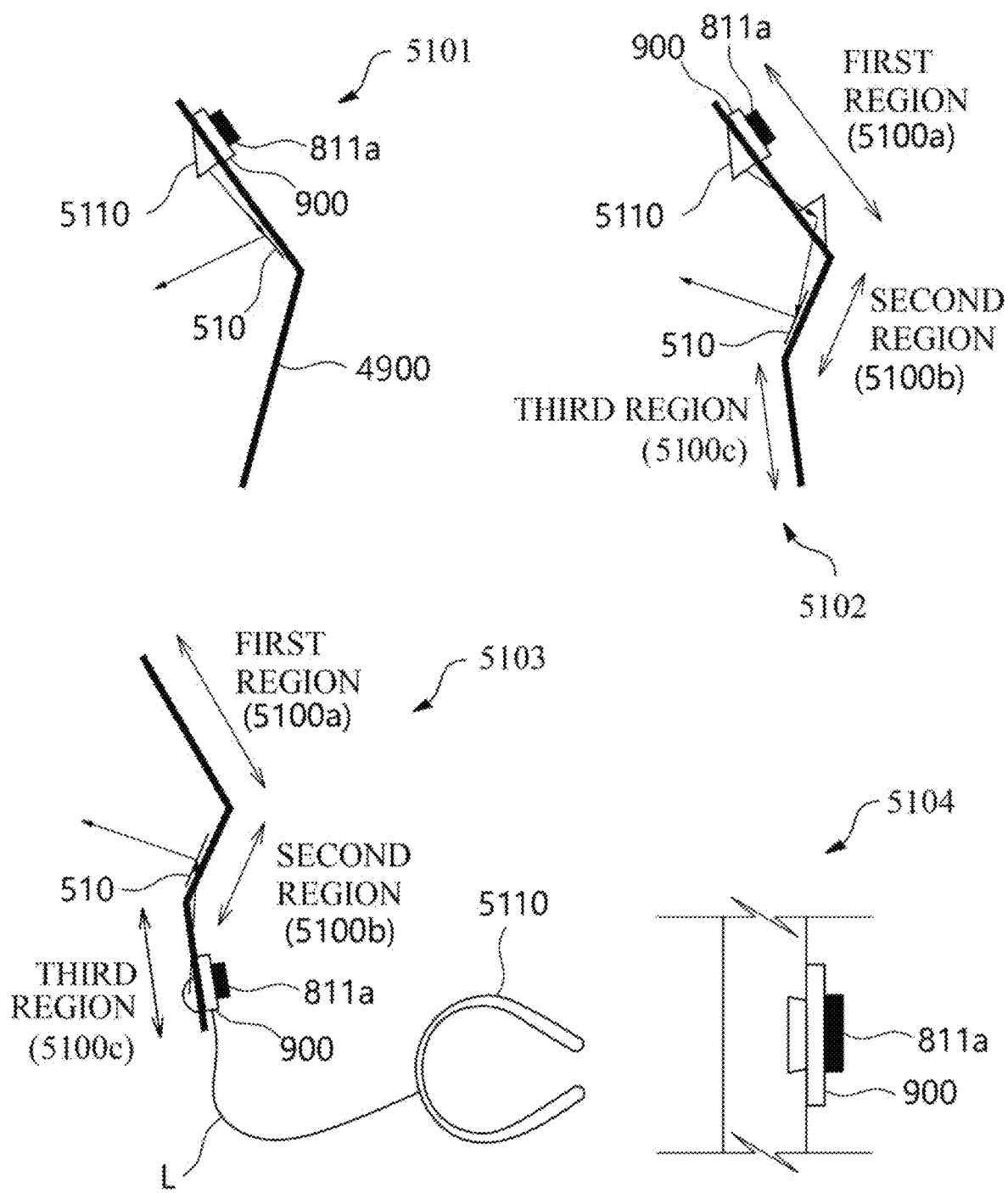
FIG. 51 is a diagram for explaining another example of a wearing-type augmented reality device according to various embodiments.
Figure 52:
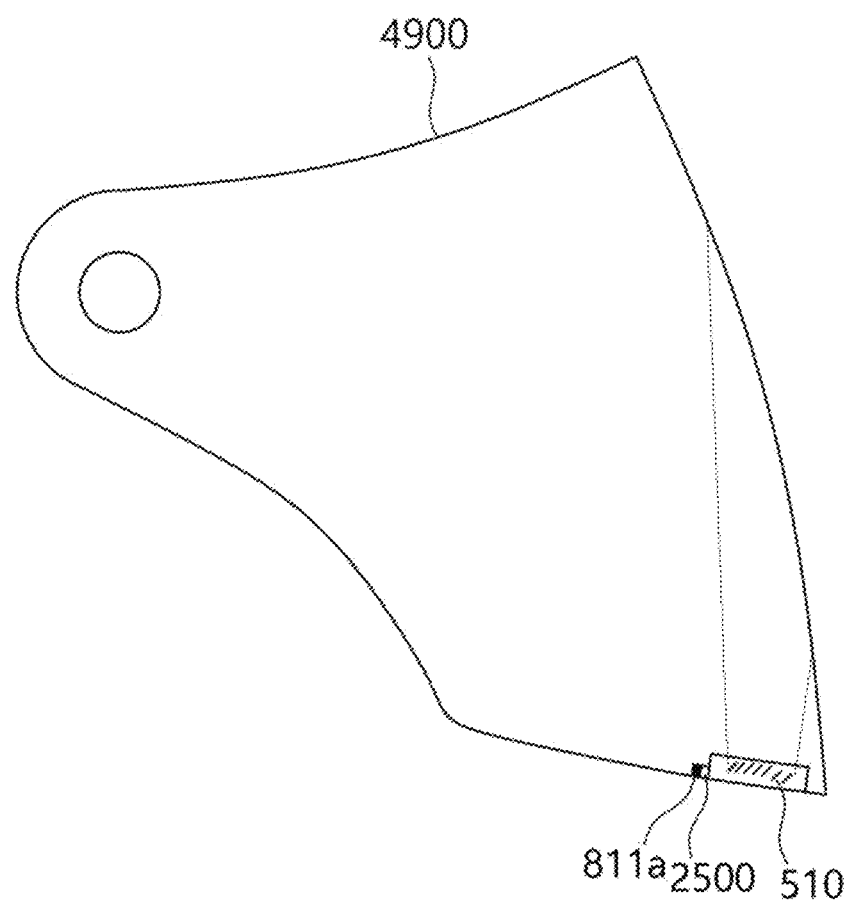
FIG. 52 is a diagram for explaining another example of a wearing-type augmented reality device according to various embodiments.

FIG. 49 is a diagram for describing an example of a wearing-type augmented reality device 10 according to various embodiments. FIG. 50 is a diagram for explaining another example of a wearing-type augmented reality device 10 according to various embodiments. FIG. 51 is a diagram for explaining another example of a wearing-type augmented reality device 10 according to various embodiments. FIG. 52 is a diagram for explaining another example of a wearing-type augmented reality device 10 according to various embodiments.

According to various embodiments, referring to FIG. 49, the augmented reality device 10 may include a helmet frame and a visor 4900 that may be coupled to the helmet frame.

According to various embodiments, the visor 4900 may include a providing area 4910 in which at least one optical element (e.g., a plurality of reflective members 510 and a collimator 520) is disposed, and a coupling structure 4920 for being coupled to the helmet frame. The connection member 900 described above in which the display 811*a* is seated may be coupled to the upper portion of the providing area 2810. The above-described coupling structure for the coupling of the connection member 900 may be implemented on the upper portion of the providing area 2810, and redundant descriptions are omitted. The image light output from the display 811*a* may be reflected on the inner surface of the visor 4900 and provided to the collimator 520, and the image light reflected from the collimator 520 may be reflected by the plurality of reflective members 510 and provided to the user's eye E. In this case, the connection member 900 and the display 811*a* may be disposed on the upper portion of the visor 4900 to have a predetermined inclination so that the image light output from the display 811*a* is provided toward the inner surface of the visor 4900.

According to various embodiments, referring to FIG. 50, the visor 4900 may be implemented to include a plurality of regions (e.g., a first providing area 5010*a* and a second providing area 5010*b*) that forms a predetermined angle compared to FIG. 49. For example, referring to 5000*a* to 5000*b* of FIG. 50, in a state in which the first providing area 5010*a* and the second providing area 5010*b* form a predetermined angle, the connection member 900 on which the display 811*a* is seated may be physically coupled to one end of the first providing area 5010*a*, and the above-mentioned optical elements (e.g., the reflection members 510 and the collimator 520) may be included in the second providing area 5010*b*. Accordingly, the image light output from the display 811*a* disposed at one end of the first providing area 71910*a* may be incident on the inner surface of the second providing area 71910*b* and reflected, and may be transmitted to the aforementioned optical element (e.g., the reflective members 510 and the collimator 520) of the second providing area 71910*b*, and as a result, the image light may be provided to the eye box B.

According to various embodiments, the visor 4900 may include a connection member 900 and a display 811*a* coupled to the surface of the visor 4900 to provide image light in a vertical direction, and may include a protruding structure 5110 formed in a portion where the connection member 900 is coupled, and a plurality of reflective members 510. Accordingly, image light output from the display 811*a* is reflected by the protruding structure 5110 and provided to the plurality of reflective members 510, resulting in image light being provided to the eye box B.

As an example, referring to 5101 of FIG. 51, a protruding structure 5110 having a reflective surface may be provided to reflect light in a direction in which the plurality of reflective members 510 are disposed.

As another example, referring to 5102 of FIG. 51, the visor 4900 may include a plurality of regions (e.g., a first region 5100*a*, a second region 5100*b*, and a third region 5100*c*) that form a predetermined angle with each other, and may provide at least one protruding structure 5110 for providing image light to the plurality of reflective members 510 embedded in the second region 5100*b* disposed in the center of the plurality of regions. While the augmented reality device 10 is worn by the user, the second region 5100*b* may form a predetermined angle with the first region 5100*a* so as to be positioned below the user's eye and extend inward toward the user. Accordingly, while the augmented reality device 10 is worn by the user, the augmented reality device 10 may be implemented to provide the user with the ambient light outside when the user faces the eye in front, and to provide the image light through the second region 5100*b* when the user faces the eye in downward. In this case, the third region 5100*c* may be formed to face the second region 5100*b* outward at a predetermined angle to prevent the formation of a dust from the user, but is not limited to the illustrated and/or described examples. As another example, referring to 5103 of FIG. 51, when the connection member 900 is coupled to the third region 5100*c* of the visor 4900, a separate wearable device 820 that is electrically connected to the connection member 900 through the electric wire L may be provided. The wearable device 5110 may include a wireless communication module (e.g., a short-range communication module and a cellular communication module), and may set a communication connection with another external device (e.g., a server and a user terminal) through the wireless communication module.

According to various embodiments, referring to FIG. 52, the visor 4900 is provided with the above-described installation-type augmented reality device 10 under the visor 4900, and accordingly, as the image light provided from the augmented reality device 10 is provided to the visor, augmented reality content may be provided to the user's eye as a result. The installation-type augmented reality device 10 may be implemented as described above, and thus redundant descriptions will be omitted.

Figure 53:
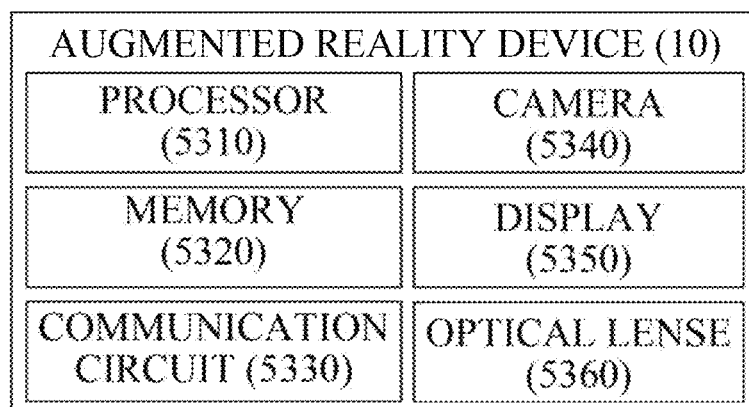
FIG. 53 is a block diagram of an augmented reality device according to various embodiments.
Figure 54:
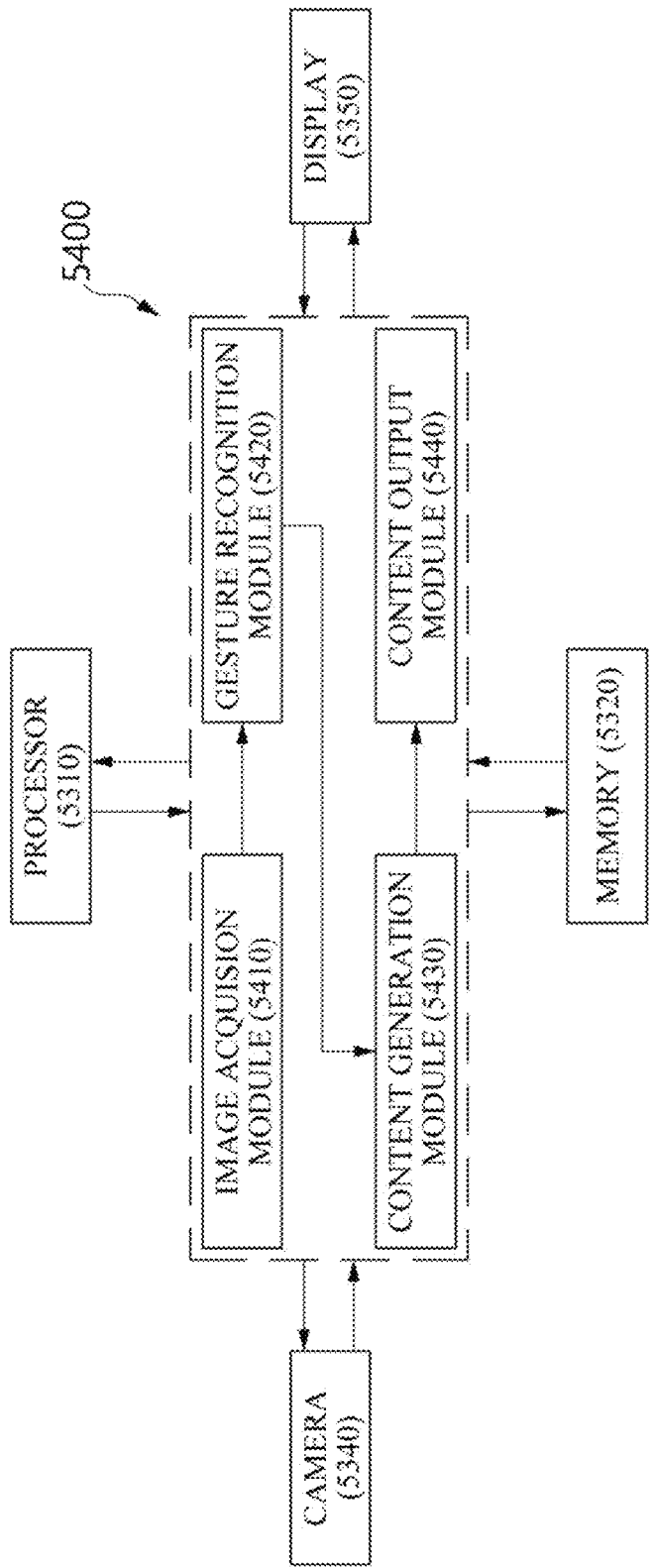
FIG. 54 shows a concept of controlling a function related to content output based on gesture recognition of the augmented reality device 10, according to various embodiments.
Figure 55:
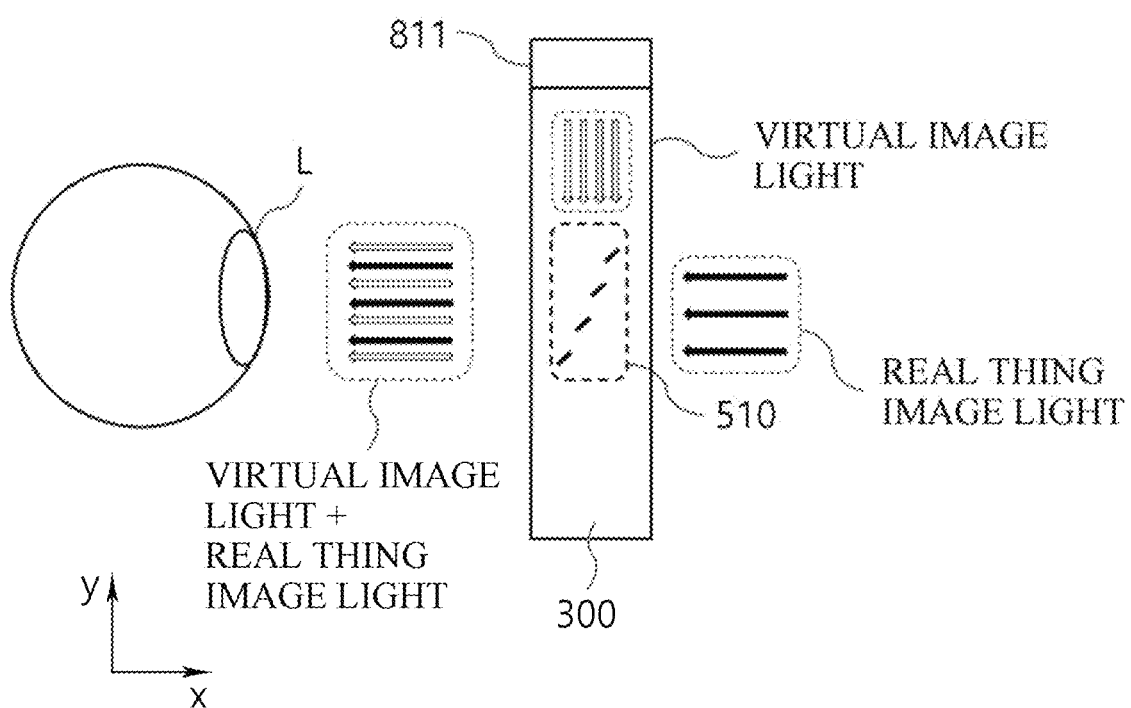
FIG. 55 is a diagram for describing an example of content output based on gesture recognition according to various embodiments.

5. A Method of Operating the Augmented Reality Device
5.1. Basic Function-Gesture Recognition FIG. 53 is a block diagram of an augmented reality device according to various embodiments. FIG. 54 shows a concept of controlling a function related to content output based on gesture recognition of the augmented reality device 10, according to various embodiments. FIG. 55 is a diagram for describing an example of content output based on gesture recognition according to various embodiments. Hereinafter, an example in which the augmented reality device 10 recognizes a user's gesture and provides content will be described with reference to FIG. 53 to 55.

Referring to FIG. 53, the augmented reality device 10 may include a processor 5310, a memory 5320, a communication circuit 5330, a camera 5340, a display 5350 (e.g., an output device 811), and/or an optical lens 5360 (e.g., an optical lens 300). However, the augmented reality device 10 may include more components and/or fewer components, without being limited to the described and/or illustrated examples.

According to various embodiments, the processor 5310, the memory 5320 and/or the communication circuit 5330 of the augmented reality device 10 may be implemented to perform the same/similar functions as the processor 3510, the communication circuit 3520 and/or the memory 3530 of the server 20 described with reference to FIG. 35 and may be the same/similar. Therefore, the description of the processor 3510, the communication circuit 3520 and/or the memory 3530 described with reference to FIG. 35 may be applied to the description of the components of the processor 5310, the memory 5320 and/or the communication circuit 5330 of the augmented reality device 10.

According to various embodiments, the augmented reality device 10 may include at least one camera 5340. According to an embodiment, the augmented reality device 10 may include a camera implemented to photograph the gaze of the user wearing the augmented reality device 10 and/or a camera implemented to photograph the surrounding external environment of the augmented reality device 10.

According to various embodiments, the augmented reality device 10 may include a camera 5340 having various fields of view (FOV). For example, the augmented reality device 10 may include a camera having a first field of view and/or a camera having a second field of view greater than the first field of view. According to an embodiment, the camera having the first field of view may be implemented to perform a function for telephoto photographing or near-view photographing. According to an embodiment, the camera having the second field of view may be implemented to perform a function for wide-angle photographing or ultra-wide-angle photographing. However, the present disclosure is not limited thereto, and various cameras having various fields of view may be included in the augmented reality device 10.

According to various embodiments, the camera 5340 may include components for photographing. For example, the camera 5340 may include a lens assembly, an image sensor, a memory, and/or an image signal processor.

According to various embodiments, a program related to execution of the function of the augmented reality device 10 may be stored as software in the memory 5320, and may include, for example, an operating system, middleware, or an application. According to various embodiments, the memory 5320 may store instructions that process data or control components of the augmented reality device 10 to perform the operation of the augmented reality device 10 when the processor 5310 is executed. The instructions may include code generated by a compiler or code that may be executed by an interpreter.

According to various embodiments, the display 5350 (e.g., the output device 811) may be implemented to output image light for various contents under the control of the processor 5310. The processor 5310 of the augmented reality device 10 may control the display 5350 to output image light through various applications included in the memory 5320.

According to another embodiment, the augmented reality device 10 may acquire front image data through the camera 5340 while the first content is output through the output device 10. In this case, the processor 5310 may identify the movement of a part of the user's body based on the front image data to obtain gesture data. For example, the processor 5310 may identify the movement of the user's hand to obtain gesture data.

According to various embodiments, the augmented reality device 10 may generate the second content based on the obtained gesture data and the first content. For example, the augmented reality device 10 may generate the second content based on the gesture data for the first content while the first content is output. The second content may include content reflecting the user gesture for the first content. For example, when the user gesture for the visual object included in the first content is a gesture for enlarging the visual object, the second content may include the content in which the visual object is enlarged.

According to various embodiments, the processor 5310 may control the display 5350 to output the second content. The virtual image light for the second content emitted through the display 5350 may be transmitted to the user's eye L through the plurality of reflective members 510.

Referring to FIG. 54, the augmented reality device 10 may recognize the user's gesture based on at least one image data obtained through the camera 5340 and provide the content based on the user's gesture. For example, the augmented reality device 10 may use hardware and/or software module 5400 to support functions related to recognizing the gesture and providing the content. For example, the processor 5310 may drive at least one of the image acquisition module 5410, the gesture recognition module 5420, the content generation module 5430, and the content output module 5440 by executing instructions stored in the memory 5320.

In various embodiments, a software module different from that shown in FIG. 54 may be implemented. For example, at least two modules may be integrated into one module or one module may be divided into two or more modules. In addition, by sharing one function by hardware and software modules, work performance may be improved. For example, the augmented reality device 10 may include both encoders implemented in hardware and encoders implemented in software modules, and some of the data obtained through the at least one camera 5340 may be processed in a hardware encoder and some of the other in a software encoder.

According to various embodiments, the image acquisition module 5410 may include a module that provides various functions for obtaining various image data including the front of the augmented reality device 10 or the user's gaze. In one embodiment, the image acquisition module 5410 may obtain image data for the surrounding environment of the augmented reality device 10. For example, the image acquisition module 5410 may obtain at least one image data obtained through the camera 5340.

According to various embodiments, the gesture recognition module 5420 may recognize the gesture from the image data. According to various embodiments, the gesture recognition module 5420 may identify whether the user performed a pre-designated gesture based on the image data and obtains the gesture data by recognizing the user's gesture. According to one embodiment, the gesture recognition module 5420 may analyze the image data and recognize the user's gesture. For example, the gesture recognition module 5420 may recognize the user's gesture by analyzing the position, movement, and/or shape of a part of the user's body included in the image based on the image data.

According to various embodiments, the gesture recognition module 5420 may acquire gesture data through various methods, without being limited to the illustrated or described examples. For example, the gesture recognition module 5420 may recognize the gesture based on sensing data acquired through at least one sensor (e.g., an infrared sensor, a depth sensor, a biometric sensor, a human body sensor, a tilt sensor, and an acceleration sensor).

According to various embodiments, the content generation module 5430 may generate content related to the execution of the function of the augmented reality device 10 based on the gesture data acquired from the gesture recognition module 5420. According to an embodiment, the content generation module 5430 may generate content for executing the specified function based on the gesture data. For example, the content generation module 5430 may generate the second content based on the gesture data while the first content is provided to the user through the augmented reality device 10.

According to various embodiments, the content output module 5440 may control the content generated through the content generation module 5430 to be provided to the user. For example, the content output module 5440 may provide the user with a user interface (UI)/graphical UI (GUI) related to the execution of the function of the augmented reality device 10 through the display 5350.

In the embodiment of FIG. 54, it can be understood that the function performed by the image acquisition module 5410, the gesture recognition module 5420, the content generation module 5430, and the content output module 5440 is performed by executing the instructions stored in the memory 5320. In addition, in various embodiments, the augmented reality device 10 may use one or more hardware processing circuits to perform various functions and operations disclosed in this document.

Also, the connection relationship between the hardware/software shown in FIG. 54 is for convenience of explanation and does not limit the flow/direction of data or commands. The components included in the augmented reality device 10 may have various electrical/operative connection relationships.

Referring to FIG. 55, an example in which the content generated through the content generation module 5430 is provided to the pupil of the user L through the content output module 5440, is illustrated. According to various embodiments, the augmented reality device 10 may provide the content to the user similar to the method described with reference to FIG. 7. Therefore, redundant descriptions may be omitted.

According to various embodiments, the augmented reality device 10 may recognize the user's gesture based on the image data acquired through the camera 5340 and provide the content based on the user's gesture. For example, the augmented reality device 10 may be implemented to generate the content based on the user's gesture and output the virtual image light to the optical lens 300 through the output device 811 to provide the generated content. At this time, the user may be provided with the virtual image light and the real thing image light for the content generated through the content generation module 5430. For example, the virtual image light and real thing image light for the content generated through the reflection member 510 may be provided to the user.

The augmented reality device 10 according to various embodiments may provide convenience to a user by controlling content output based on a user's gesture without using a separate device.

Figure 56:
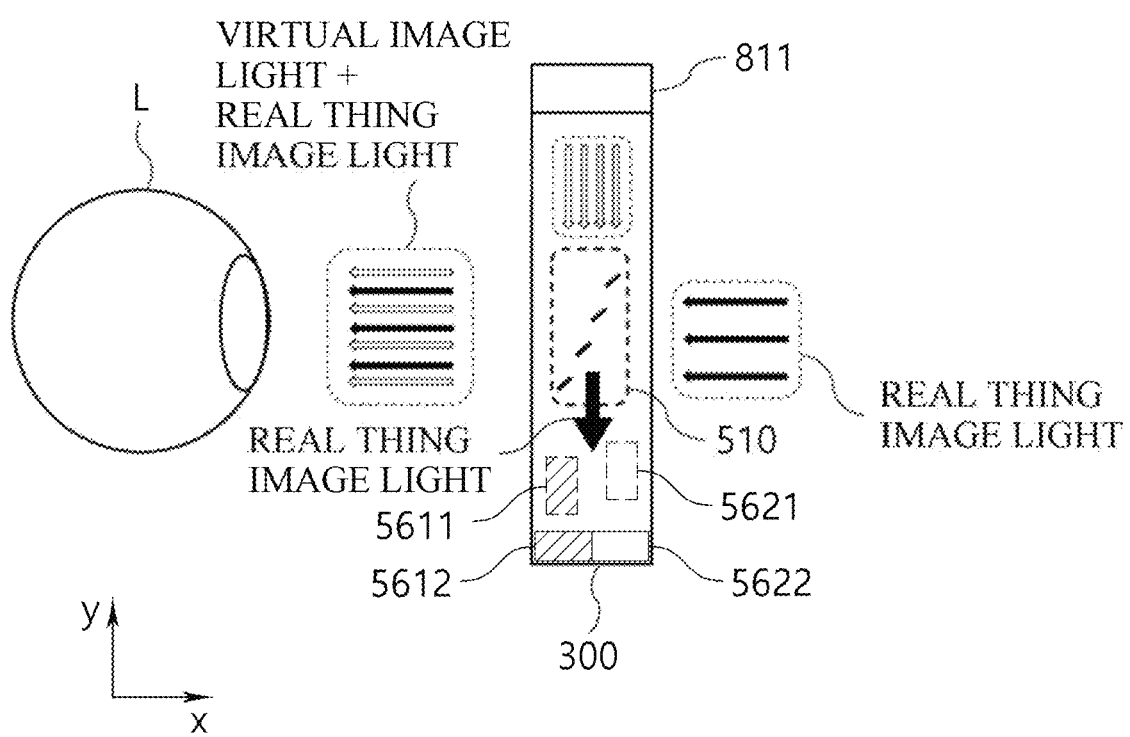
FIG. 56 is a diagram for describing an example in which the augmented reality device recognizes a gesture through a camera according to various embodiments.
Figure 57:
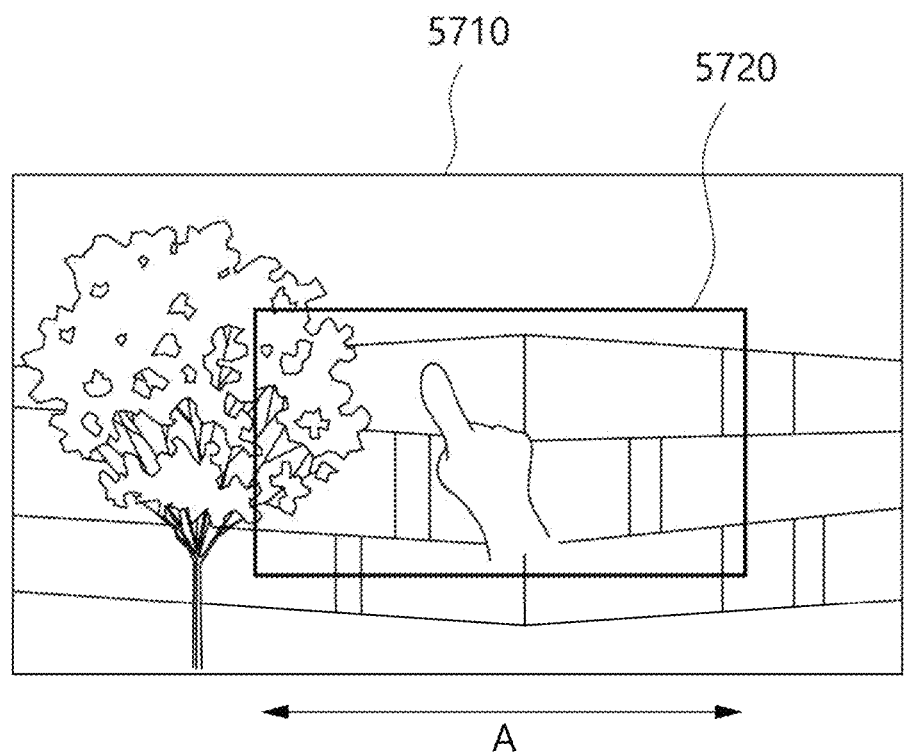
FIG. 57 is a diagram for describing an example of image data acquired by the augmented reality device through a camera according to various embodiments.

FIG. 56 is a diagram for describing an example in which the augmented reality device recognizes a gesture through a camera according to various embodiments. FIG. 57 is a diagram for describing an example of image data acquired by the augmented reality device through a camera according to various embodiments.

Hereinafter, referring to FIG. 57 and FIG. 56 will be further described.

Referring to FIG. 56, the augmented reality device 10 may include an output device 811, an optical lens 300 including a plurality of reflective members 510, a first camera having a first angle of view, and a second camera having a second angle of view narrower than the first angle of view.

According to various embodiments, the first camera (e.g., the camera 5340 of FIG. 53) may include a first image sensor 5612 that converts image light incident through the first lens unit 5611 into an electrical signal and outputs the converted image light. The second camera (e.g., the camera 5340 of FIG. 53) may include a second lens unit 5621 and a second image sensor 5622 that converts image light incident through the second lens unit 5621 into an electrical signal and outputs the converted image light. According to various embodiments, the at least one processor 5310 may activate at least one of the first camera and the second camera according to the photographing mode and perform photographing for gesture recognition. According to an embodiment, in order to increase the image quality of the second camera, the distance between the second lens unit 5621 and the second image sensor 5622 may be greater than the distance between the first lens unit 5611 and the first image sensor 5612.

According to an embodiment, the image sensor (e.g., the first image sensor 5612, the second image sensor 5622) may be a complementary metal oxide semiconductor (CMOS) sensor or a charged coupled device (CCD) sensor. A plurality of individual pixels are integrated in the image sensor (e.g., the first image sensor 5612, the second image sensor 5622), and each individual pixel may include a micro lens, a color filter, and a photodiode. Each individual pixel may convert light input as a kind of light detector into an electrical signal. The light detector generally cannot detect the wavelength of the captured light by itself and cannot determine color information. The light detector may include a photodiode. For example, the image sensor (e.g., the first image sensor 5612, the second image sensor 5622) may amplify the current generated by the light received through the plurality of lenses (e.g., the first lens unit 5611, the second lens unit 5621) through the photoelectric effect of the light receiving device. For example, each individual pixel may include a photoelectric transformation element (or a position sensitive detector (PSD)) and a plurality of transistors (e.g., reset transistor, transmission transistor, selection transistor, and driver transistor).

According to various embodiments, the processor 5310 may identify a part of the user's body (e.g., the user's hand) included in the image acquired through the first camera and the second camera to recognize the user's gesture. According to an embodiment, the processor 5310 may acquire an image gesture including the user's gesture by using the first camera and/or the second camera having different angles according to the user's gesture size. For example, when the size of the hand of the user is within the first range, the gesture of the user may be recognized using the first camera having a relatively wide angle of view (e.g., the first angle of view). For example, when the size of the hand of the user is smaller than the first range, the gesture may be recognized through the second camera having a relatively narrow angle of view (e.g., the second angle of view).

Referring to FIG. 57, wide-angle image data 5710 photographable through the first camera and telephoto image data 5720 photographable through the second camera are illustrated. According to various embodiments, the processor 5310 may recognize the gesture of the user by identifying a part of the body of the user using a plurality of cameras (e.g., the first camera and the second camera). For example, when the size of the gesture of the user (i.e., the movement range A of the part of the body of the user) is equal to or greater than a specified size, the processor 5310 may acquire the wide-angle image data 5710 through the first camera. For example, when the size of the gesture of the user (i.e., the movement range A of the part of the body of the user) is equal to or less than a specified size, the processor 5310 may acquire the telephoto image data 5720 through the second camera. According to various embodiments, the processor 5310 may acquire the wide-angle image data 5710 and/or the telephoto image data 5720 by activating the first camera and/or the second camera according to the size of the gesture of the user, and may increase the accuracy of the gesture recognition by utilizing appropriate image data according to the size of the gesture.

According to various embodiments, the processor 5310 may track the movement of the part of the body of the user using the first camera and the second camera. For example, the camera to be used for detecting the gesture may be determined according to the movement range of the part of the body of the user. For example, when the movement amount A of the part of the body of the user is less than the specified movement amount, the second camera may be used, and when the movement amount A is equal to or greater, the first camera may be used. According to various embodiments, the processor 5310 may track the movement of the part of the body of the user using the first camera and the second camera having different angles of view, thereby recognizing the movement of the user without missing.

Figure 58:
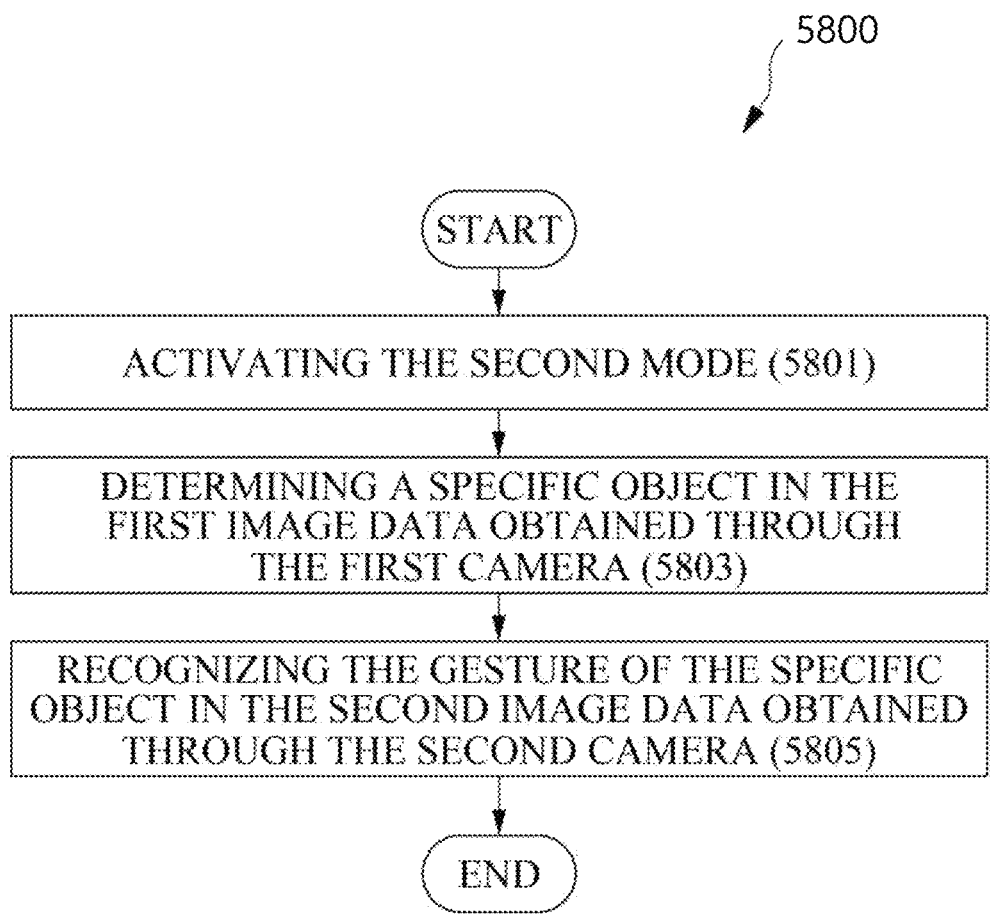
FIG. 58 is a flowchart illustrating a method of recognizing a gesture of a specific object through a camera by an augmented reality device, according to various embodiments.
Figure 59:
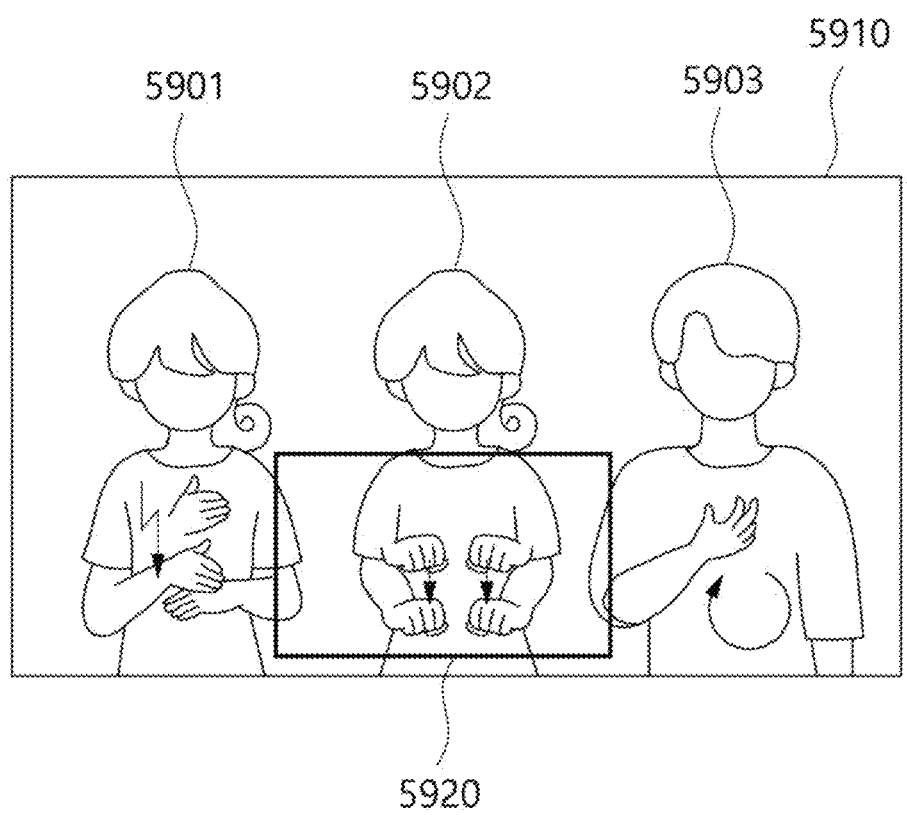
FIG. 59 is a diagram for describing an example in which the augmented reality device recognizes the gesture of the specific object through the camera, according to various embodiments.

FIG. 58 is a flowchart 5800 illustrating a method of recognizing a gesture of a specific object through a camera by an augmented reality device, according to various embodiments. FIG. 59 is a diagram for describing an example in which the augmented reality device recognizes the gesture of the specific object through the camera, according to various embodiments.

Hereinafter, FIG. 58 will be described in further detail with reference to FIG. 59.

Each of the operations described below may be performed in combination with each other. Also, the operation by the augmented reality device 10 among the operations described below may mean the operation of the augmented reality device 10 controlled by the processor 5310 of the augmented reality device 10 described with reference to FIG. 1 or the processor 3510 of the server 20 described with reference to FIG. 35.

In addition, "information" described below may be interpreted as meaning "data" or "signal", and "data" may be understood as concepts including both analog data and digital data.

According to various embodiments, the operations illustrated in FIG. 58 may be performed in various orders rather than the illustrated order. In addition, according to various embodiments, more operations may be performed or fewer at least one operation may be performed than the operations illustrated in FIG. 58.

Referring to FIG. 58, the augmented reality device 10 may activate the second mode in operation 5801. According to an embodiment, the augmented reality device 10 may include various gesture recognition modes in relation to recognizing gestures. For example, the gesture recognition mode may include a first mode for recognizing a gesture of a user wearing/using the augmented reality device 10. For example, the gesture recognition mode may include a second mode that is a mode for recognizing a gesture of a third party rather than a user wearing/using the augmented reality device 10.

According to various embodiments, in operation 5803, when the second mode is activated, the augmented reality device 10 may determine a specific object in the first image data 5910 obtained through the first camera (e.g., the camera 5340 of FIG. 53) described with reference to FIG. 56. For example, when the second mode is activated and a function is executed based on the third party's gesture recognition, the augmented reality device 10 may determine a specific object to recognize a gesture in the first image data 5910 obtained through the first camera having a relatively wide angle of view (e.g., wide angle). For example, the augmented reality device 10 may determine the specific object 5902, which is the object to recognize a gesture, among the plurality of objects 5901, 5902, and 5903 included in the first image data 5910.

According to various embodiments, in operation 5805, the augmented reality device 10 may recognize the gesture of the specific object in the second image data 5920 obtained through the second camera (e.g., the camera 5340 of FIG. 53) described with reference to FIG. 56. For example, the augmented reality device 10 may obtain the second image data 5920 using the second camera having a relatively narrow angle of view (e.g., telephoto). According to an embodiment, when the augmented reality device 10 recognizes the gesture of the specific object and controls execution of a function, the augmented reality device 10 may obtain image data through the first camera and/or the second camera having different angles of view and recognize the gesture of the specific object based on the obtained image data.

According to various embodiments, the augmented reality device 10 may determine the specific object through the first camera having a relatively large angle of view. In addition, the augmented reality device 10 may recognize the gesture of the specific object through the second camera having a relatively small angle of view. Therefore, the augmented reality device 10 may determine the specific object through the first camera having a large angle of view and may increase the accuracy of gesture recognition by capturing the gesture recognition of the specific object at a large magnification without deterioration of image quality.

Figure 60:
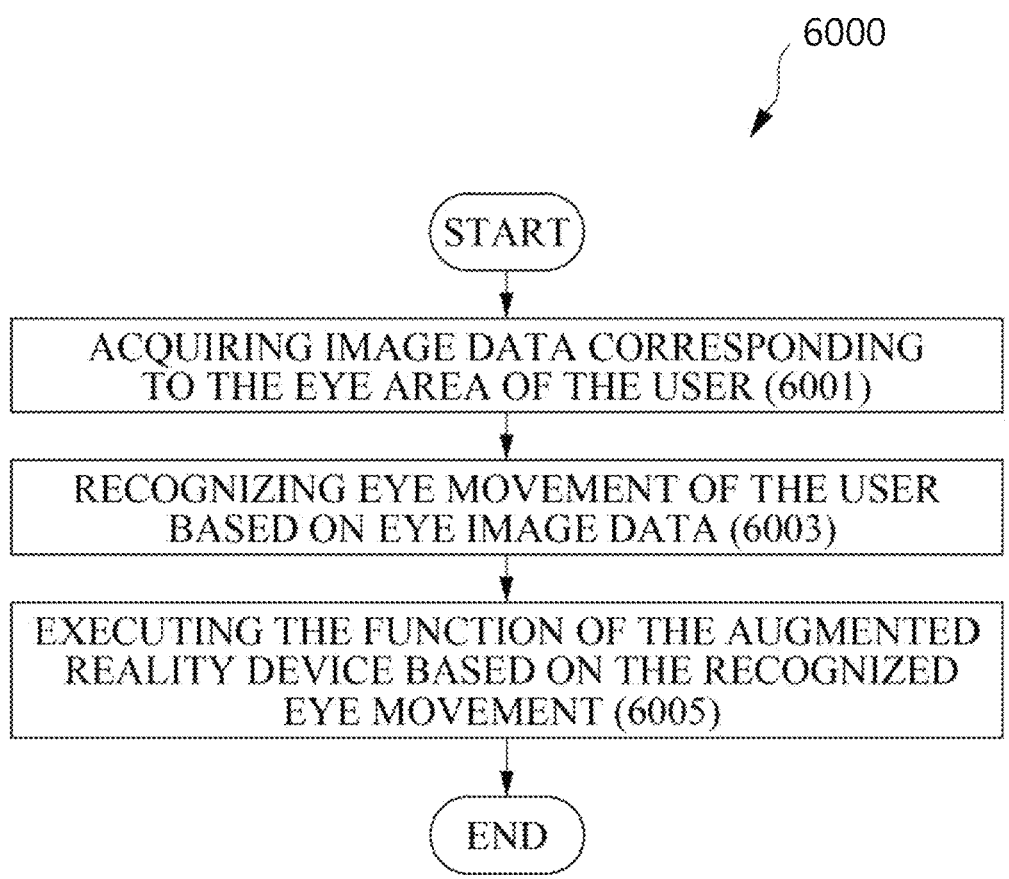
FIG. 60 is a flowchart illustrating a method in which the augmented reality device executes a function based on eye movement of a user.
Figure 61:
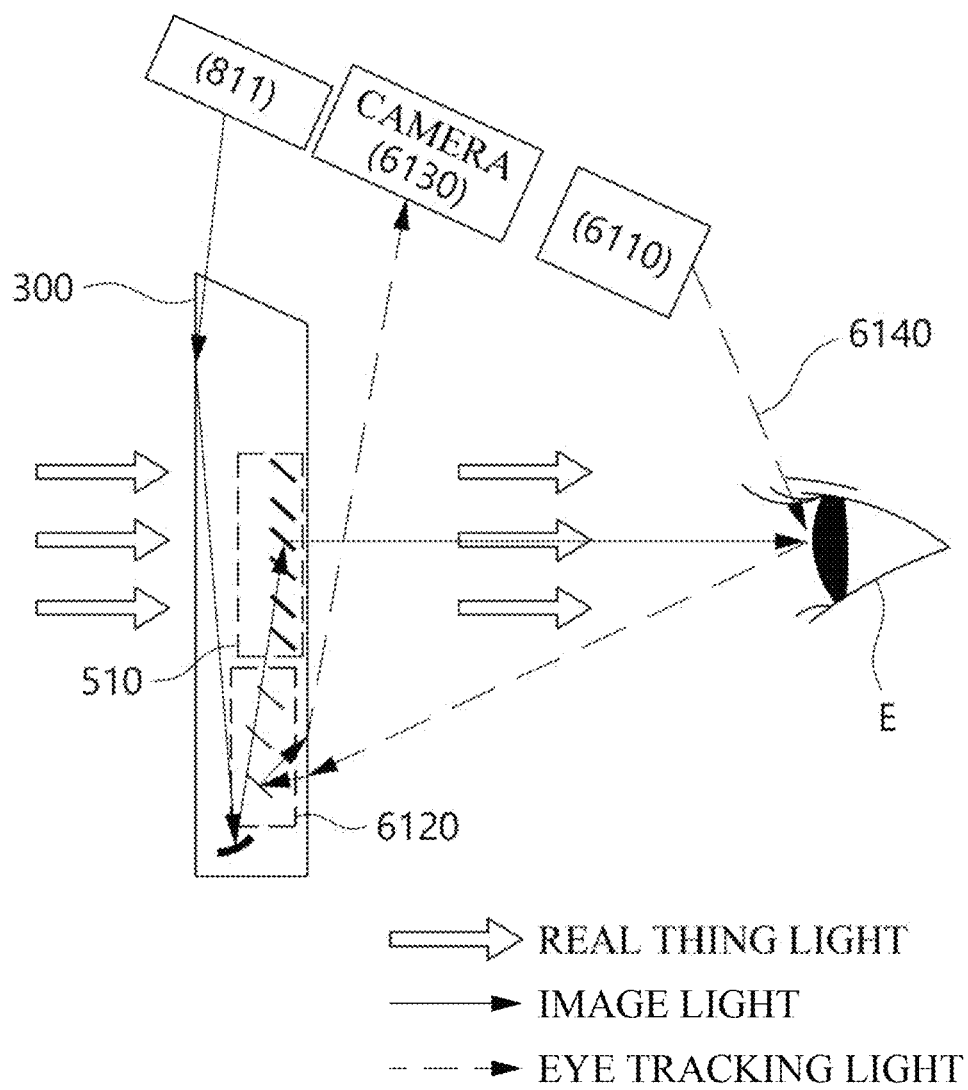
FIG. 61 is a diagram for describing an example in which an augmented reality device recognizes eye movement of a user through a camera, according to various embodiments.

FIG. 60 is a flowchart 6000 illustrating a method in which the augmented reality device executes a function based on eye movement of a user. FIG. 61 is a diagram for describing an example in which an augmented reality device recognizes eye movement of a user through a camera, according to various embodiments.

Hereinafter, FIG. 61 will be further described with reference to FIG. 60.

Each of the operations described below may be performed in combination with each other. In addition, an operation by the augmented reality device 10 among the operations described below may refer to an operation of the augmented reality device 10 controlled by the processor 5310 of the augmented reality device 10 described with reference to FIG. 1 or the processor 3510 of the server 20 described with reference to FIG. 35.

In addition, "information" described below may be interpreted as a meaning of "data" or "signal," and "data" may be understood as a concept that includes both analog data and digital data.

According to various embodiments, the operations illustrated in FIG. 60 may be performed in various orders without being limited to the order illustrated. In addition, according to various embodiments, more operations may be performed or fewer operations may be performed than the operations illustrated in FIG. 60.

According to various embodiments, the augmented reality device 10 may control execution of a function based on movement of a part of the body of the user wearing the augmented reality device 10. For example, the augmented reality device 10 may control execution of a function (e.g., providing content) provided to the user through the augmented reality device 10 based on eye movement (e.g., movement of the pupil, gaze tracking, and eye blink) of the user.

Referring to FIG. 60, the augmented reality device 10 may acquire eye image data of the user in operation 6001. For example, the augmented reality device 10 may acquire image data corresponding to the eye area of the user through the camera 6130 (e.g., the camera 5340 of FIG. 53) to identify eye movement.

According to various embodiments, the augmented reality device 10 may recognize eye movement of the user based on eye image data in operation 6003. For example, the augmented reality device 10 may identify at least one of eye blink, eye blink speed, and gaze of the user based on eye image data of the user acquired through the camera 6130.

According to various embodiments, referring to FIG. 61, the augmented reality device 10 may include a display 811, a light output device 6110 (e.g., the light output device 700) that provides analysis light to acquire gaze information, an optical lens 300 that further includes a reflected light acquisition element 6120, and a camera 6130 (e.g., the camera 5340 of FIG. 53) to acquire the reflected light. In an embodiment, the reflected light acquisition element 6120 may be implemented to acquire reflected light reflected from the eye E of the user wearing the augmented reality device 10. In an embodiment, the light output device 6110 may be implemented to output light of at least one band among an infrared band, an ultraviolet band, or a visible band. In response to the light of the band output from the light optical output device 6110, the camera 6130 may acquire information on light of at least one band among an infrared band, ultraviolet band, or a visible band. The augmented reality device 10 may recognize eye movement of the user based on eye image data including information on reflected by the camera 6130.

According to various embodiments, the augmented reality device 10 may include a plurality of reflection members as the reflected light acquisition element 6120. For example, the augmented reality device 10 may acquire eye image data corresponding to the eye area e through the plurality of reflection members, the light output device 6110, and the camera 6130. For example, the light output device 6110 may output the gaze tracking light 6140 toward the pupil e of the user. The gaze tracking light 6140 may be reflected by the plurality of reflection members in the pupil e of the user. In this case, the plurality of reflection members may reflect and refract the gaze tracking light 6140 and transmit the reflected light 6140 to the camera 6130.

According to various embodiments, the augmented reality device 10 may recognize the eye movement (e.g., gaze information) of the user through the components described with reference to FIGS. 31 to 34. Therefore, the same/similar descriptions of FIGS. 31 to 34 may be omitted.

According to various embodiments, in operation 6005, the augmented reality device 10 may execute the function of the augmented reality device 10 based on the recognized eye movement. For example, the augmented reality device 10 may generate content to be provided to the user based on the eye movement of the user, and execute the function corresponding to the eye movement by providing the generated content to the user. For example, the augmented reality device 10 may output a visual object in the area gazed by the user, and adjust the size of the visual object based on the eye blink of the user.

According to various embodiments, the augmented reality device 10 may control the function related to the content output based on the identified eye movement. The augmented reality device 10 according to various embodiments may provide convenience to the user by controlling the content output based on the eye movement of the user without using a separate device.

According to various embodiments, the reflected light acquisition element 6120 may be implemented in various forms. For example, the reflected light acquisition element 6120 may include a diffractive element implemented to transmit the gaze tracking light 6140 to the camera 6130. According to an embodiment, the diffractive element may act as a refractive or reflective element for light matching a specific wavelength band, and may serve as a window for simply passing the light in other wavelength bands. For example, the diffractive element may transmit the gaze tracking light 6140 to the camera 6130 and may pass other light.

According to various embodiments, the reflected light acquisition element 6120 may be implemented in various forms. For example, the reflected light acquisition element 6120 may include a reflection filter implemented to transmit the gaze tracking light 6140 to the camera 6130. According to an embodiment, the reflection filter may be disposed so as to have no effect on the path of the augmented reality light (image light) reflected through the plurality of reflection members.

Figure 62:
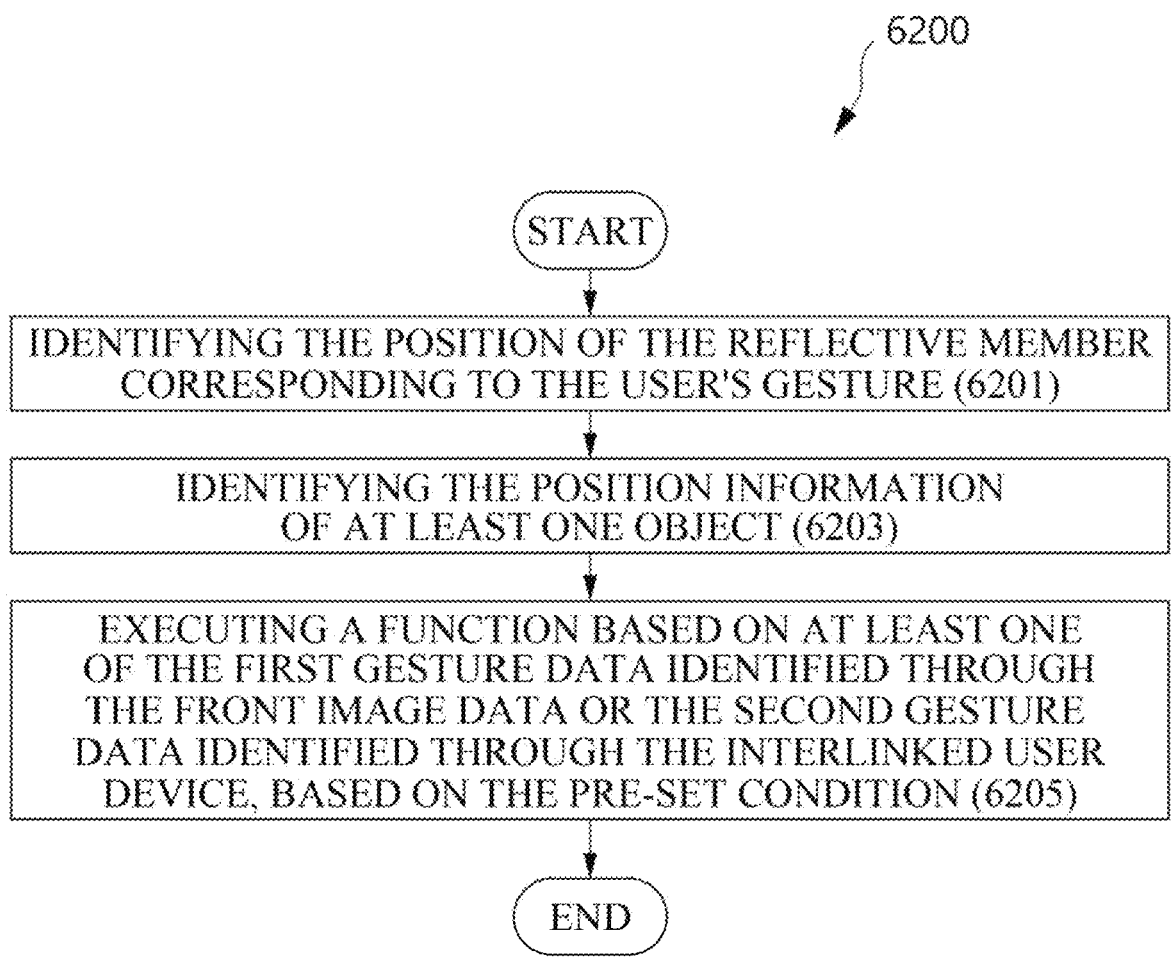
FIG. 62 is a flowchart illustrating how the augmented reality device executes functions based on location information of the reflection member.
Figure 63:
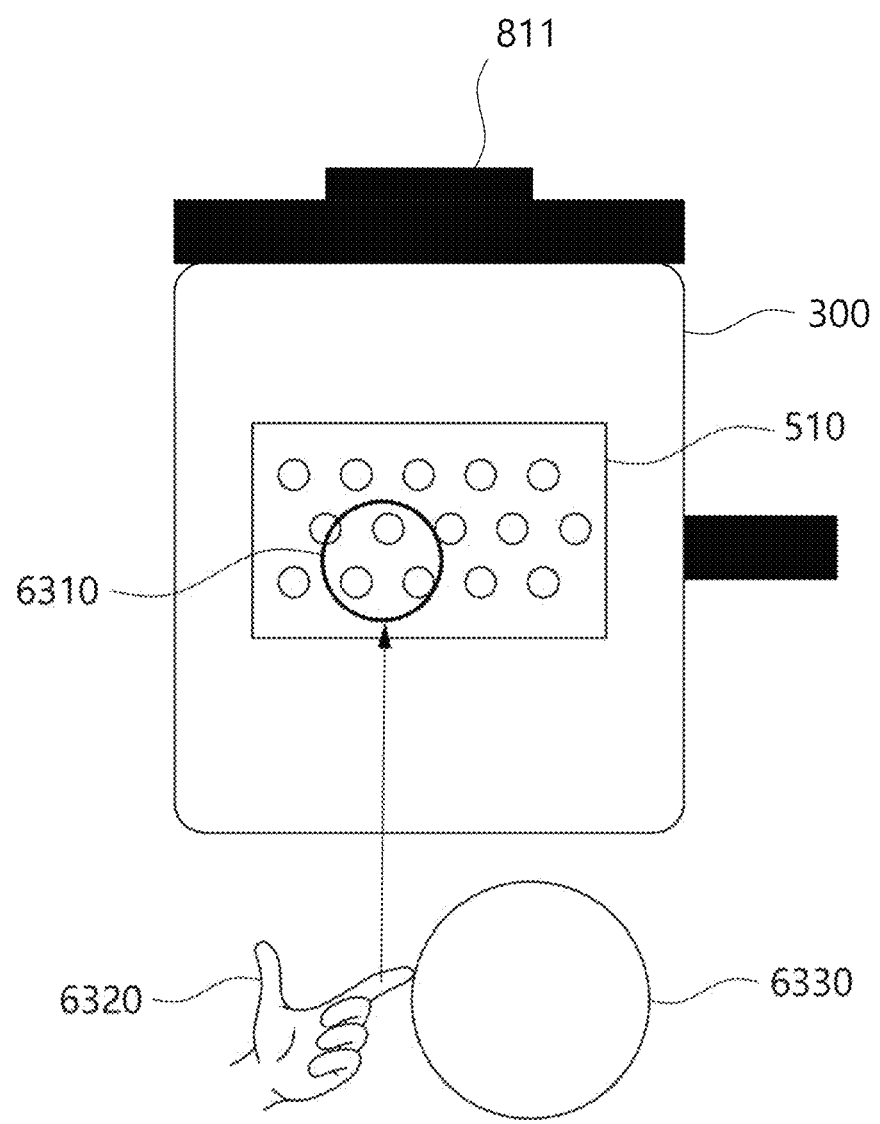
FIG. 63 is a diagram illustrating that the augmented reality device matches the position of the reflective member and the position of the AR object according to various embodiments.

FIG. 62 is a flowchart 6200 illustrating how the augmented reality device 10 executes functions based on location information of the reflection member. FIG. 63 is a diagram illustrating that the augmented reality device 10 matches the position of the reflective member and the position of the AR object according to various embodiments. Hereinafter, FIG. 62 will be further described with reference to FIG. 63.

Each of the operations described below may be performed in combination with each other. Further, an operation by the augmented reality device 10 among the operations described below may mean an operation of the augmented reality device 10 controlled by the processor 5310 of the augmented reality device 10 described with reference to FIG. 1 or the processor 3510 of the server 20 described with reference to FIG. 35.

In addition, "information" described below may be interpreted as meaning "data" or "signal", and "data" may be understood as a concept that includes both analog data and digital data.

According to various embodiments, the operations illustrated in FIG. 62 may be performed in various orders without being limited to the order illustrated. Further, according to various embodiments, more operations may be performed or fewer at least one operation may be performed than the operations illustrated in FIG. 62.

Referring to FIG. 62, the augmented reality device 10 may identify the position of the reflective member corresponding to the user's gesture in operation 6201. For example, the augmented reality device 10 may identify the user's gesture 6320 based on the image data obtained through the camera 5340 and identify the position information of the reflective member 6310 corresponding to the user's gesture 6320 among the plurality of reflective members 510.

According to various embodiments, the augmented reality device 10 may identify the position information of at least one AR object 6330 in operation 6203. For example, the augmented reality device 10 may identify the position of the AR object 6330 included in the virtual reality content provided to the user by being incident on the optical lens 300 through the output device 811.

According to various embodiments, the augmented reality device 10 may execute a function based on at least one of the first gesture data identified through the front image data or the second gesture data identified through the interlinked user device (e.g., the user device 30 of FIG. 1) based on the preset condition in operation 6205. For example, the augmented reality device 10 may match the position information of the reflective member corresponding to the user's gesture 6320 and the position information of the AR object 6330 to provide execution of a function based on the first gesture data or the second gesture data.

Figure 64:
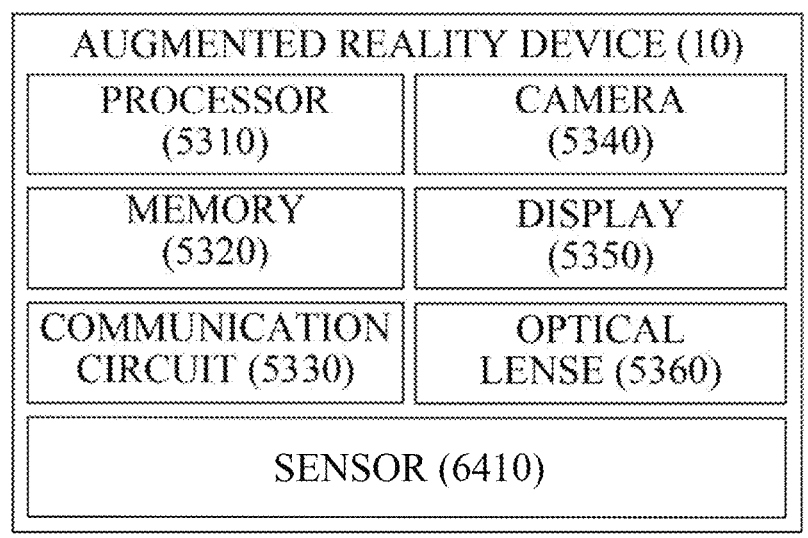
FIG. 64 is a block diagram of an augmented reality device including a sensor according to various embodiments.

FIG. 64 is a block diagram of an augmented reality device including a sensor according to various embodiments.

Referring to FIG. 64, the augmented reality device 10 may further include at least one sensor 6410 in addition to the components of the augmented reality device 10 described with reference to FIG. 53. For example, the augmented reality device 10 may include a processor 5310, a memory 5320, a communication circuit 5330, a camera 5340, a display 5350 (e.g., the output device 811), and/or an optical lens 5360 (e.g., the optical lens 300), and at least one sensor 6410. However, the description and/or illustrated example, the augmented reality device 10 may include more components and/or fewer components.

According to various embodiments, the augmented reality device 10 may include at least one sensor 6410 implemented to recognize a gesture of the user. For example, the augmented reality device 10 may include at least one sensor 6410 inside one frame of the augmented reality device 10.

According to various embodiments, the at least one sensor 6410 may include a motion sensor implemented to sense a gesture (motion) of the user wearing the augmented reality device 10. For example, the at least one sensor 6410 may include at least one sensor among a human body sensing sensor, a tilt sensor, and an acceleration sensor.

According to various embodiments, the augmented reality device 10 may detect the user gesture from the movement of the user's body while being worn on at least a portion (e.g., face) of the user's body through the at least one sensor 6410. For example, the augmented reality device 10 may detect the acceleration and angular velocity of the movement of the user's body part (e.g., face) through the at least one sensor 6410. The at least one sensor 6410 may detect the speed variation and the angular variation related to the movement of the user's body part (e.g., face) through the augmented reality device 10. According to an embodiment, the augmented reality device 10 may control the content output based on the detected user gesture.

According to various embodiments, the augmented reality device 10 may identify the type of gesture by comparing the detected acceleration and angular velocity with a pre-set acceleration and angular velocity value, and control the content output based on the identified gesture.

The augmented reality device 10 according to various embodiments may provide convenience to the user by controlling the content output based on the movement of the user's face without using a separate device.

The augmented reality device 10 according to various embodiments is not limited to the above example, and may set various gestures related to the movement of the user's body part and execute various functions corresponding to the gesture.

Figure 65:
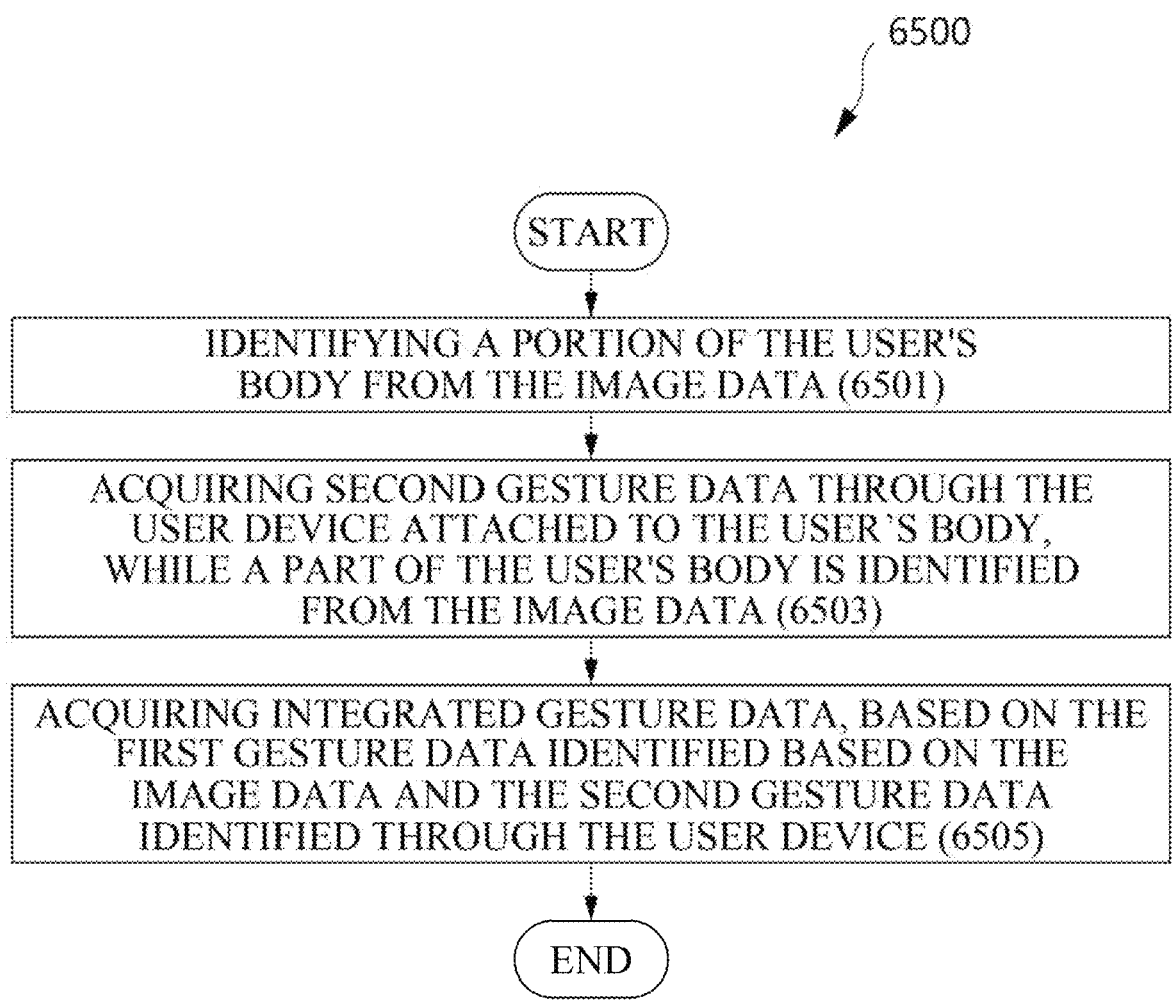
FIG. 65 is a flowchart illustrating a method of obtaining integrated gesture data using a plurality of gesture data.
Figure 66:
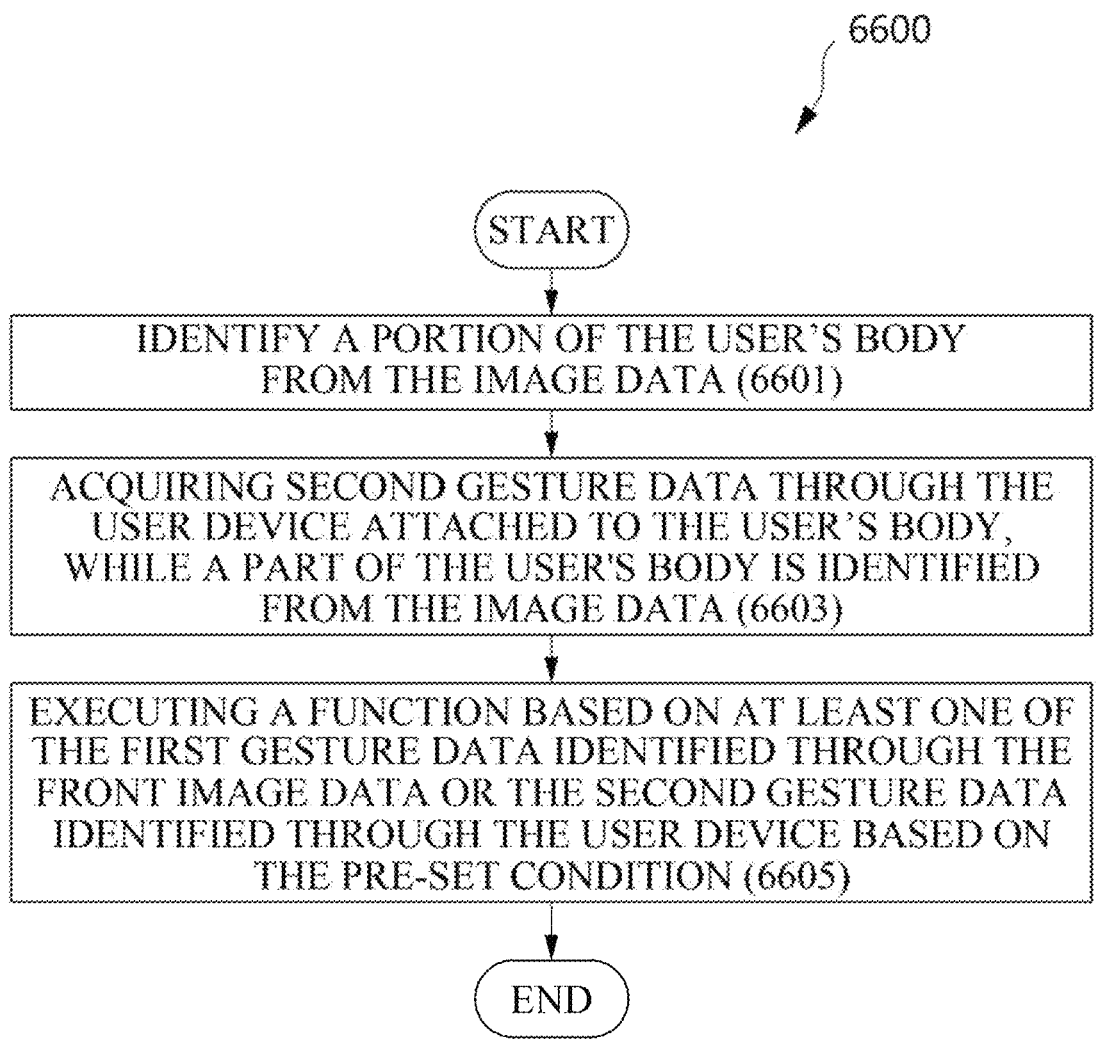
FIG. 66 is a flowchart illustrating a method of executing a function based on a plurality of gesture data.

FIG. 65 is a flowchart 6500 illustrating a method of obtaining integrated gesture data using a plurality of gesture data. FIG. 66 is a flowchart 6600 illustrating a method of executing a function based on a plurality of gesture data.

Hereinafter, FIG. 65 will be described in further detail with reference to FIG. 66.

Each of the operations described below may be performed in combination with each other. Also, the operations by the augmented reality device 10 among the operations described below may mean the operations of the augmented reality device 10 controlled by the processor 5310 of the augmented reality device 10 described with reference to FIG. 1 or the processor 3510 of the server 20 described with reference to FIG. 35.

In addition, the "information" described below may be interpreted as the meaning of "data" or "signal", and "data" may be understood as the concept including both analog data and digital data.

According to various embodiments, operations illustrated in FIGS. 65 and 66 may be performed in various orders without limitation of the illustrated order. In addition, according to various embodiments, more operations may be performed or fewer operations may be performed than the operations illustrated in FIGS. 65 and 66.

According to various embodiments, the augmented reality device 10 may control the function execution of the augmented reality device 10 based on the gesture data acquired from the augmented reality device 10 and the gesture data acquired through the user device 30 interworked with the augmented reality device 10. According to various embodiments, the augmented reality device 10 may transmit/receive various data (e.g., second gesture data) from the user device 30 described with reference to FIG. 1 through the communication circuit 5330.

Referring to FIG. 65, in operation 6501, the augmented reality device 10 may identify a portion of the user's body from the image data. For example, the augmented reality device 10 may identify a portion of the user's body from the front image data obtained through the camera 5340 of the augmented reality device 10 by performing a similar operation to that described with reference to FIGS. 53 to 64.

According to various embodiments, in operation 6503, the augmented reality device 10 may acquire second gesture data through the user device 30 attached to the user's body in a state in which a part of the user's body is identified from the image data.

According to various embodiments, in operation 6505, the augmented reality device 10 may acquire integrated gesture data based on the first gesture data identified based on the image data and the second gesture data identified through the user device 30.

According to an embodiment, the augmented reality device 10 may acquire the first gesture data from the image data through the method described with reference to FIGS. 53 to 64. According to an embodiment, the augmented reality device 10 may acquire second gesture data based on information acquired through at least one sensor and/or at least one camera of the user device 30. For example, the augmented reality device 10 may acquire second gesture data acquired by moving the part of the body in a state in which the user device 30 is attached to the part of the user's body. According to an embodiment, the augmented reality device 10 may acquire integrated gesture data based on the first gesture data and the second gesture data. According to various embodiments, the integrated gesture data may include combination data of pre-set first gesture data and second gesture data.

According to various embodiments, the augmented reality device 10 may provide a function to the user based on the integrated gesture data. For example, the augmented reality device 10 may provide a function provided to the user based on the first gesture data and a function distinguished from the function provided to the user based on the second gesture data. That is, the augmented reality device 10 may provide a function (e.g., content provision) to the user based on integrated gesture data that is distinguished from the first gesture data and/or the second gesture data.

Referring to FIG. 66, in operation 6601, the augmented reality device 10 may identify a portion of the user's body from the image data. For example, the augmented reality device 10 may identify a portion of the user's body from the front image data obtained through the camera 5340 of the augmented reality device 10 by performing a similar operation to that described with reference to FIGS. 53 to 64.

According to various embodiments, in operation 6603, the augmented reality device 10 may acquire second gesture data through the user device 30 attached to the user's body in a state in which a part of the user's body is identified from the image data. According to an embodiment, the augmented reality device 10 may acquire second gesture data based on information acquired through at least one sensor and/or at least one camera of the user device 30. For example, the augmented reality device 10 may acquire second gesture data acquired by moving the part of the body in a state in which the user device 30 is worn on the part of the user's body.

According to various embodiments, in operation 6605, the augmented reality device 10 may execute a function based on at least one of the first gesture data identified through the front image data or the second gesture data identified through the user device 30 based on the pre-set condition. For example, the augmented reality device 10 may execute a function based on any one of the first gesture data and the second gesture data based on a pre-set condition.

According to various embodiments, the pre-set condition may be determined based on various data, such as the type of gesture, the type of function corresponding to the gesture, the comparison degree of the gesture size, the gesture recognition time and place, and the user's gesture recognition history information, but is not limited to the above example.

For example, when the gesture corresponding to the execution of a specific function is a gesture that requires a large motion of the user's body, the function may be executed based on the first gesture data (vision gesture). In addition, when the gesture corresponding to the specific function execution is a gesture that requires a small motion of the user's body, the function may be executed based on the second gesture data (non-vision gesture). In addition, for example, when the second gesture data is acquired after a specified time after a part of the user's body begins to be identified from the front image data, the augmented reality device 10 may execute a function based on the second gesture data.

According to various embodiments, when a plurality of gesture data is acquired, the augmented reality device 10 may execute a function based on at least one gesture data, thereby providing a more appropriate function for user intention.

Figure 67:
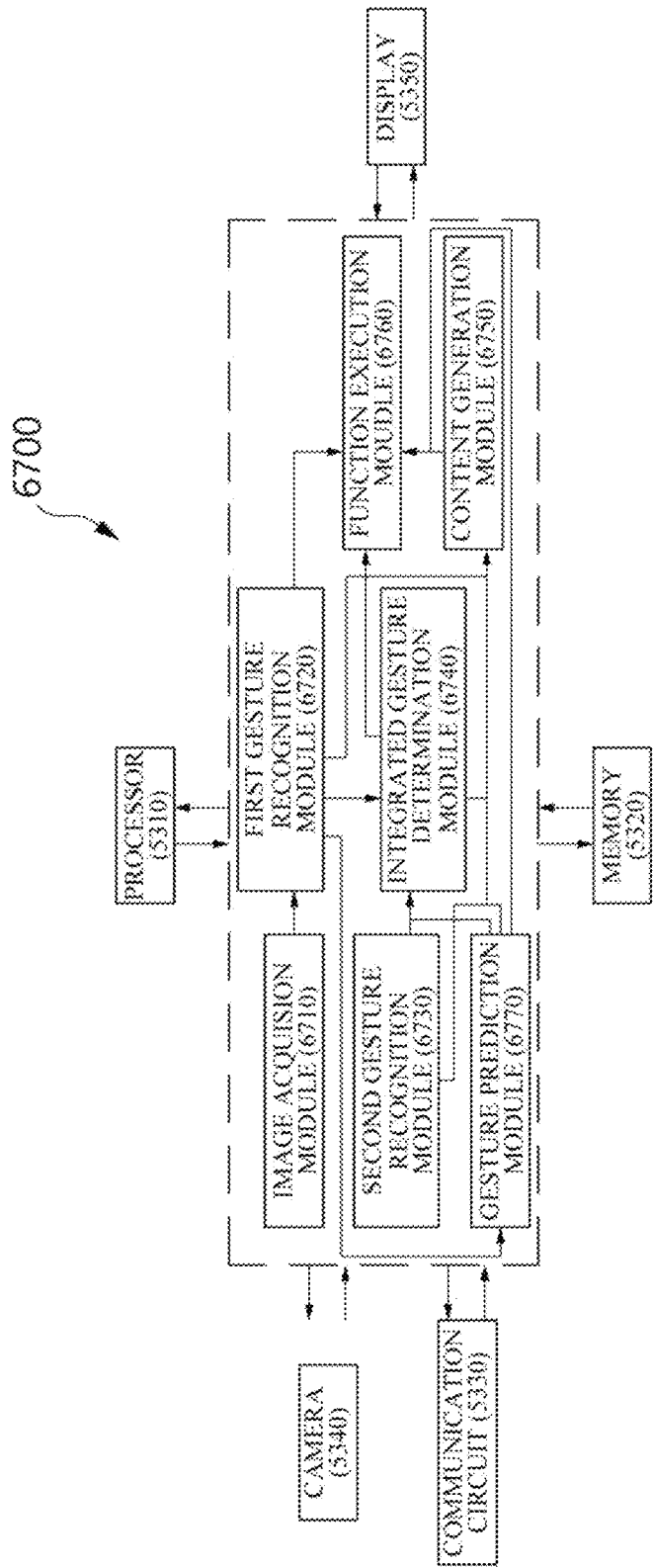
FIG. 67 illustrates a concept of controlling a function related to outputting content based on a plurality of gesture data by an augmented reality device.
Figure 68:
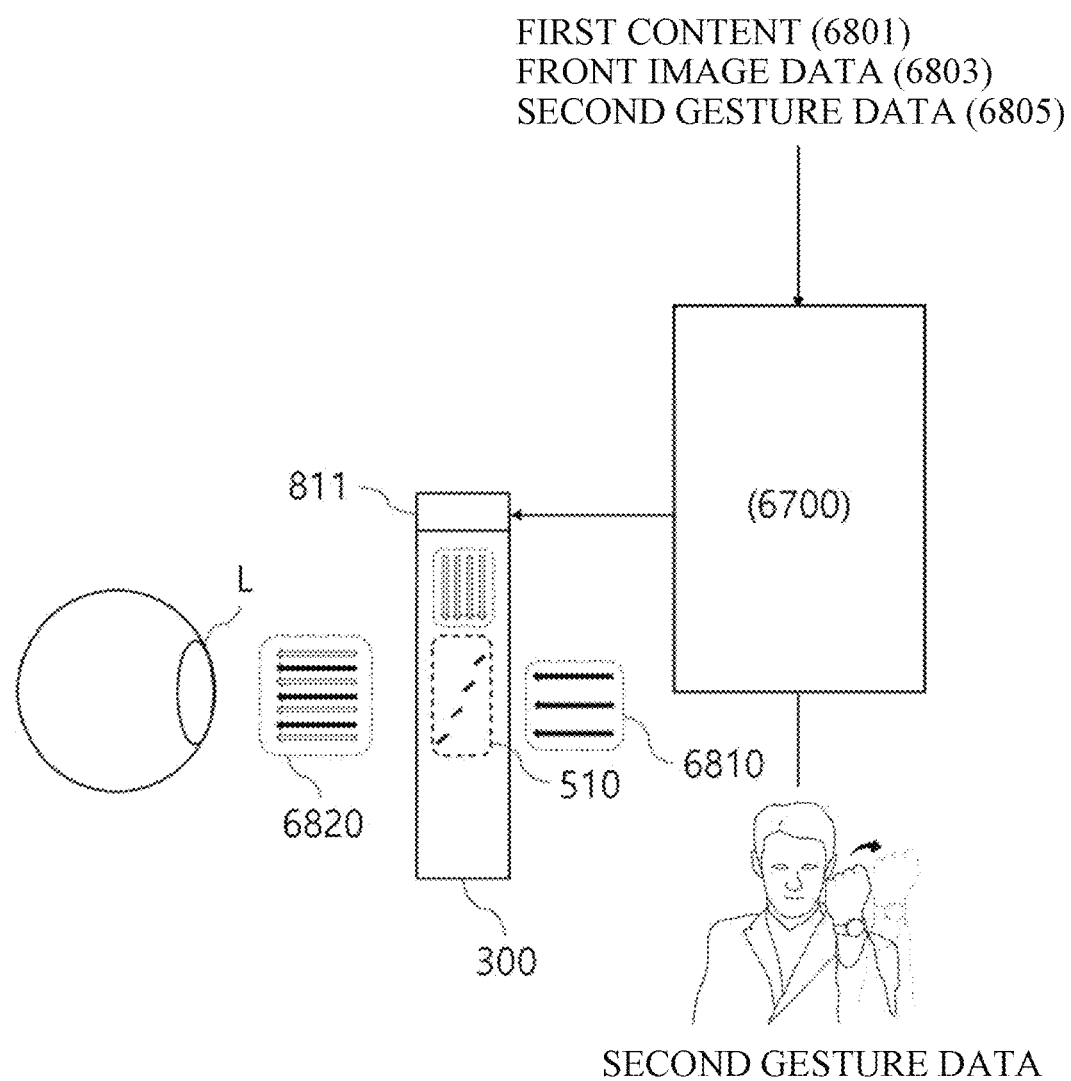
FIG. 68 is a diagram for explaining that content is provided to a user based on a plurality of gesture data.
Figure 69:
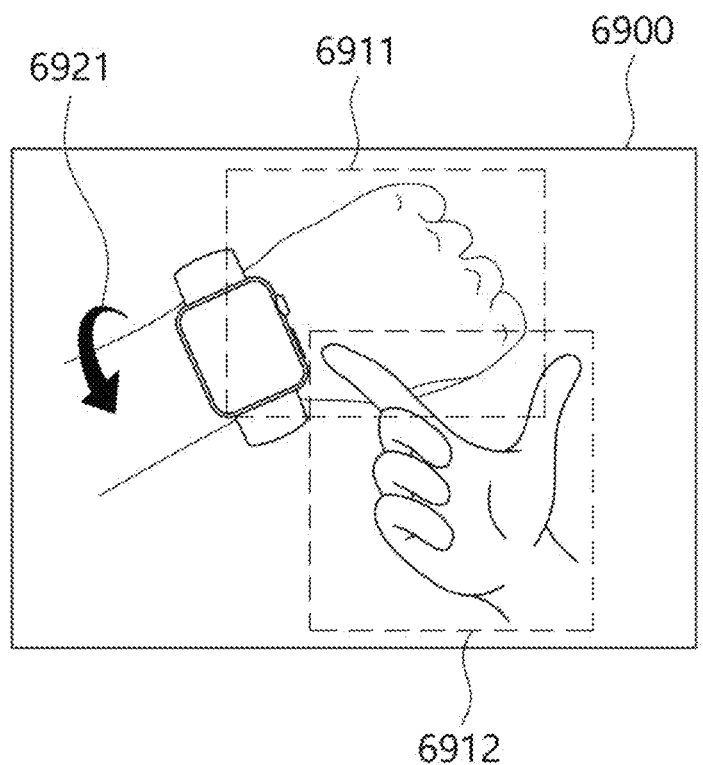
FIG. 69 is a diagram for describing recognizing a plurality of gesture data.

FIG. 67 illustrates a concept of controlling a function related to outputting content based on a plurality of gesture data by an augmented reality device. FIG. 68 is a diagram for explaining that content is provided to a user based on a plurality of gesture data. FIG. 69 is a diagram for describing recognizing a plurality of gesture data. Hereinafter, FIG. 67 will be described with reference to FIG. 68 and FIG. 69.

According to various embodiments, the augmented reality device 10 may use hardware and/or software module 6700 to support functions related to recognizing a plurality of gestures and providing content. For example, the processor 5310 may drive at least one of the image acquisition module 6710 (e.g., the image acquisition module 5410 of FIG. 54), the first gesture recognition module 6720 (e.g., the gesture recognition module 5420 of FIG. 54), the second gesture acquisition module 6730, the integrated gesture determination module 6740, the content generation module 6750 (e.g., the content generation module 5430) and the function execution module 6760 (e.g., the content output module 5440) by executing the instructions stored in the memory 5320. Hereinafter, the same or similar descriptions of the modules that perform the same function as the software module 5400 described with reference to FIG. 54 are omitted.

In various embodiments, a different software module than that shown in FIG. 67 may be implemented. For example, at least two modules may be integrated into one module or one module may be divided into two or more modules. In addition, the performance of the work may be improved by sharing one function by the hardware and software modules. For example, the augmented reality device 10 may include both a hardware encoder and a software encoder, and some of the data obtained through the at least one camera 5340 may be processed by the hardware encoder and the other by the software encoder.

According to various embodiments, the augmented reality device 10 may acquire the first gesture data of the user based on the at least one image data acquired through the camera 5340, acquire the second gesture data from the user device 30, and provide the content based on the first gesture data and the second gesture data. According to an embodiment, the augmented reality device 10 may predict the gesture, thereby executing a function based on the predicted gesture data.

According to various embodiments, the provision of the content based on the first gesture data and the second gesture data by the augmented reality device 10 may be provided through an operation similar to that of executing a function based on the first gesture data and the second gesture data described with reference to FIGS. 65 and 66. Therefore, the descriptions described with reference to FIGS. 65 and 66 may be equally applied, and the same/similar descriptions are omitted below.

According to various embodiments, the image acquisition module 6720 may include a module that provides various functions for acquiring various image data including the front of the augmented reality device 10 or the user's gaze. In an embodiment, the image acquisition module 6710 may acquire image data of the surrounding environment of the augmented reality device 10 through the camera 5340.

According to various embodiments, the first gesture recognition module 6720 may recognize the gesture from the image data. According to various embodiments, the first gesture recognition module 6720 may acquire the gesture data by identifying whether the user of the augmented reality device 10 performed a pre-designated gesture (motion) based on the image data. According to an embodiment, the first gesture recognition module 6720 may recognize the gesture of the user by analyzing the image data.

For example, referring to FIG. 69, the image acquisition module 6710 may acquire the front image data 6900 through the camera 5340. Accordingly, the first gesture recognition module 6720 may acquire the first gesture data 6910 including the first gesture 6911 and the second gesture 6912 included in the front image data 6900. For example, the gesture recognition module 5420 may identify the user's gesture (e.g., the first gesture 6911 and the second gesture 6912) by analyzing the position, motion, and/or shape of the user's body part included in the image based on the front image data 6900.

According to various embodiments, the second gesture acquisition module 6730 may acquire second gesture data acquired from the user device 30 through the communication circuit 5330. According to various embodiments, the second gesture acquisition module 6730 may acquire the user's gesture data acquired by the user device 30 through at least one sensor (e.g., an infrared sensor, a depth sensor, a biometric sensor, a human body sensor, a tilt sensor, and an acceleration sensor) through the communication circuit 5330. The second gesture acquisition module 6730 may process data (e.g., sensing data) acquired from the user device 30 to acquire second gesture data. For example, referring to FIG. 69, the second gesture acquisition module 6730 may acquire data on the third gesture 6921 from the user device 30 and acquire second gesture data 6920.

According to various embodiments, the integrated gesture determination module 6740 may acquire integrated gesture data based on the first gesture data and the second gesture data. According to various embodiments, the integrated gesture determination module 6740 may acquire integrated gesture data through the operation described with reference to FIG. 65.

According to various embodiments, the content generation module 6750 may generate content related to the execution of the function of the augmented reality device 10 based on the gesture data obtained from the first gesture recognition module 6720, the second gesture recognition module 6730, and/or the integrated gesture determination module 6740.

According to various embodiments, the function execution module 6760 may execute a function (e.g., content generated through the content generation module 6750) to be provided by the augmented reality device 10 to use based on at least one of the first gesture data, the second gesture data, and/or the integrated gesture data. For example, the function execution module 6760 may control content to be provided to a user based on the gesture data.

For example, referring to FIG. 68, while the first content 6801 is provided to the user through the output device 811, the augmented reality device 10 may acquire front image data 6803 (e.g., front image data 6900) through the camera 5340 and acquire second gesture data 6805 through the user device 30. According to various embodiments, the augmented reality device 10 may provide various functions (e.g., content generated through the content generation module 6750) to use through the hardware and/or software module 6700 to support functions related to recognizing a plurality of gestures and providing content.

According to an embodiment, the augmented reality device 10 may generate second content based on the first gesture data and the second gesture data 6805 obtained based on the front image data 6803 while the first content 6801 is output through the output device 811. The augmented reality device 10 may provide the generated second content by emitting the second content to the optical lens 300 through the output device 811 and using a plurality of reflection members 510. Therefore, the user of the augmented reality device 10 may acquire light 6820 combined with the second content (virtual image light) generated based on the user's gesture data and the actual object image light 6810.

According to various embodiments, the gesture prediction module 6770 may predict subsequent gestures based on at least one gesture data to activate some of the components of the augmented reality device 10. For example, the gesture prediction module 6770 may predict the second gesture of the user based on the first gesture data and activate the other configuration of the augmented reality device 10. While performing vision/non-vision gesture recognition in various embodiments, the other configuration of the augmented reality device 10 may be activated in consideration of the second gesture data predicted according to the first gesture data, thereby reducing power consumption and quickly providing a function through the other configuration to the user.

In the embodiment of FIG. 67, for example, it can be understood that the function performed through the image acquisition module 6710 (e.g., the image acquisition module 5410 of FIG. 54), the first gesture recognition module 6720 (e.g., the gesture recognition module 5420 of FIG. 54), the second gesture acquisition module 6730, the integrated gesture determination module 6740, the content generation module 6750 (e.g., the content generation module 5430) and the function execution module 6760 (e.g., the content output module 5440) is performed by the processor 5310 executing the instructions stored in the memory 5320. In addition, in various embodiments, the augmented reality device 10 may use one or more hardware processing circuits to perform various functions and operations disclosed in this document.

In addition, the connection relationship between the hardware/software shown in FIG. 67 is for convenience of explanation and does not limit the flow/direction of data or commands. The components included in the augmented reality device 10 may have various electrical/operative connection relationships.

5.2. Convenience Function
5.2.1 Vehicle Convenience Function
5.2.1.1. Providing a Manipulation Function During Providing a Navigation Function According to various embodiments, the augmented reality device 10 may set a communication connection with the transportation means and transmit a signal for controlling various electronic components (an electrical component) included in the transportation means based on the communication connection while providing navigation content so that the electrical component performs a predetermined function.

Figure 70:
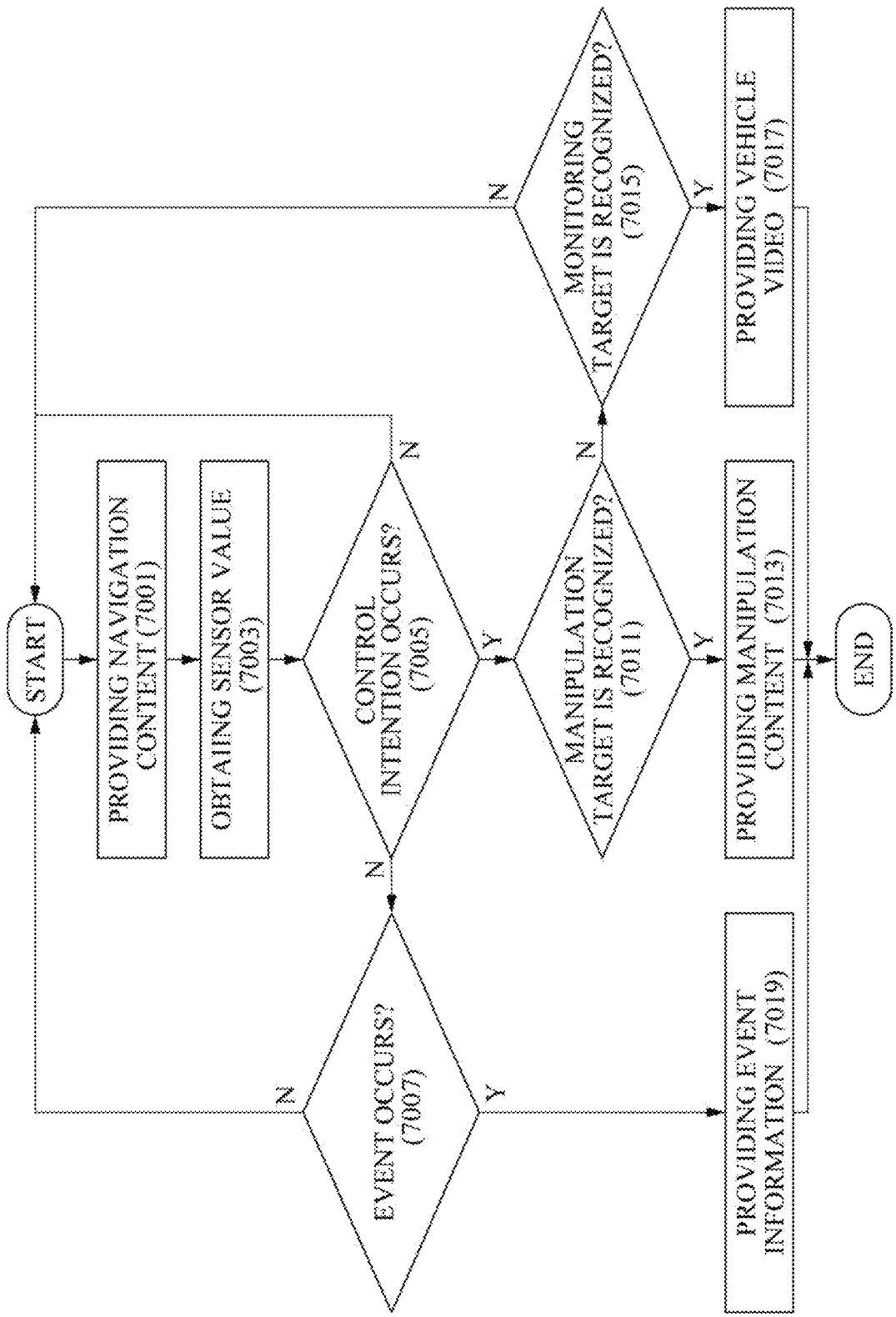
FIG. 70 is a flowchart illustrating an example of an operation of an augmented reality device for providing a manipulation function during providing a navigation function according to various embodiments.
Figure 71:
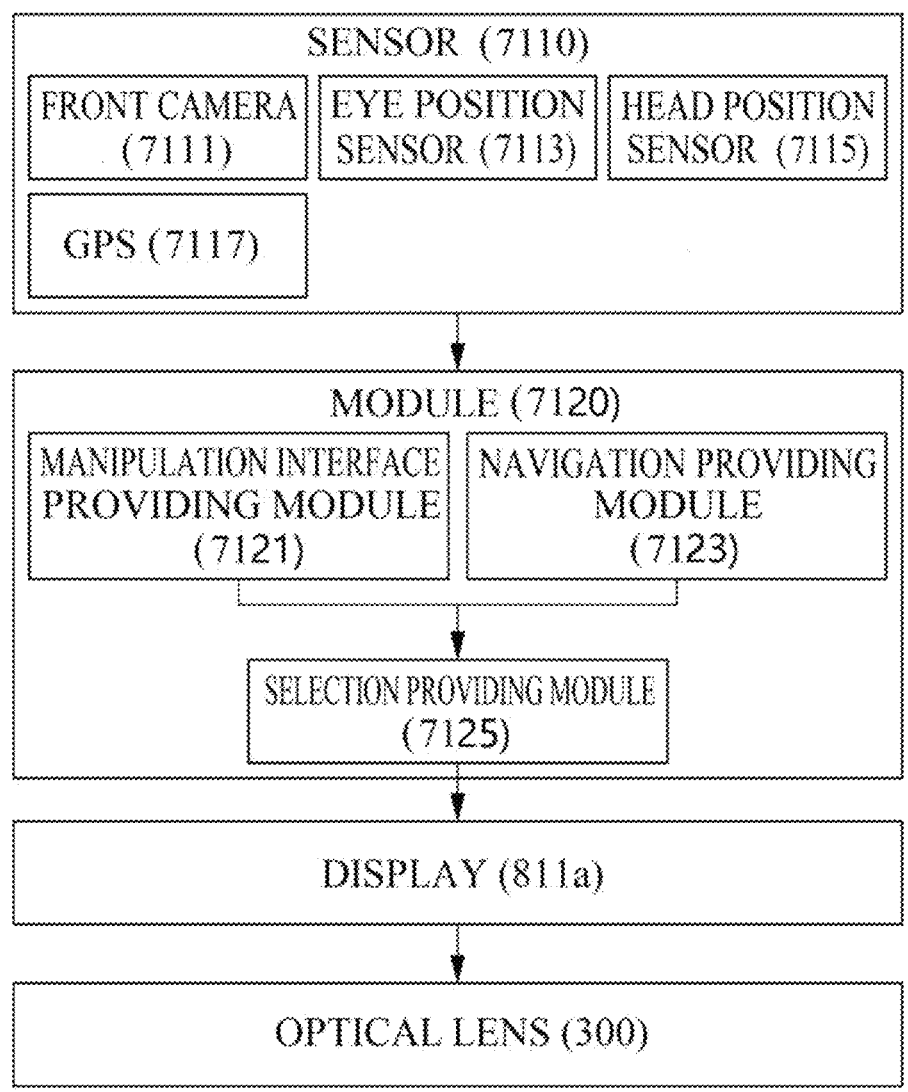
FIG. 71 is a block diagram illustrating an example of a configuration of the augmented reality device for providing a navigation function and a manipulation function according to various embodiments.
Figure 72:
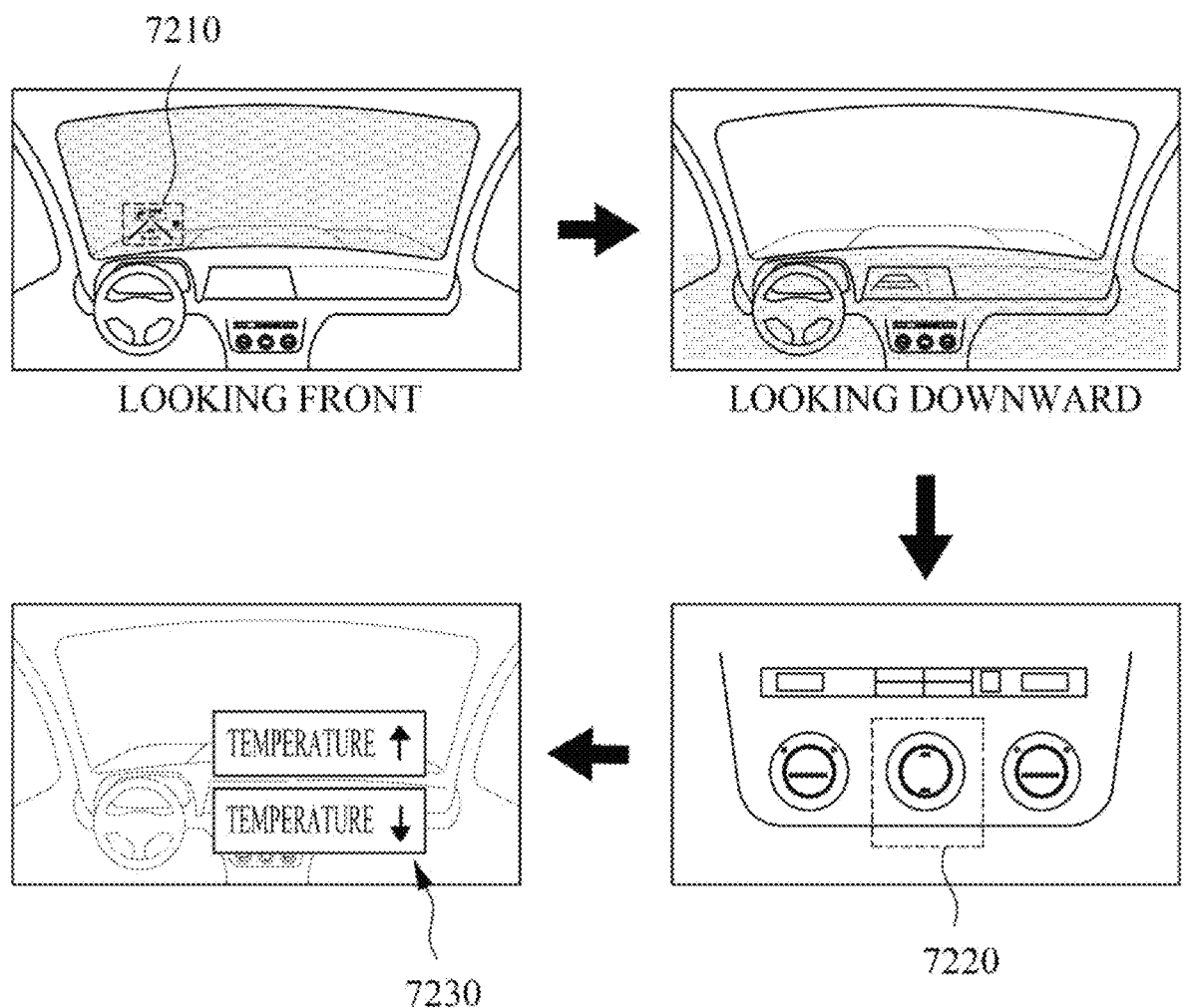
FIG. 72 is a diagram for explaining an example of providing a manipulation function during providing a navigation function according to various embodiments.
Figure 73:
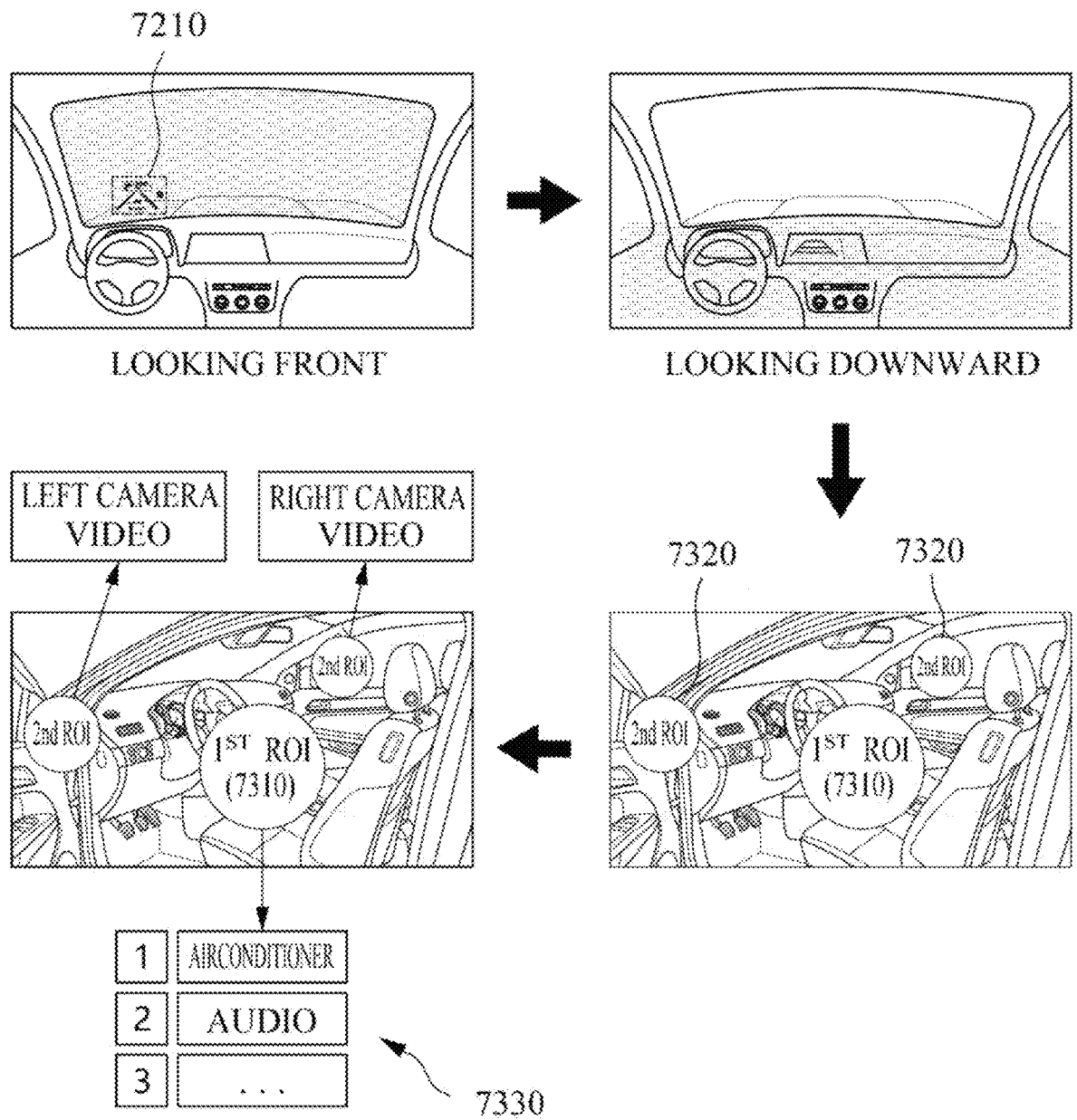
FIG. 73 is a diagram for explaining another example of providing a manipulation function during providing a navigation function according to various embodiments.

FIG. 70 is a flowchart illustrating an example of an operation of an augmented reality device for providing a manipulation function during providing a navigation function according to various embodiments. Operations may be performed in a different order from the illustrated and/or described orders, additional operations may be performed, and/or some of the operations may not be performed. FIG. 71 is a block diagram illustrating an example of a configuration of the augmented reality device 10 for providing a navigation function and a manipulation function according to various embodiments. FIG. 72 is a diagram for explaining an example of providing a manipulation function during providing a navigation function according to various embodiments. FIG. 73 is a diagram for explaining another example of providing a manipulation function during providing a navigation function according to various embodiments.

Hereinafter, FIG. 70 will be further described with reference to FIG. 60 to 73.

According to various embodiments, the augmented reality device 10 may provide navigation content in operation 7001. For example, as shown in FIG. 71, the augmented reality 10 may be implemented to provide the navigation content based on location information identified by using the GPS 7117 among the sensors 7110. For example, referring to FIGS. 72 to 73, while the user is looking at the front while wearing the augmented reality device 10, the augmented reality device 10 may provide navigation content including information 7210 for guiding at least one driving. Meanwhile, the augmented reality device 10 may be implemented to provide navigation content based on information received from an external device (e.g., the user terminal 30 and/or the transportation means), without being limited to the illustrated and/or described examples. For example, the augmented reality device 10 may be implemented to set a communication connection with an external device (e.g., the user terminal 30 and/or the vehicle), and receive and provide navigation content generated based on a sensor (e.g., a GPS 7117, a position sensor 7113 to 7115) included in the external device from the external device.

According to various embodiments, the augmented reality device 10 may obtain a sensor value in operation 7003, and determine whether a control intention occurs in operation 7005. For example, while providing navigation content, the augmented reality device 10 (e.g., the selection providing module 7125) may obtain information on a direction (e.g., a gaze direction or a head direction) of the user based on the sensor 7110 (e.g., the eye position sensor 7113, the head position sensor 7115), and determine whether a control intention is based on the information on the direction of the user. The control intention may mean an intention to take other behaviors other than driving, such as an intention to operate a device in the transportation means and/or to confirm an external situation. For example, as shown in FIGS. 72 to 73, when a direction of the user is identified in a direction other than the front, the augmented reality device 10 may determine that the control intention is present. The augmented reality device 10 (e.g., the selection providing module 7125) may provide an interface for manipulating electronic components based on the manipulation interface providing module 7121, and/or provide navigation content based on the navigation providing module 7123, according to whether the control intention is present. On the other hand, the control intention may be determined based on information on a direction of the user separately disposed in the transportation means based on a photographing of the user through an external device (e.g., a camera of the mounted user terminal 300 and/or a camera of the transportation means itself), without being limited to the information on the direction of the user.

According to various embodiments, the augmented reality device 10 may determine whether an event occurs in operation 7007 when the control intention is not present (7005—n), provide event information in operation 7009 when the event occurs (7007—y), and maintain the provision of navigation content when the event does not occur (7007—n). For example, the event is an event that requires a convenience function during driving, and may include a tunnel entry event, an event associated with an external weather, etc. While providing the navigation content, the augmented reality device 10 may provide at least one graphic object for performing a function corresponding to the event along with the navigation content, when the occurrence is identified based on information acquired through the sensor 7110. For example, when the event is a tunnel entry event, a graphic object for controlling the electronic components of the transportation means for external air blocking may be provided. In addition, for example, when the event is an event associated with external weather, an object for controlling the electronic components for adjusting temperature or humidity may be provided. According to the provision of the object, the augmented reality device 10 may transmit a signal for controlling the electronic components to the augmented reality device 10 based on receiving an input (e.g., gesture input, voice input) from the user.

According to various embodiments, the augmented reality device 10 may determine whether the manipulation target is recognized in operation 7011 when there is the control intention (7005—y), and provide the manipulation content in operation 7013 when the manipulation target is recognized (7011—y). For example, when the user's gaze direction is identified in a direction other than the front (i.e., when it is determined that there is a control intention), the augmented reality device 10 may stop providing the navigation content and provide at least one graphic object for controlling at least one electronic component in the transportation means, as illustrated in FIGS. 72 to 73. For example, when the user's direction is directed downwardly rather than the front, it is determined that there is the manipulation intention, and at least one graphic object for controlling at least one electronic component in the transportation means may be provided.

In an embodiment, as illustrated in FIG. 72, the augmented reality device 10 may recognize the target (e.g., the temperature adjusting device 7220) to be manipulated by the user using the sensor 7110 (e.g., the front camera 7111, the eye position sensor 7113), and provide at least one graphic object 7230 for controlling the recognized target. For example, among the images of the front camera 7111 of the augmented reality device 10, the target corresponding to the gaze direction acquired by the eye position sensor 732 may be recognized. In this case, the artificial intelligence model trained to output the information on the manipulation target based on the input of the image and the information on the gaze direction may be used, but is not limited to the described example. The augmented reality device 10 may transmit a control signal to the transportation means based on the user's input (e.g., the temperature increase input) acquired based on the at least one graphic object 7230 to control the electronic component. The augmented reality device 10 may provide the navigation content when the user's direction is directed again in the front direction.

In another embodiment, as illustrated in FIG. 73, the augmented reality device 10 may provide a list 7330 including the manipulatable targets. The augmented reality device 10 may be implemented to receive a user input for selecting the manipulation target from the list 7330, and provide at least one graphic object 7230 for controlling the recognized target based thereon.

According to various embodiments, the augmented reality device 10 may recognize a monitoring target in operation 7015—n when the manipulation target is not recognized, and provide a vehicle image in operation 7017 when the monitoring target is recognized. For example, when the user's direction is identified as a side (e.g., left and right), the augmented reality device 10 may stop providing navigation content and provide an image captured by the transportation means, as shown in FIG. 73. For example, referring to FIG. 73, when the user's direction is the first ROI 7310, an interface for manipulation may be provided as described above, but when the user's direction is the second ROI 7320, the augmented reality device 10 may be implemented to provide a camera image. The augmented reality device 10 may provide the camera image received based on the request for the camera image to the user to recognize the surrounding situation during driving.

5.2.1.2. External Image Provision

Figure 74:
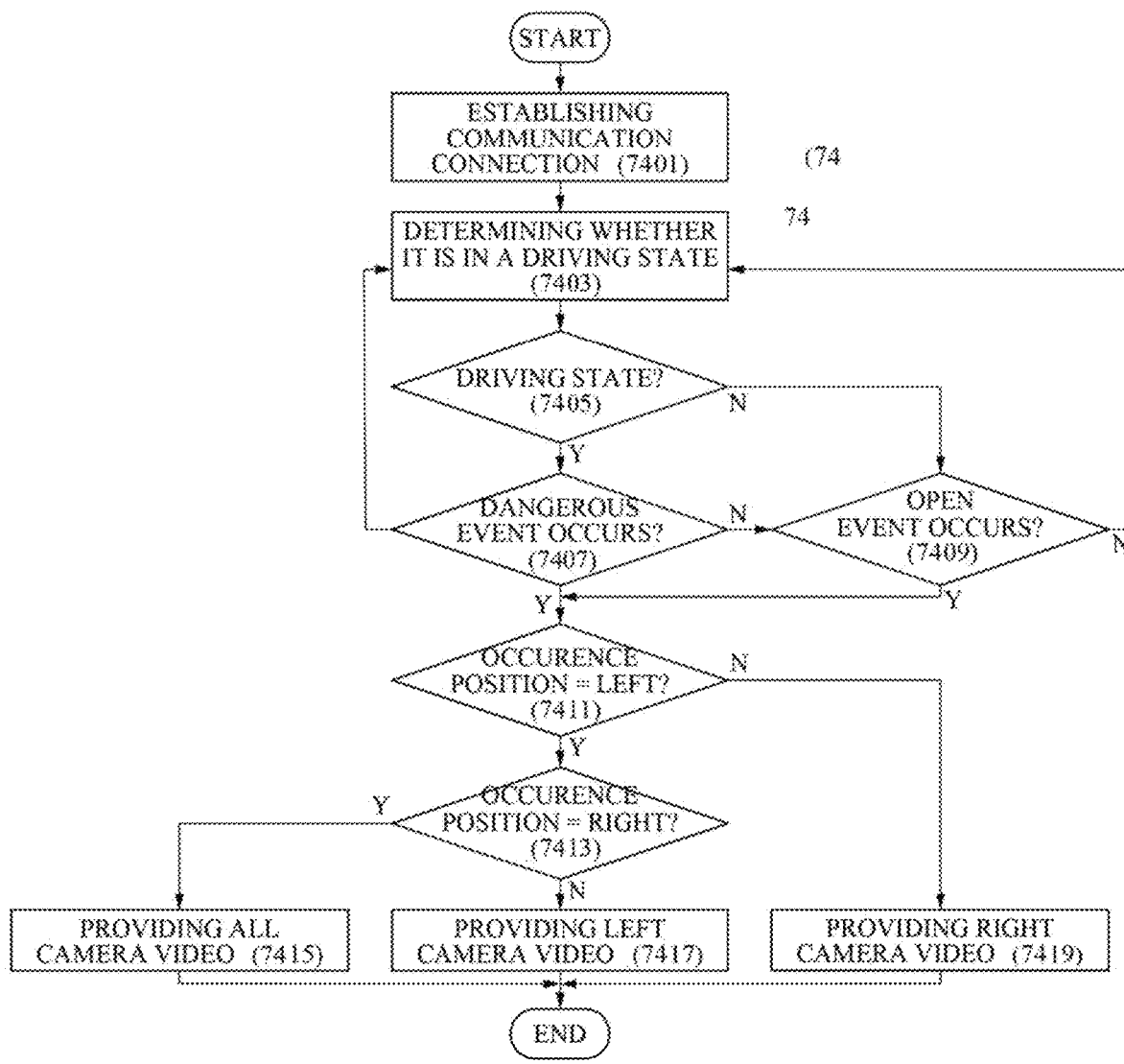
FIG. 74 is a flowchart illustrating an example of an operation of the augmented reality device that provides an image captured by an external camera of a transportation means according to various embodiments.

FIG. 74 is a flowchart illustrating an example of an operation of the augmented reality device 10 that provides an image captured by an external camera of a transportation means according to various embodiments. Operations may be performed in an order different from the illustrated and/or described order, additional operations may be performed, and/or some of the operations may not be performed. FIG. 75 is a diagram for describing an operation for providing an image around a transportation means according to various embodiments.

Hereinafter, FIG. 74 will be further described with reference to FIG. 75.

According to various embodiments, the augmented reality device 10 may establish a communication connection with a transportation means (e.g., a vehicle) in operation 7401.

According to various embodiments, the augmented reality device 10 may determine a driving state in operation 7403, determine whether it is in a driving state in operation 7405, and determine whether a dangerous event occurs in operation 7407 when it is in a driving state (7405—y). For example, the augmented reality device 10 may identify whether a dangerous event occurs when it is determined to be driving based on information (e.g., an image) received from the sensor 7110 and/or the transportation means (e.g., a vehicle). The dangerous event means an event that is highly likely to cause a danger during driving, and may include an event where another transportation means enters within a pre-set distance from the transportation means, an event where the transportation means moves to another lane, an event where the transportation means moves backward, etc.

According to various embodiments, the augmented reality device 10 may determine a driving state in operation 7403, and when it is not in a driving state (7405—y), determine whether an open event occurs in operation 7407. The open event may mean an event where a door provided in the transportation means is open.

According to various embodiments, the augmented reality device 10 may determine whether an event (e.g., a dangerous event or an open event) occurs in operation 7411 when it is left, determine whether the occurrence position is right in operation 7413 when it is left, provide all camera images in operation 7415 when it is right, provide left camera images in operation 7417 when it is not right, and provide right camera images in operation 7419—n when it is not left. For example, as illustrated in 7500a of FIG. 75, when the right door is opened while the vehicle is stopped (i.e., when the open event occurs at the right), the augmented reality apparatus 10 may provide an image captured by the right camera of the vehicle. As also shown in 7500b of FIG. 75, the augmented reality apparatus 10 implemented as an installation type may also provide the camera image 7520 by performing the above-described operation.

5.2.1.3. Other Operation

Figure 76:
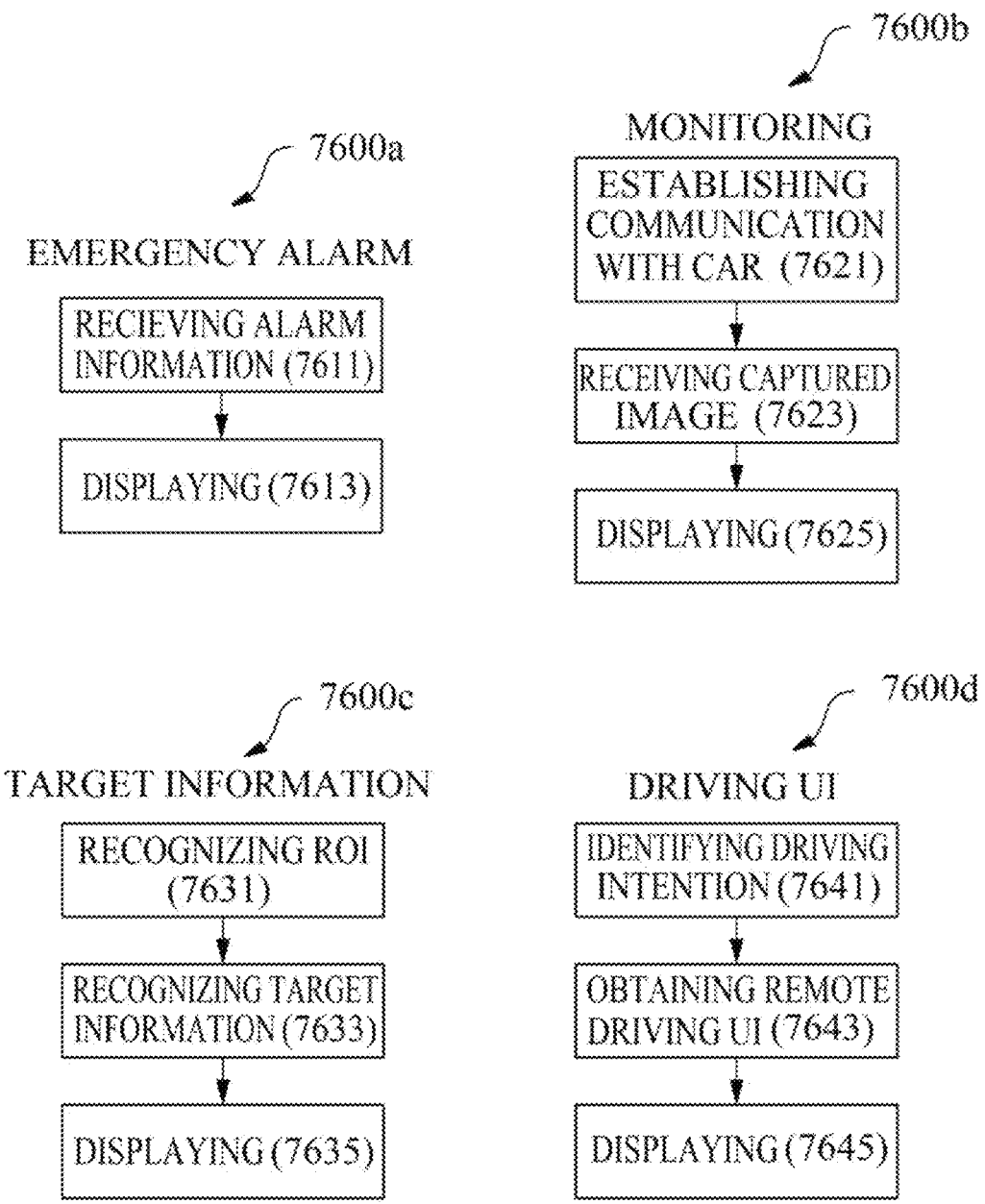
FIG. 76 is a flowchart illustrating an example of an operation of the augmented reality apparatus for providing various convenience services related to the vehicle according to various embodiments.
Figure 77:
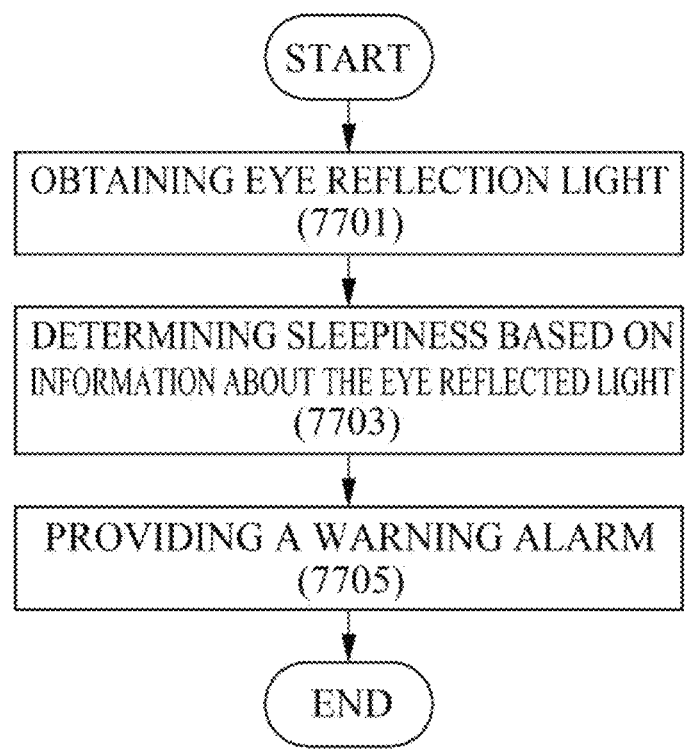
FIG. 77 is a flowchart illustrating an example of an operation of the augmented reality apparatus that provides an alarm in a drowsiness situation of a driver in the vehicle according to various embodiments.

FIG. 76 is a flowchart illustrating an example of an operation of the augmented reality apparatus 10 for providing various convenience services related to the vehicle according to various embodiments. FIG. 77 is a flowchart illustrating an example of an operation of the augmented reality apparatus 10 that provides an alarm in a drowsiness situation of a driver in the vehicle according to various embodiments. Operations may be performed in an order different from the illustrated and/or written order, additional operations may be performed, and/or some of the operations may not be performed.

According to various embodiments, the augmented reality apparatus 10 may acquire and provide an emergency alarm message (e.g., disaster alarm message) provided to the vehicle. For example, referring to 7600a of FIG. 76, the augmented reality apparatus 10 may receive alarm information in operation 7611 and display the alarm information received in operation 7613.

According to various embodiments, the augmented reality apparatus 10 may provide a captured image around the vehicle based on a request from the vehicle. For example, referring to 7600b of FIG. 76, the augmented reality apparatus 10 may set a communication connection with the vehicle in operation 7621, receive an image captured by the camera of the vehicle in operation 7623, and display the image in operation 7625.

According to various embodiments, the augmented reality apparatus 10 may provide information about a target by the driver. For example, referring to 7600c of FIG. 76, the augmented reality apparatus 10 may recognize a user ROI (e.g., an object of interest corresponding to the user gaze) in operation 7631, identify target information received from an external device (e.g., the server 20 and the user terminal 30) in operation 7633, and display the target information in operation 7635.

According to various embodiments, the augmented reality apparatus 10 may provide a service for remote driving. For example, referring to 7600d of FIG. 76, the augmented reality apparatus 10 may identify driving intention in operation 7641, acquire and provide a UI for remote driving in operation 7643 and display the UI in operation 7645 when a request for remote driving is acquired based on the identification operation.

According to various embodiments, the augmented reality apparatus 10 may determine a drowsiness state of a driver and provide a warning alarm. For example, referring to FIG. 77, the augmented reality apparatus 10 may acquire eye reflected light in operation 7701. The augmented reality apparatus 10 may acquire gaze information based on the above-described gaze information acquisition structure, and detailed descriptions are omitted. The augmented reality apparatus 10 may determine sleepiness based on information about the eye reflected light in operation 7703. For example, the sleepiness may be determined based on the pattern of the reflected light identified based on the gaze information. For example, when the reflected light is not acquired for more than a preset time, the driver may be determined to be in a sleepiness state. In operation 7705, the augmented reality device 10 may provide a warning alarm when the driver is in a sleepiness state. For example, the augmented reality device 10 may provide sound using a speaker provided in the augmented reality device 10 and/or may provide vibration using a vibration device. In addition, for example, the augmented reality device 10 may provide a warning alarm using an electronic device (e.g., a speaker) in the transportation means based on setting a communication connection with the transportation means.

5.2.1.4 Remote Parking Function

Figure 78:
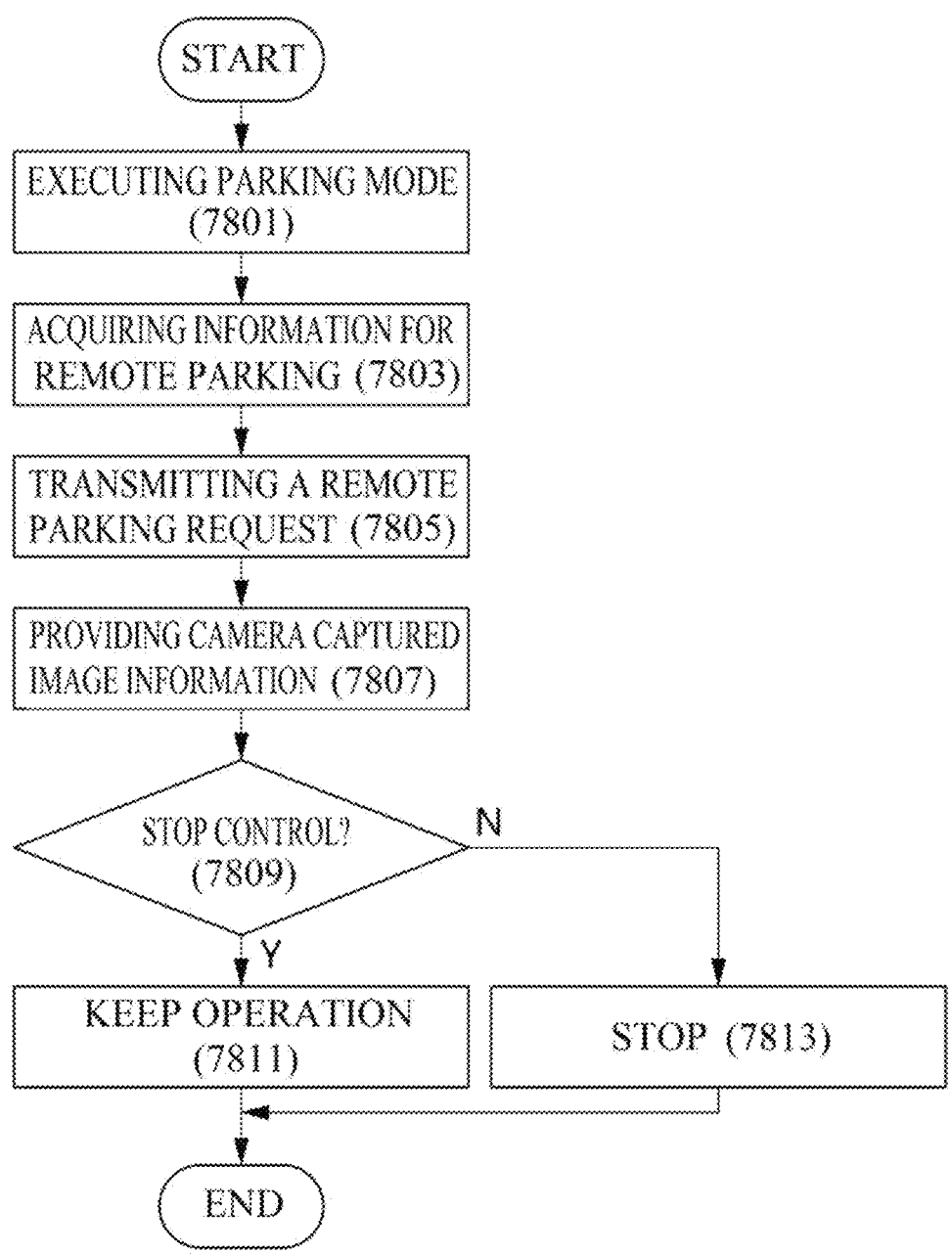
FIG. 78 is a flowchart illustrating an example of an operation of the augmented reality device 10 for providing a remote parking service according to various embodiments.

FIG. 78 is a flowchart illustrating an example of an operation of the augmented reality device 10 for providing a remote parking service according to various embodiments. Operations may be performed in an order different from the illustrated and/or written order, additional operations may be performed, and/or some of the operations may not be performed.

Figure 79:
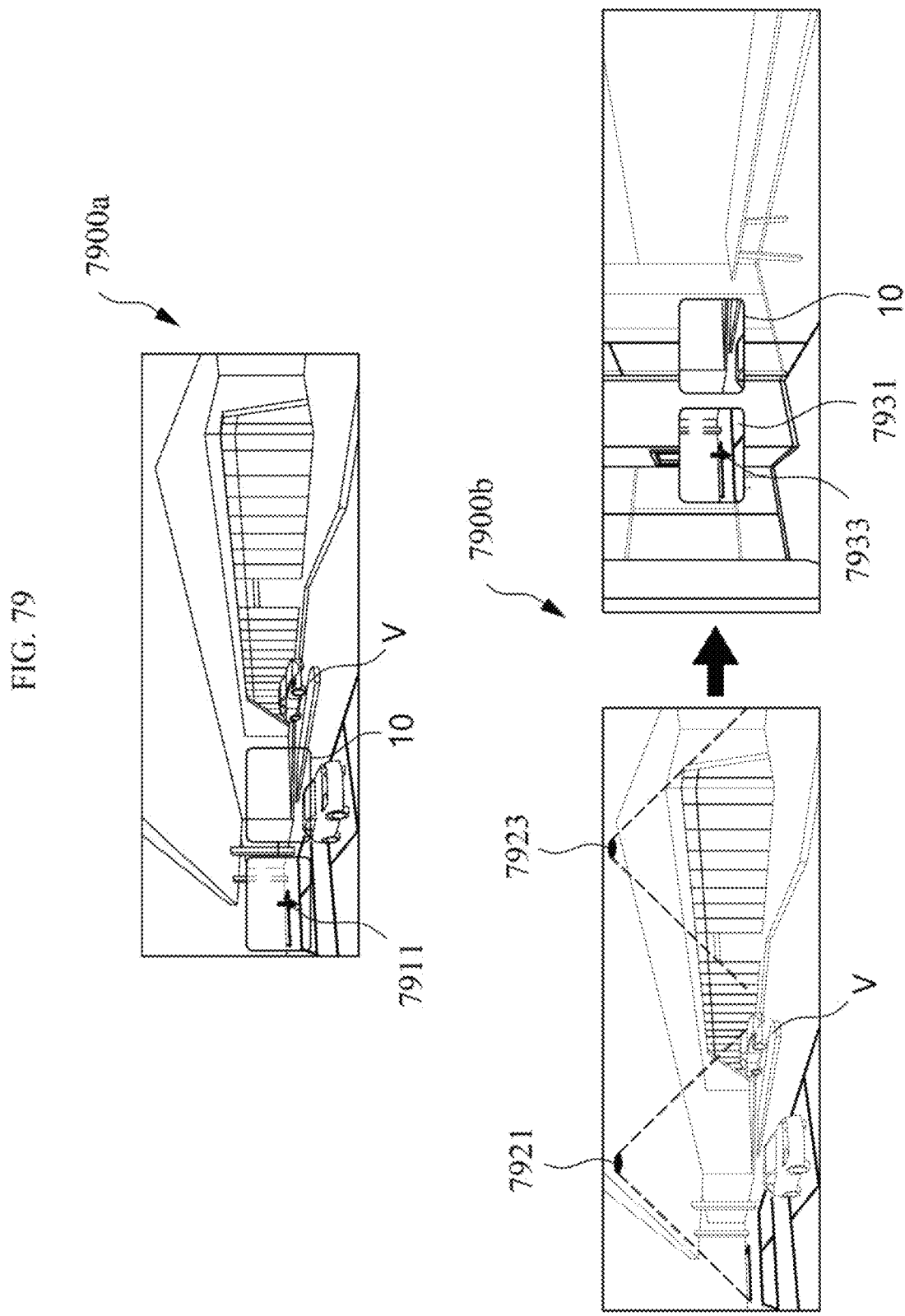
FIG. 79 is a diagram for explaining an example of providing a remote parking service according to various embodiments.

FIG. 79 is a diagram for explaining an example of providing a remote parking service according to various embodiments.

According to various embodiments, the augmented reality device 10 may execute a parking mode in operation 7801, acquire information for remote parking in operation 7803, and transmit a remote parking request in operation 7805. For example, while setting a communication connection with the transportation means, the augmented reality device 10 may execute a parking mode for remote parking based on a user input. The augmented reality device 10 may acquire information for remote parking from the user based on the execution of the parking mode. The information for remote parking may include at least one of information on a location at which the transportation means (e.g., a vehicle) is to be parked, or parking types (e.g., rear parking, front parking). Referring to 7900*a* of FIG. 79, the augmented reality device 10 may acquire information on a parking location 7911 selected by a user input from among spaces in front of the augmented reality device 10. Alternatively, referring to 7900*b* of FIG. 79, the augmented reality device 10 may acquire information on a parking location 7933 selected by a user input from the image 7931 based on providing an image 7931 photographed by at least one camera 7921 and 7923 disposed in a parking lot. The augmented reality device 10 may directly transmit the acquired information for remote parking, transmit the acquired information to the vehicle V, and/or transmit the acquired information to the server 20. The vehicle V may perform a remote parking operation based on the information for remote parking.

According to various embodiments, the augmented reality device 10 may provide camera captured image information in operation 7807, determine whether stop control is received in operation 7809, and stop the execution of remote parking of the vehicle V if stop control is not received in operation 7809—y, and maintain the execution of remote parking of the vehicle V if stop control is not received in operation 7809—n. For example, the augmented reality device 10 may receive and provide the image captured by the camera of the vehicle V and/or the image captured by at least one camera 7921 and 7923 disposed in the parking lot to the user to provide the process of performing the remote parking operation. In this case, the execution of the remote parking operation may be stopped based on the user's input.

5.2.1.5 Lamp Direction Control Function

Figure 80:
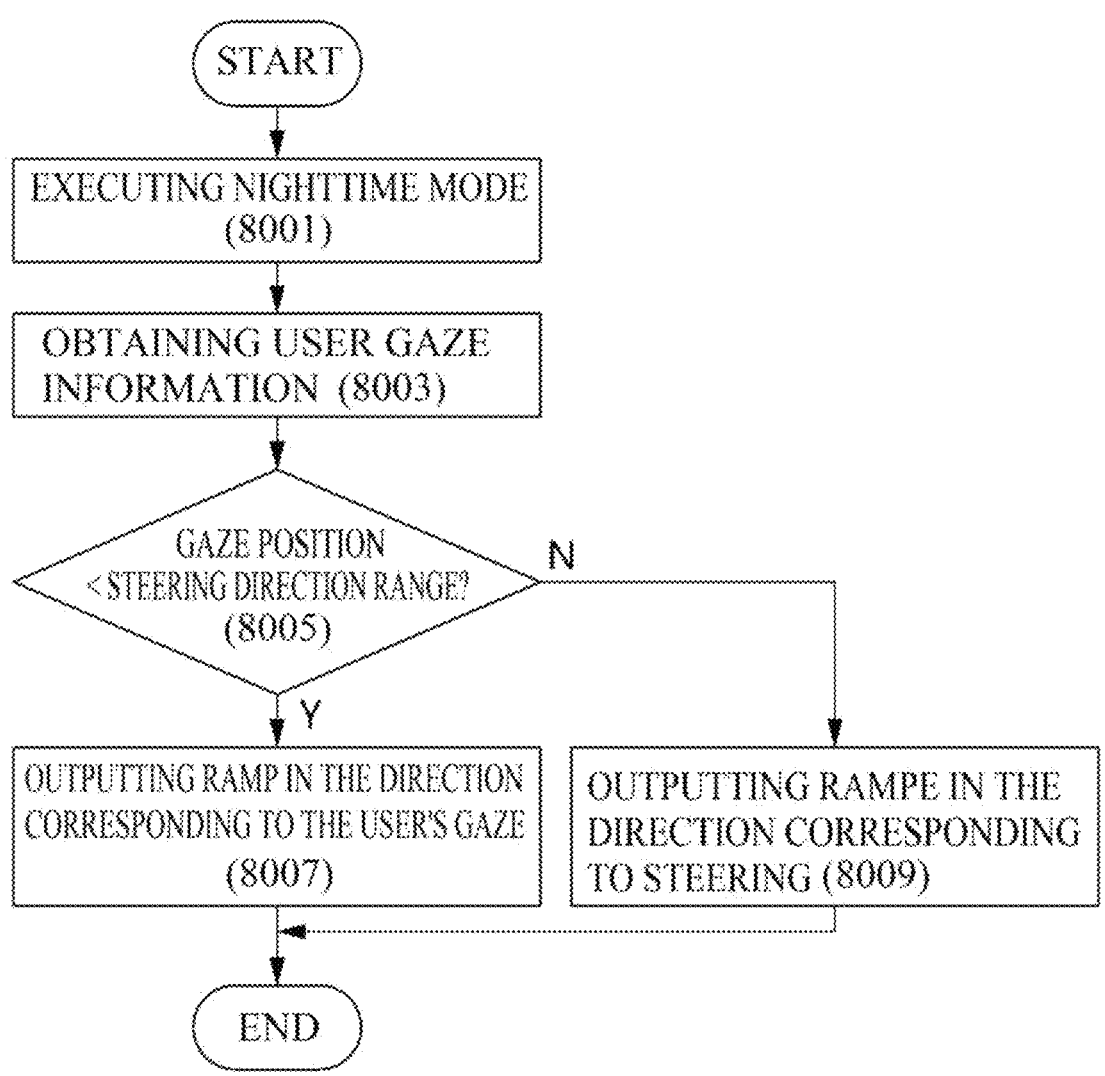
FIG. 80 is a flowchart illustrating an example of the operation of the augmented reality device 10 to provide a lamp direction control function according to various embodiments.

FIG. 80 is a flowchart illustrating an example of the operation of the augmented reality device 10 to provide a lamp direction control function according to various embodiments. Operations may be performed in an order different from the illustrated and/or written order, additional operations may be performed, and/or some of the operations may not be performed.

Figure 81:
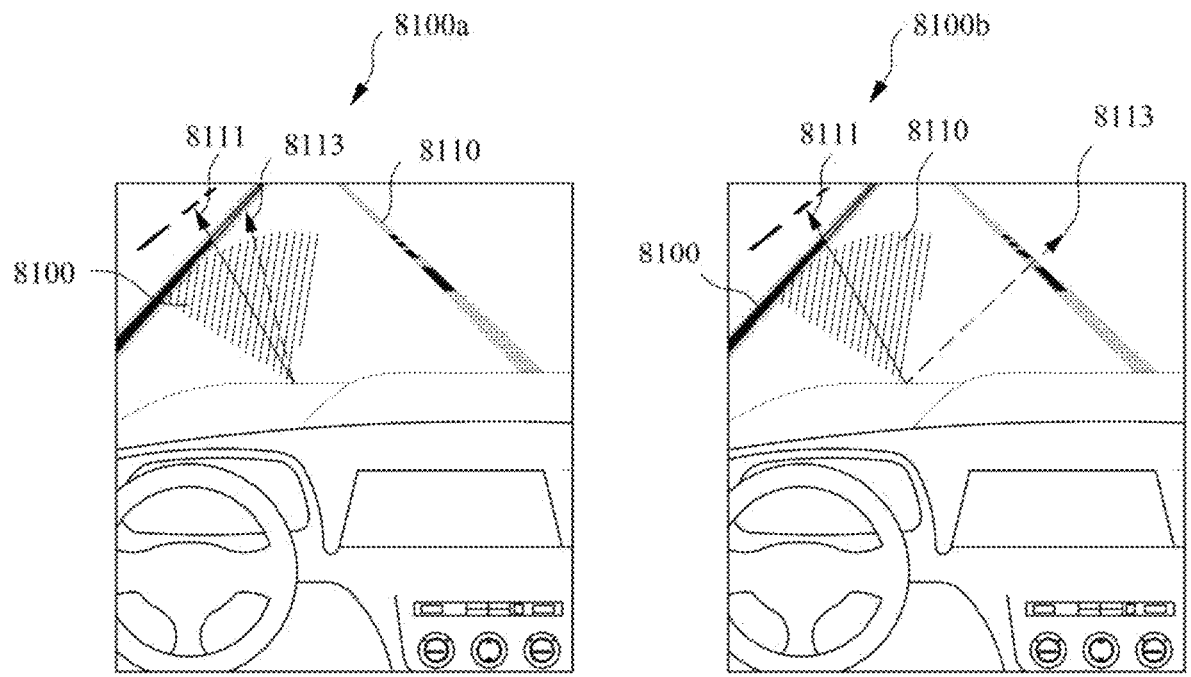
FIG. 81 is a diagram for describing an example of a lamp direction control function according to various embodiments.

FIG. 81 is a diagram for describing an example of a lamp direction control function according to various embodiments.

According to various embodiments, the augmented reality device 10 may execute the nighttime mode in operation 8001 and obtain user gaze information in operation 8003. For example, the augmented reality device 10 may execute a night mode if it is identified in night based on an illuminance value identified using an illuminance sensor while setting a communication connection with a vehicle. The nighttime mode may be defined as a mode for providing convenience services during nighttime while driving along the lane 8110. The augmented reality device 10 may acquire the user's gaze information by using the transmitted gaze information acquisition structure based on the nighttime mode execution.

According to various embodiments, the augmented reality device 10 may determine whether the user's gaze position is within the range of the steering direction in operation 8005, and control the lamp of the transportation means to be output in the direction corresponding to the user's gaze in operation 8007 when it is within the range (8005—y), and control the lamp of the transportation means to be output in the direction of the steering in operation 3407 when it is not within the range (8005—n). For example, the augmented reality device 10 may determine whether the direction 8113 of the gaze identified based on the gaze information is included within a specific range 8100 determined based on the direction 8111 of the steering identified based on the information received from the transportation means (or the direction of the driving of the transportation means). As illustrated in 8100*a* of FIG. 81, when the direction of the gaze 8113 is included within the specific range 8100, the augmented reality apparatus 10 may provide a signal for controlling the direction of the lamp of the transportation means in the direction corresponding to the direction of the gaze 8113 as the transportation means. In other words, when the direction of steering (or the direction of driving of the vehicle) is similar to the direction of gaze, the direction of the lamp of the vehicle may be determined based on the direction of gaze. As illustrated in 8100*b* of FIG. 81, when the direction 8113 of the gaze is formed outside the specific range 8100, the augmented reality device 10 may provide a signal for controlling the direction of the lamp of the transportation means in a direction corresponding to the direction of the steering (or the direction of the driving of the vehicle) as the transportation means. In other words, when the direction of the steering (or the direction of driving of the vehicle) and the direction of sight are significantly different, the direction of the lamp may be determined as the direction of the steering for driving stability.

5.2.1.6 Black Box Image Providing Function

Figure 82:
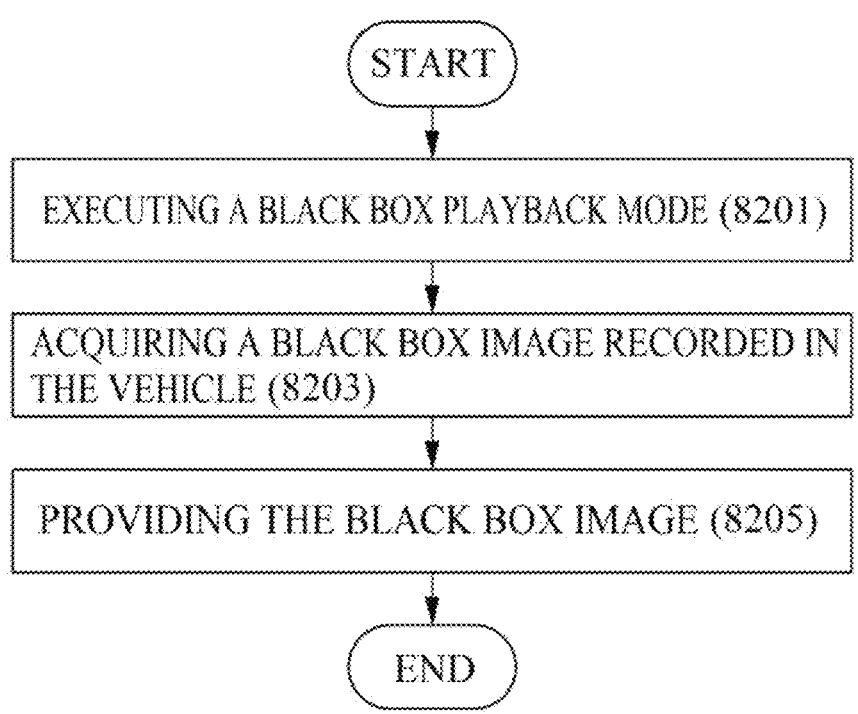
FIG. 82 is a flowchart illustrating an example of an operation of an augmented reality device for setting a communication connection with an external device based on eye tracking of a user, according to various embodiments.

FIG. 82 is a flowchart illustrating an example of an operation of an augmented reality device 10 for setting a communication connection with an external device based on eye tracking of a user, according to various embodiments. Operations may be performed in an order different from the illustrated and/or written order, additional operations may be performed, and/or some of the operations may not be performed.

According to various embodiments, the augmented reality device 10 may execute a black box playback mode in operation 8201, acquire a black box image recorded in the vehicle in operation 8203 and provide the black box image in operation 8205. In this case, the augmented reality device 10 may provide and share the received black box image with another augmented reality device 10.

5.3. Special Function
5.3.1 Medical Function
5.3.1.1. Eye Inspection Function

Figure 83:
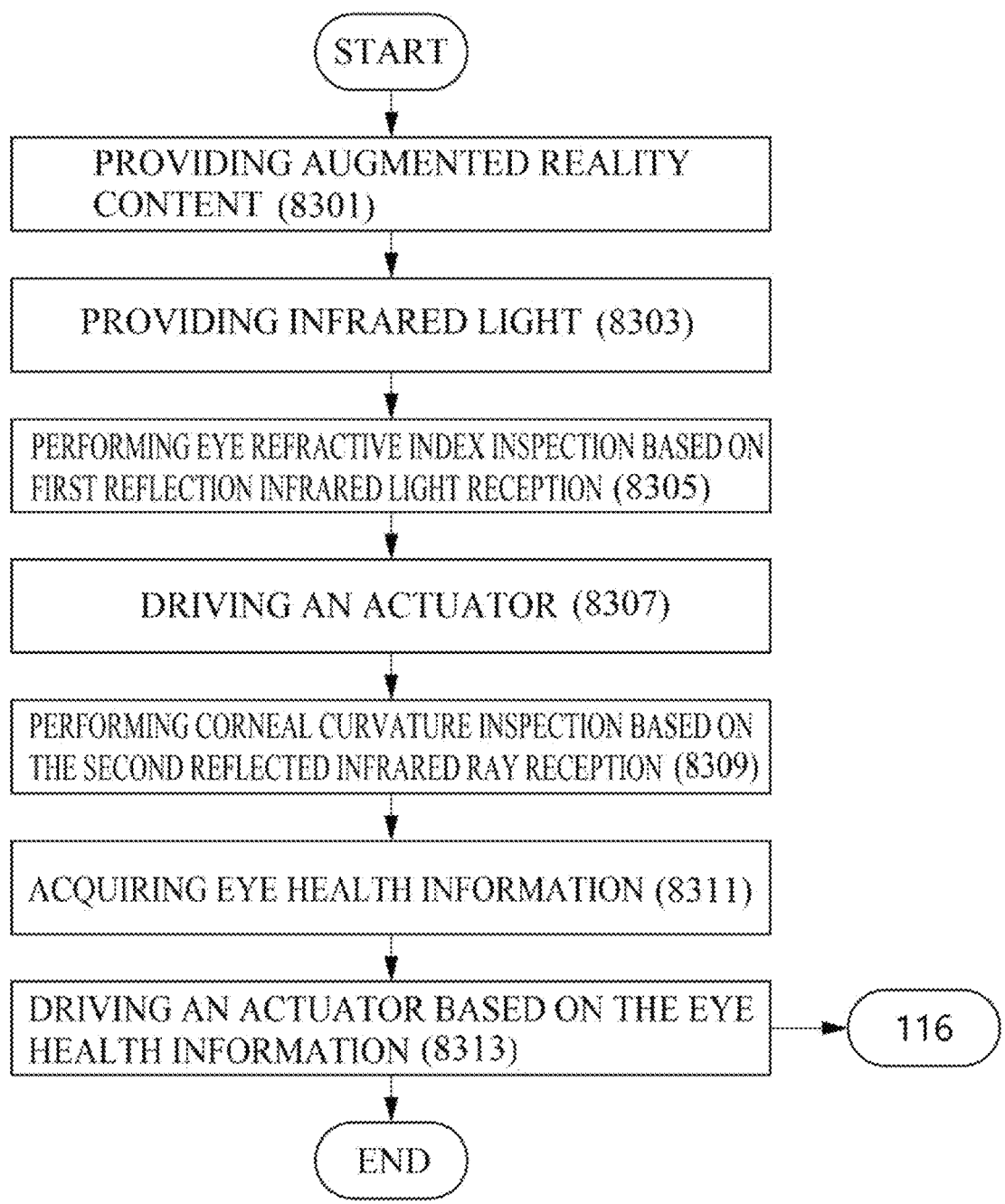
FIG. 83 is a flowchart illustrating an example of an operation of an augmented reality device 10 for obtaining eye health information, according to various embodiments.

FIG. 83 is a flowchart illustrating an example of an operation of an augmented reality device 10 for obtaining eye health information, according to various embodiments. Operations may be performed in an order different from the illustrated and/or written order, additional operations may be performed, and/or some of the operations may not be performed.

Figure 84:
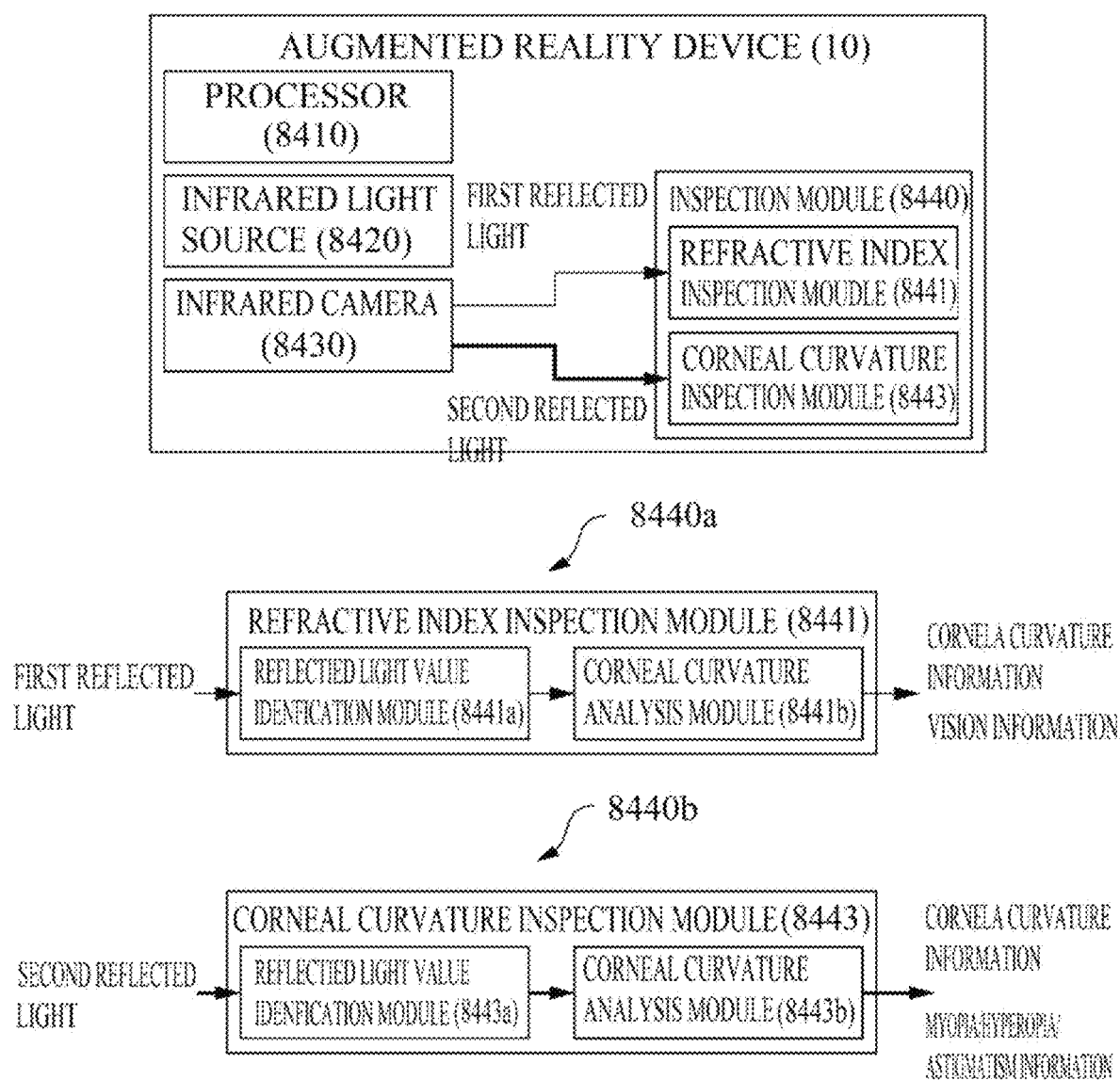
FIG. 84 is a diagram illustrating an example of a module for inspecting refractive power and curvature for obtaining eye health information, according to various embodiments.
Figure 85:
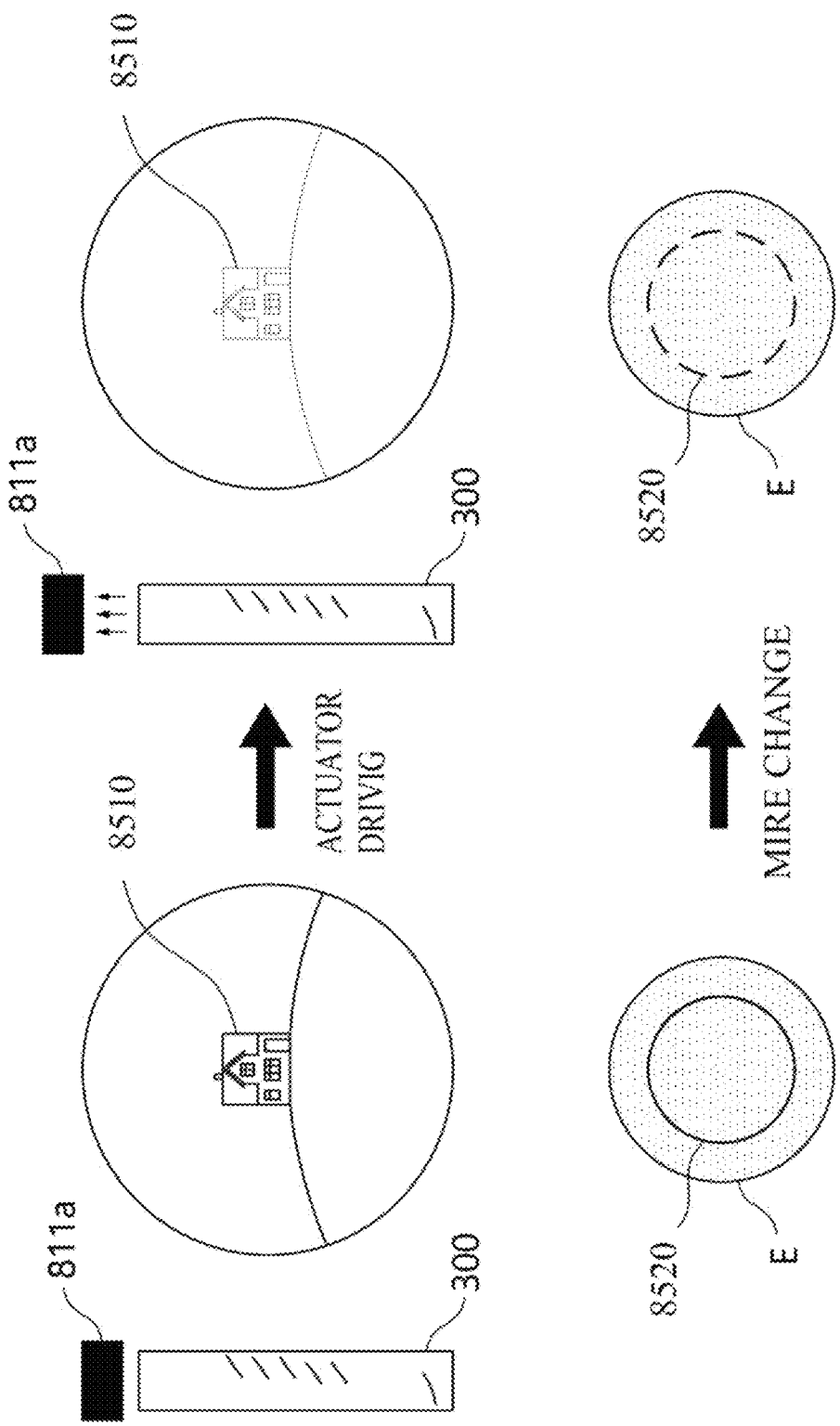
FIG. 85 is a diagram illustrating an example of curvature inspection, according to various embodiments.

FIG. 84 is a diagram illustrating an example of a module for inspecting refractive power and curvature for obtaining eye health information, according to various embodiments. FIG. 85 is a diagram illustrating an example of curvature inspection, according to various embodiments.

According to various embodiments, the augmented reality device 10 may provide augmented reality content in operation 8301 and provide infrared light in operation 8303. For example, referring to FIG. 84, the augmented reality device 10 may further include an infrared light source 8530 for obtaining eye health information, an infrared camera 8540, and an inspection module 8550. The infrared light source 8530 may be provided to the eye of the user, and the infrared camera 8540 may be implemented to acquire reflected light output from the eye E of the user. Since the implementation of the infrared light source 8530 and the infrared camera 8540 may be implemented in the same manner as the above-described eye information acquisition structure, redundant descriptions will be omitted. Accordingly, as illustrated in FIG. 85, the augmented reality device 10 (e.g., the processor 8410) may provide augmented reality content 8510 for eye inspection using the display 811a while simultaneously providing the augmented reality content 8510 for eye inspection using the infrared light source 8530 to the eye of the user.

According to various embodiments, the augmented reality device 10 may perform eye refractive power inspection based on first reflection infrared light reception in operation 8305. For example, the augmented reality device 10 may acquire reflected light 8520 reflected from the eye of the user using the infrared camera while the position of the display 811a for providing the augmented reality content 8510 for eye inspection is the first position. As illustrated in 8400a of FIG. 84, the reflected light value identification module 8551a, and the refractive index analysis module 8551b may be implemented to inspect the refractive index of the eye E of the user based on the identified value. In this case, the refractive index analysis module 1851 b may be an artificial intelligence model trained to output the refractive index of the eye when the reflected light value is input, but is not limited to the described example.

According to various embodiments, the augmented reality device 10 may drive an actuator in operation 8307 and perform corneal curvature inspection based on the second reflected infrared ray reception in operation 8309. For example, referring to FIG. 85, when the augmented reality device 10 moves the position of the display 811a using an actuator (not shown) after the refractive index of the eye E is identified, the user's eye E may react (e.g., the thickness of the lens changed) to recognize the augmented reality content 8510. While the position of the display 811a is the second position, the augmented reality device 10 may acquire the reflected light 8520 reflected from the user's eye E using the infrared camera. As shown in 8400b of FIG. 84, the reflected light value identification module 8553a of the augmented reality device 10 may identify the value of the reflected light 8520, and the curvature analysis module 8553b may inspect the curvature of the user's eye E based on the identified value. In this case, the curvature analysis module 1853b may be an artificial intelligence model trained to output the curvature of the eye when the reflected light value is input, but is not limited to the above-described example.

According to various embodiments, the augmented reality device 10 may acquire eye health information in operation 8311. For example, the eye health information may include information about vision and/or information about myopia/hyperopia/astigmatism. For example, the augmented reality device 10 may identify the user's vision based on the refractive index of the identified eye E, and acquire information about the user's myopia/hyperopia/astigmatism.

According to various embodiments, the augmented reality device 10 may drive an actuator based on the eye health information in operation 833. A detailed example of operation 8313 will be described below with reference to FIGS. 86 to 87.

5.3.1.2. Vision Correction Function Based on Eyeball Inspection

Figure 86:
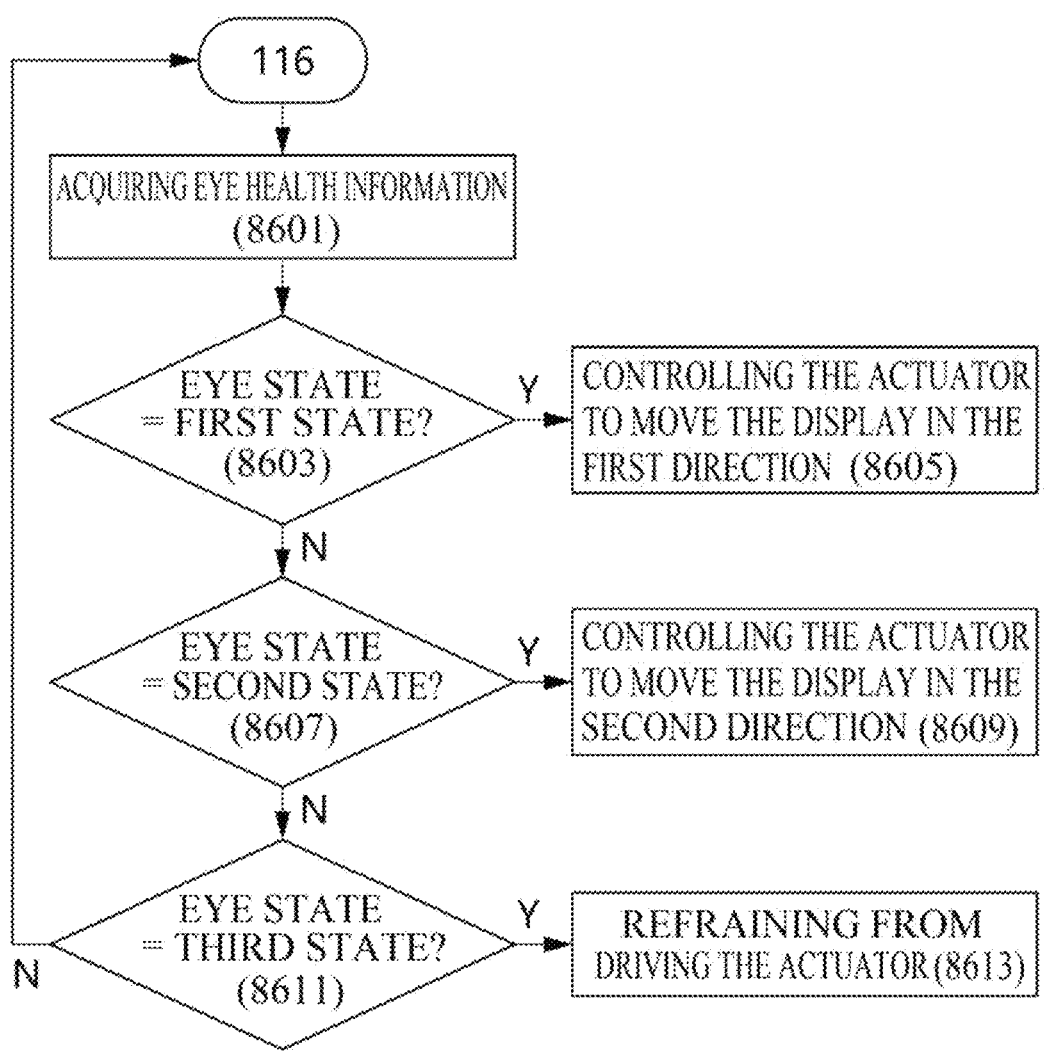
FIG. 86 is a flowchart illustrating an example of an operation of the augmented reality device that provides a vision correction function based on eyeball inspection according to various embodiments.

FIG. 86 is a flowchart illustrating an example of an operation of the augmented reality device 10 that provides a vision correction function based on eyeball inspection according to various embodiments. Operations may be performed in an order different from the illustrated and/or described orders, additional operations may be performed, and/or some of the operations may not be performed.

Figure 87:
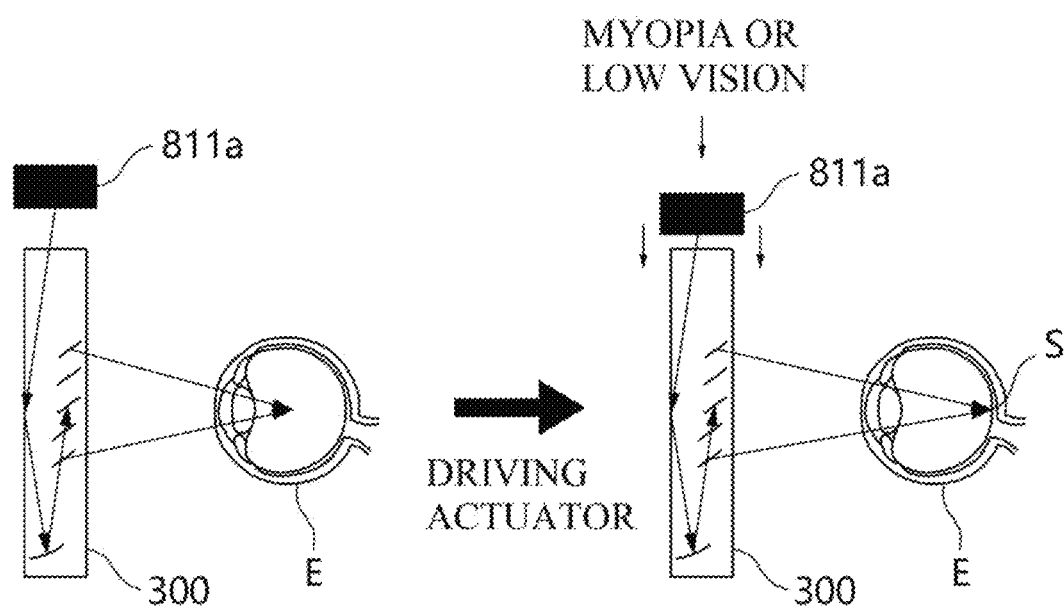
FIG. 87 is a diagram for describing an example of a module for inspecting refractive power and curvature in order to acquire eye health information according to various embodiments.

FIG. 87 is a diagram for describing an example of a module for inspecting refractive power and curvature in order to acquire eye health information according to various embodiments.

According to various embodiments, the augmented reality device 10 may acquire eye health information in operation 8601. The eye health information may be acquired based on the refractive index of the eye and/or the curvature of the eye based on the gaze information acquisition structure as described above, and thus redundant descriptions will be omitted.

According to various embodiments, the augmented reality device 10 may determine whether the state of the eye is first state (e.g., myopia) in operation 8603 and control the actuator to move the display in the first direction in operation 8605 when the state of the eye is myopia (8603—y). For example, referring to FIG. 76, when the user's eye E is myopia, the image light provided from the display 811a is focused at a position closer to the retina of the user's eye E, so that the visibility of the augmented reality content may be significant. Accordingly, the augmented reality device 10 may control the display 811a to be moved vertically downward by using the actuator so that the focus of the image light is formed on the retina of the eye E. The movement distance may be determined based on vision.

According to various embodiments, the augmented reality device 10 may determine whether the state of the eye is second state (e.g., hyperopia) in operation 8607 when it is not myopia (8603—n), and control the actuator so that the display is moved in the second direction in operation 8609 when the state of the eye is hyperopia (8607—y). For example, when the user's eye E is raw, the image light provided from the display 811a is focused at a position farther from the retina of the user's eye E, so that the visibility of the augmented reality content may be significant. Accordingly, the augmented reality device 10 may control the display 811a to be moved vertically upward by using the actuator so that the focus of the image light is formed on the retina of the eye E. The movement distance may be determined based on vision.

According to various embodiments, the augmented reality device 10 may determine whether the state of the eye is third state (e.g., regular) in operation 8611 when it is not hyperopia (8607—n), and refrain from driving the actuator in operation 8613 when the state of the eye is regular (8611—y).

5.3.1.3. Disease Information Provision Based on Ocular Examination

Figure 88:
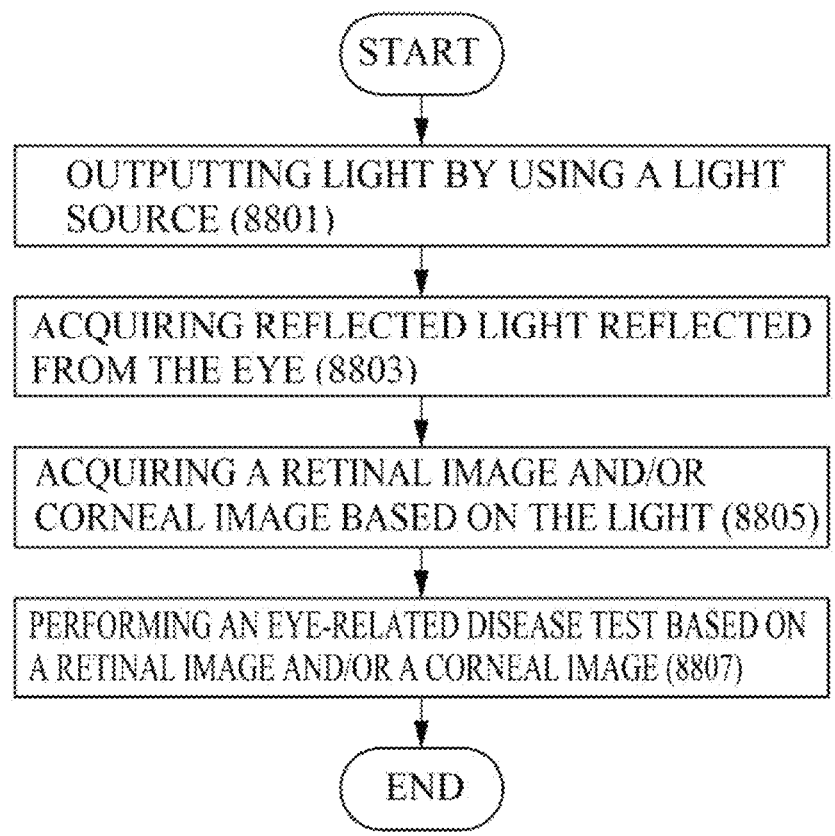
FIG. 88 is a flowchart illustrating an example of an operation of the augmented reality device for providing disease information based on ocular examination, according to various embodiments.

FIG. 88 is a flowchart illustrating an example of an operation of the augmented reality device 10 for providing disease information based on ocular examination, according to various embodiments. Operations may be performed in an order different from the illustrated and/or described orders, additional operations may be performed, and/or some of the operations may not be performed.

Figure 89:
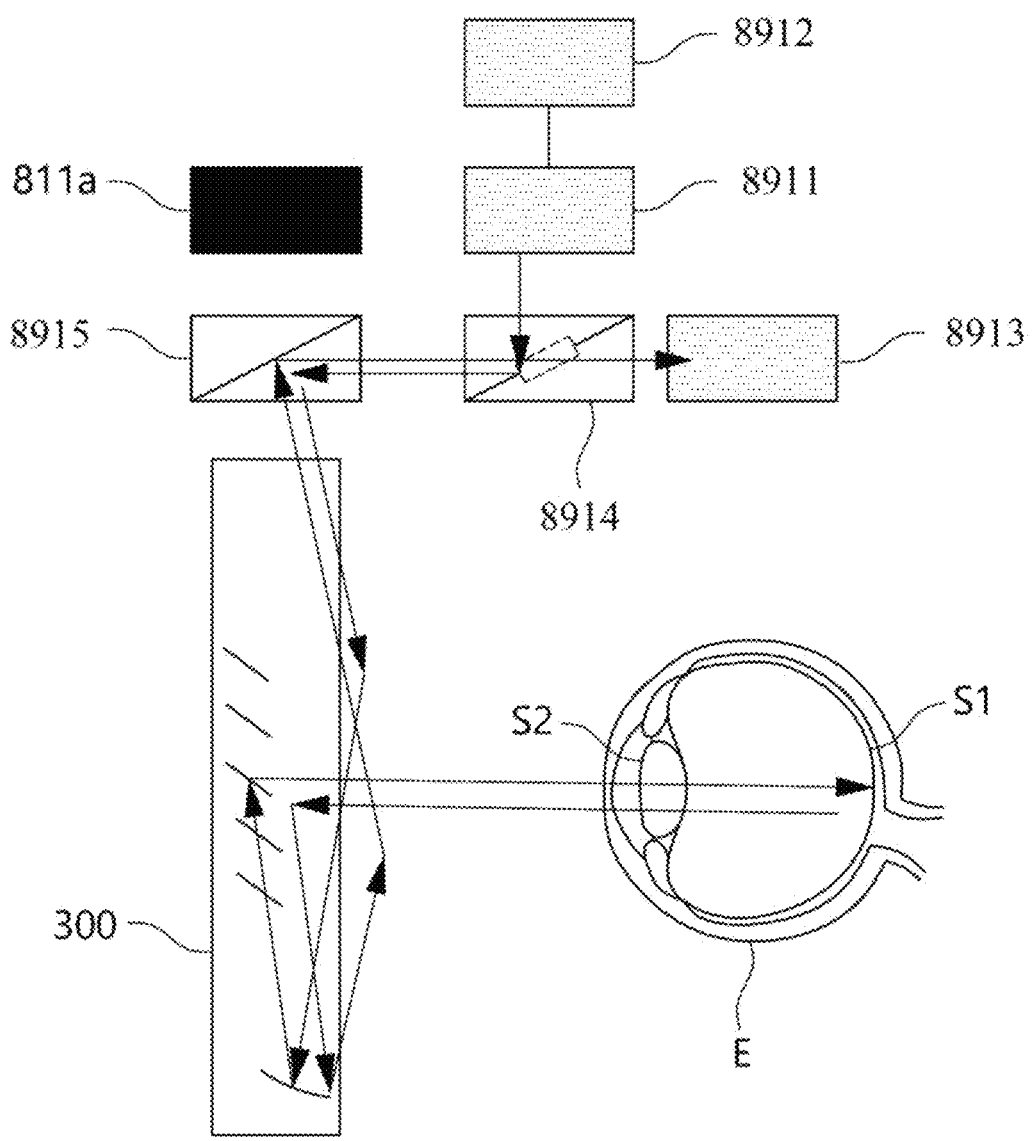
FIG. 89 is a diagram for describing an example of a structure for corneal examination and retinal examination, according to various embodiments.
Figure 90:
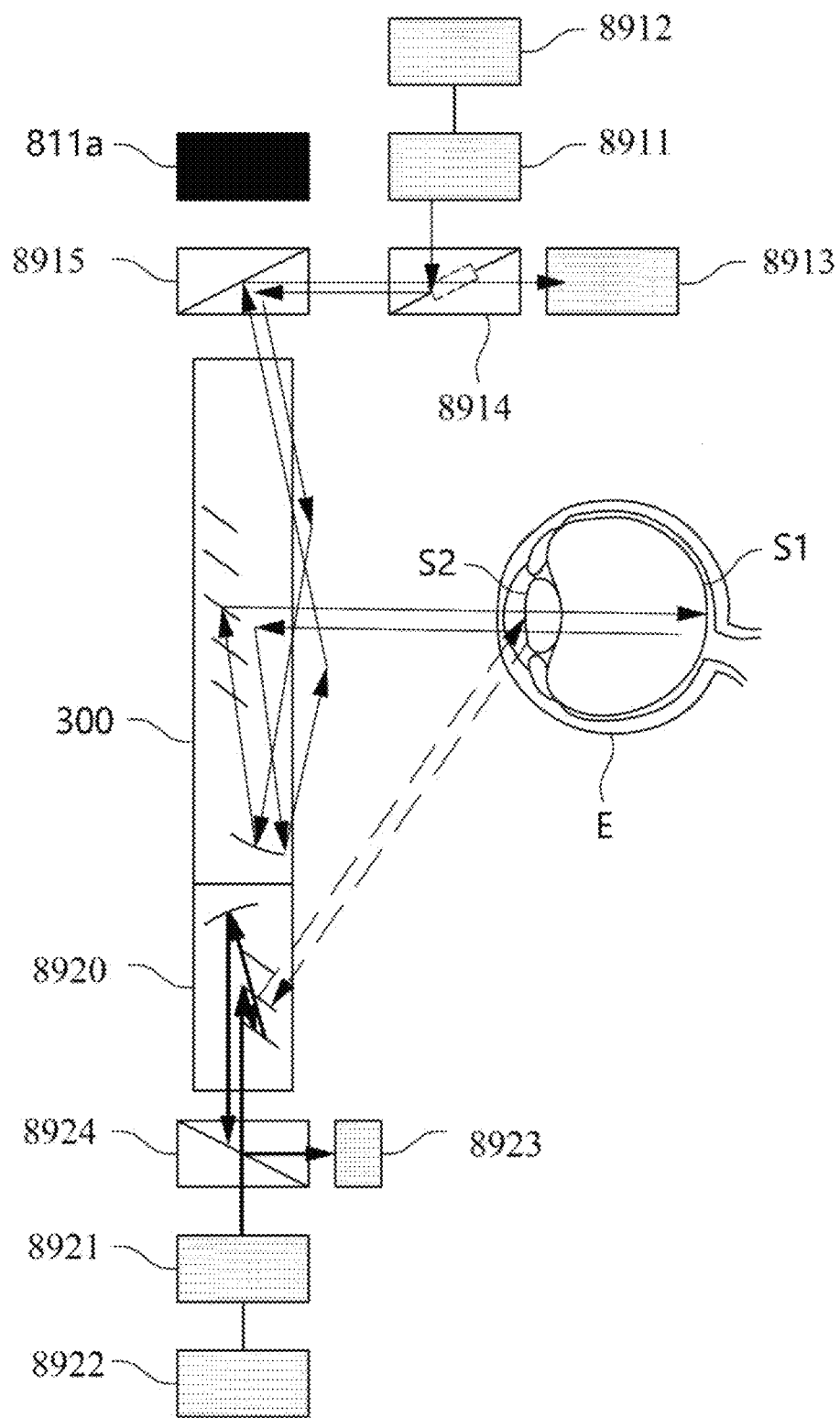
FIG. 90 is a diagram for describing another example of a structure for corneal examination and retinal examination, according to various embodiments.

FIG. 89 is a diagram for describing an example of a structure for corneal examination and retinal examination, according to various embodiments. FIG. 90 is a diagram for describing another example of a structure for corneal examination and retinal examination, according to various embodiments.

According to various embodiments, the augmented reality device 10 may output light by using a light source in operation 8801, acquire reflected light reflected from the eye in operation 8803, and acquire a retinal image and/or corneal image based on the light in operation 8805.

In an embodiment, referring to FIG. 89, the augmented reality device 10 may include a light source 8911, an actuator 8912 for moving the light source 8911 (e.g., an infrared light source, a visible light source), at least one beam splitter 8914, 8915, and a camera 8913. Light output from the light source 8911 is provided through the optical lens 300 by a plurality of beam splitters 8914, 8915, and reflected light reflected from the eye e is provided to the camera 8913 through the at least one beam splitters 8914, 8915 may be provided, so that an image for the eye may be captured. Since it may be implemented similar to the above-described viewing information acquisition structure, detailed descriptions are omitted, and may be implemented in a viewing information acquisition structure different from the illustrated example. In this case, the augmented reality device 10 may acquire a corneal image or a retinal image based on controlling the position of the light source 8911 by using the actuator 8912. For example, the augmented reality device 10 may acquire an image of the retinal S1 by using the camera 8913 by focusing light output from the light source 8911 to the retinal S1 of the eye E in a state in which the position of the light source 8911 is disposed at the first position by using the actuator 8912, and by focusing light output from the light source 8911 to the cornea S2 of the eye E in a state in which the position of the light source 8911 is disposed at the second position by using the actuator 8912, thereby acquiring an image of the cornea S2 by using the camera 8913.

In another embodiment, referring to FIG. 90, the augmented reality device 10 may be implemented to include a visual acuity information acquisition structure for photographing only the retinal S1 of the eye E and a visual acuity information acquisition structure for photographing only the cornea S2 of the eye e, respectively, compared to FIG. 89. For example, the actuator 8912, at least one beam splitter 8914, 8915, and the camera 8913 described above may be used to photograph only the retinal S1 of the eye E, and the light source 8921, the actuator 8922, the beam splitter 8924, and the camera 8923 additionally provided may be used to photograph the cornea S2 of the eye E.

According to various embodiments, the augmented reality device 10 may perform an eye-related disease test based on a retinal image and/or a corneal image in operation 8807. For example, based on the retinal image, disease information about diabetic retinopathy, glaucoma, ocular bleeding and macular abnormalities, choroidal abnormalities, retinal vascular abnormalities, neurofibrous layer defects, and changes in glaucomatous optic nerve papilla may be acquired. For example, based on the corneal image, disease information about corneal abnormalities, interstitial keratitis, corneal distrophy, and the like may be acquired. The eye-related disease test may be performed by an external device (e.g., the server 20 or the user terminal 30) that receives the cornea/retina image from the augmented reality device 10 rather than the augmented reality device 10.

According to various embodiments, the eye-related disease test may be performed based on an artificial intelligence model. The artificial intelligence model may include a first artificial intelligence model trained to output information about the aforementioned disease related to the retina in response to receiving the input of the retinal image, and a second artificial intelligence model trained to output information about the aforementioned disease related to the cornea in response to receiving the input of the cornea image.

5.3.1.4. Providing Health Care Information Based on Eye Inspection

Figure 91:
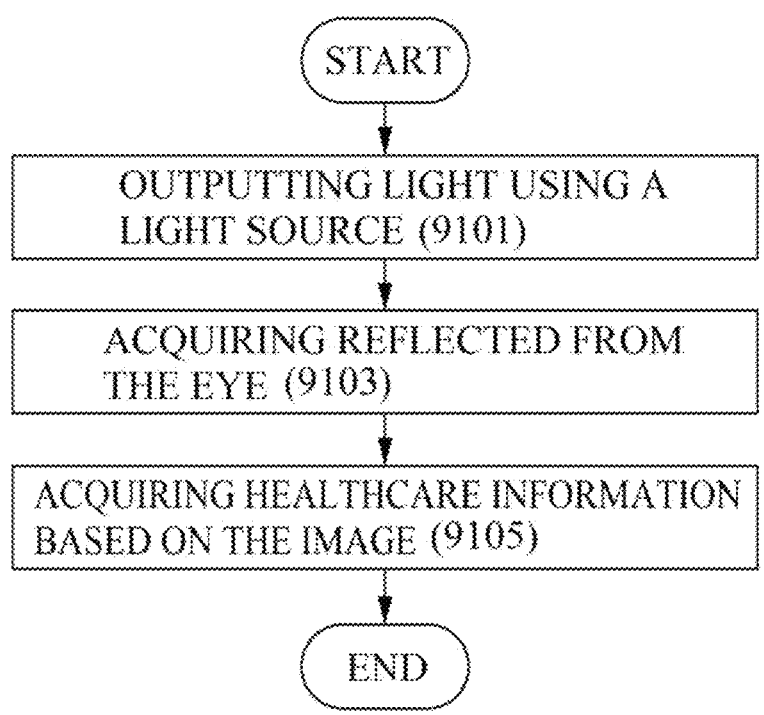
FIG. 91 is a flowchart illustrating an example of operations of the augmented reality device 10 for providing health care information based on eye tests.

FIG. 91 is a flowchart illustrating an example of operations of the augmented reality device 10 for providing health care information based on eye tests. Operations may be performed in an order different from the illustrated and/or described order, additional operations may be performed, and/or operations may not be performed in part of the operations.

According to various embodiments, the augmented reality device 10 may output light using a light source in operation 9101, and acquire reflected from the eye in operation 9103. Since the acquisition of the image associated with the eye may be performed based on the above-described sight information acquisition structure, redundant descriptions are omitted.

According to various embodiments, the augmented reality device 10 may acquire healthcare information based on the image in operation 9105. For example, the healthcare information may include cardiovascular information, and the cardiovascular information may include blood pressure information, information about hypertension or hypotension, and the like. In addition, for example, the healthcare information may include cranial nerve system information, and the cranial nerve system information may include information associated with a cognitive function such as Parkinson's disease. The acquisition of the healthcare information may be performed based on an artificial intelligence model. For example, the artificial intelligence model may be trained by using various kinds of healthcare information that can be determined based on the analysis of the eye and the image associated with the eye as training data. Accordingly, when the artificial intelligence model is input with the image associated with the eye, the artificial intelligence model may be implemented to output healthcare information.

5.3.1.5. Combined Provision of Healthcare Information

Figure 92:
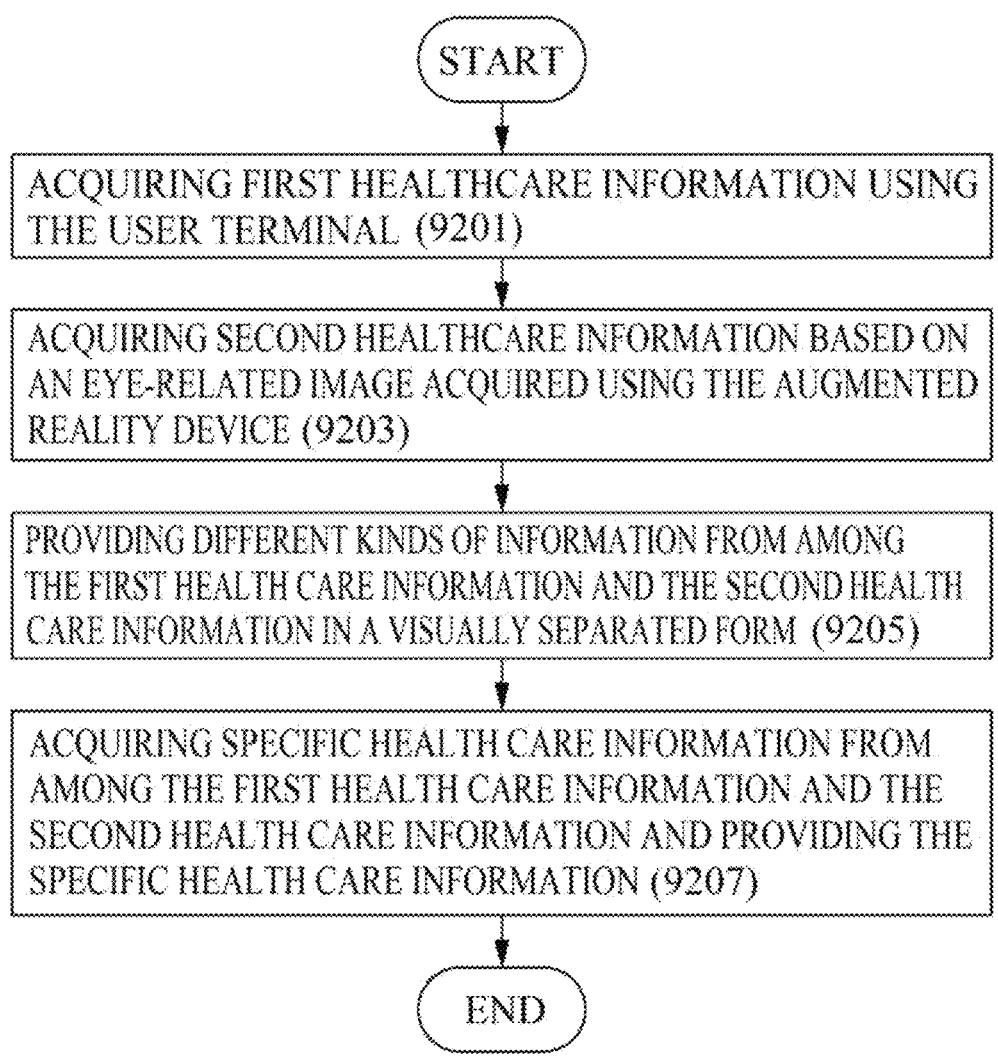
FIG. 92 is a flowchart illustrating an example of an operation of the augmented reality device 10 for providing integrated healthcare information, according to various embodiments.

FIG. 92 is a flowchart illustrating an example of an operation of the augmented reality device 10 for providing integrated healthcare information, according to various embodiments. Operations may be performed in an order different from the illustrated and/or described order, additional operations may be performed, and/or some of the operations may not be performed.

Figure 93:
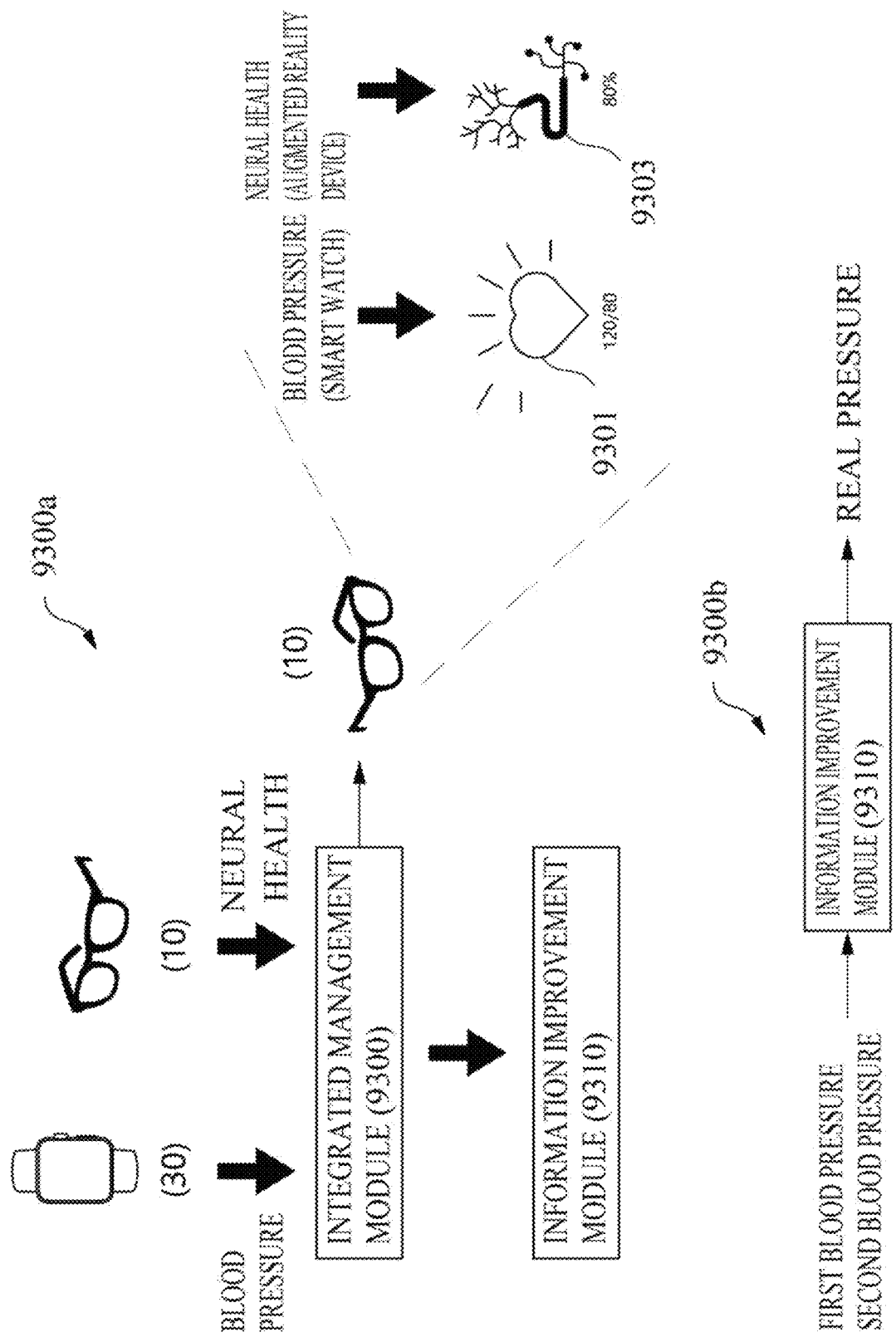
FIG. 93 is a diagram for describing an example of an operation of providing integrated healthcare information, according to various embodiments.

FIG. 93 is a diagram for describing an example of an operation of providing integrated healthcare information, according to various embodiments.

According to various embodiments, the augmented reality device 10 may acquire first healthcare information using the user terminal 30 in operation 9201. For example, referring to FIG. 93, the user terminal 30 (e.g., a smart watch) may acquire healthcare information based on a value identified using at least one sensor (e.g., at least one of a motion sensor, a ppg sensor, a heart rate sensor, a BIA sensor, an ECG sensor, or a skin temperature sensor). For example, the user terminal 30 (e.g., a smart watch) may acquire cardiovascular health information such as blood pressure, heart rate, heart rhythm, and oxygen saturation, and/or diet-related information such as blood sugar, weight, BMI, and the like, based on at least one of a PPG value identified using the PPG sensor or a BIA value identified using the BIA sensor, and is not limited to the described example, and various healthcare information may be acquired using other kinds of sensors, and detailed descriptions are omitted. The augmented reality device 10 may receive the healthcare information based on a communication connection with the user terminal 30.

According to various embodiments, the augmented reality device 10 may acquire second healthcare information based on an eye-related image acquired using the augmented reality device (e.g., a gaze information acquisition structure) in operation 9203. As described above, the augmented reality device 10 may acquire an image for the eye based on reflected light acquired using the gaze information acquisition structure.

According to various embodiments, the augmented reality device 10 may provide different kinds of information from among the first health care information and the second health care information in a visually separated form in operation 9205. For example, as shown in 9300a of FIG. 93, the augmented reality device 10 (e.g., the integrated management module 9300) may provide the user terminal 30 and the different kinds of health care information (e.g., the blood pressure 9301, the eye nerve health 9303) acquired by the augmented reality device 10. Accordingly, the user may integrate and manage the health care information managed by other devices using the augmented reality device 10. For example, the augmented reality device 10 may acquire specific health care information based on different kinds of health care information and provide the specific health care information, without being limited to the illustrated and/or described examples. For example, based on the information on the blood pressure 9301 and the information on the eye nerve health 9303, information on different kinds of diabetes may be analyzed and provided.

According to various embodiments, the augmented reality device 10 may acquire specific health care information and provide the specific health care information based on the kinds of information related to each other from among the first health care information and the second health care information in operation 9207. For example, when there are corresponding (e.g., the same) kinds of health care information acquired by the user terminal 30 and the augmented reality device 10, the augmented reality device 10 (e.g., the information improvement module 9310) may acquire health care information with higher accuracy based on the two health care information. For example, as shown in 9300b of FIG. 93, the information improvement module 9310 may be implemented as an artificial intelligence model implemented to output blood pressure with higher accuracy in response to the health care information (e.g., the blood pressure) acquired by the user terminal 30 and the same kinds of health care information (e.g., the blood pressure) acquired by the augmented reality device 10. Without being limited to the described examples, different kinds of health care information may be acquired and provided based on the difference value of the same kinds of information. For example, the augmented reality device 10 may acquire blood pressure information measured at the wrist using the wearable watch, acquire blood pressure information based on the analysis of the eye reflected light image, and acquire information on heart disease based on the difference of the blood pressure information acquired at the two body parts, and provide the blood pressure information.

Meanwhile, without being limited to the described examples, the augmented reality device 10 may be implemented to acquire health care information from IoT devices (e.g., smart mirrors, weight meters, and the like) for acquiring health care information provided inside a home other than a smart watch and perform the above operation.

5.3.2 Surgical Navigation

Surgical navigation is an advanced medical technology that visualizes the patient's anatomic structure in real time and provides precise guidance during surgical operation, which minimizes surgical intervention and increases accuracy, and helps improve surgical results. Surgical navigation requires various technologies such as medical imaging technology, image registration and integration technology, location tracking technology, and real-time data analysis. Among the various technologies, 3D visualization and virtual/augmented reality (VR/AR) technology that enables medical experts to clearly see the internal structure of the patient's organs during surgery are very important.

Figure 94:
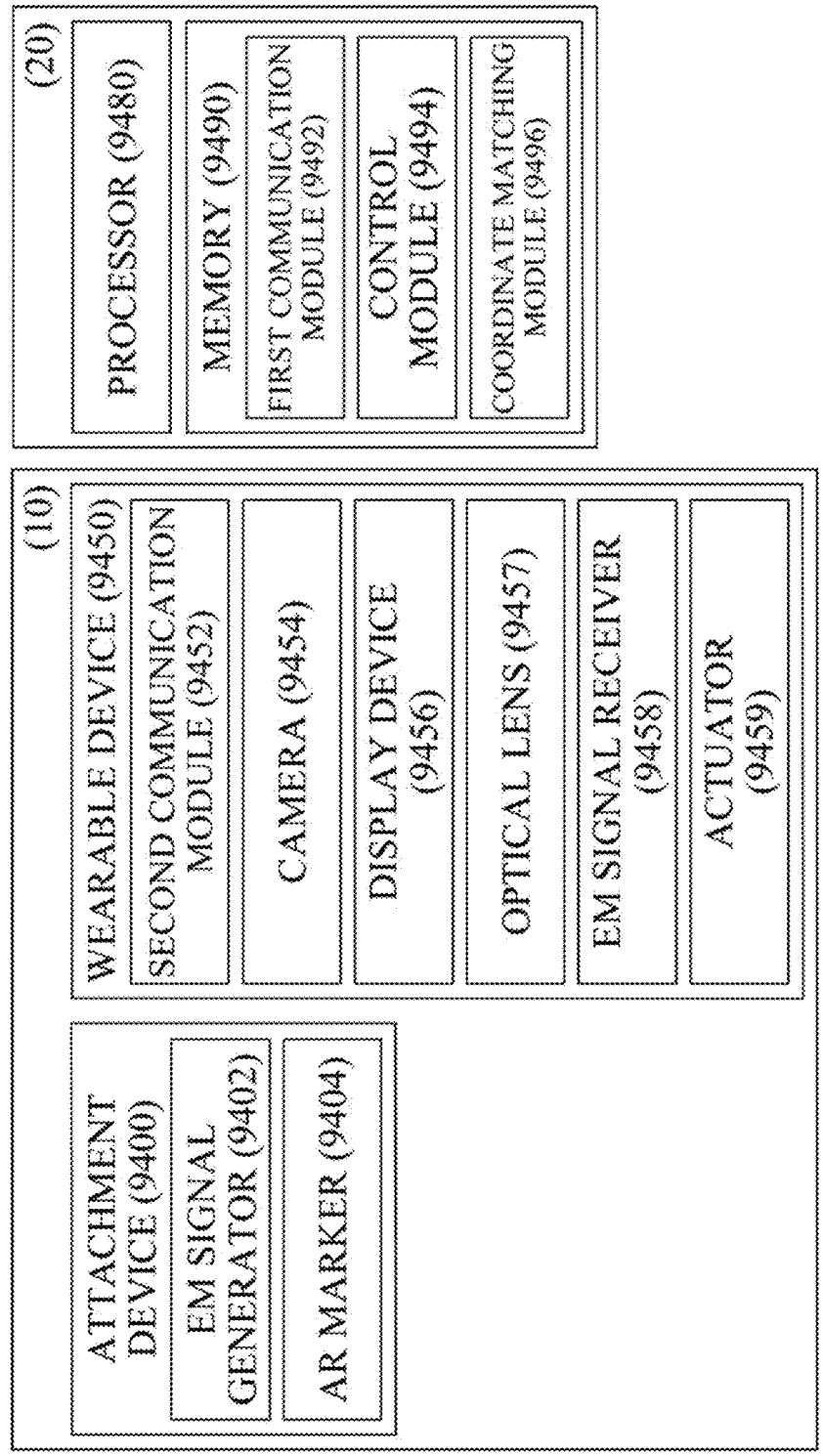
FIG. 94 is a block diagram of a surgical augmented reality system using coordinate matching in various embodiments of the present disclosure.
Figure 95:
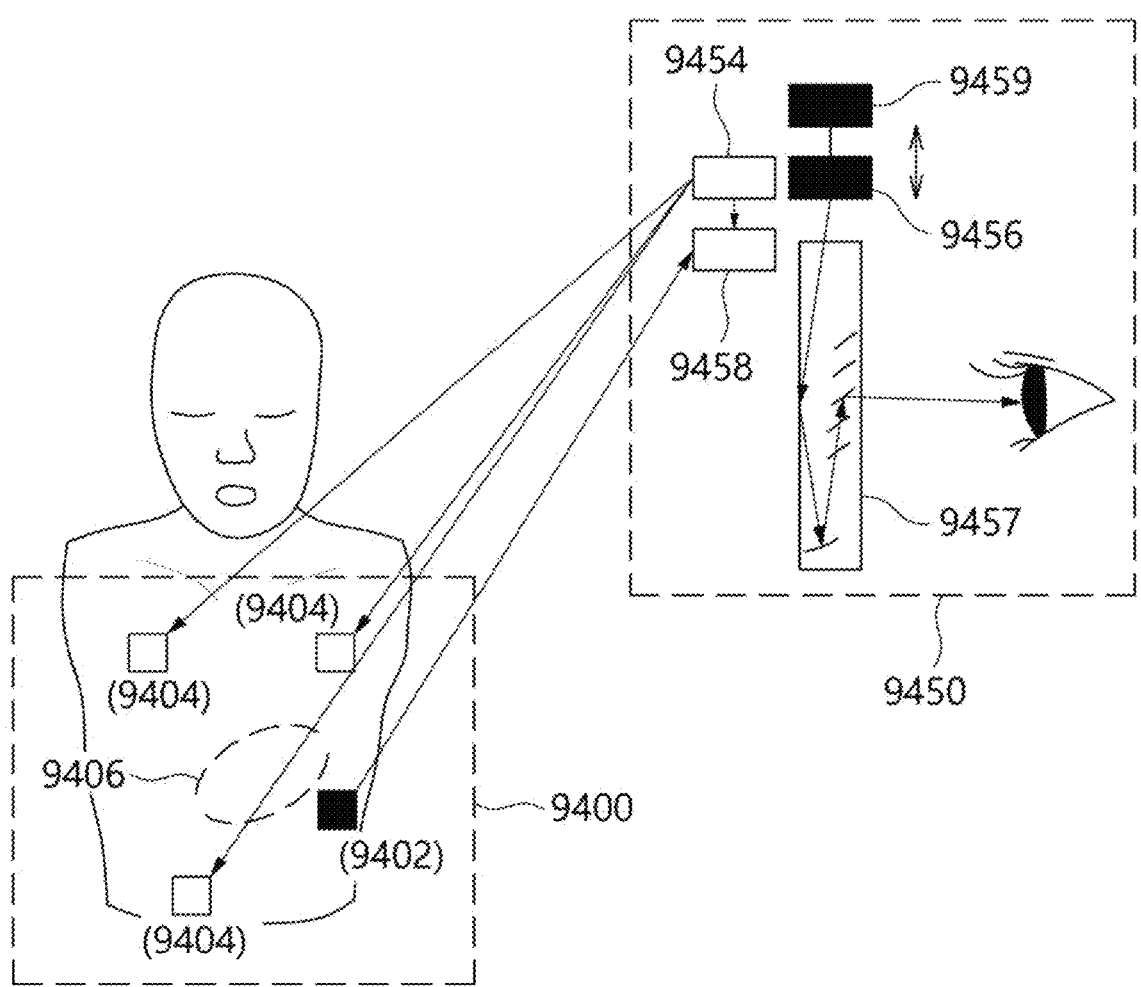
FIG. 95 is a diagram illustrating operations of a surgical augmented reality system using coordinate matching in various embodiments of the present disclosure.

FIG. 94 is a block diagram of a surgical augmented reality system using coordinate matching in various embodiments of the present disclosure. FIG. 95 is a diagram illustrating operations of a surgical augmented reality system using coordinate matching in various embodiments of the present disclosure.

Referring to FIGS. 94 and 95, the augmented reality system 1 may include an augmented reality device 10 and a server 20. The augmented reality device 10 and the server 20 communicate with a wired network or a wireless network to exchange data and provide an AR image for surgery.

The server 20 includes a processor 9480 and a memory 9490. The processor 9480 is configured to execute computer instructions stored in a computer-readable medium such as the memory 9490. For example, the processor 9480 may be a central processing unit (CPU).

The memory 9490 stores instructions and data necessary by the processor 9480 at runtime. The memory 9490 may be located inside or outside the server. In addition, as illustrated in FIG. 94, the memory 9490 includes a first communication module 9492, a control module 9494, and a coordinate matching module 9496.

The first communication module 9492 is configured to allow data to be transmitted and received in a network between the augmented reality device 10 and the server 20. The communication module may include one or more network interface cards (NICs).

The control module 9494 generates a control signal by using data obtained from the augmented reality device 10. Thereafter, the control module 9494 transfers the generated control signal to the augmented reality device 10 to control operations of each of the components of the augmented reality device 10.

The coordinate matching module 9496 determines the surgical position 12706 of the operator by matching the coordinates of the EM signal and the AR marker 9404 among the data obtained from the augmented reality device 10. The coordinate matching method of the coordinate matching module 9496 will be described in detail below.

In the drawing, it is illustrated that the memory 9490 and the processor 9480 are implemented inside the separate server 20. However, according to various embodiments, the memory 9490 and the processor 9480 may be implemented and operate inside the augmented reality device 10, and in this case, by omitting a long-distance communication process by the network, control and driving speed of the augmented reality device 10 may be improved.

The augmented reality device 10 is a device for implementing an augmented reality image in an actual thing image and displaying overlappingly, and includes an attachment device 9400 and a wearable device 9450. The attachment device 9400 is a device attached to a part of the subject's body and may be implemented in a patch form that is easy to attach. The wearable device 9450 is a part worneath a face of the operator, and may be an AR glass.

Specifically, the attachment device may include an electromagnetic (EM) signal generator 9402 and an AR marker 9404. The EM signal generator 9402 is attached to one side of the subject's body and generate at least one EM signal. In detail, the EM signal generator 9402 may be plural, and may be provided on one side of the surgically scheduled portion of the subject. The AR marker 9404 is a marker that serves as a reference point for AR recognition, and consists of a specific visual pattern or identifier, and may include preset coordinate value information.

The wearable device 9450 may include a second communication module 9452, a camera 9454, a display device 9456, an optical lens 9457, an EM signal receiver 9458, and an actuator 9459.

The second communication module 9452 communicates with the first communication module 9492 of the server and exchanges at least one data such as an image of the operator and an AR image for surgery in real time. Communication networks may be implemented in various network forms, such as local area network (LAN), wide area network (WAN), metropolitan area network (MAN), personal area network (PAN), or virtual private network (VPN).

The camera 9454 photographs the body image of the subject, and recognizes the AR marker 9404 included in the body image of the subject from the body image photographed through the processor 9480.

In various embodiments, the processor 9480 may recognize the AR marker 9404 using a computer vision algorithm, but is not necessarily limited thereto, and may use various algorithms or artificial intelligence models.

The display device 9456 emits a surgical AR image for the subject. The exited AR image is incident on the eye of the operator through the optical lens 9457, and the operator can perform surgery while simultaneously viewing the AR image projected on the surgical site along with the actual body appearance of the operator.

The EM signal receiver 9458 receives the EM signal transmitted from the EM signal generator 9402. Using the EM signal, the operator can precisely locate the surgical tool or equipment in the surgical position during the surgery through coordinate matching with the AR marker 9404, to more accurately grasp the internal structure of the patient and enable sophisticated surgery.

The actuator 9459 is coupled to the display device 9456 to control the movement of the display device 9456. The actuator 9459 may adjust the focal length of the AR image emitted from the display device 9456 by moving the display device 9456 up/down or left/right to adjust the distance to the optical lens 9457. The various structures and driving forms of the actuator 9459 are described above, and detailed descriptions thereof are omitted here.

Figure 96:
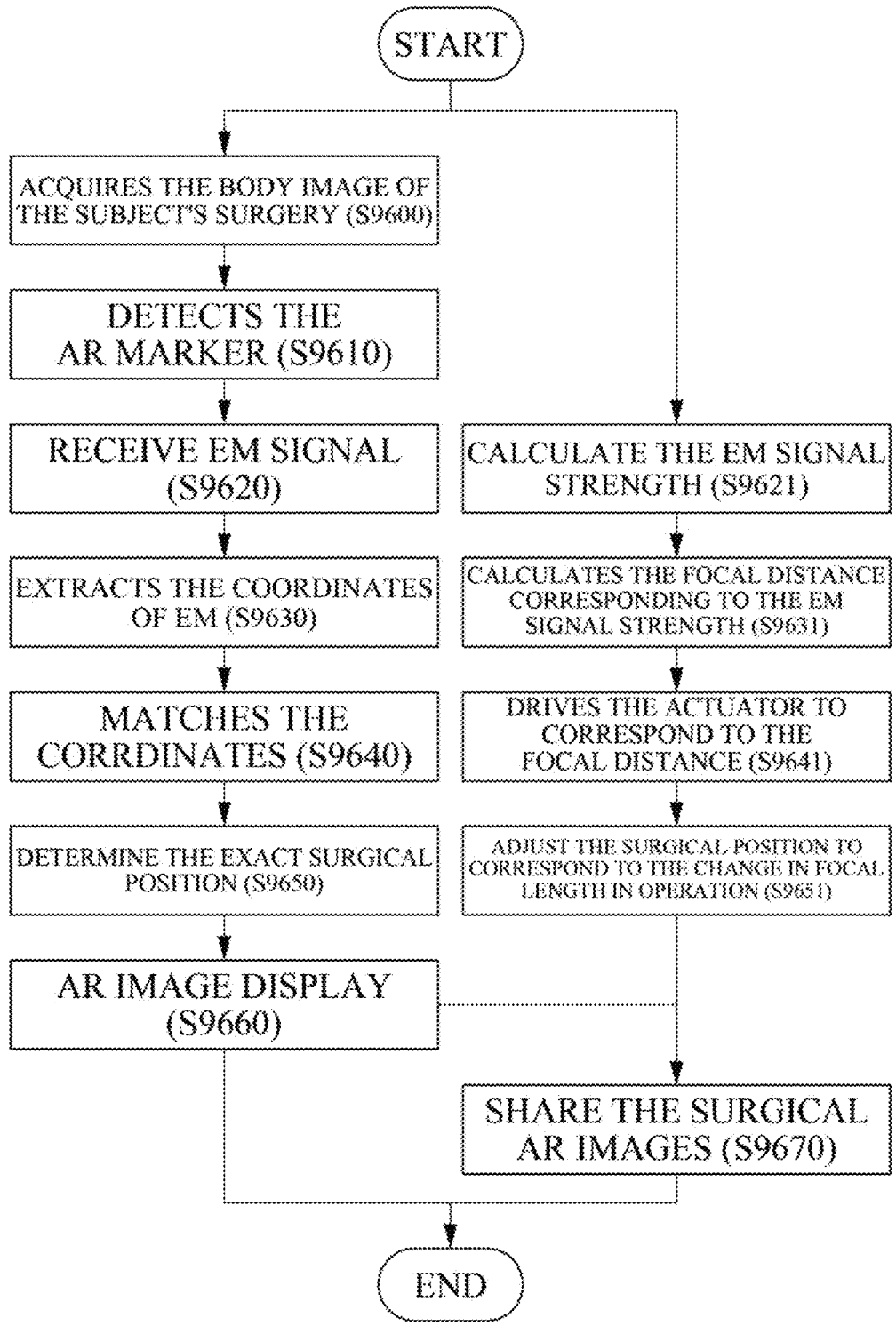
FIG. 96 is a diagram illustrating the motion flow of a surgical augmented reality system using coordinate matching in various embodiments of the present disclosure.
Figure 97:
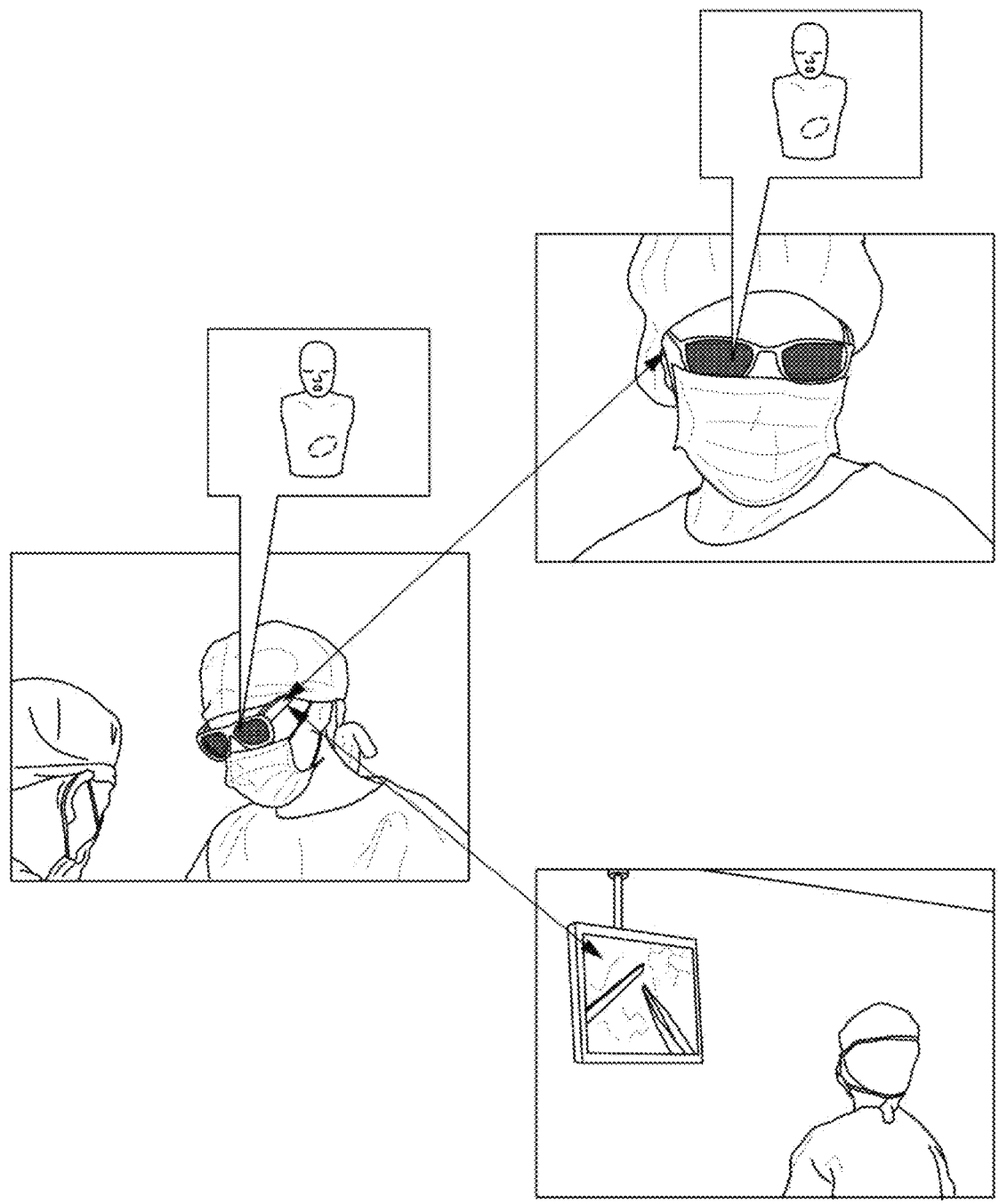
FIG. 97 is a diagram illustrating image sharing of a surgical augmented reality system using coordinate matching in various embodiments of the present disclosure.

FIG. 96 is a diagram illustrating the motion flow of a surgical augmented reality system using coordinate matching in various embodiments of the present disclosure. FIG. 97 is a diagram illustrating image sharing of a surgical augmented reality system using coordinate matching in various embodiments of the present disclosure.

First, the augmented reality system 1 acquires the body image of the subject's surgery from the camera 9454 (S9600). The augmented reality system 1 detects the AR marker 9404 attached to one side of the subject's body from the body image (S9610). The AR marker 9404 may be given a preset coordinate value for utilization as a reference value. The AR marker 9404 may be detected through the coordinate matching module 9496 of the server 20.

Thereafter, the augmented reality device 10 of the augmented reality system 1 receives the EM signal from the EM signal generator 9402 attached to the surgical site of the subject (S9620). The coordinate matching module 9496 extracts the coordinates of each of the EM signal generator 9402 from at least one EM signal (S9630) and matches the coordinates of the recognized AR marker 9404 corresponding thereto. The coordinate matching module 9496 can determine the exact surgical position by matching the coordinates of the AR marker 9404 with the coordinates of the EM signal generator 9402 attached to the surgical scheduled position of the subject as the reference point. S9650). In this case, the coordinates of the EM signal and the coordinates of the AR marker 9404 may be three-dimensional coordinates having 3d position information. In addition, depth camera 9454 (Depth Camera) may be used to acquire 3D position information. The augmented reality system 1 generates a surgical AR image based on the determined surgical location. In addition, the augmented reality system 1 outputs the surgical AR image to the eye of the operator so that the surgical AR image is displayed at the position scheduled for the surgery of the operator through the display device 9456 and the optical lens 9457 (S9660).

The above-described surgical AR image may be a marker indicating a surgical site, an internal image of the patient's body, or various guide images related to surgery, such as a surgical method. In addition, since the surgical AR image is displayed to overlap with the body of the subject, the operator can perform the surgery quickly and accurately without directly displaying the surgical location.

In addition, the size of the surgical AR image may be determined based on the distance between the attachment device and the wearable device. In detail, the size of the surgical AR image may be determined to be inversely proportional to the distance between the attachment device and the wearable device. For example, when the distance between the attachment device and the wearable device is increased according to the movement of the operator, the size of the surgical AR image may be reduced according to a predetermined ratio, and when the distance between the attachment device and the wearable device is increased, the size of the surgical AR image may be increased according to a predetermined ratio. Through this, the size of the surgical AR image can be maintained at a certain size regardless of the movement of the operator.

On the other hand, the distance between the attachment device and the wearable device of the surgical site is inevitably changed in real time during the surgeon's surgery or movement. In this case, the focus of the augmented surgical AR image on the surgical site may change, or the size or position may change. Hereinafter, a method of operating the actuator 9459 of the wearable device to prevent such a problem will be described.

When the augmented reality system 1 receives an EM signal, it can calculate the EM signal strength (S9621). Thereafter, the augmented reality system 1 calculates the focal distance corresponding to the EM signal strength (S9631) and drives the actuator 9459 to correspond to the focal distance (S9641). For example, the augmented reality system 1 determines that the distance between the augmented reality device 10 and the EM signal generator 9402 is large if the EM signal strength is large and increases the focal distance. Conversely, the augmented reality system 1 determines that the distance between the augmented reality device 10 and the EM signal generator 9402 is close if the EM signal strength is small and adjusts the movement of the actuator 9459 to decrease the focal distance.

As such, the augmented reality system 1 of the present disclosure can adjust the focal length between the augmented reality device 10 and the EM signal generator 9402 by adjusting the movement of the actuator 9459 based on the EM signal strength. In addition, the augmented reality system 1 may adjust the surgical position to correspond to the change in focal length in operation S9651 and display the surgical AR image on the changed surgical position to provide a stable surgical AR image regardless of the movement of the operator.

In various embodiments, the augmented reality device 10 may be a plurality of augmented reality devices, and communication may be performed between the second communication modules 9452 included in each augmented reality device 10 through a wireless network or a wired network. Accordingly, the same surgical AR image may be shared in the plurality of augmented reality devices 10 through the transmission of the coordinates for the determined surgical position (S9670).

In actual surgery, many operators participate, and all of the plurality of operators do not perform surgery in the same direction and the same position. Therefore, if the augmented reality device 10 of the present disclosure is used, the surgical position coordinates are shared, so that the more stable surgical AR image may be provided through the adjustment of the focal length regardless of each position of the operator.

In various embodiments, the camera 9454 of the augmented reality device 10 may be an infrared (IR) camera 9454. The augmented reality device 10 may trace the operator's eyeball by emitting a specific light source separate from the surgical AR image to the operator's eyeball through the IR camera 9454, and may control the surgical AR image to be moved together according to the operator's pupil movement, so that the surgical AR image of the surgical site may be maintained regardless of the operator's movement.

5.3.3 Digital Therapeutic Agent

The digital therapeutic agent is a treatment solution for treating a specific disease by stimulating a nerve or brain using software rather than a drug. According to various embodiments, the augmented reality system 1 may determine the disease currently held by the user using the augmented reality device 10, and may be used as a digital therapeutic agent for the determined disease.

The diseases that can be determined through the augmented reality system 1 may be, for example, Parkinson's disease, insomnia, and psychiatric disease (e.g., schizophrenia). Hereinafter, a method of using the above-described diseases as a digital therapeutic agent will be described as an example. However, the above-listed diseases are illustrative, and are not necessarily limited thereto, and all diseases that can be determined through the wearable device 3100 may be targeted.

First, Parkinson's disease is characterized by a decrease in cognitive ability and problem-solving ability, and also a hand tremor symptom along with hallucinations symptoms, and insomnia has a feature that is insufficient to sleep or does not fall in deep water because excessive stress, etc. In addition, psychiatric diseases such as a biological disease caused by abnormality in the brain, show symptoms of heartburn, retburn, and language disturbance. That is, show various expression symptoms and by diseases by disease, and thus can be determined whether a particular disease occurs.

5.3.3.1 Parkinsonism

Figure 98:
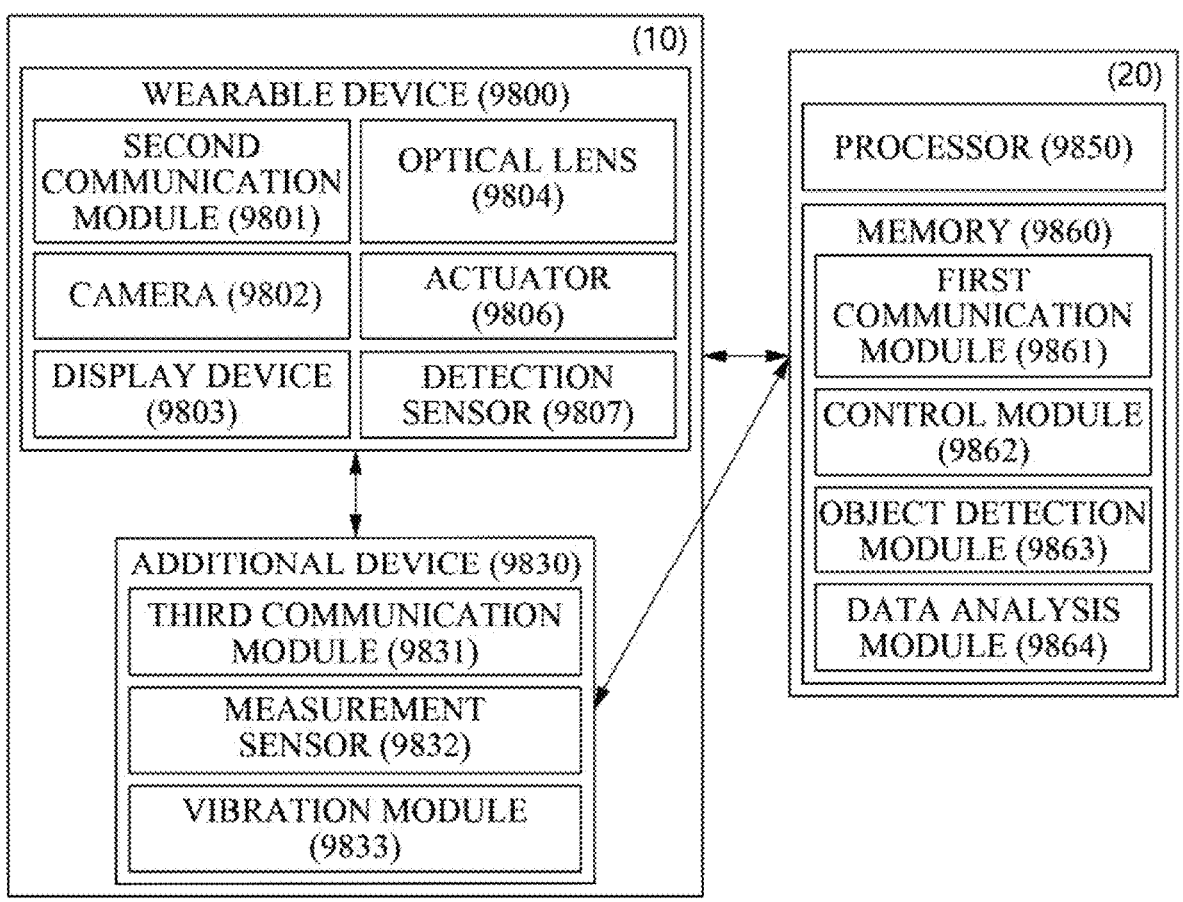
FIG. 98 is a block diagram of an augmented reality system for diagnosing Parkinson's disease in an embodiment of the present disclosure.
Figure 99:
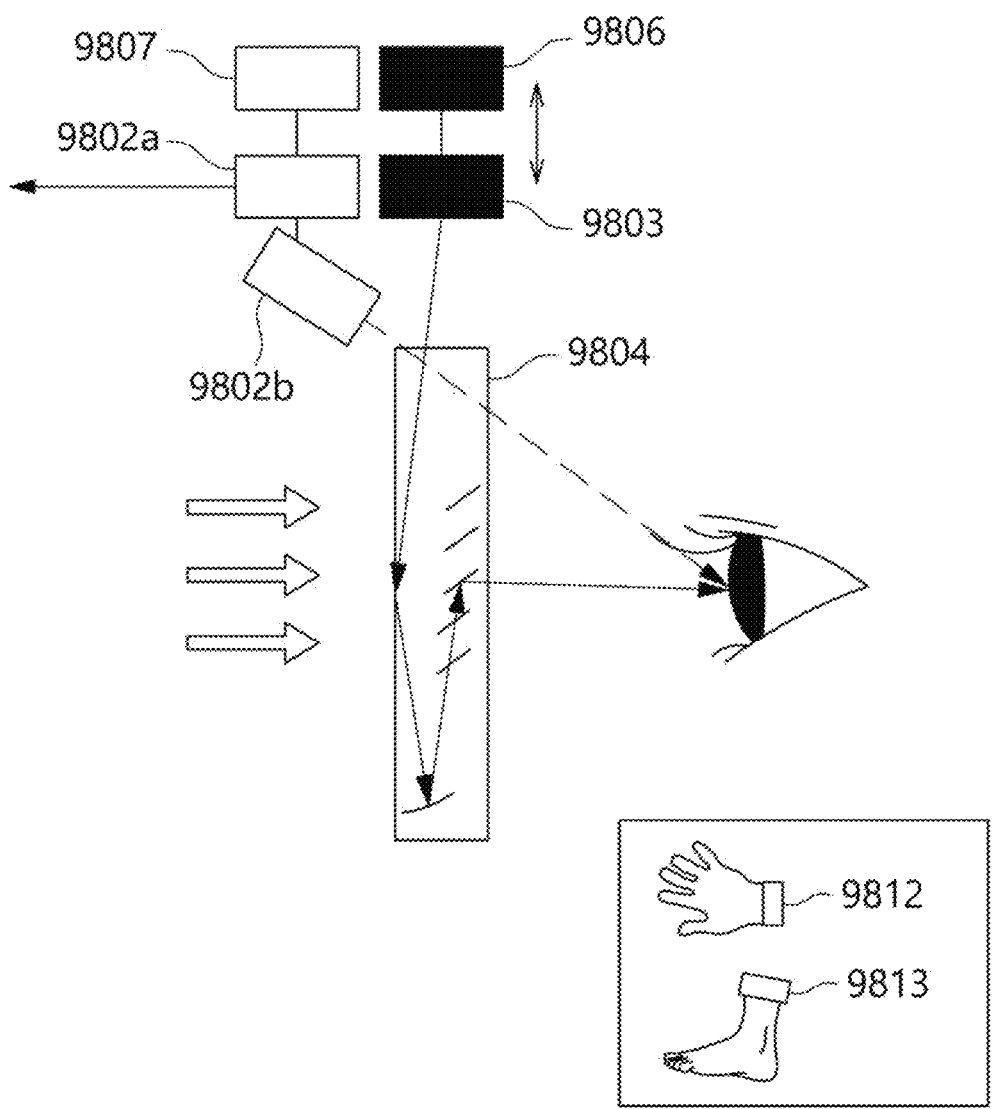
FIG. 99 is a diagram showing the structure and operation of an augmented reality system for diagnosing Parkinson's disease in an embodiment of the present disclosure.

FIG. 98 is a block diagram of an augmented reality system for diagnosing Parkinson's disease in an embodiment of the present disclosure. FIG. 99 is a diagram showing the structure and operation of an augmented reality system for diagnosing Parkinson's disease in an embodiment of the present disclosure.

Referring to FIGS. 98 and 99, the augmented reality system 1 may include an augmented reality device 10 and a server 20. The augmented reality device 10 and the server 20 communicate with a wired network or a wireless network to exchange data, and provide AR images for disease diagnosis and treatment. Since each configuration and operation of the augmented reality device 10 and the server 20 are the same as those described above, the description of the duplicate configurations will be omitted below.

In various embodiments, the augmented reality device 10 includes a wearable device 9800 and an additional device 9830. The wearable device 9800 is a device worn on a user's face, and may be, for example, AR glass. The wearable device 9800 may include a second communication module 9801, a camera 9802, a display device 9803, an optical lens 9804, an actuator 9806, and a detection sensor 9807.

The second communication module 9801 communicates in both directions and exchanges data with respect to each of the first communication module 9861 and the third communication module 9831 of the additional device 9830 of the server 20. Communication with the first communication module 9861 uses a long-range wireless communication method such as WAN, 5G, and LTE, and communication with the third communication module 9831 may use a short-range communication method such as WiFi, NFC, Bluetooth, Zigbee, Z-wave, and RFID as both the additional device 9830 and the wearable device 9800 are located on the user's body.

Camera 9802 may include a first camera 9802a and a second camera 9802b. The first camera 9802a may be installed on an external surface where the augmented reality device 10 does not contact the user, and generate an object image by photographing an external specific object. The particular object may be, for example, a user's hand or feet. The generated object image may be analyzed and detected by the object detection module 9863 of the server 20.

The second camera 9802b may be provided on one side of the augmented reality device 10 and may be disposed in a different direction from the first camera 9802a. That is, the second camera 9802b may be disposed in the direction of the user's eyes in the wearing state of the augmented reality device 10 or in the direction of the optical lens 9804 capable of photographing the user's pupil through refraction. In addition, the second camera 9802b is a camera 9802 for acquiring a pupil image of a user, and may be an infrared (IR) camera 9802.

The detection sensor 9807 is a sensor that senses a specific object outside, and may be at least one of a motion sensor and a tilt sensor (e.g., a gyroscope).

A motion sensor (not shown) senses the motion of the user's hand or feet, and a tilt sensor senses the degree of head tilting of the user. In the case of Parkinson's disease, it accompanies various symptoms such as hand tremor, slowing (behavior slowing), and tilting the upper body in the future. Therefore, various detection sensors 9807 may be used to accurately identify such symptoms.

The additional device 9830 is a device worn on one side of the body except the user's face, and may be, for example, a device that can be worn on the wrist or ankle in the form of a strap. The additional device 9830 may include at least one of the third communication module 9831, the measurement sensor 9832, and the vibration module 9833.

The measurement sensor 9832 is an additional device 9830 worn on the user's wrist, and may include at least one of an acceleration sensor, a sound sensor, a heart rate sensor, and an electromyogram sensor.

The acceleration sensor measures the degree of change in position caused by movement and tilt. In the case of Parkinson's disease patients, the swing angle of the arms is smaller than the swing angle of the general person when walking (e.g., the average swing angle of Parkinson's disease patients: 27.8 degrees, and the average swing angle of the general person: 48.2 degrees). When the acceleration sensor is used, the swing angle may be calculated by measuring the position change of the user's arms and whether they correspond to Parkinson's disease.

The sound sensor senses the sound generated near the sensor. The sensed sound data may be transmitted to the server to analyze information such as the sound generation cycle, the frequency of the sound generation, and the size of the type of sound. In the case of Parkinson's disease patients, the operating speed of the operation such as computer typing is significantly lower than the operating speed of the general person. For example, the average typing speed of Parkinson's disease patients: 209 ta/min, and the average typing speed of the general person: 260.4 ta/min. Therefore, when the sound sensor is used, it is possible to determine whether they correspond to Parkinson's disease through typing sound sensing and typing speed calculation.

The heart rate sensor is a sensor that measures the heart rate per unit time by measuring the electrical signal generated by the heart, and may be an electrocardiograph ECG/EEG or a photoplethysmogram (PPG) sensor. When the additional device 9830 is worn on the wrist of the user, the heart rate of the user may be measured by sensing the flow of blood flowing through the wrist.

The electromyogram (EMG) sensor senses the electrical signal generated during the contraction and relaxation of the muscle and measures the electrical activity. When the electromyogram sensor is used, the typing speed according to the typing operation may be measured similarly to the sound sensor, by determining the muscle movement of the user by contacting the wrist of the user. Therefore, it is possible to easily determine whether they correspond to Parkinson's disease through the electromyogram sensor.

The vibration module 9833 includes a vibration sensor and a vibration motor. The vibration sensor may sense vibration, that is, the tremor of the user. In the case of Parkinson's disease patients, since a representative symptom is the tremor of the body, the degree of tremor may be measured through the vibration sensor and whether they correspond to Parkinson's disease may be determined. On the other hand, since the slow motion and stiffness phenomenon are also representative symptoms in Parkinson's disease, the vibration motor may be attached to the body of the user to prevent the tremor of the body from vibrating through the vibration operation or may alleviate the tremor-specific symptoms of Parkinson's disease through synchronized vibration.

The server 20 includes a processor 9850 and a memory 9860. The memory 9860 includes a first communication module 9861 for communicating with the additional device 9830 and the wearable device 9800, a control module 9862 for controlling the operation of the augmented reality device, an object detection module 9863 for extracting a specific object from the object image, and data analysis module 9864 for analyzing data received from the augmented reality device.

The object detection module 9863 detects a specific object (e.g., the user's hand or foot) from the object image acquired through the camera 9802. The object detection module 9863 may determine whether the user corresponds to Parkinson's disease by analyzing the degree of tremor of the hand through the data analysis module 9864 after detecting the hand of the user, or measuring the walking status of the user through the data analysis module 9864 after detecting the feet of the user.

The data analysis module 9864 analyzes data received from the augmented reality device. The data is data acquired from the measurement sensor 9832 of the additional device 9830 and data acquired from the detection sensor 9807 of the wearable device 9800, and various data may be collected and analyzed for each sensor.

Figure 100:
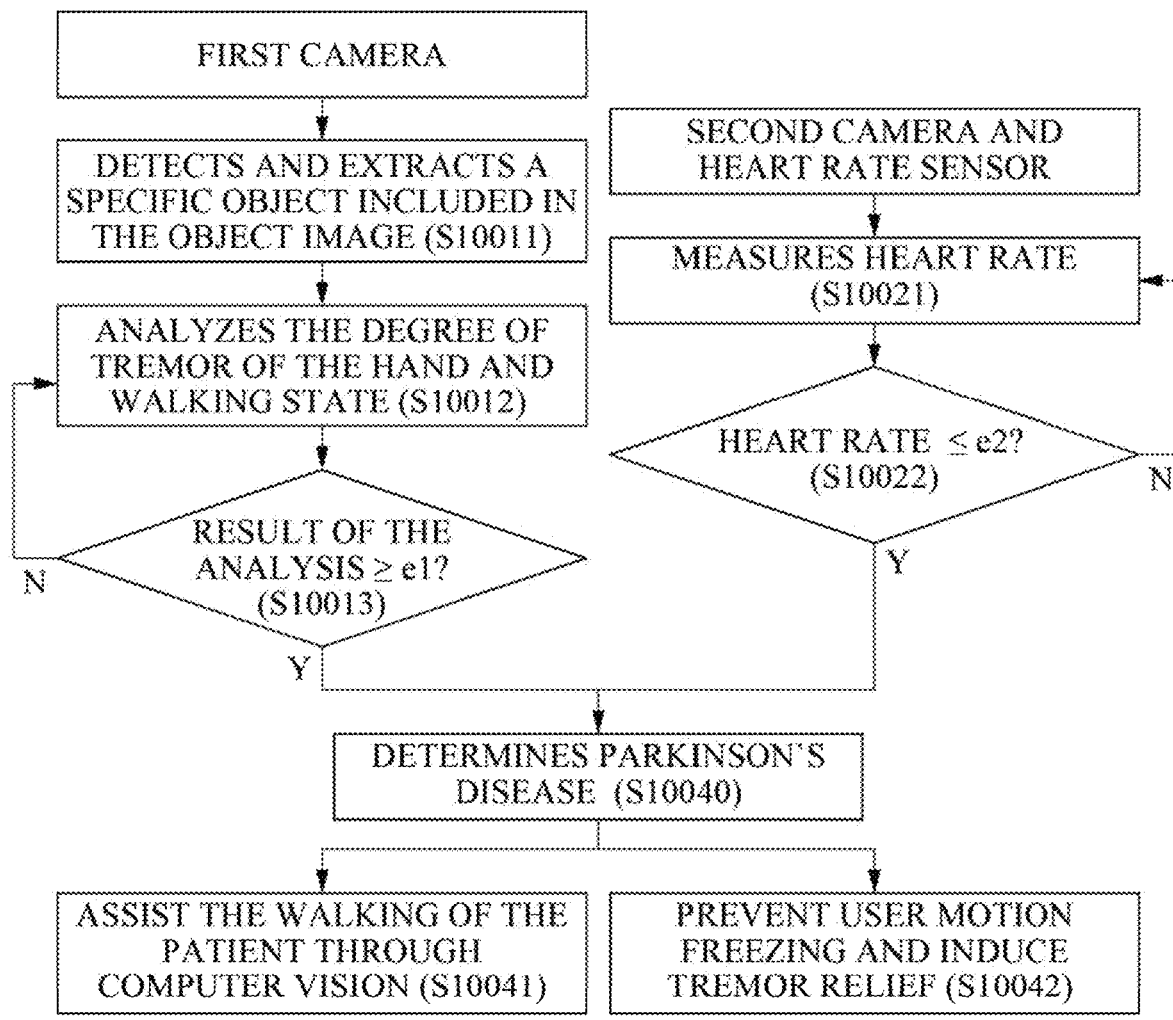
FIG. 100 is a flowchart of an operation of an augmented reality system for diagnosing Parkinson's disease using a first camera in an embodiment of the present disclosure.

FIG. 100 is a flowchart of an operation of an augmented reality system for diagnosing Parkinson's disease using a first camera 9802a in an embodiment of the present disclosure.

Referring to FIG. 100, the augmented reality system can acquire various data using various sensors and devices. In various embodiments, the augmented reality system acquires an object image using the first camera 9802a. The object detection module 9863 detects and extracts a specific object included in the object image from the acquired object image (S10011).

The data analysis model analyzes information about the extracted object. For example, when the specific object is the user's hand 9812, the degree of tremor of the hand is determined, and when the specific object is the user's feet 9833, the walking state is analyzed (S10012). As a result of the analysis, when the walking width is less than or equal to the first reference value (e1), or the degree of tremor of the hand is less than or equal to the first reference value (e1), it may be determined as Parkinson's Disease. Here, the first reference value (e1) is a reference for determining Parkinson's disease and may have a different value according to a specific object. When a specific object is hand, the first reference value may be, for example, about a hand tremor of 3 to 7 Hz.

On the other hand, certain symptoms such as hand tremors in Parkinson's disease have the characteristics of muscle stabilizing (resting). Therefore, if the heart rate is measured, it is possible to check whether the user is in a stable state, and it is possible to accurately determine when diagnosing Parkinson's disease.

In various embodiments, the augmented reality system 1 measures the heart rate of the user using at least one of the second camera 9802b and the heart rate sensor (S10021). The data analysis module 9864 compares the measured heart rate with the second reference value (e2). As a result of the comparison, when the measured heart rate is less than or equal to the second reference value (e2) (S10022) and the hand tremor or walking state of the user is equal to or greater than the first reference value, the data analysis module 9864 may determine that the user corresponds to Parkinson's disease. (S10040).

If it is determined that the user corresponds to Parkinson's disease, the augmented reality module may assist the walking of the patient through computer vision (s10041) or transmit an operating signal to the vibration motor of the additional device 13130 attached to the user's body to prevent user motion freezing and induce tremor relief (s10042).

Figure 101:
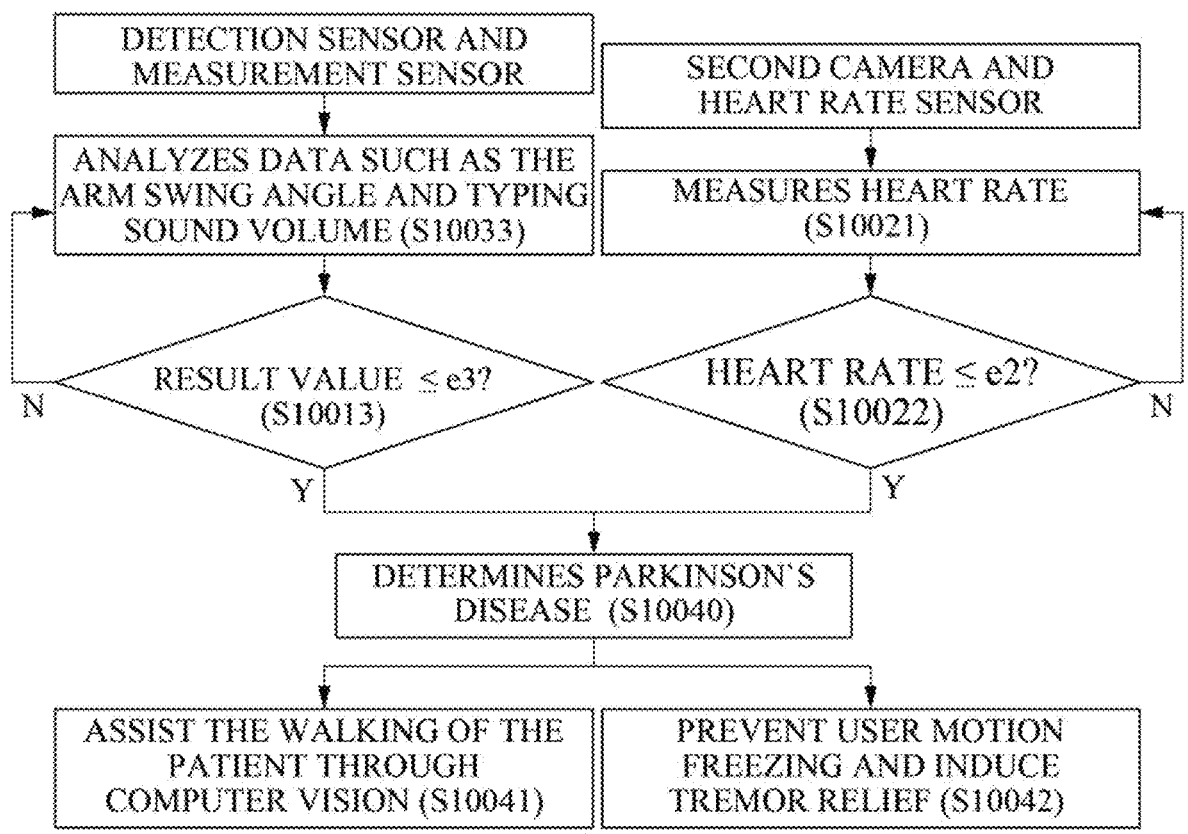
FIG. 101 is a flowchart of an operation of an augmented reality system for diagnosing Parkinson's disease using a sensor in an embodiment of the present disclosure.

FIG. 101 is a flowchart of an operation of an augmented reality system for diagnosing Parkinson's disease using a sensor in an embodiment of the present disclosure.

The augmented reality system analyzes various data such as the arm swing angle and typing sound volume using at least one of the detection sensor 9807 and the measurement sensor 9832 (s10031). Data to be analyzed may be different depending on the type of data acquired from the sensor.

The augmented reality system compares the data analysis result value with the third reference value (e3), and if the comparison result analysis result value is less than or equal to the third reference value (e3), it is determined as Parkinson's Disease (S10033).

In various embodiments, the augmented reality system measures the heart rate of the user using at least one of the second camera 9802b and the heart rate sensor (s10021). The data analysis module 9864 may compare the measured heart rate with the second reference value, and if the measured heart rate is less than or equal to the second reference value (s10022) and the data analysis result is less than or equal to the third reference value, it may be determined as Parkinson's disease. s10040).

If it is determined that the user corresponds to Parkinson's disease, the augmented reality module may assist the walking of the patient through computer vision (s10041) or transmit an operation signal to the vibration motor of the additional device 13130 attached to the user's body to prevent user movement freezing (s10042).

In the above, it was mentioned that the detection sensor 9807 and the measurement sensor 9832 and the first camera 9802a operate separately to determine Parkinson's disease, but all of the detection sensor 9807, the measurement sensor 9832, and the first camera 9802a may be used or selectively combined to determine Parkinson's disease according to weights.

Figure 102:
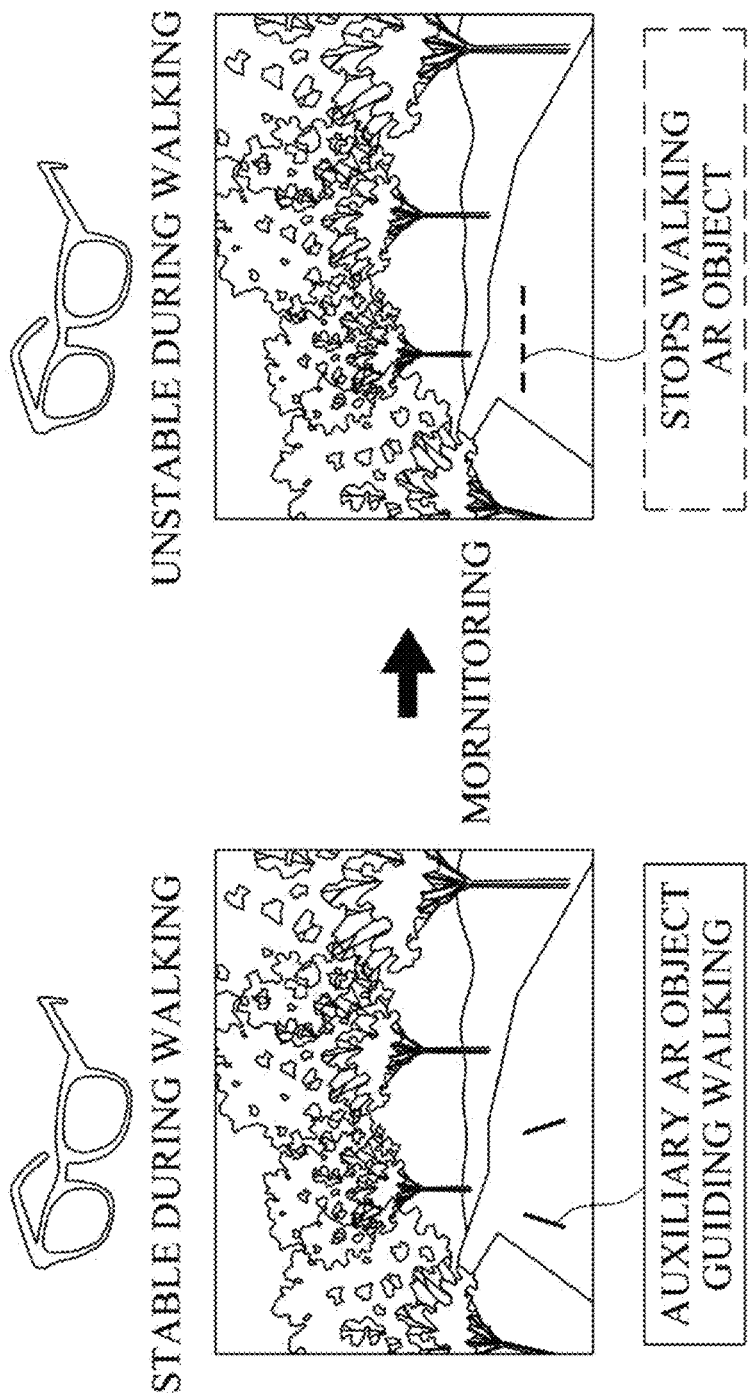
FIG. 102 is a diagram illustrating the action of treating Parkinson's disease in an augmented reality system using computer vision in an embodiment of the present disclosure.

FIG. 102 is a diagram illustrating the action of treating Parkinson's disease in an augmented reality system using computer vision in an embodiment of the present disclosure.

Referring to the drawing, the augmented reality system 1 may display an AR object through computer vision on the wearable device 9800 according to the degree of handshake or walking when the user moves to wear the wearable device 9800.

In detail, when it is determined that the hand tremor or walking state is stable during walking of the user, the augmented reality system 1 displays an auxiliary AR object guiding walking on the wearable device 9800 and continuously monitors the walking state of the user. The auxiliary AR object may be implemented to receive geographic information from an external gps server and guide the way.

The augmented reality system 1 displays a stop AR object that stops walking on the wearable device 9800 when it is determined that the walking state of the user is unstable during walking. As described above, the augmented reality system 1 provides different AR objects according to the user's state, so that the user can respond quickly when developing Parkinson's symptoms.

5.3.3.2 Insomnia

Figure 103:
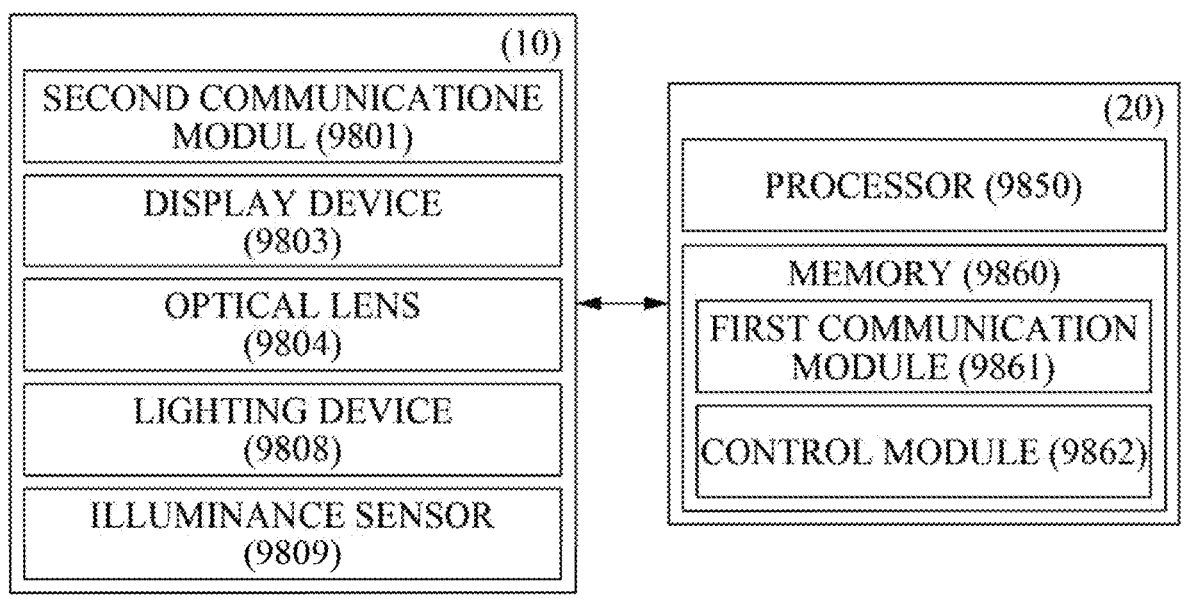
FIG. 103 is a block diagram of an augmented reality system for treating insomnia according to an embodiment of the present disclosure.
Figure 104:
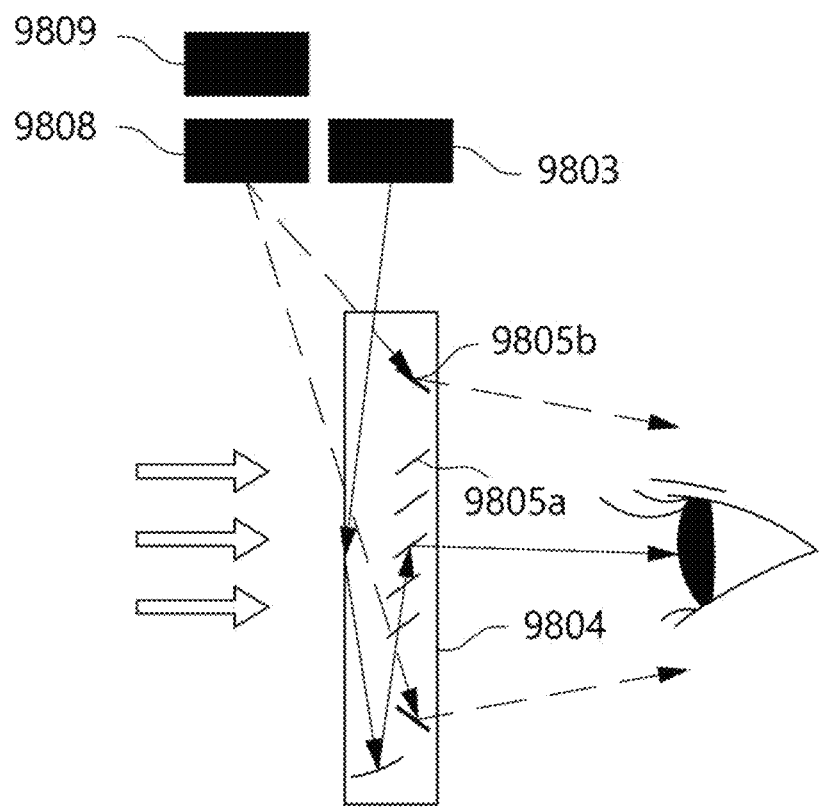
FIG. 104 is a diagram illustrating a method of operating an augmented reality system for treating insomnia using an internal second reflector in an embodiment of the present disclosure.
Figure 105:
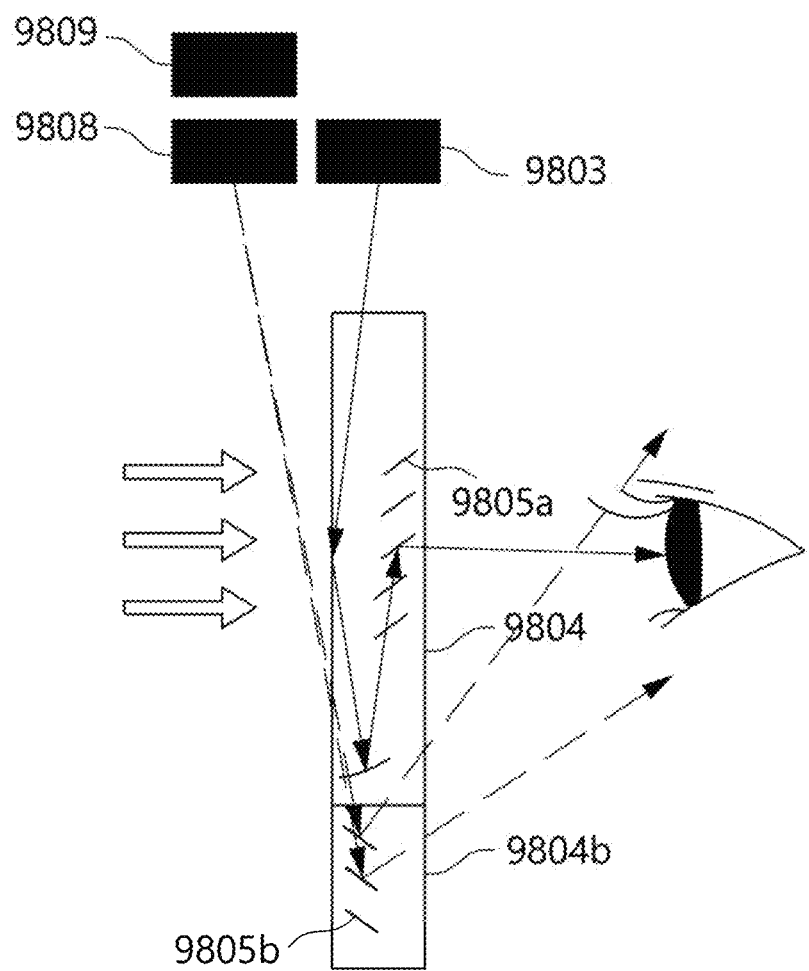
FIG. 105 is a diagram illustrating a method of operating an augmented reality system for treating insomnia using a second reflector of an extension in an embodiment of the present disclosure.
Figure 106:
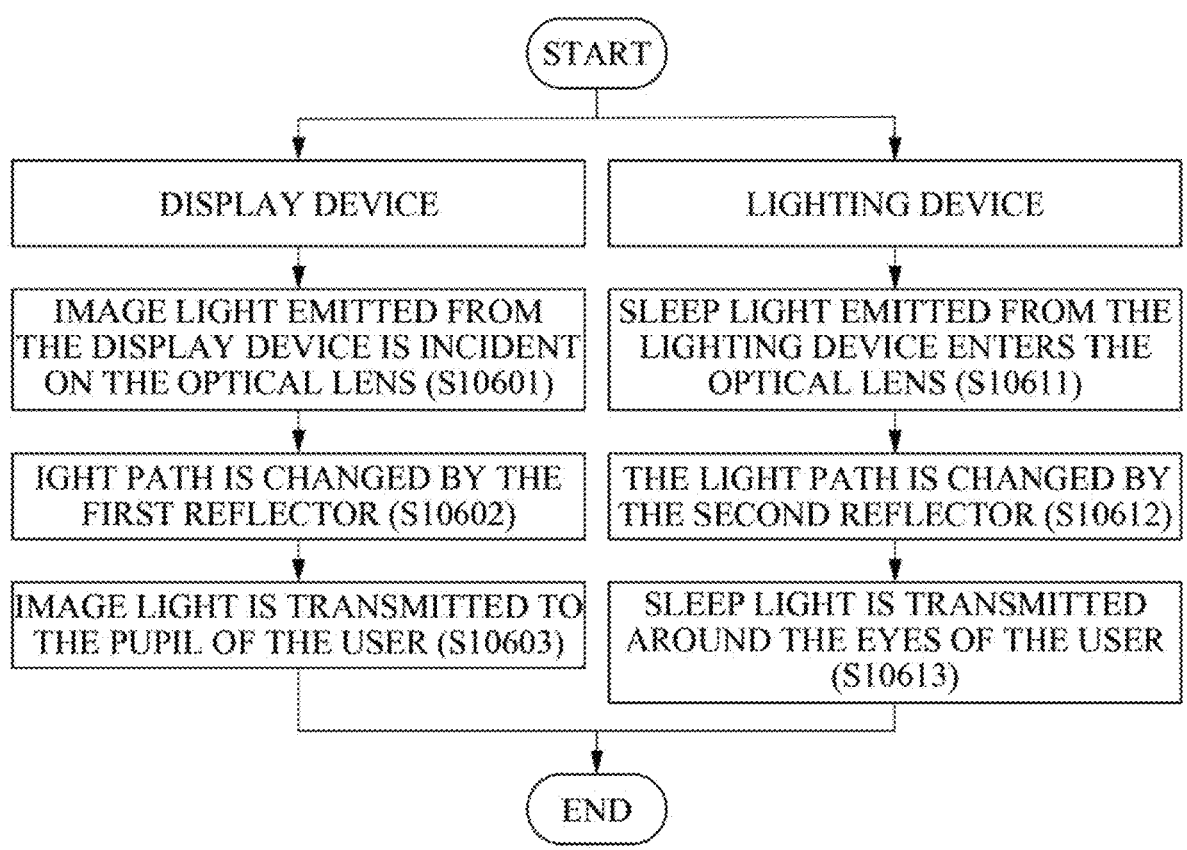
FIG. 106 is a flowchart of an operation of an augmented reality system for treating insomnia according to an embodiment of the present disclosure.

FIG. 103 is a block diagram of an augmented reality system for treating insomnia according to an embodiment of the present disclosure. FIG. 104 is a diagram illustrating a method of operating an augmented reality system for treating insomnia using an internal second reflector in an embodiment of the present disclosure. FIG. 105 is a diagram illustrating a method of operating an augmented reality system for treating insomnia using a second reflector of an extension in an embodiment of the present disclosure. FIG. 106 is a flowchart of an operation of an augmented reality system for treating insomnia according to an embodiment of the present disclosure.

Referring to FIGS. 103 and 104, the augmented reality system 1 includes an augmented reality device 10 and a server 20. The augmented reality device 10 and the server 20 communicate with a wired network or a wireless network to exchange data, and provide AR images for disease diagnosis and treatment to users. Since some configurations and operations of the augmented reality device 10 and the server 20 are the same as those described above, descriptions of duplicate configurations will be omitted below.

In various embodiments, the augmented reality device 10 is a device worn on the user's face, and may be a wearable device 9800 (e.g., AR glass). The wearable device may include a second communication module 9801, a display device 9803, an optical lens 9804, a lighting device 9808, and an illuminance sensor 9809. The server 20 may include a processor 9850, a first communication module 9861, and a control module 9862.

In the case of insomnia, it is a disease that does not easily fall in the night, and when sunlight is applied for a predetermined time in the day, melatonin, which is a sleep hormone, is normally secreted, so that the lifetime hindrance phenomenon can be significantly alleviated.

The lighting device 9808 is a device that generates sleep light using electric energy, and may be an LED lamp, and the sleep light emitted may be visible light or green light having a wavelength between 450 nm and 117 nm.

The optical lens 9804 includes a first reflector 9805a and a second reflector 9805b. The first reflector 9805a and the second reflector 9805b are all one of the light path forming elements, and may be an optical element that changes the path of light. The first reflector 9805a reflects the image light emitted from the display device 9803 and transmits the image light to the user's eye. The second reflector 9805b reflects the sleep light emitted from the lighting device 9808 and transmits the sleep light to the periphery of the user's eye. The sleep light transmitted to the periphery of the user's eye by the second reflector 9805b is absorbed through the retina of the user's eye, stimulates the sleep glands of the brain and regulates the secretion of melatonin, so that insomnia can be eliminated.

In addition, the display device 9803 and the led lamp may be selectively driven or simultaneously driven. The display device 9803 and the LED lamp are disposed so that the first reflector 9805*a* and the second reflector 9805*b* do not interfere with each other with each other when they are simultaneously driven, so that the sleep therapy can be performed and the AR image and the external object can be seen.

In various embodiments, since the destinations of the light reflected by the first reflector 9805*a* and the second reflector 9805*b* are different, the first reflector 9805*a* and the second reflector 9805*b* may be formed at different angles. In detail, the first reflector 9805*a* is formed at a first angle so as to reflect the image light and enter the user's eye. The second reflector 9805*b* may be formed at a second angle different from the first angle so as to irradiate the sleep light at a predetermined distance based on the user's eye. That is, the second reflector 9805*b* may be formed at a smoother angle than the first reflector 9805*a*, and the first reflector 9805*b* may be disposed at a pluralities at different locations.

In various embodiments, referring to FIG. 105, the optical lens 9804 may include a main portion 9804*a* and an extension portion 9804*b*. The main portion 9804*a* includes the first reflector to enter the user's pupil. The extension portion 9804*b* may be formed at one end of the main portion 9804*a* in the longitudinal direction of the main portion 9804*a*. As described above, the second reflector 9805*b* transmits the sleep In various embodiments, the second reflector 9805*b* may be provided in a path in which sleep light is not interfered with image light and actual object image light in the extension 9804*b*. As the second reflector 9805*b* is located in the extension 9804*b*, which is a separate space rather than located in the main body 13104*a* such as the first reflector 9805*a*, the probability that the image light of the display device 9803 and the illumination light of the illumination device interfere with each other can be lowered.

The server 20 includes a processor 9850 and a memory 9860. The memory 9860 includes a first communication module 9861 for communicating with the augmented reality device 10 and a control module 9862 for controlling overall operations of the augmented reality device 10.

As illustrated in FIG. 106, the operation flow of the augmented reality system for treating insomnia is examined, when the image light (S10601) emitted from the display device 9803 is incident on the optical lens 9804, the light path is changed by the first reflector 9805*a*, and the image light is transmitted to the pupil of the user (S10602). In addition, when the sleep light (S10611) emitted from the lighting device enters the optical lens 9804, the light path is changed by the second reflector 9805*b* (S10612) and the sleep light is transmitted around the eyes of the user (S10613).

5.3.3.3 Psychiatric Disease

Figure 107:
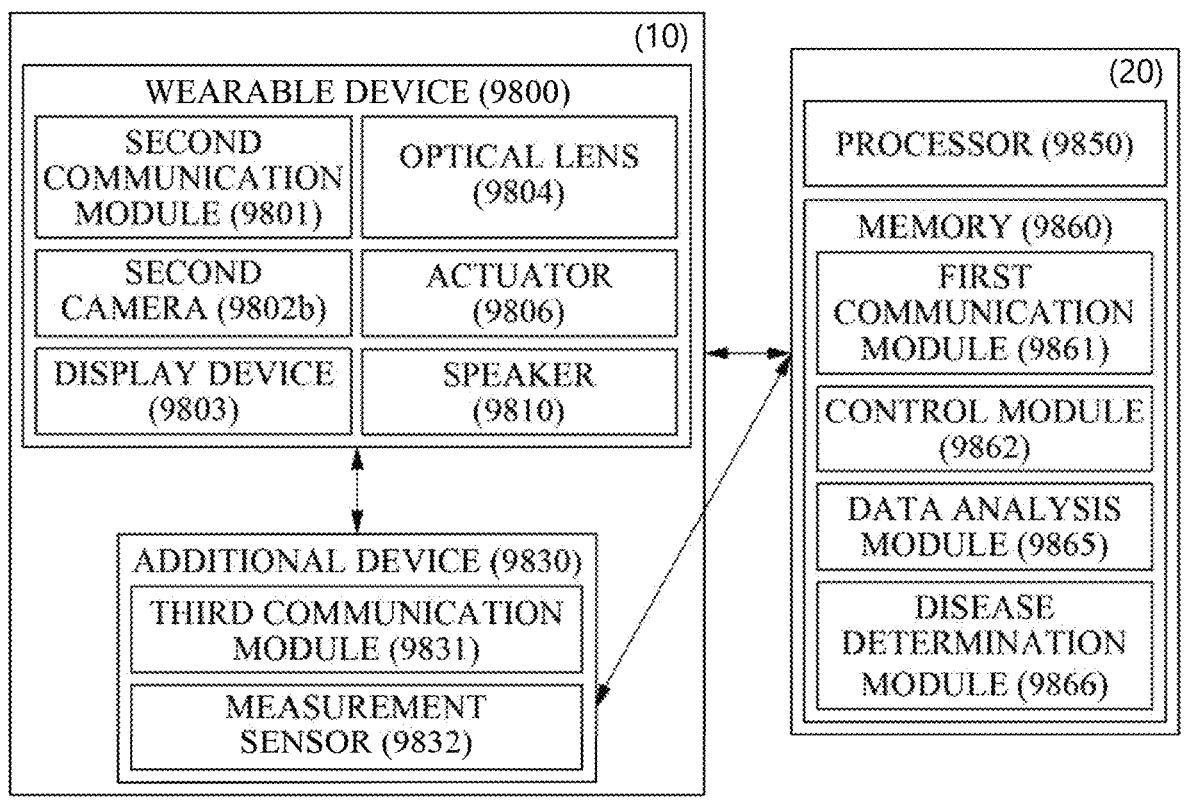
FIG. 107 is a block diagram of an augmented reality system for mental disease according to an embodiment of the present disclosure.
Figure 108:
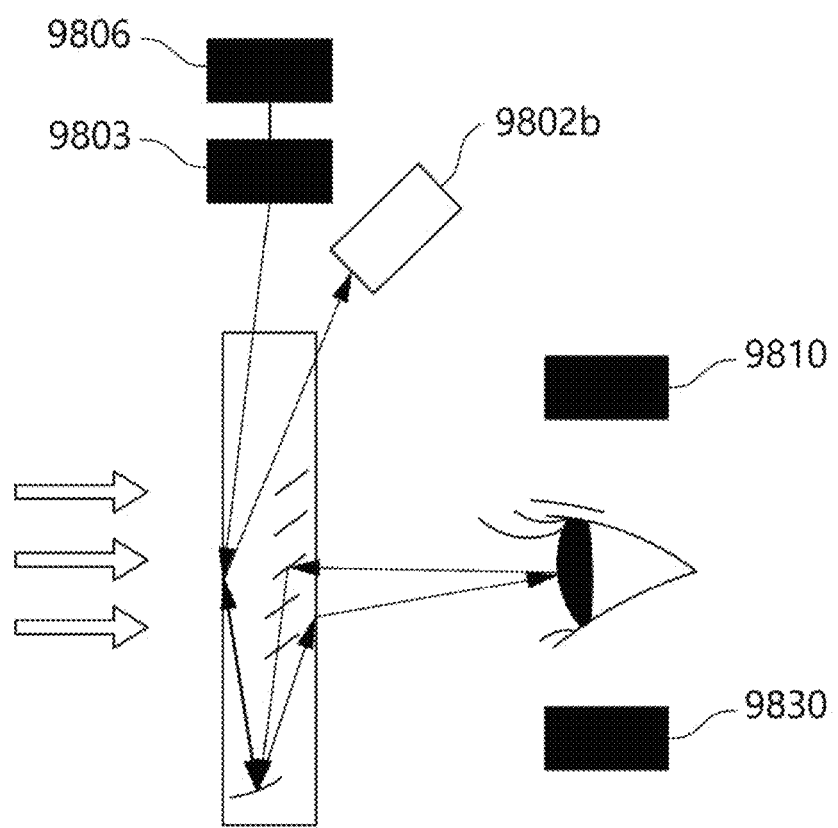
FIG. 108 is a diagram illustrating the structure and operation of an augmented reality system for mental disease according to an embodiment of the present disclosure.

FIG. 107 is a block diagram of an augmented reality system for mental disease according to an embodiment of the present disclosure. FIG. 108 is a diagram illustrating the structure and operation of an augmented reality system for mental disease according to an embodiment of the present disclosure.

Referring to FIGS. 107 and 108, the augmented reality system 1 includes an augmented reality device 10 and a server 20. The augmented reality device 10 and the server 20 communicate with a wired network or a wireless network to exchange data, and provide AR images for disease diagnosis and treatment to users. Since some configurations and operations of the augmented reality device 10 and the server 20 are the same as those described above, descriptions of duplicate configurations will be omitted below.

In various embodiments, the augmented reality device 10 includes a wearable device 9800 and an additional device 9830, and the wearable device 9800 may include at least one of a second communication module 9801, a second camera 9802*b*, a display device 9803, an optical lens 9804, an actuator 9806, and a speaker 9810.

The second camera 9802*b* is provided on one side of the augmented reality device 10 and may be disposed to face the user's eyeball while the user wears the augmented reality device 10 or may be disposed in a direction to face the optical lens 9804 to allow the user to photograph the pupil through refraction.

The second camera 9802*b* may be an infrared camera using a light source of an infrared (IR) region. In addition, the acquired user's pupil image may be transmitted to a server to be described later and used to determine whether the user has a mental disease.

The speaker 9810 is provided on one side of the augmented reality device 10 to provide a sound related to the treatment of psychiatric diseases. Various sounds may be, for example, sounds for mental stability such as natural sounds and sleep-induced sounds, or treatment notification sounds.

Meanwhile, the speaker 9810 may be provided at a position close to the user's ear so that the user easily recognizes the sound only with a small loudness. For example, when the augmented reality device 10 is an optical glass, the speaker 9810 may be located on one side of the temple.

The display device 9803 emits image light including therapeutic AR content for mental disease. The therapeutic AR content may be an image providing positive visual data, an image providing role play, or an image guiding medication, etc. In addition, the display device 9803 may output an image and content corresponding to the sound output of the speaker 9810. The emitted image light is changed by the optical path through the lens and is transmitted to the pupil of the user, and the display device 9803 and the camera 9802 may be integrally formed in consideration of form factors.

The additional device 9830 may include a third communication module 9831 and a measurement sensor 9832. The measurement sensor 9832 is attached to one side of the body rather than the face of the user to measure the user's motion or biometric signal. The measurement sensor 9832 may be, for example, a motion sensor, a sound detection sensor 9807, and a vibration detection sensor 9807. The measurement sensor 9832 collects biometric data such as motion data of the user, sound data generated, and vibration data in real time.

The server 20 includes a processor 9850 and a memory 9860. The memory 9860 includes a first communication module 9861 for communicating with the augmented reality device 10, a control module 9862 for controlling the overall operation of the augmented reality device 10, a data analysis module 9865 for analyzing the acquired data, and a disease determination module 9866.

The data analysis module 9865 analyzes the pupil image of the user acquired from the second camera 9802*b* of the augmented reality device 10. In detail, the degree of movement of the pupil and the rate of change in the size of the pupil may be calculated from the pupil image.

The disease determination module 9866 determines the mental disease currently having by the user among various mental diseases through the results of the pupil image analysis and the biometric data of the user. The mental disease may include various mental diseases such as ADHD, schizophrenia, and depression, and may have different pupil movement and biometric data values for each disease.

The disease determination module 9866 may assign different weights to the biometric data value or type and analysis result to determine the mental disease corresponding to the user. In addition, the disease determination module 9866 may provide the therapeutic AR content related to the determined mental disease to the user through the display device 9803. The therapeutic AR content may be cognitive behavior therapeutic content.

Figure 109:
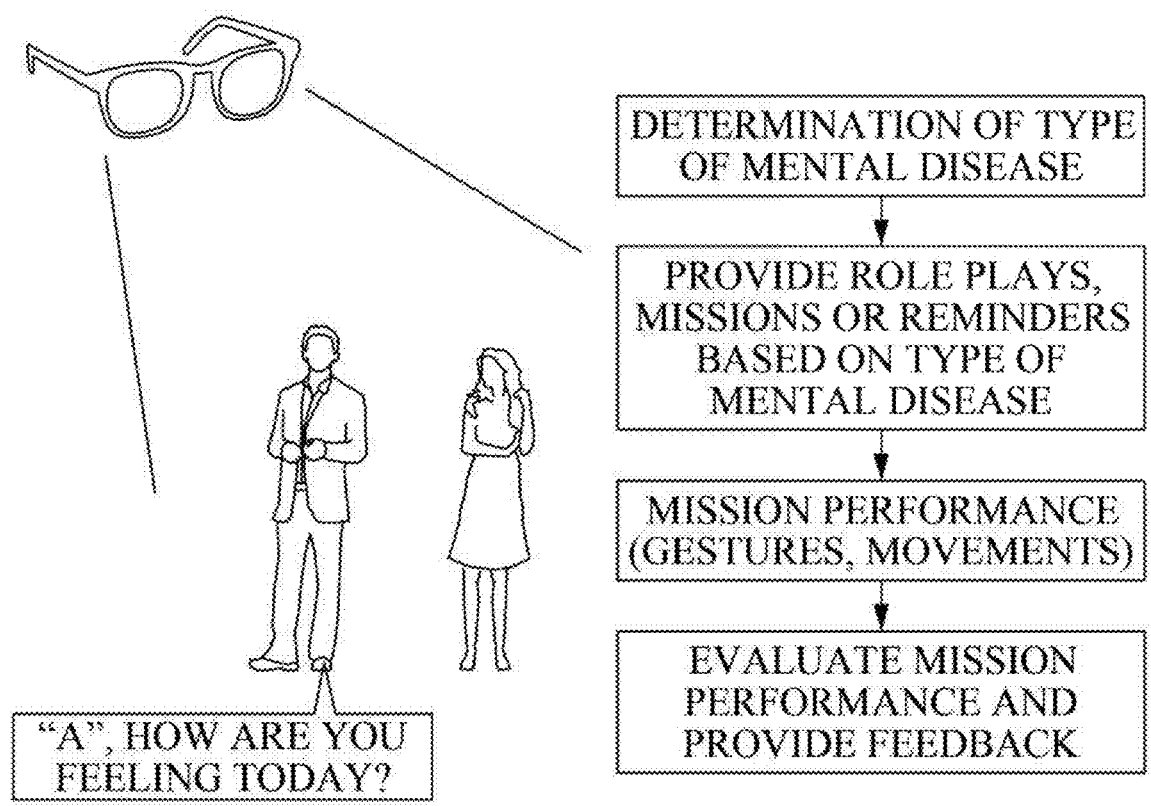
FIG. 109 is a diagram illustrating therapeutic AR content provided according to mental disease according to an embodiment of the present disclosure.

FIG. 109 is a diagram illustrating therapeutic AR content provided according to mental disease according to an embodiment of the present disclosure.

As illustrated in FIG. 109, the wearable device 9800 may provide a virtual character that may interact with the user through the display device 9803. The user may perform role play through interaction with the virtual character, and may reduce anxiety while performing a mission presented through the virtual character and reduce stress to alleviate symptoms of schizophrenia. The mission may include various mission such as drawing painting, medication guided mission at a specific cycle, breathing guided mission, etc.

According to various embodiments, the wearable device 9800 may provide a medication guide notification including at least one of the type, dose, medication frequency, and medication cycle of medicines requiring medication through virtual characters as game-type AR contents.

In addition, in various embodiments, the wearable device 9800 may provide feedback through evaluation according to the mission performance of the user. For example, the wearable device 9800 may determine whether to perform a medication operation according to the medication guide through the measurement sensor 9832, and provide a feedback of praise or encouragement to the user on the result of the operation.

Figure 110:
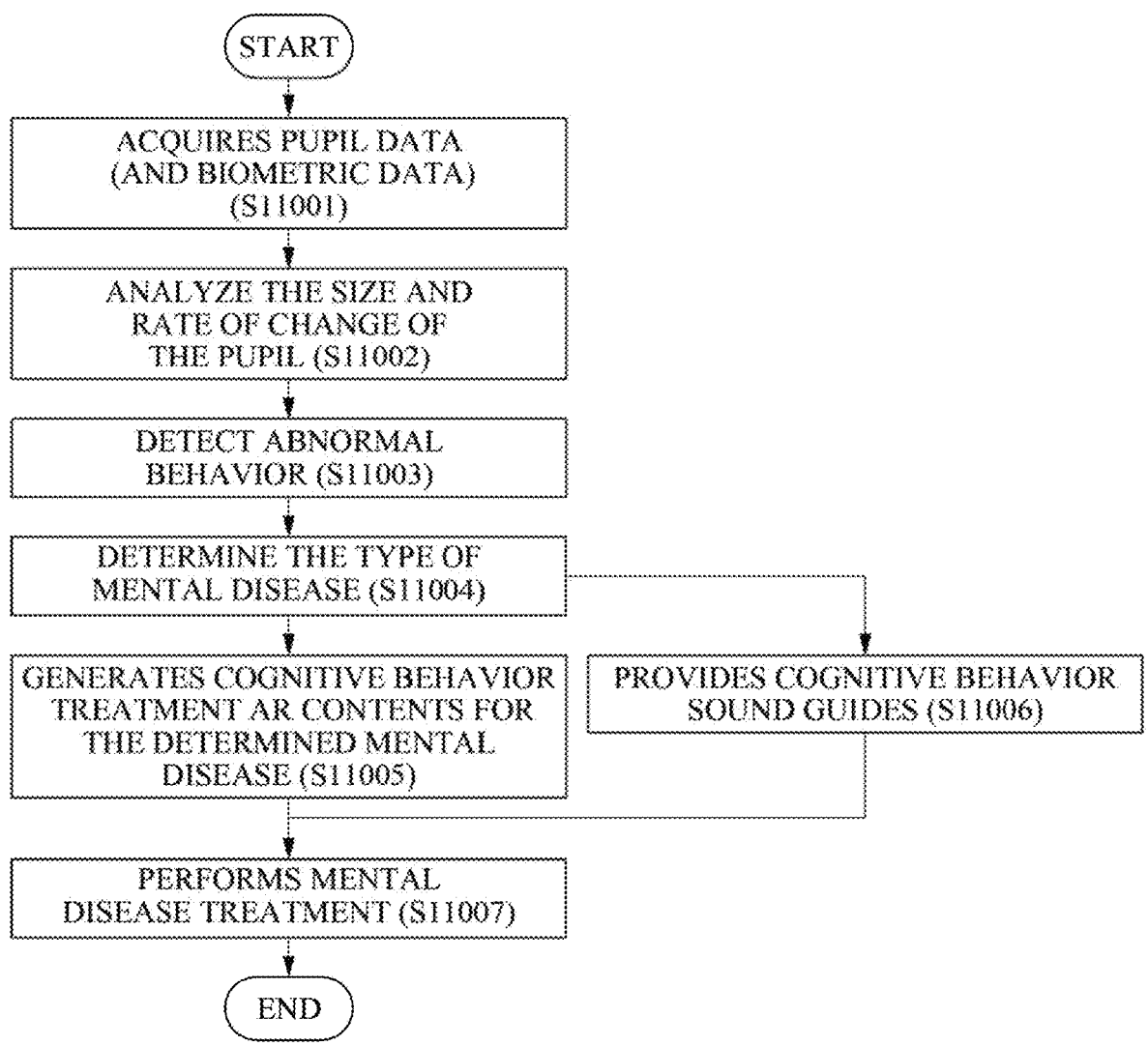
FIG. 110 is a flowchart of an operation of an augmented reality system for mental disease according to an embodiment of the present disclosure.

FIG. 110 is a flowchart of an operation of an augmented reality system for mental disease according to an embodiment of the present disclosure.

First, the augmented reality device 10 acquires pupil data through the second camera 9802*b* and acquires biometric data through the measurement sensor 9832 (S11001). Thereafter, the data analysis module 9864 and the disease determination module of the server 20 analyze the size and rate of change of the pupil from the pupil data (s11002), detect abnormal behavior from the biometric data (s11003), and determine the type of mental disease of the user (s11004).

Thereafter, the disease determination module generates cognitive behavior treatment AR contents for the determined mental disease and provides it through the display device 9803 (s11005), and simultaneously or separately provides cognitive behavior sound guides to the user (s11006), thereby performing mental disease treatment (s11007).

6. Quality Evaluation

Figure 111:
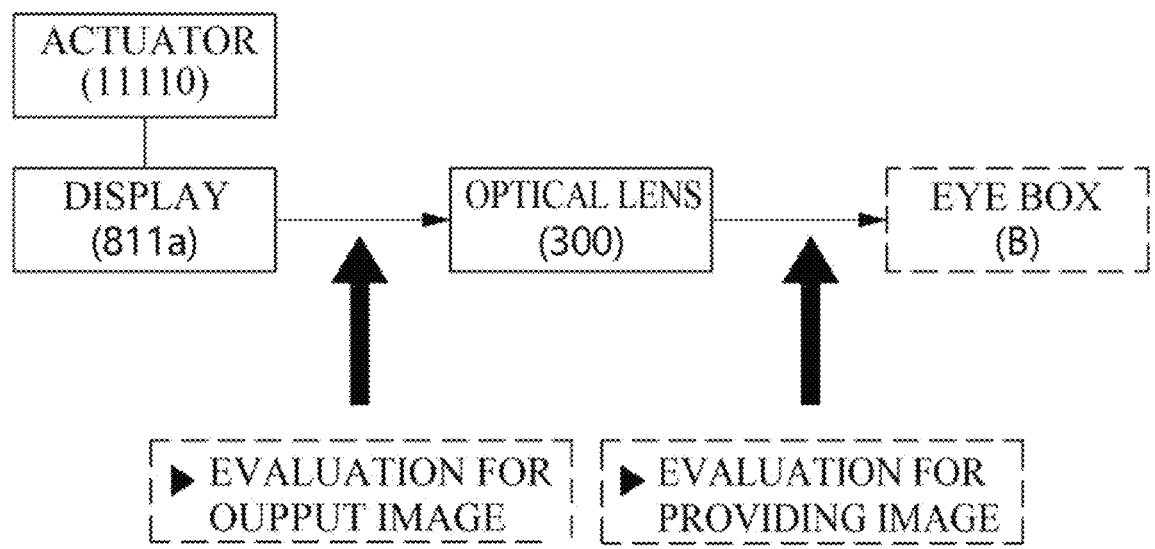
FIG. 111 is a diagram for describing an example of a quality evaluation target according to various embodiments.
Figure 112:
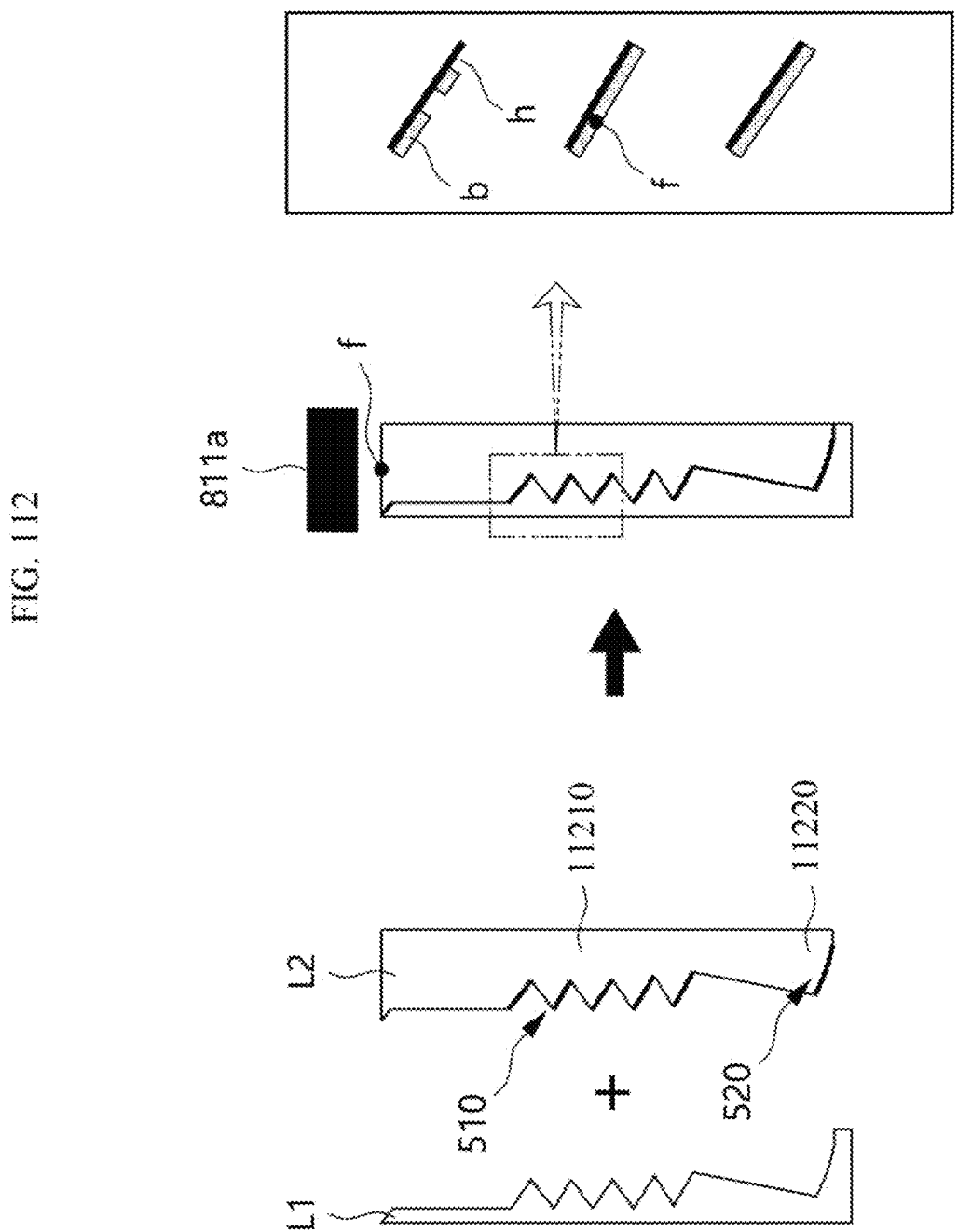
FIG. 112 is a diagram for explaining an example of defects that may occur during the manufacturing process and the manufacturing process of the optical lens 300 according to various embodiments.

FIG. 111 is a diagram for describing an example of a quality evaluation target according to various embodiments. FIG. 112 is a diagram for explaining an example of defects that may occur during the manufacturing process and the manufacturing process of the optical lens 300 according to various embodiments.

According to various embodiments, a quality evaluation device for evaluating the quality of the augmented reality device 10 may be provided. For example, referring to FIG. 111, the augmented reality device 10 may include an actuator 11110, a display 811*a*, and an optical lens 300, and is not limited to the illustrated example and may include more components described above, and thus redundant descriptions are omitted.

In an embodiment, the quality evaluation device may be implemented to evaluate the actuator 11110 and/or the quality of the display 811*a* to enhance the quality of the image output from the display 811*a*. For example, referring to FIG. 112, assessment of foreign matter f between the display 811*a* and the optical lens 300 may also be performed.

In another embodiment, the quality evaluation device may be implemented to evaluate the quality of the optical lens 300 itself in an unworn state to enhance the quality of the image provided to the user from the augmented reality device 10. For example, referring to FIG. 112, the optical lens 300 may be formed based on the coupling of the plurality of portions I1 and I2. Each of the plurality of portions I1 and I2 is formed to include structures 11210 and 11220 for arranging optical elements 510 and 530, and the optical lens 300 may be implemented by coupling the one portion (e.g., the second portion I2) to another portion (e.g., the first portion I1) while the optical elements 510 and 530 are arranged on the structures 11210 and 11220 of one portion (e.g., the second portion I2). In this case, defects such as parts h in which foreign substance f is disposed or adhesive body b is not applied may occur between the structures 11210, 11220 for disposing the optical elements 510, 530 of the plurality of parts L1, L2. Therefore, the quality evaluation device may be implemented to detect defects between the structures 11210, 11220 for disposing the optical elements 510, 530.

In another embodiment, the quality evaluation device may be implemented to evaluate the quality of the image visualized by the user in a wearing state to enhance the quality of the image provided from the augmented reality device 10 to the user.

6.1. Actuator Quality Evaluation

Figure 113:
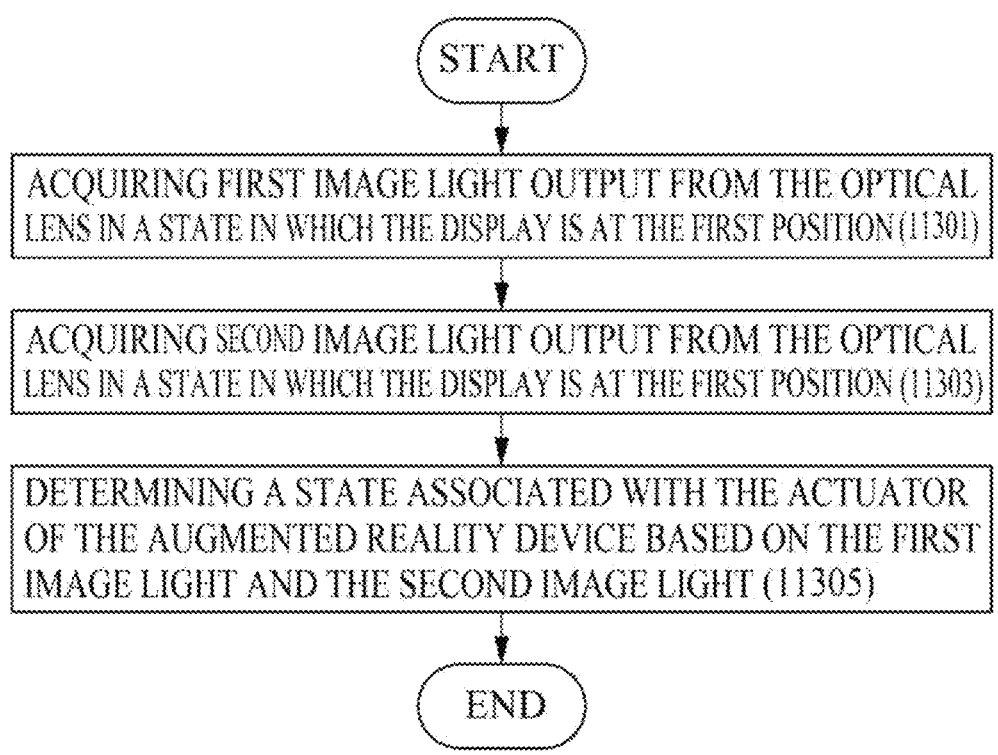
FIG. 113 is a flowchart illustrating an example of an operation of a quality evaluation device for evaluating the quality of an actuator according to various embodiments.
Figure 114:
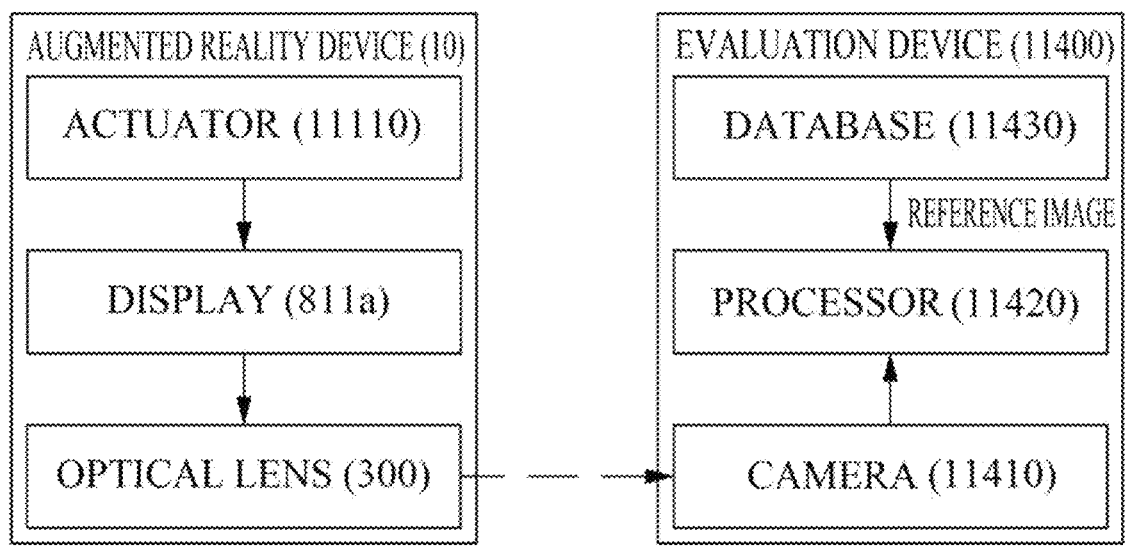
FIG. 114 is a diagram illustrating an example of a quality evaluation device according to various embodiments.

FIG. 113 is a flowchart illustrating an example of an operation of a quality evaluation device for evaluating the quality of an actuator according to various embodiments. Operations may be performed in a different order from the illustrated and/or recited order, additional operations may be performed, and/or some of the operations may not be performed. FIG. 114 is a diagram illustrating an example of a quality evaluation device according to various embodiments.

Hereinafter, FIG. 113 will be further described with reference to FIG. 114.

According to various embodiments, in operation 11301, the evaluation device 11400 may acquire first image light output from the optical lens in a state in which the display is at the first position, and acquire second image light output from the optical lens in a state in which the display is at the second position in operation 11303. For example, the evaluation device 11400 may include a camera 11410, a processor 11420, and a database 11430. The evaluation device 11400 (e.g., the processor 11420) may acquire first image light output through the optical lens 300 in a state in which the position of the display 811*a* is at the first position by the actuator 11110 using the camera 11410, and acquire second image light output through the optical lens 300 in a state in which the position of the display 811*a* is at the second position by the actuator 11110 using the camera 11410.

According to various embodiments, in operation 11305, the evaluation device 11400 may determine a state associated with the actuator of the augmented reality device based on the first image light and the second image light. The evaluation device 11400 (e.g., the processor 11420) may determine the state of the actuator 11110 based on a comparison between the difference between the first image light and the second image light and a reference value stored in the database 11430. For example, the database 11430 may be implemented to store a difference value of image light corresponding to each difference in the position of the display 811*a*. For example, the database 11430 may store a reference value for a difference in image light expected when the difference between the first position and the second position occurs. The evaluation device 11400 (e.g., the processor 11420) may determine that the state of the actuator 11110 is an abnormal state when the difference between the reference value and the difference value is greater than or equal to a pre-set value, and may determine that the state of the actuator 11110 is a normal state when the pre-set value is less than the pre-set value.

6.2. Optical Lens Quality Evaluation

Figure 115:
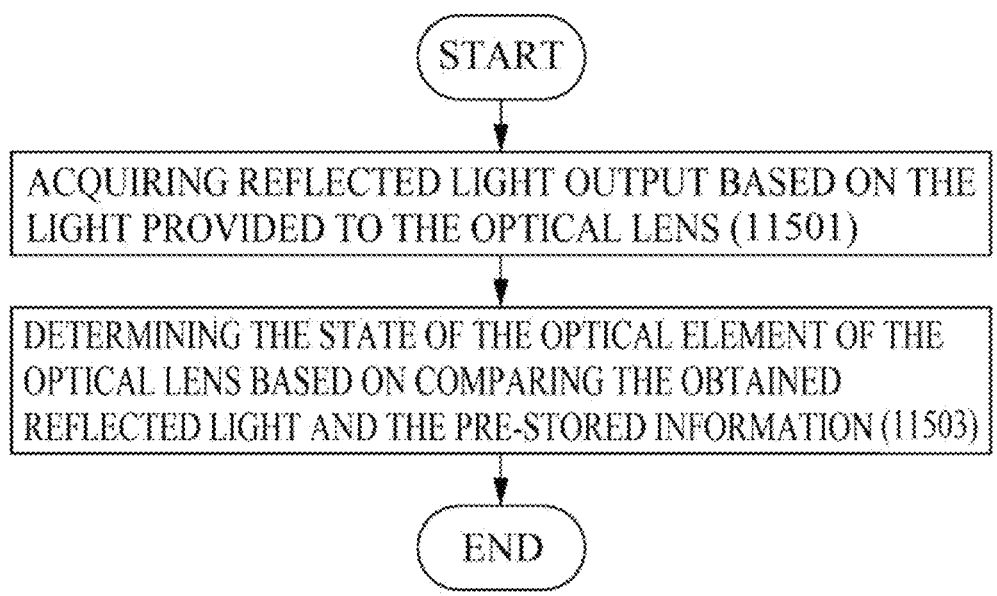
FIG. 115 is a flowchart illustrating an example of an operation of a quality a quality evaluation device for evaluating the quality of an optical lens according to various embodiments.

FIG. 115 is a flowchart illustrating an example of an operation of a quality a quality evaluation device for evaluating the quality of an optical lens according to various embodiments. Operations may be performed in a different order from the illustrated and/or recited order, additional operations may be performed, and/or some of the operations may not be performed. Hereinafter, FIG. 115 will be further described with reference to FIG. 116 to 117.

Figure 116:
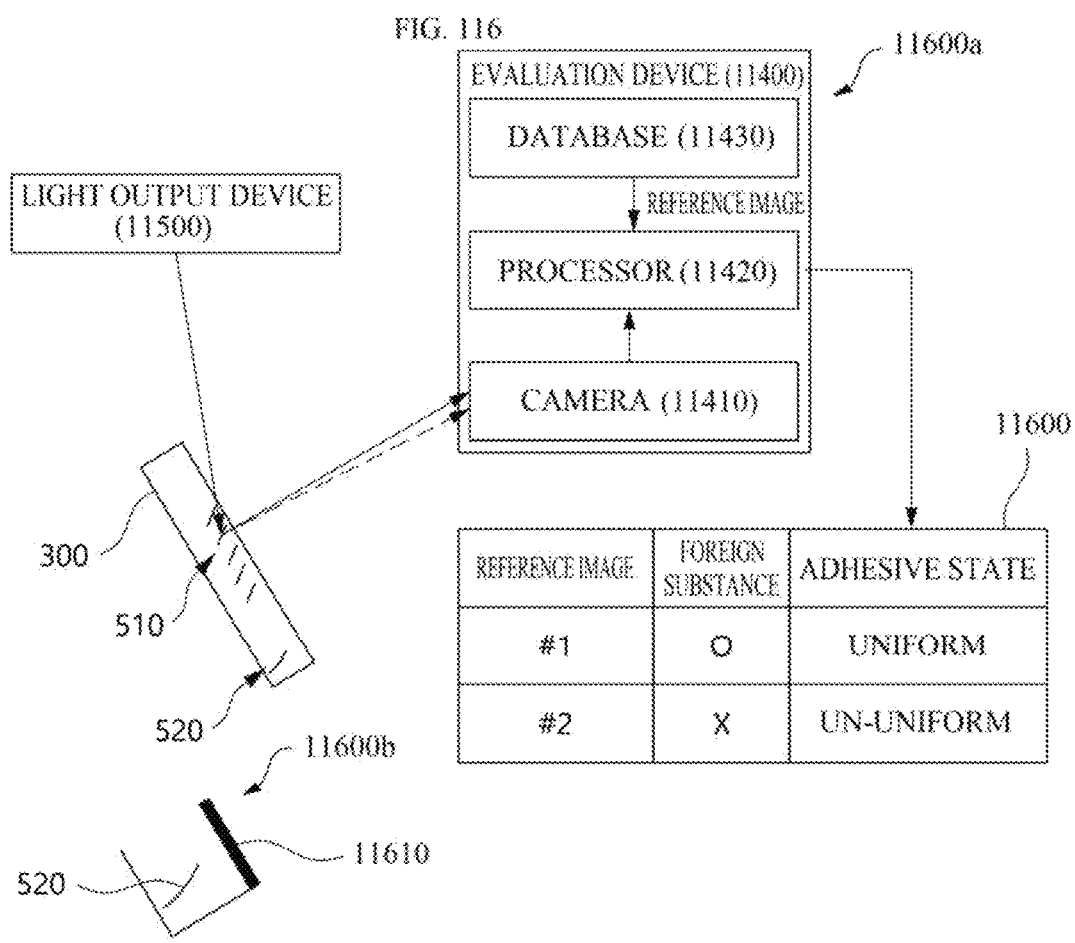
FIG. 116 is a diagram for describing an example of an operation for evaluating the quality of an optical lens of a quality evaluation device according to various embodiments.

FIG. 116 is a diagram for describing an example of an operation for evaluating the quality of an optical lens of a quality evaluation device according to various embodiments. FIG. 117 is a diagram for describing an example of a pattern image provided as an optical lens by a quality evaluation device according to various embodiments.

According to various embodiments, the evaluation device 11400 may acquire reflected light output based on the light provided to the optical lens 300 in operation 11501. For example, referring to 11600*a* of FIG. 116, the evaluation device 11400 described above may further include a light output device 11500 for providing light for quality evaluation to the optical lens 300. Based on providing light to the optical lens 300 using the light output device 11500, the evaluation device 11400 (e.g., the processor 11420) may acquire an image output from the reflective members 510 using the camera 11410. In this case, the light provided using the light output device 11500 may be a pattern image 11700 including a pattern corresponding to the arrangement of the plurality of reflective members 510, as shown in FIG. 117.

According to various embodiments, when light for quality evaluation is provided to the optical lens 300 by using the light output device 11500, the optical lens 300 may be disposed to have a predetermined inclination so that the light is directly provided to the plurality of reflective members 510. In this case, as illustrated in 11600*b* of FIG. 116, the light blocking member 11610 is disposed in the region of the optical lens 300 corresponding to the collimator 520, so that the influence of the collimator 520 by reflection can be reduced. Meanwhile, the arrangement state of the optical lens 300 may be formed so that the light is provided to a partial area of the optical lens 300 and reflected and provided to a plurality of reflective members 300, without limitation to the illustrated and/or described examples.

According to various embodiments, the evaluation device 11400 may determine the state of the optical element (e.g., the plurality of reflective members 510) of the optical lens 300 based on comparing the obtained reflected light and the pre-stored information 11600 in operation 11503.

In an embodiment, as shown in 11600*a* of FIG. 116, the database 11430 may be implemented to store information 11600 on a reference image corresponding to each application state of the foreign substance f and the adhesive b between the portions L1, L2 of the optical lens 300 described above. The evaluation device 11400 may identify the foreign substance and/or the adhesive application state of the optical lens 300 based on comparing the acquired image with the reference image.

In another embodiment, the evaluation device 11400 may determine whether the optical lens 300 is bad based on the intensity of light by position from the image identified based on the provision of the pattern image. For example, if the intensity of light at a specific location is less than a pre-set value, it may be determined that a specific reflection member corresponding to the location among the plurality of reflection members 510 is bad.

On the other hand, without being limited to the described example, the evaluation device 11400 may provide a pattern image for evaluation of the collimator 520 and perform quality evaluation on the collimator 520 based on the image formed based on the reflected light.

6.3. Quality Assessment-Based Content Control

Figure 118:
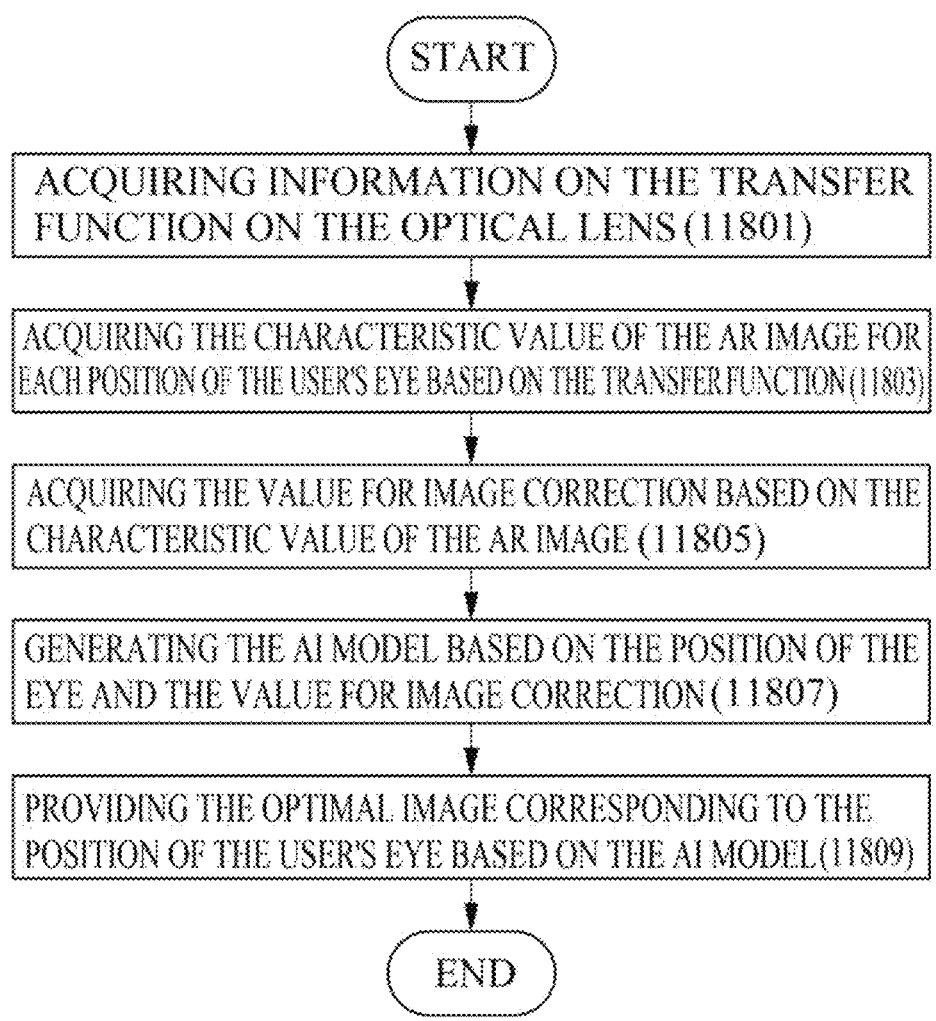
FIG. 118 is a flowchart illustrating an example of an operation of the server for controlling content based on quality evaluation according to various embodiments.

FIG. 118 is a flowchart illustrating an example of an operation of the server 20 for controlling content based on quality evaluation according to various embodiments. Operations may be performed in an order different from the illustrated and/or described order, additional operations may be performed, and/or some of the operations may not be performed.

Hereinafter, FIG. 118 will be further described with reference to FIG. 119.

FIG. 119 is a diagram for describing an example of an artificial intelligence model for content control according to various embodiments.

According to various embodiments, the server 20 may acquire information on the transfer function on the optical lens 300 in operation 11801, and acquire the characteristic value of the AR image for each position of the user's eye based on the transfer function in operation 11803.

According to various embodiments, the server 20 may acquire the value for image correction based on the characteristic value of the AR image in operation 11805. For example, referring to 11900*a* of FIG. 119, the correction module may acquire the correction parameter for correction based on comparing the above-described characteristic value of the AR image with the reference characteristic value set to be provided to the user.

According to various embodiments, the server 20 may generate the ai model based on the position of the eye and the value for image correction in operation 11807. For example, as shown in 11900*b* of FIG. 119, the artificial intelligence model 11900 implemented to output the correction parameter for correcting the characteristic value may be trained in response to the information on the position of the eye being input.

According to various embodiments, the server 20 may provide the optimal image corresponding to the position of the user's eye based on the ai model in operation 11809. For example, the server 20 may control the visual characteristic (e.g., brightness, contrast) and/or the shape of the image light for each pixel output based on the correction parameter output from the artificial intelligence model 11900. The artificial intelligence model 11900 may be provided and used as the user terminal 20 and/or the augmented reality device 10 without being limited to the described example.

The invention claimed is:

1. An optical lens module for providing augmented reality content comprising:
    an optical lens, in which a plurality of optical elements are embedded and disposed to provide image light to a pupil of a user's eye;

a connection member configured to be physically coupled with the optical lens, and a display configured to provide image light to the plurality of optical elements, wherein the display is physically coupled with a seating structure of the connection member, wherein a first coupling structure extending in a lateral direction is formed on one side of the optical lens, wherein a plurality of second coupling structures are formed on one side of the connection member in the lateral direction, and a gap is formed between the plurality of second coupling structures, and wherein, in a state in which the connection member and the optical lens are physically coupled with each other based on the first coupling structure and the plurality of second coupling structures being physically coupled to each other so that the display coupled with the connection member is optically coupled with the optical lens through the gap, image light output from the display is provided in a direction of the optical lens through the gap between the plurality of second coupling structures.

2. The optical lens module of claim 1, wherein, in the state in which the connection member and the optical lens are coupled based on the first coupling structure and the plurality of second coupling structures being coupled to each other, the position of the gap formed between the plurality of protruding structures corresponds to the position of the plurality of optical elements.

3. The optical lens module of claim 2, wherein the image light output from the display is provided toward the plurality of optical elements through the gap, and wherein the augmented reality content is visually recognized by the user as the image light is reflected from the plurality of optical elements and provided to the pupil of the user.

4. The optical lens module of claim 1, further comprising: a display holder in which the display is disposed, wherein the display holder is disposed in the seating structure of the connection member.

5. The optical lens module of claim 4, further comprising: an electrical connection member extending from the display, wherein the electrical connection member is extend laterally on the connection member.

6. The optical lens module of claim 1, wherein at least one optical member is disposed between the gap.

7. The optical lens module of claim 6, wherein the at least one member includes an optical member, wherein a first optical characteristic of the optical member corresponds to a second optical characteristic of the optical lens.

8. The optical lens module of claim 6, wherein the at least one member includes a driving device for moving a position of the display.

9. The optical lens module of claim 1, wherein the plurality of second coupling structures include a first protruding structure and a second protruding structure, wherein the first coupling structures includes a first concave structure implemented to be coupled to the first protruding structure and a second concave structure implemented to be coupled to the second protruding structure, and wherein an electrical connection member extending from the display may be disposed in an empty space formed in a state in which the first protruding structure and the first concave structure are coupled.

10. The optical lens module of claim 9, wherein a height of the first protruding structure is smaller than a height of the second protruding structure, and wherein an empty space is formed between a bottom surface of the first protruding structure and a bottom surface of the first concave structure.

11. The optical lens module of claim 9, wherein a width of the first protruding structure is larger than a width of the second protruding structure, and wherein an empty space is formed inside the first protruding structure.

12. The optical lens module of claim 1, wherein a third coupling structure is formed at the side of the optical lens, wherein a fourth coupling structure formed to be coupled to the first coupling structure, and wherein the connection member is firmly supported by an additional member in a state in which the third coupling structure and the fourth coupling structure are coupled.

13. The optical lens module of claim 12, wherein the third coupling structure is a protruding structure, and the fourth coupling structure is formed as a structure for surrounding the protruding structure.

14. An augmented reality device for providing augmented reality content comprising:

an optical lens in which a plurality of optical elements configured to provide image light to a pupil of an eye of a user are embedded and disposed;

a connection member configured to be physically coupled with the optical lens; and a display configured to provide image light to the plurality of optical elements, wherein the display is physically coupled with a seating structure of the connection member and covering at least a portion of the connection member and the optical lens on which the display is seated, wherein a first coupling structure extending in a transverse direction is formed at an upper portion of the optical lens, a plurality of second coupling structures are formed at a lower portion of the connection member in the transverse direction, and a gap is formed between the plurality of protruding structures, and wherein an image light output from the display is provided in the direction of the optical lens through the gap between the plurality of second coupling structures in a state in which the connection member and the optical lens are physically coupled based on the first coupling structure and each of the plurality of second coupling structures being physically coupled with each other so that the display coupled with the connection member is optically coupled with the optical lens through the gap.

15. The augmented reality device of claim 14, wherein a position of the gap corresponds to the position of the plurality of optical elements, in a state in which the connection member and the optical lens are coupled based on the first coupling structure and each of the plurality of second coupling structures being coupled to each other.

* * * * *